(12) United States Patent
Sheng et al.

(10) Patent No.: US 12,500,745 B2
(45) Date of Patent: Dec. 16, 2025

(54) PRE-SHARED KEY PSK UPDATING METHOD AND APPARATUS

(71) Applicant: Huawei Technologies Co., Ltd., Shenzhen (CN)

(72) Inventors: De Sheng, Shenzhen (CN); Zhonghua Hu, Shenzhen (CN); Shu Zhang, Shenzhen (CN); Jingyi Wang, Shenzhen (CN); Hao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 344 days.

(21) Appl. No.: 18/158,890

(22) Filed: Jan. 24, 2023

(65) Prior Publication Data
US 2023/0163958 A1 May 25, 2023

Related U.S. Application Data

(63) Continuation of application No. PCT/CN2021/086854, filed on Apr. 13, 2021.

(30) Foreign Application Priority Data

Jul. 25, 2020 (CN) ............ 202010740829.0
Sep. 22, 2020 (CN) ............ 202011003460.1
(Continued)

(51) Int. Cl.
H04L 9/08 (2006.01)
(52) U.S. Cl.
CPC ............ *H04L 9/0838* (2013.01); *H04L 9/085* (2013.01); *H04L 9/0861* (2013.01); *H04L 9/0891* (2013.01)

(58) Field of Classification Search
CPC ..... H04L 9/0838; H04L 9/085; H04L 9/0861; H04L 9/0891
(Continued)

(56) References Cited

U.S. PATENT DOCUMENTS 9,763,088 B2 * 9/2017 Lin ............ H04L 63/061
2011/0055558 A1 3/2011 Liu et al.
(Continued)

FOREIGN PATENT DOCUMENTS

CN 101162997 A 4/2008
CN 101282208 A 10/2008
(Continued)

OTHER PUBLICATIONS

F. Bersani et al., "The EAP-PSK Protocol: A Pre-Shared Key Extensible Authentication Protocol (EAP) Method," Network Working Group Request for Comments: 4764, [online], Jan. 2017, pp. 1-64, [search date: May 14, 2024], Internet, URL: https://www.rfc-editor.org/rfc/pdfrfc/rfc4764.txt.pdf>.
(Continued)

*Primary Examiner* — Linglan Edwards
*Assistant Examiner* — Phuc Pham
(74) *Attorney, Agent, or Firm* — Slater Matsil, LLP

(57) ABSTRACT

A pre-shared key (PSK) updating method is disclosed. A first communication apparatus stores a first PSK for processing, within an aging periodicity of the first PSK, a packet exchanged between the first communication apparatus and a second communication apparatus. The first communication apparatus may receive, within the aging periodicity of the first PSK, a first protocol packet that is sent by the second communication apparatus and includes a first PSK key material for generating a second PSK. The second PSK is for processing, within an aging periodicity of the second PSK,
(Continued)

a packet exchanged between the first communication apparatus and the second communication apparatus.

22 Claims, 32 Drawing Sheets

(30) Foreign Application Priority Data

Sep. 22, 2020 (CN) .......................... 202011003466.9
Sep. 22, 2020 (CN) .......................... 202011003471.X
Sep. 22, 2020 (CN) .......................... 202011003472.4
Sep. 22, 2020 (CN) .......................... 202011004873.1

(58) Field of Classification Search
USPC ........................................................ 713/171
See application file for complete search history.

(56) References Cited

U.S. PATENT DOCUMENTS

2019/0342081 A1* 11/2019 Tanimoto .............. H04L 9/0894
2022/0182413 A1*  6/2022 Benson ................. H04L 9/085

FOREIGN PATENT DOCUMENTS

| | | |
|---|---|---|
| CN | 101521882 A | 9/2009 |
| CN | 102984699 A | 3/2013 |
| CN | 103051628 A | 4/2013 |
| CN | 109274494 A | 1/2019 |
| CN | 110399717 A | 11/2019 |
| CN | 111064571 A | 4/2020 |
| CN | 111447128 A | 7/2020 |
| JP | 2005012514 A | 1/2005 |
| JP | 2016537887 A | 12/2016 |
| JP | 2019195116 A | 11/2019 |

OTHER PUBLICATIONS

IEEE 802.1x-2010, Port-Based Network Access Control, IEEE Standard for Local and metropolitan area networks, Feb. 2, 2010, total 222 pages.
T. Clancy et al, Extensible Authentication Protocol Generalized Pre-Shared Key (EAP-GPSK) Method, RFC5433, Feb. 2009, total 38 pages.
B. Aboba et al, Extensible Authentication Protocol (EAP), RFC3748, Jun. 2004, total 67 pages.
Z. Cao et al, EAP Extensions for the EAP Re-authentication Protocol (ERP), RFC6696, Jul. 2012, total 47 pages.

* cited by examiner

| Extensible authentication protocol header EAP header | EAP type EAP type | Flags flags | Extension flags ext flags | Session identifier session ID | Key identifier keyID | Nonce nonce | Identifier ID |

FIG. 3a

| Extensible authentication protocol header EAP header | EAP type EAP type | Flags flags | Extension flags ext flags | Session identifier session ID | Key identifier keyID | Encrypted payload encrypted payload | Integrity check value ICV |
|---|---|---|---|---|---|---|---|

FIG. 3c

| Extensible authentication protocol header EAP header | EAP type EAP type | Flags flags | Extension flags ext flags | Session identifier session ID | Key identifier keyID | Integrity check value ICV |

FIG. 3m

| Bit → | 8 | 7 | 6 | 5 | 4 | 3 | 2 | 1 | Byte sequence number |
|---|---|---|---|---|---|---|---|---|---|
| | | | | Parameter set type parameter set type | | | | | 1 |
| | PSK update capability | X | X | X | X | X | X | X | 2 |
| | X | X | X | X | | Parameter set length parameter set body length | | | 3 |
| MKA capability notification parameter set | | | Parameter set length parameter set body length | | | | | | 4 |
| MKA capability notification parameter set | | | Capability type cap_type | | | | | | 5 |
| | | | Capability notification length length of this capability information | | | | | | 6 |
| | | | Whether a pre-shared key needs to be updated needtoupdatePSK | | | | | | 7 |
| | | | Remaining lifetime of the current PSK currentPSKremainlifetime | | | | | | 8-11 |
| | | | Padding padding | | | | | | 12 |

FIG. 5a

| Bit → | 8 | 7 | 6 | 5 | 4 | 3 | 2 | 1 | Byte sequence number |
|---|---|---|---|---|---|---|---|---|---|
| | \multicolumn{4}{c}{Parameter set type} | \multicolumn{4}{c}{parameter set type} | 1 |
| MKA distributed updated PSK parameter set | X | X | X | X | X | X | X | X | 2 |
| | X | X | X | X | X | | | | 3 |
| MKA distributed updated PSK parameter set | | | | | Parameter set length parameter set body length | | | | 4 |
| | | | | | Parameter set length parameter set body length | | | | 5 |
| | TLV type | | | | | | | | 6 |
| | TLV length | | | | | | | | 7-x1 |
| | TLV value | | | | | | | | x1+1 |
| | TLV type | | | | | | | | x1+2 |
| | TLV length | | | | | | | | x1+3, x2 |
| | TLV value | | | | | | | | x2+1, x3 |
| | Padding padding | | | | | | | | |

FIG. 5b

| Bit → | 8 | 7 | 6 | 5 | 4 | 3 | 2 | 1 | Byte sequence number |
|---|---|---|---|---|---|---|---|---|---|
| | | | | Parameter set type | | | | 1 |
| MKA PSK stored result notification parameter set | X | X | X | X | X | X | X | X | 2 |
| | X | X | X | X | X | parameter set length parameter set body length | | | 3 |
| | | | | Parameter set length parameter set body length | | | | 4 |
| | | | | TLV type | | | | 5 |
| | | | | TLV length | | | | 6 |
| | | | | TLV value | | | | 7 and 8 |
| MKA PSK stored result notification parameter set | | | | TLV type | | | | 9 |
| | | | | TLV length | | | | 10 |
| | | | | TLV value | | | | 11-x4 |
| | | | | Padding padding | | | | x4+1, x5 |

FIG. 5c

| Number of bytes → | 0 | 1 | 2 | 3 |
|---|---|---|---|---|
| Notification payload notification payload | Next payload next payload | C  Reserved reserved | Payload length payload length | |
| | Protocol identifier Protocol ID | Security parameter index size SPI size | Notify message type notify message type | |
| | Security parameter index SPI | | | |
| | Notification data notification data | | | |

FIG. 7a

| Number of bytes → | 0 | 1 | 2 | 3 |
|---|---|---|---|---|
| Notification data notification data | Key type bit information keytypebitmap | Key material type key material type | Reserved reserved | |
| | Key identifier key ID | | | |

FIG. 7b

| Number of bytes → | 0 | 1 | 2 | 3 |
|---|---|---|---|---|
| Notification data notification data | Key type key type | Key material type key material type | Key material length key material length | |
| | Key identifier key ID | | | |
| | Key data key data | | | |

FIG. 7c

| Number of bytes → | 0 | 1 | 2 | 3 |
|---|---|---|---|---|
| Key distribute payload key distribute payload | Next payload next payload | Reserved reserved | Payload length payload length | |
| | Key type key type | C | Key material type key material type | Key material length key material length |
| | Key identifier key ID | | | |
| | Key data key data | | | |

FIG. 7d

| Number of bytes → | 0 | 1 | 2 | 3 |
|---|---|---|---|---|
| Notification data notification data | Key type key type | Key material type key material type | Result result | |
| | | Key identifier key ID | | |
| | | Key data key data | | |

FIG. 7e

Method 800

Receive, within an aging periodicity of a first authentication key, a first protocol packet sent by a second communication apparatus, where the first protocol packet includes a first authentication key material for generating a second authentication key, the first authentication key is for processing, within the aging periodicity of the first authentication key, an identity authentication packet exchanged between a first communication apparatus and the second communication apparatus, and the second authentication key is for processing, within an aging periodicity of the second authentication key, an identity authentication packet exchanged between the first communication apparatus and the second communication apparatus — S801

Obtain the second authentication key based on the first authentication key material, where the first communication apparatus and the second communication apparatus communicate with each other over a non-Ethernet interface, and/or the first communication apparatus or the second communication apparatus does not use an asymmetric key algorithm — S802

FIG. 10a

PRE-SHARED KEY PSK UPDATING METHOD AND APPARATUS

CROSS-REFERENCE TO RELATED APPLICATIONS

This application is a continuation of International Application No. PCT/CN2021/086854, filed on Apr. 13, 2021, which claims priorities to Chinese Patent Application No. 202010740829.0, filed on Jul. 25, 2020 and Chinese Patent Application No. 202011003460.1, filed on Sep. 22, 2020 and Chinese Patent Application No. 202011004873.1, filed on Sep. 22, 2020 and Chinese Patent Application No. 202011003472.4, filed on Sep. 22, 2020 and Chinese Patent Application No. 202011003466.9, filed on Sep. 22, 2020 and Chinese Patent Application No. 202011003471.X, filed on Sep. 22, 2020. All of the aforementioned patent applications are hereby incorporated by reference in their entireties.

TECHNICAL FIELD

This application relates to the field of security technologies, and in particular, to a pre-shared key (PSK) updating method and apparatus.

BACKGROUND

Identity authentication may be performed before two communication apparatuses exchange data, to ensure data security during the data exchange between the communication apparatuses. Currently, a first communication apparatus and a second communication apparatus may perform mutual authentication on an identity of the peer end by transmitting an authentication packet. In some examples, the authentication packet may be processed by using a key to ensure transmission security of the authentication packet. For example, important information in the authentication packet may be encrypted by using a cipher key, and integrity verification information of the authentication packet may be verified by using an integrity verification key. The key for processing the authentication packet may be derived based on a PSK.

In some embodiments, PSKs in the first communication apparatus and the second communication apparatus remain unchanged. Consequently, security risks may be caused once the PSK is cracked.

SUMMARY

Embodiments of this application provide a pre-shared key PSK updating method, to reduce a risk of cracking a PSK, and therefore accordingly avoid security risks.

According to a first aspect, an embodiment of this application provides a PSK updating method. The method may be performed by a first communication apparatus. In an example, the first communication apparatus stores a first PSK, and the first PSK is for processing, within an aging periodicity of the first PSK, a packet exchanged between the first communication apparatus and a second communication apparatus. Both the first communication apparatus and the second communication apparatus may process, based on the first PSK within the aging periodicity of the first PSK, the packet exchanged between the first communication apparatus and the second communication apparatus. In this application, the first communication apparatus may receive, within the aging periodicity of the first PSK, a first protocol packet sent by the second communication apparatus, where the first protocol packet includes a first PSK key material, and the first PSK key material is for generating a second PSK. The second PSK is for processing, within an aging periodicity of the second PSK, a packet exchanged between the first communication apparatus and the second communication apparatus. Both the first communication apparatus and the second communication apparatus may process, based on the second PSK within the aging periodicity of the second PSK, the packet exchanged between the first communication apparatus and the second communication apparatus. It can be learned from this that, according to the solution in this embodiment of this application, the first communication apparatus may update the PSK based on the first PSK key material. Therefore, the PSK stored in the first communication apparatus may change. This reduces a possibility of cracking the PSK in the first communication apparatus, and accordingly avoids security risks.

In an implementation, after obtaining the second PSK based on the first PSK key material, the first communication apparatus may store the second PSK in a non-volatile memory area of the first communication apparatus, to ensure that the second PSK is not lost when an unexpected fault or a power failure occurs on the first communication apparatus. The first communication apparatus may read the second PSK from the non-volatile memory area when the aging periodicity of the second PSK starts, to process, by using the second PSK, the packet exchanged between the first communication apparatus and the second communication apparatus.

In an implementation, when the first communication apparatus can use an asymmetric key algorithm, the first communication apparatus may obtain the second PSK based on the first PSK key material and a second PSK key material of the first communication apparatus. For example, the first PSK key material may be a public value of the second communication apparatus, and the second PSK key material may be a private value of the first communication apparatus. The first communication apparatus may calculate the second PSK by using the asymmetric key algorithm based on the public value of the second communication apparatus and the private value of the first communication apparatus.

In an implementation, if the first communication apparatus obtains the second PSK based on the first PSK key material and the second PSK key material, the second communication apparatus may also obtain the second PSK by using the asymmetric key algorithm. In this case, the first communication apparatus may send a third PSK key material to the second communication apparatus, so that the second communication apparatus calculates the second PSK based on the third PSK key material. For example, the third PSK key material may be a public value of the first communication apparatus, and the second communication apparatus may calculate the second PSK by using the public value of the first communication apparatus and a private value of the second communication apparatus.

In an implementation, the second communication apparatus may obtain the second PSK in advance, and send the first protocol packet including the second PSK to the first communication apparatus. In this case, the first PSK key material included in the first protocol packet received by the first communication apparatus is the second PSK. Therefore, in an example, after receiving the first protocol packet, the first communication apparatus may parse the first protocol packet to obtain the first PSK key material included in the first protocol packet, and determine the first PSK key material as the second PSK.

In an implementation, for example, during specific implementation in which the first communication apparatus obtains the second PSK based on the first PSK key material, the first communication apparatus may obtain the second PSK based on the first PSK key material and a first key derivation algorithm. The first key derivation algorithm herein may be, for example, a KDF or a PRF. For the KDF and the PRF, refer to related descriptions in IEEE 802.1x-2010, and repeated descriptions are omitted herein.

In an implementation, for example, during specific implementation in which the first communication apparatus obtains the second PSK based on the first PSK key material and the first key derivation algorithm, the first communication apparatus may first process the first PSK key material by using a first algorithm to obtain an intermediate value, and then obtain the second PSK by using the intermediate value and the first key derivation algorithm. The first algorithm is not specifically limited in this embodiment of this application, and may be a key derivation algorithm or another algorithm. In this manner, the second PSK can be cracked only when the first algorithm, the first PSK key material, and the first key derivation algorithm are all cracked, thereby reducing a risk of cracking the second PSK, and further improving security of the second PSK.

In an implementation, the first PSK key material may be a nonce. The second communication apparatus may generate a nonce, and send the first protocol packet including the nonce as the first PSK key material to the first communication apparatus. Compared with a case in which the second communication apparatus generates the first PSK key material according to a specific rule, using the nonce as the first PSK key material causes a lower possibility of cracking the nonce. Therefore, using the nonce as the first PSK key material can reduce a possibility of cracking the first PSK key material, and correspondingly reduce a possibility of cracking the second PSK.

In an implementation, the first protocol packet is a PSK-based extensible authentication protocol EAP-PSK packet. In this case, the second communication apparatus may reconstruct a packet structure of the EAP-PSK packet, and send the reconstructed EAP-PSK packet including the first PSK key material to the first communication apparatus.

In an implementation, when the first protocol packet is the EAP-PSK packet, the first protocol packet may include an extended TLV field, and the first PSK key material may be carried in the extended TLV field.

In an implementation, considering that the first PSK key material is for obtaining the second PSK, security of the first PSK key material is particularly important. This is because once the first PSK key material is cracked, the risk of cracking the second PSK is increased. To avoid this problem, in an example, the first PSK key material may be encrypted by using a first key, and the encrypted first PSK key material is carried in the first protocol packet.

In an implementation, to ensure the security of the first PSK key material, the first protocol packet may further include first integrity verification information, and the first integrity verification information is for performing integrity verification on the first protocol packet. In this case, the security of the first PSK key material may be preliminarily determined by using the first integrity verification information. The first integrity verification information may be for determining whether a bit error occurs on the first protocol packet or the first protocol packet is tampered with in a transmission process. If the bit error occurs on the first protocol packet or the first protocol packet is tampered with in the transmission process, the security of the first PSK key material in the first protocol packet cannot be ensured.

In an implementation, when the first protocol packet includes the first integrity verification information, the first communication apparatus may first perform integrity verification on the first protocol packet based on the first integrity verification information after receiving the first protocol packet. When the integrity verification of the first protocol packet succeeds, the first communication apparatus obtains the first PSK key material in the first protocol packet.

In an implementation, the first protocol packet may include an identifier of the first key for encrypting the first PSK key material. In this case, the first communication apparatus may parse the first protocol packet to obtain the identifier of the first key. Then, the first communication apparatus may obtain the first key based on the identifier of the first key, decrypt the encrypted first PSK key material in the first protocol packet by using the first key, and obtain the second PSK based on the decrypted first PSK key material. In an example, the first communication apparatus may store a correspondence between the identifier of the first key and the first key. After obtaining the identifier of the first key, the first communication apparatus may obtain the first key by using the correspondence.

In an implementation, when the first protocol packet includes the first integrity verification information, the first integrity verification information may be calculated by the second communication apparatus by using a second key. In an example, the first protocol packet may include an identifier of the second key, and the identifier of the second key identifies the second key. In this case, when performing integrity verification on the first protocol packet by using the first integrity verification information, the first communication apparatus may obtain the second key based on the identifier of the second key, and then perform integrity verification on the first protocol packet by using the second key and the first integrity verification information. In an example, the first integrity verification information may be carried in an ICV field of the first protocol packet. The first communication apparatus may perform calculation on a field other than the ICV field in the first protocol packet by using the second key to obtain third integrity verification information, and then perform matching verification on the third integrity verification information and the first integrity verification information. In an example, when the third integrity verification information is equal to the first integrity verification information, it may be determined that the integrity verification of the first protocol packet succeeds; or when the third integrity verification information is not equal to the first integrity verification information, it may be determined that the integrity verification of the first protocol packet fails.

In an implementation, before receiving the first protocol packet, the first communication apparatus may further send a second protocol packet to the second communication apparatus, where the second protocol packet may carry an identifier of a third key, the identifier of the third key identifies the third key, and the third key is for deriving the first key. The first communication apparatus and the second communication apparatus may negotiate the third key by using the second protocol packet, to determine the first key for encrypting the first PSK key material in the first protocol packet. The second protocol packet herein may also be an EAP-PSK packet. In an example, if the second protocol packet includes the identifier of the third key, the first protocol packet may not include an identifier of the first key.

In an implementation, before receiving the first protocol packet, the first communication apparatus may further send a second protocol packet to the second communication apparatus, where the second protocol packet carries an identifier of a third key, the identifier of the third key identifies the third key, the third key is for deriving a second key, and the second key is for calculating the first integrity verification information. The first communication apparatus and the second communication apparatus may negotiate the third key by using the second protocol packet, to determine the second key for calculating the first integrity verification information. The second protocol packet herein may also be an EAP-PSK packet. The second key herein and the first key above may be a same key, or may be different keys. This is not specifically limited in this embodiment of this application. In an example, if the second protocol packet includes the identifier of the third key, the first protocol packet may not include an identifier of the second key. In an implementation, the third key may be the first PSK. The first communication apparatus and the second communication apparatus may separately store the first PSK locally. The second communication apparatus may derive the first key and the second key by using the first PSK, encrypt the first PSK key material by using the first key, and calculate the first integrity verification information by using the second key. The first communication apparatus may derive the first key and the second key by using the first PSK, decrypt the encrypted first PSK key material in the first protocol packet by using the first key, and perform integrity verification on the first protocol packet by using the second key.

In an implementation, before sending the second protocol packet to the second communication apparatus, the first communication apparatus may further receive a third protocol packet from the second communication apparatus, where the third protocol packet is for requesting to perform identity authentication on the second communication apparatus. In this case, the second protocol packet may indicate that the first communication apparatus agrees to perform identity authentication. In this way, the third key can be negotiated in an initial interaction phase of the identity authentication without any additional signaling exchange procedure, so that signaling exchange between the first communication apparatus and the second communication apparatus can be reduced. The third protocol packet herein may also be an EAP-PSK packet.

In an implementation, the third protocol packet may carry the identifier of the third key. Because the third protocol packet includes the identifier of the third key, after receiving the third protocol packet, the first communication apparatus sends the second protocol packet to the second communication apparatus, and the second protocol packet also includes the identifier of the third key. The first communication apparatus and the second communication apparatus complete the negotiation on the third key and interaction in the initial phase of the identity authentication by using the third protocol packet and the second protocol packet.

In an implementation, an identity authentication procedure may start after the third protocol packet and the second protocol packet are exchanged between the first communication apparatus and the second communication apparatus. In this case, the first protocol packet may further include first identity authentication information in addition to the first PSK key material, and the first identity authentication information is for performing identity authentication on the second communication apparatus. In this manner, the first communication apparatus may obtain the first PSK key material when performing identity authentication on the second communication apparatus.

In an implementation, considering that the first identity authentication information may be for determining an identity of the second communication apparatus, security of the first identity authentication information is particularly important. Therefore, in an example, the first identity authentication information may be encrypted by using the first key. In other words, the first protocol packet may include the first identity authentication information that is encrypted by using the first key.

In an implementation, the first identity authentication information may be obtained by the second communication apparatus by performing calculation on a target field by using a fourth key, where the target field may include a part or all of fields in the third protocol packet and/or a part or all of fields in the second protocol packet.

In an implementation, after receiving the first protocol packet, the first communication apparatus may perform identity authentication on the second communication apparatus by using the first identity authentication information in the first protocol packet. In an example, after determining that the identity authentication of the second communication apparatus succeeds, the first communication apparatus may perform the step of obtaining the second PSK based on the first PSK key material. Because security of the PSK is particularly important, the first communication apparatus cannot update the PSK with an untrusted second communication apparatus.

In an implementation, for example, during specific implementation in which the first communication apparatus performs identity authentication on the second communication apparatus by using the first identity authentication information, the first communication apparatus may perform calculation on the target field by using the fourth key to obtain third identity authentication information, and perform matching verification on the third identity authentication information and the first identity authentication information that is carried in the first protocol packet. In an example, if the first identity authentication information is the same as the third identity authentication information, it may be determined that the identity authentication of the second communication apparatus succeeds; or if the first identity authentication information is different from the third identity authentication information, it may be determined that the identity authentication of the second communication apparatus fails. It may be understood that, if the target field includes the part or all of the fields in the third protocol packet, the second communication apparatus calculates the first identity authentication information by using the part or all of the fields in the third protocol packet sent by the second communication apparatus, and the first communication apparatus calculates the third identity authentication information by using the part or all of the fields in the received third protocol packet. In this manner, the third protocol packet may be verified to some extent, to verify whether the third protocol packet is tampered with in a transmission process. Similarly, if the target field includes the part or all of the fields in the second protocol packet, the second communication apparatus calculates the first identity authentication information by using the part or all of the fields in the second protocol packet received by the second communication apparatus, and the first communication apparatus calculates the third identity authentication information by using the part or all of the fields in the second protocol packet sent by the first communication apparatus. In this manner, the second protocol packet may be verified to some extent, to verify whether the second protocol packet is tampered with in a transmission process.

In an implementation, if the first identity authentication information in the first protocol packet is information encrypted by using the first key, during specific implementation in which the first communication apparatus performs calculation on the target field by using the fourth key to obtain the third identity authentication information, the first communication apparatus may first perform calculation on the target field by using the fourth key to obtain a first calculation result, and then encrypt the first calculation result by using the first key, to obtain the third identity authentication information.

In an implementation, the fourth key may be derived from the third key.

In an implementation, the fourth key may be derived from a third PSK stored in the first communication apparatus and the second communication apparatus. In this case, the first key and the second key are derived by using the third key (for example, the first PSK), and the fourth key is derived by using the third PSK. In this manner, an untrusted third-party communication apparatus can spoof the first protocol packet only when both the first PSK and the third PSK are cracked, thereby improving security of the first protocol packet.

In an implementation, when the fourth key is derived from the third PSK, the second protocol packet may carry an identifier of the third PSK, and the identifier of the third PSK identifies the third PSK. In this case, the first communication apparatus and the second communication apparatus may negotiate the third PSK by using the second protocol packet.

In an implementation, after obtaining the second PSK based on the first PSK key material, the first communication apparatus may notify the second communication apparatus of a processing result of the first PSK key material. In an example, the first communication apparatus may send a fourth protocol packet to the second communication apparatus, where the fourth protocol packet carries first indication information, and the first indication information indicates that the first communication apparatus has stored the second PSK. The fourth protocol packet may be an EAP-PSK packet. If the first communication apparatus has stored the second PSK, it indicates that the first communication apparatus successfully updates the PSK locally.

In an implementation, the first communication apparatus may extend the EAP-PSK packet, and include the first indication information in an extended TLV field.

In an implementation, the fourth protocol packet carries second integrity verification information, and the second integrity verification information is for performing integrity verification on the fourth protocol packet. In this way, after receiving the fourth protocol packet, the second communication apparatus may determine, by using the second integrity verification information, whether a bit error occurs on the fourth protocol packet or the fourth protocol packet is tampered with in a transmission process.

In an implementation, the fourth protocol packet may further include second identity authentication information in addition to the foregoing first indication information, where the second identity authentication information is for performing identity authentication on the first communication apparatus. In this way, the first communication apparatus and the second communication apparatus complete mutual identity authentication and a PSK update by using the third protocol packet and the fourth protocol packet.

In an implementation, the first communication apparatus may also encrypt the second identity authentication information in the fourth protocol packet by using the first key. This is similar to a manner in which the second communication apparatus processes the first identity authentication information.

In an implementation, the second identity authentication information is obtained through calculation on one or more of the following based on the fourth key: a part or all of the fields in the second protocol packet or a part or all of the fields in the third protocol packet. It can be learned from the foregoing descriptions of the first identity authentication information that, when the second identity authentication information is obtained through calculation on the part or all of the fields in the second protocol packet, whether the second protocol packet is tampered with in the transmission process may be verified; or when the second identity authentication information is obtained through calculation on the part or all of the fields in the third protocol packet, whether the third protocol packet is tampered with in the transmission process may be verified.

In an implementation, after the first communication apparatus sends the fourth protocol packet to the second communication apparatus, the second communication apparatus may not only perform identity authentication on the first communication apparatus by using the second identity authentication information, but also need to confirm the first indication information in the fourth protocol packet. Then, the second communication apparatus may send a fifth protocol packet to the first communication apparatus, where the fifth protocol packet carries an identity authentication result and a PSK update result. The fifth protocol packet may be an EAP-PSK packet.

In an implementation, if the identity authentication result in the fifth protocol packet indicates that the identity authentication fails, it indicates that the identity authentication of the first communication apparatus fails. In other words, the second communication apparatus considers that the first communication apparatus is untrusted. In this case, the first communication apparatus and the second communication apparatus cannot update the PSK. Therefore, the first communication apparatus may delete the second PSK. If the PSK update result in the fifth protocol packet indicates that a PSK update fails, the first communication apparatus may delete the second PSK. There are a plurality of reasons for the PSK update failure. For example, the second communication apparatus fails to locally update the PSK. For another example, when verifying the first indication information, the second communication apparatus determines that the first indication information fails to be verified.

In an implementation, after receiving the fifth protocol packet, the first communication apparatus may send a sixth protocol packet to the second communication apparatus, where the sixth protocol packet indicates that the first communication apparatus has received the fifth protocol packet. The sixth protocol packet may be an EAP-PSK packet.

In an implementation, the fifth protocol packet may include an ICV field. In this case, after receiving the fifth protocol packet, the first communication apparatus may perform integrity verification on the fifth protocol packet, to determine whether a bit error occurs on the fifth protocol packet or the fifth protocol packet is tampered with in a transmission process.

In an implementation, the first communication apparatus stores a first data key, the first protocol packet further includes a data key material, the data key material is for generating a second data key, the first data key is for processing, within an aging periodicity of the first data key, a data packet exchanged between the first communication apparatus and the second communication apparatus, and the second data key is for processing, within an aging periodicity of the second data key, a data packet exchanged between the first communication apparatus and the second communication apparatus. In this case, the first communication apparatus may obtain the second data key based on the data key material. In this case, the first communication apparatus may implement the PSK update and a data key update by using the first protocol packet.

In an implementation, the second data key includes an integrity verification key and/or a cipher key, where the integrity verification key is for performing integrity verification on the data packet, and the cipher key is for encrypting the data packet.

In an implementation, the first communication apparatus stores a first authentication key, the first protocol packet includes an authentication key material, the authentication key material is for generating an updated second authentication key, the first authentication key is for processing, within an aging periodicity of the first authentication key, an identity authentication packet exchanged between the first communication apparatus and the second communication apparatus, and the second authentication key is for processing, within an aging periodicity of the second authentication key, an identity authentication packet exchanged between the first communication apparatus and the second communication apparatus. In this case, the first communication apparatus may obtain the second authentication key based on the authentication key material. In this case, the first communication apparatus may implement the PSK update and an authentication key update by using the first protocol packet.

In an implementation, both the second authentication key and the first authentication key may include any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet. The integrity verification key in the first authentication key may be the foregoing second key, the cipher key in the first authentication key may be the foregoing first key, and the identity authentication key in the first authentication key may be the foregoing fourth key. In second identity authentication, an authentication packet exchanged between the first communication apparatus and the second communication apparatus may be processed when the first communication apparatus and the second communication apparatus perform next identity authentication. In an example, in a current identity authentication process, the first communication apparatus and the second communication apparatus update the identity authentication key for the next identity authentication. For example, a first identity authentication key may be an identity authentication key updated before the first communication apparatus and the second communication apparatus perform current identity authentication.

In an implementation, after obtaining the second PSK, the first communication apparatus may further derive a media access control security MACsec key by using the second PSK. In this solution, the PSK stored in the first communication apparatus may change. This reduces the possibility of cracking the PSK in the first communication apparatus, and correspondingly reduces a risk of cracking a MACsec key derived from the PSK, to reduce a security risk.

In an implementation, during specific implementation in which the first communication apparatus derives the MACsec key by using the second PSK, the first communication apparatus may generate a master session key MSK based on the second PSK, derive a secure connectivity association key CAK by using the MSK, and derive the media access control security MACsec key by using the CAK.

In an implementation, during specific implementation in which the first communication apparatus derives the MACsec key by using the second PSK, the first communication apparatus may derive the MACsec key by using the second PSK as a CAK.

In an implementation, during specific implementation in which the first communication apparatus derives the media access control security MACsec key by using the CAK, the first communication apparatus may determine the CAK based on an identifier of the CAK, and derive the media access control security MACsec key by using the CAK.

In an implementation, in this embodiment of this application, the first communication apparatus and the second communication apparatus may complete the PSK update by using the four EAP-PSK packets, namely, the first protocol packet, the second protocol packet, the third protocol packet, and the fourth protocol packet. The identifier of the CAK may be obtained based on content included in the four protocol packets. In an example, the identifier of the CAK may be calculated based on a first nonce generated by the first communication apparatus, a second nonce generated by the second communication apparatus, and a session identifier of the first protocol packet. The first nonce may be carried in the second protocol packet, and the second nonce may be carried in the third protocol packet.

In an implementation, the first protocol packet includes an extensible authentication protocol EAP header, an EAP extension header, and a keyword field.

In an implementation, the first PSK key material is carried in the keyword field.

In an implementation, the keyword field includes any one or more of the following fields: a protocol version number field, a session identifier field, a key identifier field, an encrypted data field, a nonce field, an identifier field, and an integrity verification field.

In an implementation, the keyword field includes the encrypted data field, and the first PSK key material is carried in the encrypted data field.

In an implementation, before receiving the first protocol packet, the first communication apparatus may send second indication information to the second communication apparatus, where the second indication information indicates that the first communication apparatus has a capability of automatically updating a PSK. After determining, based on the second indication information, that the first communication apparatus has the capability of automatically updating a PSK, the second communication apparatus may send the first protocol packet including the first PSK key material to the first communication apparatus.

In an implementation, the first protocol packet is an Internet key exchange IKE protocol-based packet.

In an implementation, when the first protocol packet is the IKE protocol-based packet, the first PSK key material is carried in a payload field of the first protocol packet.

In an implementation, when the first protocol packet is the IKE protocol-based packet, the first PSK key material is carried in a notification payload field of the first protocol packet.

In an implementation, when the first protocol packet is the IKE protocol-based packet, the first PSK key material is carried in an extended TLV field of the first protocol packet.

In an implementation, when the first protocol packet is the IKE protocol-based packet, the first communication apparatus may further send third indication information to the second communication apparatus, where the third indication information indicates that the first communication apparatus has a capability of automatically updating a PSK. After determining, based on the third indication information, that the first communication apparatus has the capability of automatically updating a PSK, the second communication apparatus may send the first protocol packet including the first PSK key material to the first communication apparatus.

In an implementation, the third indication information is carried in a notification payload field of an IKE protocol-based packet.

In an implementation, the third indication information is carried in a notification message type field of the IKE protocol-based packet, and the notification payload field of the IKE protocol-based packet includes the notification message type field.

In an implementation, after obtaining the second PSK based on the first PSK key material, the first communication apparatus may notify the second communication apparatus of a processing result of the first PSK key material. In an example, the first communication apparatus may send a seventh protocol packet to the second communication apparatus, where the seventh protocol packet indicates that the first communication apparatus has stored the second PSK.

In an implementation, the seventh protocol packet includes fourth indication information, and the fourth indication information indicates that the first communication apparatus has stored the second PSK.

In an implementation, the seventh protocol packet is an IKE protocol-based packet, and the fourth indication information is carried in a notification message type field of the seventh protocol packet.

In an implementation, the first protocol packet is an authentication exchange AUTH exchange packet.

In an implementation, the first protocol packet is a create child security association exchange CREATE_CHILD_SA exchange packet.

In an implementation, the first protocol packet is an informational exchange packet.

In an implementation, the first protocol packet is a media access control security key agreement MKA-based packet.

In an implementation, when the first protocol packet is the MKA-based packet, the first PSK key material is carried in an extended parameter set field of the first protocol packet.

In an implementation, when the first protocol packet is the MKA-based packet, the first communication apparatus may further send fifth indication information to the second communication apparatus, where the fifth indication information indicates that the first communication apparatus has a capability of automatically updating a PSK. After determining, based on the fifth indication information, that the first communication apparatus has the capability of automatically updating a PSK, the second communication apparatus may send the first protocol packet including the first PSK key material to the first communication apparatus.

In an implementation, the fifth indication information is carried in a parameter set field of an MKA-based packet.

In an implementation, the MKA-based packet may include a parameter set type field, and the fifth indication information may be carried in the parameter set type field of the MKA-based packet.

In an implementation, after obtaining the second PSK based on the first PSK key material, the first communication apparatus may notify the second communication apparatus of a processing result of the first PSK key material. In an example, the first communication apparatus may send an eighth protocol packet to the second communication apparatus, where the eighth protocol packet indicates that the first communication apparatus has stored the second PSK.

In an implementation, the eighth protocol packet includes sixth indication information, and the sixth indication information indicates that the first communication apparatus has stored the second PSK.

In an implementation, the eighth protocol packet is an MKA-based packet, and the sixth indication information is carried in a parameter set type field of the MKA-based packet.

In an implementation, the first communication apparatus is an in-vehicle apparatus. For example, the first communication apparatus is a communication entity in a T-BOX.

In an implementation, the second communication apparatus is an in-vehicle apparatus. For example, the second communication apparatus is a communication entity in the T-BOX.

In an implementation, both the first communication apparatus and the second communication apparatus belong to the T-BOX.

According to a second aspect, an embodiment of this application provides a PSK updating method. The method may be performed by a second communication apparatus. In an example, the second communication apparatus may obtain a first PSK key material, where the first PSK key material is for generating a second PSK. After obtaining the first PSK key material, the second communication apparatus may generate a first protocol packet based on the first PSK key material, where the first protocol packet includes the first PSK key material. After generating the first protocol packet, the second communication apparatus may send the first protocol packet to a first communication apparatus, to enable the first communication apparatus to generate an updated second PSK based on the first PSK key material. It can be learned from this that, according to the solution in this embodiment of this application, the first communication apparatus may update a PSK based on the first PSK key material. Therefore, the PSK stored in the first communication apparatus may change. This reduces a possibility of cracking the PSK in the first communication apparatus, and accordingly avoids security risks.

In an implementation, the second communication apparatus may further store the first PSK key material. In this case, before an aging periodicity of the second PSK starts, the second communication apparatus may obtain the stored first PSK key material, and obtain the second PSK based on the first PSK key material. In this way, the second communication apparatus may process, by using the second PSK within the aging periodicity of the second PSK, a packet exchanged between the first communication apparatus and the second communication apparatus.

In an implementation, the method further includes: receiving a third PSK key material sent by the first communication apparatus, and obtaining the second PSK based on the third PSK key material.

In an implementation, the method further includes: obtaining the second PSK based on the first PSK key material.

In an implementation, the obtaining the second PSK based on the first PSK key material includes: determining the first PSK key material as the second PSK.

In an implementation, the obtaining the second PSK based on the first PSK key material includes: obtaining the second PSK based on the first PSK key material and a first key derivation algorithm.

In an implementation, the obtaining the second PSK based on the first PSK key material and a first key derivation algorithm includes: performing calculation on the first PSK key material by using a first algorithm, to obtain an intermediate value; and generating the second PSK based on the intermediate value and the first key derivation algorithm.

In an implementation, the method further includes: storing the second PSK in a non-volatile memory area of the second communication apparatus.

In an implementation, the first PSK key material includes a nonce.

In an implementation, the first protocol packet is a PSK-based extensible authentication protocol EAP-PSK packet.

In an implementation, the first protocol packet includes an extended type-length-value TLV field, and the extended TLV field includes the first PSK key material.

In an implementation, the first PSK key material is encrypted in the first protocol packet by using a first key.

In an implementation, the first protocol packet further includes first integrity verification information, and the first integrity verification information is for performing integrity verification on the first protocol packet.

In an implementation, the first protocol packet carries an identifier of the first key.

In an implementation, the first protocol packet includes an identifier of a second key, the identifier of the second key identifies the second key, and the second key is for calculating the first integrity verification information.

In an implementation, before the sending the first protocol packet to a first communication apparatus, the method further includes:

receiving a second protocol packet sent by the first communication apparatus, where the second protocol packet carries an identifier of a third key, the identifier of the third key identifies the third key, and the third key is for deriving the first key.

In an implementation, before the sending the first protocol packet to a first communication apparatus, the method further includes:

receiving a second protocol packet sent by the first communication apparatus, where the second protocol packet carries an identifier of a third key, the identifier of the third key identifies the third key, the third key is for deriving a second key, and the second key is for calculating the first integrity verification information.

In an implementation, the third key includes a first PSK.

In an implementation, before the receiving a second protocol packet sent by the first communication apparatus, the method further includes:

sending a third protocol packet to the first communication apparatus, where the third protocol packet is for requesting to perform identity authentication on the second communication apparatus.

In an implementation, the third protocol packet carries the identifier of the third key.

In an implementation, the first protocol packet includes first identity authentication information, and the first identity authentication information is for performing identity authentication on the second communication apparatus.

In an implementation, the first identity authentication information is encrypted in the first protocol packet by using the first key.

In an implementation, the first identity authentication information is obtained through calculation on one or more of the following based on a fourth key: a part or all of fields in the third protocol packet or a part or all of fields in the second protocol packet.

In an implementation, the fourth key is derived from the third key.

In an implementation, the fourth key is derived from a third PSK stored in the first communication apparatus and the second communication apparatus.

In an implementation, the second protocol packet carries an identifier of the third PSK, and the identifier of the third PSK identifies the third PSK.

In an implementation, the method further includes: receiving a fourth protocol packet sent by the first communication apparatus, where the fourth protocol packet carries first indication information, and the first indication information indicates that the first communication apparatus has stored the second PSK.

In an implementation, the fourth protocol packet includes an extended TLV field, and the extended TLV field includes the first indication information.

In an implementation, the fourth protocol packet carries second integrity verification information, and the second integrity verification information is for performing integrity verification on the fourth protocol packet.

In an implementation, the fourth protocol packet includes second identity authentication information, and the second identity authentication information is for performing identity authentication on the first communication apparatus.

In an implementation, the second identity authentication information is encrypted in the fourth protocol packet by using the first key.

In an implementation, the second identity authentication information is obtained through calculation on one or more of the following based on the fourth key: a part or all of the fields in the second protocol packet or a part or all of the fields in the third protocol packet.

In an implementation, the method further includes: performing identity authentication on the first communication apparatus by using the second identity authentication information.

In an implementation, the performing identity authentication on the first communication apparatus by using the second identity authentication information includes: performing calculation on a target field by using the fourth key, to obtain fourth identity authentication information; and performing matching verification on the fourth identity authentication information and the second identity authentication information carried in the fourth protocol packet, where the target field includes one or more of the following: a part or all of the fields in the third protocol packet or a part or all of the fields in the second protocol packet.

In an implementation, the performing calculation on a target field by using the fourth key, to obtain fourth identity authentication information includes: performing calculation on the target field by using the fourth key, to obtain a second calculation result; and encrypting the second calculation result by using the first key, to obtain the fourth identity authentication information.

In an implementation, the method further includes: sending a fifth protocol packet to the first communication apparatus, where the fifth protocol packet carries an identity authentication result and a PSK update result.

In an implementation, the method further includes: receiving a sixth protocol packet sent by the first communication apparatus, where the sixth protocol packet indicates that the first communication apparatus has received the fifth protocol packet.

In an implementation, the second communication apparatus stores a first data key, the first protocol packet further includes a data key material, the data key material indicates the first communication apparatus to generate an updated second data key, the second communication apparatus processes, based on the first data key within an aging periodicity of the first data key, a data packet exchanged between the first communication apparatus and the second communication apparatus, and the second communication apparatus processes, based on the second data key within an aging periodicity of the second data key, a data packet exchanged between the first communication apparatus and the second communication apparatus.

In an implementation, the method further includes: obtaining the second data key based on the data key material.

In an implementation, the second data key includes an integrity verification key and/or a cipher key, where the integrity verification key is for performing integrity verification on the data packet, and the cipher key is for encrypting the data packet.

In an implementation, the second communication apparatus stores a first authentication key, the first protocol packet further includes an authentication key material, the authentication key material indicates the first communication apparatus to generate an updated second authentication key, the second communication apparatus processes, based on the first authentication key within an aging periodicity of the first authentication key, an identity authentication packet exchanged between the first communication apparatus and the second communication apparatus, and the second communication apparatus processes, based on the second authentication key within an aging periodicity of the second authentication key, an identity authentication packet exchanged between the first communication apparatus and the second communication apparatus.

In an implementation, the method further includes: obtaining the second authentication key based on the authentication key material.

In an implementation, the second authentication key includes any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, the method further includes: deriving a media access control security MACsec key by using the second PSK.

In an implementation, the deriving a MACsec key by using the second PSK includes: generating a master session key MSK based on the second PSK; deriving a secure connectivity association key CAK by using the MSK; and deriving the media access control security MACsec key by using the CAK.

In an implementation, the deriving a MACsec key by using the second PSK includes: deriving the MACsec key by using the second PSK as a CAK.

In an implementation, the deriving the media access control security MACsec key by using the CAK includes: determining the CAK based on an identifier of the CAK; and deriving the media access control security MACsec key by using the CAK.

In an implementation, the identifier of the CAK is generated based on any one or more of the following parameters: a first nonce generated by the first communication apparatus, a second nonce generated by the second communication apparatus, and a session identifier of the first protocol packet.

In an implementation, the first protocol packet includes an extensible authentication protocol EAP header, an EAP extension header, and a keyword field.

In an implementation, the first PSK key material is carried in the keyword field.

In an implementation, the keyword field includes any one or more of the following fields: a protocol version number field, a session identifier field, a key identifier field, an encrypted data field, a nonce field, an identifier field, and an integrity verification field.

In an implementation, the keyword field includes the encrypted data field, and the first PSK key material is carried in the encrypted data field.

In an implementation, the method further includes: receiving second indication information sent by the first communication apparatus, where the second indication information indicates that the first communication apparatus has a capability of automatically updating a PSK.

In an implementation, the first protocol packet is an Internet key exchange IKE protocol-based packet.

In an implementation, the first PSK key material is carried in a payload field of the first protocol packet.

In an implementation, the first PSK key material is carried in a notification payload field of the first protocol packet.

In an implementation, the first PSK key material is carried in an extended TLV field of the first protocol packet.

In an implementation, the method further includes: receiving third indication information sent by the first communication apparatus, where the third indication information indicates that the first communication apparatus has a capability of automatically updating a PSK.

In an implementation, the third indication information is carried in a notification payload field of an IKE protocol-based packet.

In an implementation, the third indication information is carried in a notification message type field of the IKE protocol-based packet, and the notification payload field of the IKE protocol-based packet includes the notification message type field.

In an implementation, the method further includes: receiving a seventh protocol packet sent by the first communication apparatus, where the seventh protocol packet indicates that the first communication apparatus has stored the second PSK.

In an implementation, the seventh protocol packet includes fourth indication information, and the fourth indication information indicates that the first communication apparatus has stored the second PSK.

In an implementation, the seventh protocol packet is an IKE protocol-based packet, and the fourth indication information is carried in a notification message type field of the seventh protocol packet.

In an implementation, the first protocol packet is an authentication exchange AUTH exchange packet.

In an implementation, the first protocol packet is a create child security association exchange CREATE_CHILD_SA exchange packet.

In an implementation, the first protocol packet is an informational exchange packet.

In an implementation, the first protocol packet is a media access control security key agreement MKA-based packet.

In an implementation, the first PSK key material is carried in an extended parameter set field of the first protocol packet.

In an implementation, the method further includes: receiving fifth indication information sent by the first communication apparatus, where the fifth indication information indicates that the first communication apparatus has a capability of automatically updating a PSK.

In an implementation, the fifth indication information is carried in a parameter set field of an MKA-based packet.

In an implementation, the fifth indication information is carried in a parameter set type field of the MKA-based packet, and the parameter set field includes the parameter set type field.

In an implementation, the method further includes: receiving an eighth protocol packet sent by the first communication apparatus, where the eighth protocol packet indicates that the first communication apparatus has stored the second PSK.

In an implementation, the eighth protocol packet includes sixth indication information, and the sixth indication information indicates that the first communication apparatus has stored the second PSK.

In an implementation, the eighth protocol packet is an MKA-based packet, and the sixth indication information is carried in a parameter set type field of the MKA-based packet.

In an implementation, the first communication apparatus is an in-vehicle apparatus. For example, the first communication apparatus is a communication entity in a T-BOX.

In an implementation, the second communication apparatus is an in-vehicle apparatus. For example, the second communication apparatus is a communication entity in the T-BOX.

In an implementation, both the first communication apparatus and the second communication apparatus belong to the T-BOX.

According to a third aspect, an embodiment of this application provides a data key updating method. The method may be performed by a first communication apparatus. In an example, the first communication apparatus stores a first data key, and the first data key is for processing, within an aging periodicity of the first data key, a data packet exchanged between the first communication apparatus and a second communication apparatus. In an example, both the first communication apparatus and the second communication apparatus may process, based on the first data key within the aging periodicity of the first data key, the data packet exchanged between the first communication apparatus and the second communication apparatus. In this application, the first communication apparatus may receive, within the aging periodicity of the first data key, a first protocol packet sent by the second communication apparatus, where the first protocol packet is not an MKA-based packet, and includes a first data key material, and the first data key material is for generating a second data key. The second data key is for processing, within an aging periodicity of the second data key, a data packet exchanged between the first communication apparatus and the second communication apparatus. In an example, both the first communication apparatus and the second communication apparatus may process, based on the second data key within the aging periodicity of the second data key, the data packet exchanged between the first communication apparatus and the second communication apparatus. It can be learned from this that, according to the solution in this embodiment of this application, the first communication apparatus may update the data key based on the first data key material. Therefore, the data key stored in the first communication apparatus may change. This reduces a possibility of cracking the data key in the first communication apparatus, and accordingly avoids security risks. In addition, because the first protocol packet is not the MKA-based packet, the data key can also be updated according to this solution when the first communication apparatus and the second communication apparatus interact with each other through a non-MKA protocol.

In an implementation, after obtaining the second data key based on the first data key material, the first communication apparatus may store the second data key in a non-volatile memory area of the first communication apparatus, so that the second data key is not lost when an unexpected fault or a power failure occurs on the first communication apparatus. The first communication apparatus may read the second data key from the non-volatile memory area when the aging periodicity of the second data key starts, to process, by using the second data key, the data packet exchanged between the first communication apparatus and the second communication apparatus.

In an implementation, it is considered that when the first communication apparatus and the second communication apparatus communicate with each other through an Ethernet port, the data key may be updated through MKA or the pre-shared key (pre-shared key, PSK)-based extensible authentication protocol (EAP), namely, EAP-PSK. In this application, the first communication apparatus and the second communication apparatus communicate with each other through a non-Ethernet port. In this way, the data key can be updated according to this solution when the first communication apparatus and the second communication apparatus communicate with each other through the non-Ethernet port.

In an implementation, it is considered that if the first communication apparatus and the second communication apparatus communicate with each other through an Ethernet port, and both use an asymmetric key algorithm, the first communication apparatus and the second communication apparatus may update the data key through the Internet key exchange (IKE) protocol. In an example of this application, the first communication apparatus and the second communication apparatus communicate with each other through the Ethernet port, and the first communication apparatus or the second communication apparatus does not use the asymmetric key algorithm. In this way, according to this solution, the first communication apparatus and the second communication apparatus may update the data key by using the IKE protocol when the first communication apparatus and the second communication apparatus communicate with each other through the Ethernet port and at least one of the first communication apparatus and the second communication apparatus does not use the asymmetric key algorithm.

In an implementation, the second data key may include an integrity verification key and/or a cipher key, where the integrity verification key is for performing integrity verification on the data packet, and the cipher key is for encrypting the data packet.

In an implementation, when the first communication apparatus can use the asymmetric key algorithm, the first communication apparatus may obtain the second data key based on the first data key material and a second data key material of the first communication apparatus. For example, the first data key material may be a public value of the second communication apparatus, and the second data key material may be a private value of the first communication apparatus. The first communication apparatus may calculate the second data key by using the asymmetric key algorithm based on the public value of the second communication apparatus and the private value of the first communication apparatus.

In an implementation, if the first communication apparatus obtains the second data key based on the first data key material and the second data key material, the second communication apparatus may also obtain the second data key by using the asymmetric key algorithm. In this case, the first communication apparatus may send a third data key material to the second communication apparatus, so that the second communication apparatus calculates the second data key based on the third data key material. For example, the third data key material may be a public value of the first communication apparatus, and the second communication apparatus may calculate the second data key by using the public value of the first communication apparatus and a private value of the second communication apparatus.

In an implementation, the second communication apparatus may obtain the second data key in advance, and send the first protocol packet including the second data key to the first communication apparatus. In this case, the first data key material included in the first protocol packet received by the first communication apparatus is the second data key. Therefore, in an example, after receiving the first protocol packet, the first communication apparatus may parse the first protocol packet to obtain the first data key material included in the first protocol packet, and determine the first data key material as the second data key.

In an implementation, for example, during specific implementation in which the first communication apparatus obtains the second data key based on the first data key material, the first communication apparatus may obtain the second data key based on the first data key material and a first key derivation algorithm. The first key derivation algorithm herein may be, for example, a KDF or a PRF. For the KDF and the PRF, refer to related descriptions in IEEE 802.1x-2010, and repeated descriptions are omitted herein.

In an implementation, for example, during specific implementation in which the first communication apparatus obtains the second data key based on the first data key material and the first key derivation algorithm, the first communication apparatus may first process the first data key material by using a first algorithm to obtain an intermediate value, and then obtain the second data key by using the intermediate value and the first key derivation algorithm. The first algorithm is not specifically limited in this embodiment of this application, and may be a key derivation algorithm or another algorithm. In this manner, the second data key can be cracked only when the first algorithm, the first data key material, and the first key derivation algorithm are all cracked, thereby reducing a risk of cracking the second data key, and further improving security of the second data key.

In an implementation, the first data key material may be a nonce. The second communication apparatus may generate a nonce, and send the first protocol packet including the nonce as the first data key material to the first communication apparatus. Compared with a case in which the second communication apparatus generates the first data key material according to a specific rule, using the nonce as the first data key material causes a lower possibility of cracking the nonce. Therefore, using the nonce as the first data key material can reduce a possibility of cracking the first data key material, and correspondingly reduce a possibility of cracking the second data key.

In an implementation, the first data key material may include a nonce for generating the integrity verification key and/or a nonce for generating the cipher key.

In an implementation, when the first protocol packet is an EAP-PSK packet, the first protocol packet may include an extended TLV field, and the first data key material may be carried in the extended TLV field.

In an implementation, considering that the first data key material is for obtaining the second data key, security of the first data key material is particularly important. This is because once the first data key material is cracked, the risk of cracking the second data key is increased. To avoid this problem, in an example, the first data key material may be encrypted by using a first key, and the encrypted first data key material is carried in the first protocol packet.

In an implementation, to ensure the security of the first data key material, the first protocol packet may further include first integrity verification information, and the first integrity verification information is for performing integrity verification on the first protocol packet. In this case, the security of the first data key material may be preliminarily determined by using the first integrity verification information. The first integrity verification information may be for determining whether a bit error occurs on the first protocol packet or the first protocol packet is tampered with in a transmission process. If the bit error occurs on the first protocol packet or the first protocol packet is tampered with in the transmission process, the security of the first data key material in the first protocol packet cannot be ensured.

In an implementation, when the first protocol packet includes the first integrity verification information, the first communication apparatus may first perform integrity verification on the first protocol packet based on the first integrity verification information after receiving the first protocol packet. When the integrity verification of the first protocol packet succeeds, the first communication apparatus obtains the first data key material in the first protocol packet, and performs integrity verification on the first protocol packet based on the first integrity verification information.

In an implementation, the first protocol packet may include an identifier of the first key for encrypting the first data key material. In this case, the first communication apparatus may parse the first protocol packet to obtain the identifier of the first key. Then, the first communication apparatus may obtain the first key based on the identifier of the first key, decrypt the encrypted first data key material in the first protocol packet by using the first key, and obtain the second data key based on the decrypted first data key material. In an example, the first communication apparatus may store a correspondence between the identifier of the first key and the first key. After obtaining the identifier of the first key, the first communication apparatus may obtain the first key by using the correspondence.

In an implementation, when the first protocol packet includes the first integrity verification information, the first integrity verification information may be calculated by the second communication apparatus by using a second key. In an example, the first protocol packet may include an identifier of the second key, and the identifier of the second key identifies the second key. In this case, when performing integrity verification on the first protocol packet by using the first integrity verification information, the first communication apparatus may obtain the second key based on the identifier of the second key, and then perform integrity verification on the first protocol packet by using the second key and the first integrity verification information. In an example, the first integrity verification information may be carried in an ICV field of the first protocol packet. The first communication apparatus may perform calculation on a field other than the ICV field in the first protocol packet by using the second key to obtain third integrity verification information, and then perform matching verification on the third integrity verification information and the first integrity verification information. In an example, when the third integrity verification information is equal to the first integrity verification information, it may be determined that the integrity verification of the first protocol packet succeeds; or when the third integrity verification information is not equal to the first integrity verification information, it may be determined that the integrity verification of the first protocol packet fails.

In an implementation, before receiving the first protocol packet, the first communication apparatus may further send a second protocol packet to the second communication apparatus, where the second protocol packet may carry an identifier of a third key, the identifier of the third key identifies the third key, and the third key is for deriving the first key. The first communication apparatus and the second communication apparatus may negotiate the third key by using the second protocol packet, to determine the first key for encrypting the first data key material in the first protocol packet. The second protocol packet herein may also be an EAP-PSK packet.

In an implementation, before receiving the first protocol packet, the first communication apparatus may further send a second protocol packet to the second communication apparatus, where the second protocol packet carries an identifier of a third key, the identifier of the third key identifies the third key, the third key is for deriving a second key, and the second key is for calculating the first integrity verification information. The first communication apparatus and the second communication apparatus may negotiate the third key by using the second protocol packet, to determine the second key for calculating the first integrity verification information. The second protocol packet herein may also be an EAP-PSK packet.

In an implementation, the third key may be a first PSK. The first communication apparatus and the second communication apparatus may separately store the first PSK locally. The second communication apparatus may derive the first key and the second key by using the first PSK, encrypt the first data key material by using the first key, and calculate the first integrity verification information by using the second key. The first communication apparatus may derive the first key and the second key by using the first PSK, decrypt the encrypted first data key material in the first protocol packet by using the first key, and perform integrity verification on the first protocol packet by using the second key.

In an implementation, before sending the second protocol packet to the second communication apparatus, the first communication apparatus may further receive a third protocol packet from the second communication apparatus, where the third protocol packet is for requesting to perform identity authentication on the second communication apparatus. In this case, the second protocol packet may indicate that the first communication apparatus agrees to perform identity authentication. In this way, the third key can be negotiated in an initial interaction phase of the identity authentication without any additional signaling exchange procedure, so that signaling exchange between the first communication apparatus and the second communication apparatus can be reduced. The third protocol packet herein may also be an EAP-PSK packet.

In an implementation, the third protocol packet may carry the identifier of the third key. Because the third protocol packet includes the identifier of the third key, after receiving the third protocol packet, the first communication apparatus sends the second protocol packet to the second communication apparatus, and the second protocol packet also includes the identifier of the third key. The first communication apparatus and the second communication apparatus complete the negotiation on the third key and interaction in the initial phase of the identity authentication by using the third protocol packet and the second protocol packet.

In an implementation, an identity authentication procedure may start after the third protocol packet and the second protocol packet are exchanged between the first communication apparatus and the second communication apparatus. In this case, the first protocol packet may further include first identity authentication information in addition to the first data key material, and the first identity authentication information is for performing identity authentication on the second communication apparatus. In this manner, the first communication apparatus may obtain the first data key material when performing identity authentication on the second communication apparatus.

In an implementation, considering that the first identity authentication information may be for determining an identity of the second communication apparatus, security of the first identity authentication information is particularly important. Therefore, in an example, the first identity authentication information may be encrypted by using the first key. In other words, the first protocol packet may include the first identity authentication information that is encrypted by using the first key.

In an implementation, the first identity authentication information may be obtained by the second communication apparatus by performing calculation on a target field by using a fourth key, where the target field may include a part or all of fields in the third protocol packet and/or a part or all of fields in the second protocol packet.

In an implementation, after receiving the first protocol packet, the first communication apparatus may perform identity authentication on the second communication apparatus by using the first identity authentication information in the first protocol packet. In an example, after determining that the identity authentication of the second communication apparatus succeeds, the first communication apparatus may perform the step of obtaining the second data key based on the first data key material. Because security of the data key is particularly important, the first communication apparatus cannot update the data key with an untrusted second communication apparatus.

In an implementation, for example, during specific implementation in which the first communication apparatus performs identity authentication on the second communication apparatus by using the first identity authentication information, the first communication apparatus may perform calculation on the target field by using the fourth key to obtain third identity authentication information, and perform matching verification on the third identity authentication information and the first identity authentication information that is carried in the first protocol packet. In an example, if the first identity authentication information is the same as the third identity authentication information, it may be determined that the identity authentication of the second communication apparatus succeeds; or if the first identity authentication information is different from the third identity authentication information, it may be determined that the identity authentication of the second communication apparatus fails. It may be understood that, if the target field includes the part or all of the fields in the third protocol packet, the second communication apparatus calculates the first identity authentication information by using the part or all of the fields in the third protocol packet sent by the second communication apparatus, and the first communication apparatus calculates the third identity authentication information by using the part or all of the fields in the received third protocol packet. In this manner, the third protocol packet may be verified to some extent, to verify whether the third protocol packet is tampered with in a transmission process. Similarly, if the target field includes the part or all of the fields in the second protocol packet, the second communication apparatus calculates the first identity authentication information by using the part or all of the fields in the second protocol packet received by the second communication apparatus, and the first communication apparatus calculates the third identity authentication information by using the part or all of the fields in the second protocol packet sent by the first communication apparatus. In this manner, the second protocol packet may be verified to some extent, to verify whether the second protocol packet is tampered with in a transmission process.

In an implementation, if the first identity authentication information in the first protocol packet is information encrypted by using the first key, during specific implementation in which the first communication apparatus performs calculation on the target field by using the fourth key to obtain the third identity authentication information, the first communication apparatus may first perform calculation on the target field by using the fourth key to obtain a first calculation result, and then encrypt the first calculation result by using the first key, to obtain the third identity authentication information.

In an implementation, the fourth key may be derived from the third key.

In an implementation, the fourth key may be derived from a third PSK stored in the first communication apparatus and the second communication apparatus. In this case, the first key and the second key are derived by using the third key (for example, the first PSK), and the fourth key is derived by using the third PSK. In this manner, an untrusted third-party communication apparatus can spoof the first protocol packet only when both the first PSK and the third PSK are cracked, thereby improving security of the first protocol packet.

In an implementation, when the fourth key is derived from the third PSK, the second protocol packet may carry an identifier of the third PSK, and the identifier of the third PSK identifies the third PSK. In this case, the first communication apparatus and the second communication apparatus may negotiate the third PSK by using the second protocol packet.

In an implementation, after obtaining the second data key based on the first data key material, the first communication apparatus may notify the second communication apparatus of a processing result of the first data key material. In an example, the first communication apparatus may send a fourth protocol packet to the second communication apparatus, where the fourth protocol packet carries first indication information, and the first indication information indicates that the first communication apparatus has stored the second data key. The fourth protocol packet may be an EAP-PSK packet.

In an implementation, the first communication apparatus may extend the EAP-PSK packet, and include the first indication information in an extended TLV field.

In an implementation, the fourth protocol packet carries second integrity verification information, and the second integrity verification information is for performing integrity verification on the fourth protocol packet. In this way, after receiving the fourth protocol packet, the second communication apparatus may determine, by using the second integrity verification information, whether a bit error occurs on the fourth protocol packet or the fourth protocol packet is tampered with in a transmission process.

In an implementation, the fourth protocol packet may further include second identity authentication information in addition to the foregoing first indication information, where the second identity authentication information is for performing identity authentication on the first communication apparatus. In this way, the first communication apparatus and the second communication apparatus complete mutual identity authentication and a data key update by using the third protocol packet and the fourth protocol packet.

In an implementation, the first communication apparatus may also encrypt the second identity authentication information in the fourth protocol packet by using the first key. This is similar to a manner in which the second communication apparatus processes the first identity authentication information.

In an implementation, the second identity authentication information is obtained through calculation on one or more of the following based on the fourth key: a part or all of the fields in the second protocol packet or a part or all of the fields in the third protocol packet. It can be learned from the foregoing descriptions of the first identity authentication information that, when the second identity authentication information is obtained through calculation on the part or all of the fields in the second protocol packet, whether the second protocol packet is tampered with in the transmission process may be verified; or when the second identity authentication information is obtained through calculation on the part or all of the fields in the third protocol packet, whether the third protocol packet is tampered with in the transmission process may be verified.

In an implementation, after the first communication apparatus sends the fourth protocol packet to the second communication apparatus, the second communication apparatus may not only perform identity authentication on the first communication apparatus by using the second identity authentication information, but also need to confirm the first indication information in the fourth protocol packet. Then, the second communication apparatus may send a fifth protocol packet to the first communication apparatus, where the fifth protocol packet carries an identity authentication result and a data key update result. The fifth protocol packet may be an EAP-PSK packet.

In an implementation, if the identity authentication result in the fifth protocol packet indicates that the identity authentication fails, it indicates that the identity authentication of the first communication apparatus fails. In other words, the second communication apparatus considers that the first communication apparatus is untrusted. In this case, the first communication apparatus and the second communication apparatus cannot update the data key. Therefore, the first communication apparatus may delete the second data key. If the data key update result in the fifth protocol packet indicates that a data key update fails, the first communication apparatus may delete the second data key. There are a plurality of reasons for the data key update failure. For example, the second communication apparatus fails to locally update the data key. For another example, when verifying the first indication information, the second communication apparatus determines that the first indication information fails to be verified.

In an implementation, after receiving the fifth protocol packet, the first communication apparatus may send a sixth protocol packet to the second communication apparatus, where the sixth protocol packet indicates that the first communication apparatus has received the fifth protocol packet. The sixth protocol packet may be an EAP-PSK packet.

In an implementation, the fifth protocol packet may include an ICV field. In this case, after receiving the fifth protocol packet, the first communication apparatus may perform integrity verification on the fifth protocol packet, to determine whether a bit error occurs on the fifth protocol packet or the fifth protocol packet is tampered with in a transmission process.

In an implementation, the first communication apparatus stores the first PSK, the first protocol packet further includes a PSK key material, the PSK key material is for generating an updated second PSK, the first communication apparatus processes, based on the first PSK within an aging periodicity of the first PSK, a packet exchanged between the first communication apparatus and the second communication apparatus, and the first communication apparatus processes, based on the second PSK within an aging periodicity of the second PSK, a packet exchanged between the first communication apparatus and the second communication apparatus. In this case, the first communication apparatus may further obtain the second PSK based on the PSK key material. In this case, the first communication apparatus may implement a PSK update and the data key update by using the first protocol packet.

In an implementation, the first communication apparatus stores a first authentication key, the first protocol packet includes an authentication key material, the authentication key material is for generating an updated second authentication key, the first communication apparatus processes, based on the first authentication key within an aging periodicity of the first authentication key, an identity authentication packet exchanged between the first communication apparatus and the second communication apparatus, and the first communication apparatus processes, based on the second authentication key within an aging periodicity of the second authentication key, an identity authentication packet exchanged between the first communication apparatus and the second communication apparatus. In this case, the first communication apparatus may obtain the second authentication key based on the authentication key material. In this case, the first communication apparatus may implement the data key update and an authentication key update by using the first protocol packet.

In an implementation, the second authentication key includes any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, the first protocol packet includes an extensible authentication protocol EAP header, an EAP extension header, and a keyword field.

In an implementation, the first data key material is carried in the keyword field.

In an implementation, the keyword field includes any one or more of the following fields: a protocol version number field, a session identifier field, a key identifier field, an encrypted data field, a nonce field, an identifier field, and an integrity verification field.

In an implementation, the first data key material is carried in the encrypted data field.

In an implementation, before receiving the first protocol packet, the first communication apparatus may send second indication information to the second communication apparatus, where the second indication information indicates that the first communication apparatus has a capability of automatically updating a data key. After determining, based on the second indication information, that the first communication apparatus has the capability of automatically updating a data key, the second communication apparatus may send the first protocol packet including the first data key material to the first communication apparatus.

In an implementation, the first protocol packet is an Internet key exchange IKE protocol-based packet.

In an implementation, when the first protocol packet is the IKE protocol-based packet, the first data key material is carried in a payload field of the first protocol packet.

In an implementation, when the first protocol packet is the IKE protocol-based packet, the first data key material is carried in a notification payload field of the first protocol packet.

In an implementation, when the first protocol packet is the IKE protocol-based packet, the first data key material is carried in an extended TLV field of the first protocol packet.

In an implementation, when the first protocol packet is the IKE protocol-based packet, the first communication apparatus may further send third indication information to the second communication apparatus, where the third indication information indicates that the first communication apparatus has a capability of automatically updating a data key. After determining, based on the third indication information, that the first communication apparatus has the capability of automatically updating a data key, the second communication apparatus may send the first protocol packet including the first data key material to the first communication apparatus.

In an implementation, the third indication information is carried in a notification payload field of an IKE protocol-based packet.

In an implementation, the third indication information is carried in a notification message type field of the IKE protocol-based packet, and the notification payload field of the IKE protocol-based packet includes the notification message type field.

In an implementation, after obtaining the second data key based on the first data key material, the first communication apparatus may notify the second communication apparatus of a processing result of the first data key material. In an example, the first communication apparatus may send a seventh protocol packet to the second communication apparatus, where the seventh protocol packet indicates that the first communication apparatus has stored the second data key.

In an implementation, the seventh protocol packet includes fourth indication information, and the fourth indication information indicates that the first communication apparatus has stored the second data key.

In an implementation, the seventh protocol packet is an IKE protocol-based packet, and the fourth indication information is carried in a notification message type field of the seventh protocol packet.

In an implementation, the first protocol packet is an authentication exchange AUTH exchange packet.

In an implementation, the first protocol packet is a create child security association exchange CREATE_CHILD_SA exchange packet.

In an implementation, the first protocol packet is an informational exchange packet.

In an implementation, the first communication apparatus is an in-vehicle apparatus. For example, the first communication apparatus is a communication entity in a T-BOX.

In an implementation, the second communication apparatus is an in-vehicle apparatus. For example, the second communication apparatus is a communication entity in the T-BOX.

In an implementation, both the first communication apparatus and the second communication apparatus belong to the T-BOX.

According to a fourth aspect, an embodiment of this application provides a data key updating method. The method may be performed by a second communication apparatus. In an example, the second communication apparatus may obtain a first data key material, where the first data key material is for generating an updated second data key. After obtaining the first data key material, the second communication apparatus may generate a first protocol packet based on the first data key material, where the first protocol packet includes the first data key material. The first protocol packet is not an MKA-based packet. After generating the first protocol packet, the second communication apparatus may send the first protocol packet to a first communication apparatus, to enable the first communication apparatus to generate the second data key based on the first data key material. It can be learned from this that, according to the solution in this embodiment of this application, the first communication apparatus may update the data key based on the first data key material. Therefore, the data key stored in the first communication apparatus may change. This reduces a possibility of cracking the data key in the first communication apparatus, and accordingly avoids security risks.

In an implementation, the second communication apparatus may further store the first data key material. In this case, before an aging periodicity of the second data key starts, the second communication apparatus may obtain the stored first data key material, and obtain the second data key based on the first data key material. In this way, the second communication apparatus may process, by using the second data key within the aging periodicity of the second data key, a data packet exchanged between the first communication apparatus and the second communication apparatus.

In an implementation, the method further includes: receiving a third data key material sent by the first communication apparatus, and obtaining the second data key based on the third data key material.

In an implementation, the method further includes: obtaining the second data key based on the first data key material.

In an implementation, the obtaining the second data key based on the first data key material includes: determining the first data key material as the second data key.

In an implementation, the obtaining the second data key based on the first data key material includes:
obtaining the second data key based on the first data key material and a first key derivation algorithm.

In an implementation, the obtaining the second data key based on the first data key material and a first key derivation algorithm includes: performing calculation on the first data key material by using a first algorithm to obtain an intermediate value; and generating the second data key based on the intermediate value and the first key derivation algorithm.

In an implementation, the method further includes: storing the second data key.

In an implementation, the first communication apparatus and the second communication apparatus communicate with each other through a non-Ethernet port.

In an implementation, the first communication apparatus and the second communication apparatus communicate with each other through an Ethernet port, and the first communication apparatus or the second communication apparatus does not use an asymmetric algorithm.

In an implementation, the second data key includes an integrity verification key and/or a cipher key, where the integrity verification key is for performing integrity verification on the data packet, and the cipher key is for encrypting the data packet.

In an implementation, the first data key material includes a nonce.

In an implementation, the first data key material includes a nonce for generating the integrity verification key and/or a nonce for generating the cipher key.

In an implementation, the first protocol packet is a PSK-based extensible authentication protocol EAP-PSK packet.

In an implementation, the first protocol packet includes an extended type-length-value TLV field, and the extended TLV field includes the first data key material.

In an implementation, the first data key material is encrypted in the first protocol packet by using a first key.

In an implementation, the first protocol packet further includes first integrity verification information, and the first integrity verification information is for performing integrity verification on the first protocol packet.

In an implementation, the first protocol packet carries an identifier of the first key.

In an implementation, the first protocol packet includes an identifier of a second key, the identifier of the second key identifies the second key, and the second key is for calculating the first integrity verification information.

In an implementation, before the sending the first protocol packet to a first communication apparatus, the method further includes: receiving a second protocol packet sent by the first communication apparatus, where the second protocol packet carries an identifier of a third key, the identifier of the third key identifies the third key, and the third key is for deriving the first key.

In an implementation, before the sending the first protocol packet to a first communication apparatus, the method further includes: receiving a second protocol packet sent by the first communication apparatus, where the second protocol packet carries an identifier of a third key, the identifier of the third key identifies the third key, the third key is for deriving a second key, and the second key is for calculating the first integrity verification information.

In an implementation, the third key includes a first PSK stored in the first communication apparatus and the second communication apparatus.

In an implementation, before the receiving a second protocol packet sent by the first communication apparatus, the method further includes: sending a third protocol packet to the first communication apparatus, where the third protocol packet is for requesting to perform identity authentication on the second communication apparatus.

In an implementation, the third protocol packet carries the identifier of the third key.

In an implementation, the first protocol packet includes first identity authentication information, and the first identity authentication information is for performing identity authentication on the second communication apparatus.

In an implementation, the first identity authentication information is encrypted in the first protocol packet by using the first key.

In an implementation, the first identity authentication information is obtained through calculation on one or more of the following based on a fourth key: a part or all of fields in the third protocol packet or a part or all of fields in the second protocol packet.

In an implementation, the fourth key is derived from the third key.

In an implementation, the fourth key is derived from a third PSK stored in the first communication apparatus and the second communication apparatus.

In an implementation, the second protocol packet carries an identifier of the third PSK, and the identifier of the third PSK identifies the third PSK.

In an implementation, the method further includes: receiving a fourth protocol packet sent by the first communication apparatus, where the fourth protocol packet carries first indication information, and the first indication information indicates that the first communication apparatus has stored the second data key.

In an implementation, the fourth protocol packet includes an extended TLV field, and the extended TLV field includes the first indication information.

In an implementation, the fourth protocol packet carries second integrity verification information, and the second integrity verification information is for performing integrity verification on the fourth protocol packet.

In an implementation, the fourth protocol packet includes second identity authentication information, and the second identity authentication information is for performing identity authentication on the first communication apparatus.

In an implementation, the second identity authentication information is encrypted in the fourth protocol packet by using the first key.

In an implementation, the second identity authentication information is obtained through calculation on one or more of the following based on the fourth key: a part or all of the fields in the second protocol packet or a part or all of the fields in the third protocol packet.

In an implementation, the method further includes: performing identity authentication on the first communication apparatus by using the second identity authentication information.

In an implementation, the performing identity authentication on the first communication apparatus by using the second identity authentication information includes: performing calculation on a target field by using the fourth key, to obtain fourth identity authentication information; and performing matching verification on the fourth identity authentication information and the second identity authentication information carried in the fourth protocol packet, where the target field includes one or more of the following: a part or all of the fields in the third protocol packet or a part or all of the fields in the second protocol packet.

In an implementation, the performing calculation on a target field by using the fourth key, to obtain fourth identity authentication information includes: performing calculation on the target field by using the fourth key, to obtain a second calculation result; and encrypting the second calculation result by using the first key, to obtain the fourth identity authentication information.

In an implementation, the method further includes: sending a fifth protocol packet to the first communication apparatus, where the fifth protocol packet carries an identity authentication result and a data key update result.

In an implementation, the method further includes: receiving a sixth protocol packet sent by the first communication apparatus, where the sixth protocol packet indicates that the first communication apparatus has received the fifth protocol packet.

In an implementation, the second communication apparatus stores the first PSK, the first protocol packet further includes a PSK key material, the PSK key material indicates the first communication apparatus to generate an updated second PSK, the second communication apparatus processes, based on the first PSK within an aging periodicity of the first PSK, a packet exchanged between the first communication apparatus and the second communication apparatus, and the second communication apparatus processes, based on the second PSK within an aging periodicity of the second PSK, a packet exchanged between the first communication apparatus and the second communication apparatus.

In an implementation, the method further includes: obtaining the second PSK based on the PSK key material.

In an implementation, the second communication apparatus stores a first authentication key, the first protocol packet further includes an authentication key material, the authentication key material indicates the first communication apparatus to generate an updated second authentication key, the second communication apparatus processes, based on the first authentication key within an aging periodicity of the first authentication key, an identity authentication packet exchanged between the first communication apparatus and the second communication apparatus, and the second communication apparatus processes, based on the second authentication key within an aging periodicity of the second authentication key, an identity authentication packet exchanged between the first communication apparatus and the second communication apparatus.

In an implementation, the method further includes: obtaining the second authentication key based on the authentication key material.

In an implementation, the second authentication key includes any one or more of the following:

an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, the first protocol packet includes an extensible authentication protocol EAP header, an EAP extension header, and a keyword field.

In an implementation, the first data key material is carried in the keyword field.

In an implementation, the keyword field includes any one or more of the following fields: a protocol version number field, a session identifier field, a key identifier field, an encrypted data field, a nonce field, an identifier field, and an integrity verification field.

In an implementation, the first data key material is carried in the encrypted data field.

In an implementation, the method further includes: receiving second indication information sent by the first communication apparatus, where the second indication information indicates that the first communication apparatus has a capability of automatically updating a data key.

In an implementation, the first protocol packet is an Internet key exchange IKE protocol-based packet.

In an implementation, the first data key material is carried in a payload field of the first protocol packet.

In an implementation, the first data key material is carried in a notification payload field of the first protocol packet.

In an implementation, the first data key material is carried in an extended TLV field of the first protocol packet.

In an implementation, the method further includes: receiving third indication information sent by the first communication apparatus, where the third indication information indicates that the first communication apparatus has a capability of automatically updating a data key.

In an implementation, the third indication information is carried in a notification payload field of an IKE protocol-based packet.

In an implementation, the third indication information is carried in a notification message type field of the IKE protocol-based packet, and the notification payload field of the IKE protocol-based packet includes the notification message type field.

In an implementation, the method further includes: receiving a seventh protocol packet sent by the first communication apparatus, where the seventh protocol packet indicates that the first communication apparatus has stored the second data key.

In an implementation, the seventh protocol packet includes fourth indication information, and the fourth indication information indicates that the first communication apparatus has stored the second data key.

In an implementation, the seventh protocol packet is an IKE protocol-based packet, and the fourth indication information is carried in a notification message type field of the seventh protocol packet.

In an implementation, the first protocol packet is an authentication exchange AUTH exchange packet.

In an implementation, the first protocol packet is a create child security association exchange CREATE_CHILD_SA exchange packet.

In an implementation, the first protocol packet is an informational exchange packet.

In an implementation, the first communication apparatus is an in-vehicle apparatus. For example, the first communication apparatus is a communication entity in a T-BOX.

In an implementation, the second communication apparatus is an in-vehicle apparatus. For example, the second communication apparatus is a communication entity in the T-BOX.

In an implementation, both the first communication apparatus and the second communication apparatus belong to the T-BOX.

According to a fifth aspect, an embodiment of this application provides an authentication key updating method. The method may be performed by a first communication apparatus. In an example, the first communication apparatus stores a first authentication key, and the first authentication key is for processing, within an aging periodicity of the first authentication key, an authentication packet exchanged between the first communication apparatus and a second communication apparatus. Both the first communication apparatus and the second communication apparatus may process, based on the first authentication key within the aging periodicity of the first authentication key, the authentication packet exchanged between the first communication apparatus and the second communication apparatus. In this application, the first communication apparatus and the second communication apparatus communicate with each other through a non-Ethernet port, and/or the first communication apparatus or the second communication apparatus does not use an asymmetric key algorithm. The first communication apparatus may receive, within the aging periodicity of the first authentication key, a first protocol packet sent by the second communication apparatus, where the first protocol packet includes a first authentication key material, and the first authentication key material is for generating an updated second authentication key. The second authentication key is for processing, within an aging periodicity of the second authentication key, an authentication packet exchanged between the first communication apparatus and the second communication apparatus. Both the first communication apparatus and the second communication apparatus may process, based on the second authentication key within the aging periodicity of the second authentication key, the authentication packet exchanged between the first communication apparatus and the second communication apparatus. It can be learned from this that, according to the solution in this embodiment of this application, the first communication apparatus may update the authentication key based on the first authentication key material. Therefore, the authentication key stored in the first communication apparatus may change. This reduces a possibility of cracking the authentication key in the first communication apparatus, and accordingly avoids security risks. In addition, according to this solution, the authentication key can also be updated when the first communication apparatus and the second communication apparatus communicate with each other through the non-Ethernet port. Furthermore, in some embodiments, it is considered that if the first communication apparatus and the second communication apparatus communicate with each other through an Ethernet port, and both use an asymmetric key algorithm, the first communication apparatus and the second communication apparatus may update the authentication key through the IKE protocol. In an example of this application, the first communication apparatus or the second communication apparatus does not use the asymmetric key algorithm. In this way, according to this solution, the first communication apparatus and the second communication apparatus may update the authentication key by using the IKE protocol when at least one of the first communication apparatus and the second communication apparatus does not use the asymmetric key algorithm.

In an implementation, after obtaining the second authentication key based on the first authentication key material, the first communication apparatus may store the second authentication key. The first communication apparatus may read the second authentication key when the aging periodicity of the second authentication key starts, to process, by using the second authentication key, the packet exchanged between the first communication apparatus and the second communication apparatus.

In an implementation, the first protocol packet includes first indication information, and the first indication information indicates the first communication apparatus to derive the second authentication key by using a symmetric key algorithm. After receiving the first protocol packet, the first communication apparatus may obtain the first indication information, to determine, based on the first indication information, to derive the second authentication key by using the symmetric key algorithm.

In an implementation, the second authentication key includes any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, when the first communication apparatus can use the asymmetric key algorithm, the first communication apparatus may obtain the second authentication key based on the first authentication key material and a second authentication key material of the first communication apparatus. For example, the first authentication key material may be a public value of the second communication apparatus, and the second authentication key material may be a private value of the first communication apparatus. The first communication apparatus may calculate the second authentication key by using the asymmetric key algorithm based on the public value of the second communication apparatus and the private value of the first communication apparatus.

In an implementation, if the first communication apparatus obtains the second authentication key based on the first authentication key material and the second authentication key material, the second communication apparatus may also obtain the second authentication key by using the asymmetric key algorithm. In this case, the first communication apparatus may send a third authentication key material to the second communication apparatus, so that the second communication apparatus calculates the second authentication key based on the third authentication key material. For example, the third authentication key material may be a public value of the first communication apparatus, and the second communication apparatus may calculate the second authentication key by using the public value of the first communication apparatus and a private value of the second communication apparatus.

In an implementation, the second communication apparatus may obtain the second authentication key in advance, and send the first protocol packet including the second authentication key to the first communication apparatus. In this case, the first authentication key material included in the first protocol packet received by the first communication apparatus is the second authentication key. Therefore, in an example, after receiving the first protocol packet, the first communication apparatus may parse the first protocol packet to obtain the first authentication key material included in the first protocol packet, and determine the first authentication key material as the second authentication key.

In an implementation, for example, during specific implementation in which the first communication apparatus obtains the second authentication key based on the first authentication key material, the first communication apparatus may obtain the second authentication key based on the first authentication key material and a first key derivation algorithm. The first key derivation algorithm herein may be, for example, a KDF or a PRF. For the KDF and the PRF, refer to related descriptions in IEEE 802.1x-2010, and repeated descriptions are omitted herein.

In an implementation, for example, during specific implementation in which the first communication apparatus obtains the second authentication key based on the first authentication key material and the first key derivation algorithm, the first communication apparatus may first process the first authentication key material by using a first algorithm to obtain an intermediate value, and then obtain the second authentication key by using the intermediate value and the first key derivation algorithm. The first algorithm is not specifically limited in this embodiment of this application, and may be a key derivation algorithm or another algorithm. In this manner, the second authentication key can be cracked only when the first algorithm, the first authentication key material, and the first key derivation algorithm are all cracked, thereby reducing a risk of cracking the second authentication key, and further improving security of the second authentication key.

In an implementation, the first authentication key material may be a nonce. The second communication apparatus may generate a nonce, and send the first protocol packet including the nonce as the first authentication key material to the first communication apparatus. Compared with a case in which the second communication apparatus generates the first authentication key material according to a specific rule, using the nonce as the first authentication key material causes a lower possibility of cracking the nonce. Therefore, using the nonce as the first authentication key material can reduce a possibility of cracking the first authentication key material, and correspondingly reduce a possibility of cracking the second authentication key.

In an implementation, the first authentication key material includes any one or more of the following: a nonce for generating the integrity verification key, a nonce for generating the cipher key, a nonce for generating the key derivation key, and a nonce for generating the identity authentication key.

In an implementation, the identity authentication key and the integrity verification key may be the same. In this case, if the second authentication key includes both the identity authentication key and the integrity verification key, and the first authentication key material is the nonce, the first protocol packet may carry one less nonce.

In an implementation, the first protocol packet is a PSK-based extensible authentication protocol EAP-PSK packet. In this case, the second communication apparatus may reconstruct a packet structure of the EAP-PSK packet, and send the reconstructed EAP-PSK packet including a first authentication key material to the first communication apparatus.

In an implementation, when the first protocol packet is the EAP-PSK packet, the first protocol packet may include an extended TLV field, and the first authentication key material may be carried in the extended TLV field.

In an implementation, considering that the first authentication key material is for obtaining the second authentication key, security of the first authentication key material is particularly important. This is because once the first authentication key material is cracked, the risk of cracking the second authentication key is increased. To avoid this problem, in an example, the first authentication key material may be encrypted by using a first key, and the encrypted first authentication key material is carried in the first protocol packet.

In an implementation, to ensure the security of the first authentication key material, the first protocol packet may further include first integrity verification information, and the first integrity verification information is for performing integrity verification on the first protocol packet. In this case, the security of the first authentication key material may be preliminarily determined by using the first integrity verification information. The first integrity verification information may be for determining whether a bit error occurs on the first protocol packet or the first protocol packet is tampered with in a transmission process. If the bit error occurs on the first protocol packet or the first protocol packet is tampered with in the transmission process, the security of the first authentication key material in the first protocol packet cannot be ensured.

In an implementation, when the first protocol packet includes the first integrity verification information, the first communication apparatus may first perform integrity verification on the first protocol packet based on the first integrity verification information after receiving the first protocol packet. When the integrity verification of the first protocol packet succeeds, the first communication apparatus obtains the first authentication key material in the first protocol packet, and performs integrity verification on the first protocol packet based on the first integrity verification information.

In an implementation, the first protocol packet may include an identifier of the first key for encrypting the first authentication key material. In this case, the first communication apparatus may parse the first protocol packet to obtain the identifier of the first key. Then, the first communication apparatus may obtain the first key based on the identifier of the first key, decrypt the encrypted first authentication key material in the first protocol packet by using the first key, and obtain the second authentication key based on the decrypted first authentication key material. In an example, the first communication apparatus may store a correspondence between the identifier of the first key and the first key. After obtaining the identifier of the first key, the first communication apparatus may obtain the first key by using the correspondence.

In an implementation, when the first protocol packet includes the first integrity verification information, the first integrity verification information may be calculated by the second communication apparatus by using a second key. In an example, the first protocol packet may include an identifier of the second key, and the identifier of the second key identifies the second key. In this case, when performing integrity verification on the first protocol packet by using the first integrity verification information, the first communication apparatus may obtain the second key based on the identifier of the second key, and then perform integrity verification on the first protocol packet by using the second key and the first integrity verification information. In an example, the first integrity verification information may be carried in an ICV field of the first protocol packet. The first communication apparatus may perform calculation on a field other than the ICV field in the first protocol packet by using the second key to obtain third integrity verification information, and then perform matching verification on the third integrity verification information and the first integrity verification information. In an example, when the third integrity verification information is equal to the first integrity verification information, it may be determined that the integrity verification of the first protocol packet succeeds; or when the third integrity verification information is not equal to the first integrity verification information, it may be determined that the integrity verification of the first protocol packet fails.

In an implementation, before receiving the first protocol packet, the first communication apparatus may further send a second protocol packet to the second communication apparatus, where the second protocol packet may carry an identifier of a third key, the identifier of the third key identifies the third key, and the third key is for deriving the first key. The first communication apparatus and the second communication apparatus may negotiate the third key by using the second protocol packet, to determine the first key for encrypting the first authentication key material in the first protocol packet. The second protocol packet herein may also be an EAP-PSK packet.

In an implementation, before receiving the first protocol packet, the first communication apparatus may further send a second protocol packet to the second communication apparatus, where the second protocol packet carries an identifier of a third key, the identifier of the third key identifies the third key, the third key is for deriving a second key, and the second key is for calculating the first integrity verification information. The first communication apparatus and the second communication apparatus may negotiate the third key by using the second protocol packet, to determine the second key for calculating the first integrity verification information. The second protocol packet herein may also be an EAP-PSK packet.

In an implementation, the third key may be a first PSK. The first communication apparatus and the second communication apparatus may separately store the first PSK locally. The second communication apparatus may derive the first key and the second key by using the first PSK, encrypt the first authentication key material by using the first key, and calculate the first integrity verification information by using the second key. The first communication apparatus may derive the first key and the second key by using the first PSK, decrypt the encrypted first authentication key material in the first protocol packet by using the first key, and perform integrity verification on the first protocol packet by using the second key.

In an implementation, before sending the second protocol packet to the second communication apparatus, the first communication apparatus may further receive a third protocol packet from the second communication apparatus, where the third protocol packet is for requesting to perform identity authentication on the second communication apparatus. In this case, the second protocol packet may indicate that the first communication apparatus agrees to perform identity authentication. In this way, the third key can be negotiated in an initial interaction phase of the identity authentication without any additional signaling exchange procedure, so that signaling exchange between the first communication apparatus and the second communication apparatus can be reduced. The third protocol packet herein may also be an EAP-PSK packet.

In an implementation, the third protocol packet may carry the identifier of the third key. Because the third protocol packet includes the identifier of the third key, after receiving the third protocol packet, the first communication apparatus sends the second protocol packet to the second communication apparatus, and the second protocol packet also includes the identifier of the third key. The first communication apparatus and the second communication apparatus complete the negotiation on the third key and interaction in the initial phase of the identity authentication by using the third protocol packet and the second protocol packet.

In an implementation, an identity authentication procedure may start after the third protocol packet and the second protocol packet are exchanged between the first communication apparatus and the second communication apparatus. In this case, the first protocol packet may further include first identity authentication information in addition to the first authentication key material, and the first identity authentication information is for performing identity authentication on the second communication apparatus. In this manner, the first communication apparatus may obtain the first authentication key material when performing identity authentication on the second communication apparatus.

In an implementation, considering that the first identity authentication information may be for determining an identity of the second communication apparatus, security of the first identity authentication information is particularly important. Therefore, in an example, the first identity authentication information may be encrypted by using the first key. In other words, the first protocol packet may include the first identity authentication information that is encrypted by using the first key.

In an implementation, the first identity authentication information may be obtained by the second communication apparatus by performing calculation on a target field by using a fourth key, where the target field may include a part or all of fields in the third protocol packet and/or a part or all of fields in the second protocol packet.

In an implementation, after receiving the first protocol packet, the first communication apparatus may perform identity authentication on the second communication apparatus by using the first identity authentication information in the first protocol packet. In an example, after determining that the identity authentication of the second communication apparatus succeeds, the first communication apparatus may perform the step of obtaining the second authentication key based on the first authentication key material. Because security of the authentication key is particularly important, the first communication apparatus cannot update the authentication key with an untrusted second communication apparatus.

In an implementation, for example, during specific implementation in which the first communication apparatus performs identity authentication on the second communication apparatus by using the first identity authentication information, the first communication apparatus may perform calculation on the target field by using the fourth key to obtain third identity authentication information, and perform matching verification on the third identity authentication information and the first identity authentication information that is carried in the first protocol packet. In an example, if the first identity authentication information is the same as the third identity authentication information, it may be determined that the identity authentication of the second communication apparatus succeeds; or if the first identity authentication information is different from the third identity authentication information, it may be determined that the identity authentication of the second communication apparatus fails. It may be understood that, if the target field includes the part or all of the fields in the third protocol packet, the second communication apparatus calculates the first identity authentication information by using the part or all of the fields in the third protocol packet sent by the second communication apparatus, and the first communication apparatus calculates the third identity authentication information by using the part or all of the fields in the received third protocol packet. In this manner, the third protocol packet may be verified to some extent, to verify whether the third protocol packet is tampered with in a transmission process. Similarly, if the target field includes the part or all of the fields in the second protocol packet, the second communication apparatus calculates the first identity authentication information by using the part or all of the fields in the second protocol packet received by the second communication apparatus, and the first communication apparatus calculates the third identity authentication information by using the part or all of the fields in the second protocol packet sent by the first communication apparatus. In this manner, the second protocol packet may be verified to some extent, to verify whether the second protocol packet is tampered with in a transmission process.

In an implementation, if the first identity authentication information in the first protocol packet is information encrypted by using the first key, during specific implementation in which the first communication apparatus performs calculation on the target field by using the fourth key to obtain the third identity authentication information, the first communication apparatus may first perform calculation on the target field by using the fourth key to obtain a first calculation result, and then encrypt the first calculation result by using the first key, to obtain the third identity authentication information.

In an implementation, the fourth key may be derived from the third key.

In an implementation, the fourth key may be derived from a third PSK stored in the first communication apparatus and the second communication apparatus. In this case, the first key and the second key are derived by using the third key (for example, the first PSK), and the fourth key is derived by using the third PSK. In this manner, an untrusted third-party communication apparatus can spoof the first protocol packet only when both the first PSK and the third PSK are cracked, thereby improving security of the first protocol packet.

In an implementation, when the fourth key is derived from the third PSK, the second protocol packet may carry an identifier of the third PSK, and the identifier of the third PSK identifies the third PSK. In this case, the first communication apparatus and the second communication apparatus may negotiate the third PSK by using the second protocol packet.

In an implementation, after obtaining the second authentication key based on the first authentication key material, the first communication apparatus may notify the second communication apparatus of a processing result of the first authentication key material. In an example, the first communication apparatus may send a fourth protocol packet to the second communication apparatus, where the fourth protocol packet carries second indication information, and the second indication information indicates that the first communication apparatus has stored the second authentication key. The fourth protocol packet may be an EAP-PSK packet.

In an implementation, the first communication apparatus may extend the EAP-PSK packet, and include the second indication information in an extended TLV field.

In an implementation, the fourth protocol packet carries second integrity verification information, and the second integrity verification information is for performing integrity verification on the fourth protocol packet. In this way, after receiving the fourth protocol packet, the second communication apparatus may determine, by using the second integrity verification information, whether a bit error occurs on the fourth protocol packet or the fourth protocol packet is tampered with in a transmission process.

In an implementation, the fourth protocol packet may further include second identity authentication information in addition to the foregoing first indication information, where the second identity authentication information is for performing identity authentication on the first communication apparatus. In this way, the first communication apparatus and the second communication apparatus complete mutual identity authentication and an authentication key update by using the third protocol packet and the fourth protocol packet.

In an implementation, the first communication apparatus may also encrypt the second identity authentication information in the fourth protocol packet by using the first key.

This is similar to a manner in which the second communication apparatus processes the first identity authentication information.

In an implementation, the second identity authentication information is obtained through calculation on one or more of the following based on the fourth key: a part or all of the fields in the second protocol packet or a part or all of the fields in the third protocol packet. It can be learned from the foregoing descriptions of the first identity authentication information that, when the second identity authentication information is obtained through calculation on the part or all of the fields in the second protocol packet, whether the second protocol packet is tampered with in the transmission process may be verified; or when the second identity authentication information is obtained through calculation on the part or all of the fields in the third protocol packet, whether the third protocol packet is tampered with in the transmission process may be verified.

In an implementation, after the first communication apparatus sends the fourth protocol packet to the second communication apparatus, the second communication apparatus may not only perform identity authentication on the first communication apparatus by using the second identity authentication information, but also need to confirm the first indication information in the fourth protocol packet. Then, the second communication apparatus may send a fifth protocol packet to the first communication apparatus, where the fifth protocol packet carries an identity authentication result and an authentication key update result. The fifth protocol packet may be an EAP-PSK packet.

In an implementation, if the identity authentication result in the fifth protocol packet indicates that the identity authentication fails, it indicates that the identity authentication of the first communication apparatus fails. In other words, the second communication apparatus considers that the first communication apparatus is untrusted. In this case, the first communication apparatus and the second communication apparatus cannot update the authentication key. Therefore, the first communication apparatus may delete the second authentication key. If the authentication key update result in the fifth protocol packet indicates that an authentication key update fails, the first communication apparatus may delete the second authentication key. There are a plurality of reasons for the authentication key update failure. For example, the second communication apparatus fails to locally update the authentication key. For another example, when verifying the first indication information, the second communication apparatus determines that the first indication information fails to be verified.

In an implementation, after receiving the fifth protocol packet, the first communication apparatus may send a sixth protocol packet to the second communication apparatus, where the sixth protocol packet indicates that the first communication apparatus has received the fifth protocol packet. The sixth protocol packet may be an EAP-PSK packet.

In an implementation, the fifth protocol packet may include an ICV field. In this case, after receiving the fifth protocol packet, the first communication apparatus may perform integrity verification on the fifth protocol packet, to determine whether a bit error occurs on the fifth protocol packet or the fifth protocol packet is tampered with in a transmission process.

In an implementation, the first communication apparatus stores the first PSK, the first protocol packet includes a PSK key material, the PSK key material is for generating an updated second PSK, the first communication apparatus processes, based on the first PSK within an aging periodicity of the first PSK, a packet exchanged between the first communication apparatus and the second communication apparatus, and the first communication apparatus processes, based on the second PSK within an aging periodicity of the second PSK, a packet exchanged between the first communication apparatus and the second communication apparatus. In this case, the first communication apparatus may further obtain the second PSK based on the PSK key material. In this case, the first communication apparatus may implement a PSK update and the authentication key update by using the first protocol packet.

In an implementation, the first communication apparatus stores a first data key, the first protocol packet further includes a data key material, the data key material is for generating an updated second data key, the first communication apparatus processes, based on the first data key within an aging periodicity of the first data key, a data packet exchanged between the first communication apparatus and the second communication apparatus, and the first communication apparatus processes, based on the second data key within an aging periodicity of the second data key, a data packet exchanged between the first communication apparatus and the second communication apparatus. In this case, the first communication apparatus may obtain the second data key based on the data key material. In this case, the first communication apparatus may implement the authentication key update and a data key update by using the first protocol packet.

In an implementation, the second data key includes an integrity verification key and/or a cipher key, where the integrity verification key is for performing integrity verification on the data packet, and the cipher key is for encrypting the data packet.

In an implementation, the first protocol packet includes an EAP header, an EAP extension header, and a keyword field.

In an implementation, the first authentication key material is carried in the keyword field.

In an implementation, the keyword field includes any one or more of the following fields: a protocol version number field, a session identifier field, a key identifier field, an encrypted data field, a nonce field, an identifier field, and an integrity verification field.

In an implementation, the first authentication key material is carried in the encrypted data field.

In an implementation, before receiving the first protocol packet, the first communication apparatus may send third indication information to the second communication apparatus, where the third indication information indicates that the first communication apparatus has a capability of automatically updating an authentication key. After determining, based on the third indication information, that the first communication apparatus has the capability of automatically updating an authentication key, the second communication apparatus may send the first protocol packet including the first authentication key material to the first communication apparatus.

In an implementation, the first protocol packet is an Internet key exchange IKE protocol-based packet.

In an implementation, when the first protocol packet is the IKE protocol-based packet, the first authentication key material is carried in a payload field of the first protocol packet.

In an implementation, when the first protocol packet is the IKE protocol-based packet, the first authentication key material is carried in a notification payload field of the first protocol packet.

In an implementation, when the first protocol packet is the IKE protocol-based packet, the first authentication key material is carried in an extended TLV field of the first protocol packet.

In an implementation, when the first protocol packet is the IKE protocol-based packet, the first communication apparatus may further send fourth indication information to the second communication apparatus, where the fourth indication information indicates that the first communication apparatus has a capability of automatically updating an authentication key. After determining, based on the fourth indication information, that the first communication apparatus has the capability of automatically updating an authentication key, the second communication apparatus may send the first protocol packet including the first authentication key material to the first communication apparatus.

In an implementation, the fourth indication information is carried in a notification payload field of an IKE protocol-based packet.

In an implementation, the fourth indication information is carried in a notification message type field of the IKE protocol-based packet, and the notification payload field of the IKE protocol-based packet includes the notification message type field.

In an implementation, after obtaining the second authentication key based on the first authentication key material, the first communication apparatus may notify the second communication apparatus of a processing result of the first authentication key material. In an example, the first communication apparatus may send a seventh protocol packet to the second communication apparatus, where the seventh protocol packet indicates that the first communication apparatus has stored the second authentication key.

In an implementation, the seventh protocol packet includes fifth indication information, and the fifth indication information indicates that the first communication apparatus has stored the second authentication key.

In an implementation, the seventh protocol packet is an IKE protocol-based packet, and the fifth indication information is carried in a notification message type field of the seventh protocol packet.

In an implementation, the first protocol packet is an authentication exchange AUTH exchange packet.

In an implementation, the first protocol packet is a create child security association exchange CREATE_CHILD_SA exchange packet.

In an implementation, the first protocol packet is an informational exchange packet.

In an implementation, the first communication apparatus is an in-vehicle apparatus. For example, the first communication apparatus is a communication entity in a T-BOX.

In an implementation, the second communication apparatus is an in-vehicle apparatus. For example, the second communication apparatus is a communication entity in the T-BOX.

In an implementation, both the first communication apparatus and the second communication apparatus belong to the T-BOX.

According to a sixth aspect, an embodiment of this application provides an authentication key updating method. The method may be performed by a second communication apparatus. In an example, the second communication apparatus may obtain a first authentication key material, where the first authentication key material is for generating a second authentication key. After obtaining the first authentication key material, the second communication apparatus may generate a first protocol packet based on the first authentication key material, where the first protocol packet includes the first authentication key material. A first communication apparatus and the second communication apparatus communicate with each other through a non-Ethernet port, and/or the first communication apparatus or the second communication apparatus does not use an asymmetric key algorithm. After generating the first protocol packet, the second communication apparatus may send the first protocol packet to the first communication apparatus, to enable the first communication apparatus to generate the updated second authentication key based on the first authentication key material. It can be learned from this that, according to the solution in this embodiment of this application, the first communication apparatus may update the authentication key based on the first authentication key material. Therefore, the authentication key stored in the first communication apparatus may change. This reduces a possibility of cracking the authentication key in the first communication apparatus, and accordingly avoids security risks.

In an implementation, the second communication apparatus may further store the first authentication key material. In this case, before an aging periodicity of the second authentication key starts, the second communication apparatus may obtain the stored first authentication key material, and obtain the second authentication key based on the first authentication key material. In this way, the second communication apparatus may process, by using the second authentication key within the aging periodicity of the second authentication key, a packet exchanged between the first communication apparatus and the second communication apparatus.

In an implementation, the method further includes: receiving a third authentication key material sent by the first communication apparatus, and obtaining the second authentication key based on the third authentication key material.

In an implementation, the method further includes: obtaining the second authentication key based on the first authentication key material.

In an implementation, the obtaining the second authentication key based on the first authentication key material includes: determining the first authentication key material as the second authentication key.

In an implementation, the obtaining the second authentication key based on the first authentication key material includes: obtaining the second authentication key based on the first authentication key material and a first key derivation algorithm.

In an implementation, the obtaining the second authentication key based on the first authentication key material and a first key derivation algorithm includes: performing calculation on the first authentication key material by using a first algorithm to obtain an intermediate value; and generating the second authentication key based on the intermediate value and the first key derivation algorithm.

In an implementation, the method further includes: storing the second authentication key.

In an implementation, the second authentication key includes any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, the first authentication key material includes a nonce.

In an implementation, the first authentication key material includes any one or more of the following: a nonce for generating the integrity verification key, a nonce for generating the cipher key, a nonce for generating the key derivation key, and a nonce for generating the identity authentication key.

In an implementation, the identity authentication key and the integrity verification key are the same.

In an implementation, the first protocol packet is a PSK-based extensible authentication protocol EAP-PSK packet.

In an implementation, the first protocol packet includes an extended type-length-value TLV field, and the extended TLV field includes the first authentication key material.

In an implementation, the first authentication key material is encrypted in the first protocol packet by using a first key.

In an implementation, the first protocol packet further includes first integrity verification information, and the first integrity verification information is for performing integrity verification on the first protocol packet.

In an implementation, the first protocol packet carries an identifier of the first key.

In an implementation, the first protocol packet includes an identifier of a second key, the identifier of the second key identifies the second key, and the second key is for calculating the first integrity verification information.

In an implementation, before the sending the first protocol packet to the first communication apparatus, the method further includes: receiving a second protocol packet sent by the first communication apparatus, where the second protocol packet carries an identifier of a third key, the identifier of the third key identifies the third key, and the third key is for deriving the first key.

In an implementation, before the sending the first protocol packet to the first communication apparatus, the method further includes: receiving a second protocol packet sent by the first communication apparatus, where the second protocol packet carries an identifier of a third key, the identifier of the third key identifies the third key, the third key is for deriving a second key, and the second key is for calculating the first integrity verification information.

In an implementation, the third key includes a first PSK stored in the first communication apparatus and the second communication apparatus.

In an implementation, before the receiving a second protocol packet sent by the first communication apparatus, the method further includes: sending a third protocol packet to the first communication apparatus, where the third protocol packet is for requesting to perform identity authentication on the second communication apparatus.

In an implementation, the third protocol packet carries the identifier of the third key.

In an implementation, the first protocol packet includes first identity authentication information, and the first identity authentication information is for performing identity authentication on the second communication apparatus.

In an implementation, the first identity authentication information is encrypted in the first protocol packet by using the first key.

In an implementation, the first identity authentication information is obtained through calculation on one or more of the following based on a fourth key: a part or all of fields in the third protocol packet or a part or all of fields in the second protocol packet.

In an implementation, the fourth key is derived from the third key.

In an implementation, the fourth key is derived from a third PSK stored in the first communication apparatus and the second communication apparatus.

In an implementation, the second protocol packet carries an identifier of the third PSK, and the identifier of the third PSK identifies the third PSK.

In an implementation, the method further includes: receiving a fourth protocol packet sent by the first communication apparatus, where the fourth protocol packet carries first indication information, and the first indication information indicates that the first communication apparatus has stored the second authentication key.

In an implementation, the fourth protocol packet includes an extended TLV field, and the extended TLV field includes the first indication information.

In an implementation, the fourth protocol packet carries second integrity verification information, and the second integrity verification information is for performing integrity verification on the fourth protocol packet.

In an implementation, the fourth protocol packet includes second identity authentication information, and the second identity authentication information is for performing identity authentication on the first communication apparatus.

In an implementation, the second identity authentication information is encrypted in the fourth protocol packet by using the first key.

In an implementation, the second identity authentication information is obtained through calculation on one or more of the following based on the fourth key: a part or all of the fields in the second protocol packet or a part or all of the fields in the third protocol packet.

In an implementation, the method further includes: performing identity authentication on the first communication apparatus by using the second identity authentication information.

In an implementation, the performing identity authentication on the first communication apparatus by using the second identity authentication information includes: performing calculation on a target field by using the fourth key, to obtain fourth identity authentication information; and performing matching verification on the fourth identity authentication information and the second identity authentication information carried in the fourth protocol packet, where the target field includes one or more of the following: a part or all of the fields in the third protocol packet or a part or all of the fields in the second protocol packet.

In an implementation, the performing calculation on a target field by using the fourth key, to obtain fourth identity authentication information includes: performing calculation on the target field by using the fourth key, to obtain a second calculation result; and encrypting the second calculation result by using the first key, to obtain the fourth identity authentication information.

In an implementation, the method further includes: sending a fifth protocol packet to the first communication apparatus, where the fifth protocol packet carries an identity authentication result and an authentication key update result.

In an implementation, the method further includes: receiving a sixth protocol packet sent by the first communication apparatus, where the sixth protocol packet indicates that the first communication apparatus has received the fifth protocol packet.

In an implementation, the second communication apparatus stores the first PSK, the first protocol packet further includes a PSK key material, the PSK key material indicates the first communication apparatus to generate an updated second PSK, the second communication apparatus processes, based on the first PSK within an aging periodicity of the first PSK, a packet exchanged between the first communication apparatus and the second communication apparatus, and the second communication apparatus processes, based on the second PSK within an aging periodicity of the second PSK, a packet exchanged between the first communication apparatus and the second communication apparatus.

In an implementation, the method further includes: obtaining the second PSK based on the PSK key material.

In an implementation, the second communication apparatus stores a first data key, the first protocol packet further includes a data key material, the data key material indicates the first communication apparatus to generate an updated second data key, the second communication apparatus processes, based on the first data key within an aging periodicity of the first data key, an data packet exchanged between the first communication apparatus and the second communication apparatus, and the second communication apparatus processes, based on the second data key within an aging periodicity of the second data key, an identity data packet exchanged between the first communication apparatus and the second communication apparatus.

In an implementation, the method further includes: obtaining the second data key based on the data key material.

In an implementation, the second data key includes any one or more of the following: an integrity verification key and a cipher key, where the integrity verification key is for performing integrity verification on the data packet, and the cipher key is for encrypting the data packet.

In an implementation, the first protocol packet includes an extensible authentication protocol EAP header, an EAP extension header, and a keyword field.

In an implementation, the first authentication key material is carried in the keyword field.

In an implementation, the keyword field includes any one or more of the following fields: a protocol version number field, a session identifier field, a key identifier field, an encrypted data field, a nonce field, an identifier field, and an integrity verification field.

In an implementation, the first authentication key material is carried in the encrypted data field.

In an implementation, the method further includes: receiving second indication information sent by the first communication apparatus, where the second indication information indicates that the first communication apparatus has a capability of automatically updating an authentication key.

In an implementation, the first protocol packet is an Internet key exchange IKE protocol-based packet.

In an implementation, the first authentication key material is carried in a payload field of the first protocol packet.

In an implementation, the first authentication key material is carried in a notification payload field of the first protocol packet.

In an implementation, the first authentication key material is carried in an extended TLV field of the first protocol packet.

In an implementation, the method further includes: receiving third indication information sent by the first communication apparatus, where the third indication information indicates that the first communication apparatus has a capability of automatically updating an authentication key.

In an implementation, the third indication information is carried in a notification payload field of an IKE protocol-based packet.

In an implementation, the third indication information is carried in a notification message type field of the IKE protocol-based packet, and the notification payload field of the IKE protocol-based packet includes the notification message type field.

In an implementation, the method further includes: receiving a seventh protocol packet sent by the first communication apparatus, where the seventh protocol packet indicates that the first communication apparatus has stored the second authentication key.

In an implementation, the seventh protocol packet includes fourth indication information, and the fourth indication information indicates that the first communication apparatus has stored the second authentication key.

In an implementation, the seventh protocol packet is an IKE protocol-based packet, and the fourth indication information is carried in a notification message type field of the seventh protocol packet.

In an implementation, the first protocol packet is an authentication exchange AUTH exchange packet.

In an implementation, the first protocol packet is a create child security association exchange CREATE_CHILD_SA exchange packet.

In an implementation, the first protocol packet is an informational exchange packet.

In an implementation, the first communication apparatus is an in-vehicle apparatus. For example, the first communication apparatus is a communication entity in a T-BOX.

In an implementation, the second communication apparatus is an in-vehicle apparatus. For example, the second communication apparatus is a communication entity in the T-BOX.

In an implementation, both the first communication apparatus and the second communication apparatus belong to the T-BOX.

According to a seventh aspect, an embodiment of this application provides a PSK-based MACsec communication method. The method may be performed by a first communication apparatus. In an example, the first communication apparatus stores a first PSK, and the first PSK is for processing, within an aging periodicity of the first PSK, a packet exchanged between the first communication apparatus and a second communication apparatus. Both the first communication apparatus and the second communication apparatus may process, based on the first PSK within the aging periodicity of the first PSK, the packet exchanged between the first communication apparatus and the second communication apparatus. In this application, the first communication apparatus may receive, within the aging periodicity of the first PSK, a first protocol packet sent by the second communication apparatus, where the first protocol packet includes a first PSK key material, and the first PSK key material is for generating a second PSK. The second PSK is for processing, within an aging periodicity of the second PSK, a packet exchanged between the first communication apparatus and the second communication apparatus. Both the first communication apparatus and the second communication apparatus may process, based on the second PSK within the aging periodicity of the second PSK, the packet exchanged between the first communication apparatus and the second communication apparatus. After obtaining the second PSK based on the first PSK key material, the first communication apparatus may derive a MACsec key by using the second PSK within the aging periodicity of the second PSK. It can be learned from this that, according to the solution in this embodiment of this application, the first communication apparatus may update the PSK based on the first PSK key material. Therefore, the PSK stored in the first communication apparatus may change. This reduces a possibility of cracking the PSK in the first communication apparatus, and correspondingly reduces a risk of cracking the MACsec key derived from the PSK, to reduce a security risk.

For a specific implementation in which the first communication apparatus obtains the first PSK key material, and obtains the second PSK based on the first PSK key material, refer to the related descriptions in the first aspect. Details are not described herein.

According to an eighth aspect, an embodiment of this application provides a PSK-based MACsec communication method. The method may be performed by a second communication apparatus. In an example, the second communication apparatus may obtain a first PSK key material, where the first PSK key material is for generating an updated second PSK. After obtaining the first PSK key material, the second communication apparatus may generate a first protocol packet based on the first PSK key material, where the first protocol packet includes the first PSK key material. After generating the first protocol packet, the second communication apparatus may send the first protocol packet to the first communication apparatus, so that the first communication apparatus generates the second PSK based on the first PSK key material, and derives a MACsec key based on the second PSK within an aging periodicity of the second PSK. It can be learned from this that, according to the solution in this embodiment of this application, the first communication apparatus may update the PSK based on the first PSK key material. Therefore, the PSK stored in the first communication apparatus may change. This reduces a possibility of cracking the PSK in the first communication apparatus, and correspondingly reduces a risk of cracking the MACsec key derived from the PSK, to reduce a security risk.

In addition, the second communication apparatus may further perform the method according to any implementation of the second aspect.

According to a ninth aspect, an embodiment of this application provides a PSK processing method. The method may be performed by a first communication apparatus. In an example, the first communication apparatus stores a first PSK. Normally, the first communication apparatus may process, based on the first PSK within an aging periodicity of the first PSK, a packet exchanged between the first communication apparatus and a second communication apparatus. In addition, the first communication apparatus further locally stores a second PSK. In this application, if the first communication apparatus cannot process, based on the first PSK within the aging periodicity of the first PSK, the packet exchanged between the first communication apparatus and the second communication apparatus, the first communication apparatus may process, by using the second PSK, the packet exchanged between the first communication apparatus and the second communication apparatus, so that the first communication apparatus and the second communication apparatus can normally communicate with each other.

In an implementation, the second PSK may be stored in a non-volatile memory area of the first communication apparatus, to ensure that the second PSK is not lost when an unexpected fault or a power failure occurs on the first communication apparatus.

In an implementation, the first communication apparatus may read, within the aging periodicity of the first PSK, the first PSK from a non-volatile memory area storing the first PSK, to help process, by using the first PSK, the packet exchanged between the first communication apparatus and the second communication apparatus. In an example, if the first communication apparatus fails to read the first PSK from the non-volatile memory area corresponding to the first PSK, the first communication apparatus may determine that the packet exchanged between the first communication apparatus and the second communication apparatus cannot be processed currently based on the first PSK.

In an implementation, the second PSK is generated by the first communication apparatus based on a PSK key material within the aging periodicity of the first PSK. In an example, the first communication apparatus may receive, within the aging periodicity of the first PSK, a first protocol packet sent by the second communication apparatus, where the first protocol packet includes the PSK key material, and the PSK key material is for generating the updated second PSK. The first communication apparatus may process, based on the second PSK within an aging periodicity of the second PSK, a packet exchanged between the first communication apparatus and the second communication apparatus. After obtaining the first protocol packet, the first communication apparatus may obtain the second PSK based on the PSK key material, and store the second PSK.

In an implementation, the second PSK is a PSK preconfigured at delivery of the first communication apparatus.

In an implementation, if the second PSK is the PSK preconfigured at delivery of the first communication apparatus, when the first communication apparatus has another available PSK, the first communication apparatus does not use the second PSK to process the packet exchanged between the first communication apparatus and the second communication apparatus. In other words, before determining that the first PSK cannot be for processing the packet exchanged between the first communication apparatus and the second communication apparatus, the first communication apparatus does not use the second PSK to process the packet exchanged between the first communication apparatus and the second communication apparatus.

In an implementation, the second PSK is the PSK preconfigured at delivery of the first communication apparatus, and the first communication apparatus further locally stores a third PSK in addition to the first PSK and the second PSK. In this case, after determining that the first PSK cannot be for processing the packet exchanged between the second communication apparatus and the first communication apparatus, the first communication apparatus first determines whether the first communication apparatus locally stores an available PSK in addition to the first PSK and the second PSK. If the another available PSK exists, the first communication apparatus uses the another available PSK to process the packet exchanged between the second communication apparatus and the first communication apparatus. If no other available PSK exists, the first communication apparatus uses the second PSK to process the packet exchanged between the second communication apparatus and the first communication apparatus. In an example, the first communication apparatus further locally stores the third PSK in addition to the first PSK and the second PSK. After determining that the first PSK cannot be for processing the packet exchanged between the second communication apparatus and the first communication apparatus, the first communication apparatus further determines whether the third PSK can be for processing the packet exchanged between the second communication apparatus and the first communication apparatus. After determining that the third PSK cannot be for processing the packet exchanged between the second communication apparatus and the first communication apparatus, the first communication apparatus determines to use the second PSK to process the packet exchanged between the second communication apparatus and the first communication apparatus.

In an implementation, when failing to read the third PSK from a non-volatile memory area that stores the third PSK, the first communication apparatus may determine that the third PSK cannot be for processing the packet exchanged between the second communication apparatus and the first communication apparatus.

In an implementation, for example, during specific implementation in which the first communication apparatus processes, by using the second PSK, the packet exchanged between the second communication apparatus and the first communication apparatus, the first communication apparatus may derive a key by using the second PSK, and process, by using the derived key, the packet exchanged between the second communication apparatus and the first communication apparatus.

In an implementation, the first communication apparatus may derive an authentication key by using the second PSK, and process, by using the authentication key, a packet 1 exchanged between the second communication apparatus and the first communication apparatus, where the packet 1 is for performing identity authentication on the first communication apparatus. The authentication key may include one or more of a cipher key, an integrity verification key, and an identity authentication key. The cipher key may be for encrypting crucial information in an authentication packet, the integrity verification key may be for performing integrity verification on the authentication packet, and the identity authentication key may be for calculating identity authentication information in the authentication packet. In this embodiment of this application, the second communication apparatus may perform identity authentication through the EAP-PSK protocol. The second communication apparatus may alternatively perform identity authentication by using the IKE protocol. This is not specifically limited in this embodiment of this application.

In another example, the first communication apparatus may derive a key by using the second PSK, and process, by using the derived key, a packet 2 exchanged between the second communication apparatus and the first communication apparatus, where the packet 2 may be for updating the first PSK stored in the first communication apparatus. In an example, after successfully updating the PSK, the first communication apparatus may process, by using the updated PSK instead of the second PSK, the packet exchanged between the second communication apparatus and the first communication apparatus.

In an implementation, after determining, within the aging periodicity of the first PSK, that the packet exchanged between the second communication apparatus and the first communication apparatus cannot be processed based on the first PSK, the first communication apparatus may send alarm information to a control management device, where the alarm information indicates that the first communication apparatus cannot process, based on the first PSK within the aging periodicity of the first PSK, the packet exchanged between the second communication apparatus and the first communication apparatus. This helps operation and maintenance personnel determine a status of a PSK in the second communication apparatus based on the alarm information, and determine whether manual intervention is needed.

According to a tenth aspect, an embodiment of this application provides a first communication apparatus, including a transceiver unit and a processing unit. The transceiver unit is configured to perform a sending and receiving operation performed by the first communication apparatus according to any one of the first aspect or the implementations of the first aspect, and the processing unit is configured to perform an operation, other than the receiving and sending operation, performed by the first communication apparatus according to any one of the first aspect or the implementations of the first aspect. Alternatively, the transceiver unit is configured to perform a sending and receiving operation performed by the first communication apparatus according to any one of the third aspect or the implementations of the third aspect, and the processing unit is configured to perform an operation, other than the receiving and sending operation, performed by the first communication apparatus according to any one of the third aspect or the implementations of the third aspect. Alternatively, the transceiver unit is configured to perform a sending and receiving operation performed by the first communication apparatus according to any one of the fifth aspect or the implementations of the fifth aspect, and the processing unit is configured to perform an operation, other than the receiving and sending operation, performed by the first communication apparatus according to any one of the fifth aspect or the implementations of the fifth aspect. Alternatively, the transceiver unit is configured to perform a sending and receiving operation performed by the first communication apparatus according to any one of the seventh aspect or the implementations of the seventh aspect, and the processing unit is configured to perform an operation, other than the receiving and sending operation, performed by the first communication apparatus according to any one of the seventh aspect or the implementations of the seventh aspect. Alternatively, the transceiver unit is configured to perform a sending and receiving operation performed by the first communication apparatus according to any one of the ninth aspect or the implementations of the ninth aspect, and the processing unit is configured to perform an operation, other than the receiving and sending operation, performed by the first communication apparatus according to any one of the ninth aspect or the implementations of the ninth aspect.

According to an eleventh aspect, an embodiment of this application provides a second communication apparatus, including a transceiver unit and a processing unit. The transceiver unit is configured to perform a sending and receiving operation performed by the second communication apparatus according to any one of the second aspect or the implementations of the second aspect, and the processing unit is configured to perform an operation, other than the receiving and sending operation, performed by the second communication apparatus according to any one of the second aspect or the implementations of the second aspect. Alternatively, the transceiver unit is configured to perform a sending and receiving operation performed by the second communication apparatus according to any one of the fourth aspect or the implementations of the fourth aspect, and the processing unit is configured to perform an operation, other than the receiving and sending operation, performed by the second communication apparatus according to any one of the fourth aspect or the implementations of the fourth aspect. Alternatively, the transceiver unit is configured to perform a sending and receiving operation performed by the second communication apparatus according to any one of the sixth aspect or the implementations of the sixth aspect, and the processing unit is configured to perform an operation, other than the receiving and sending operation, performed by the second communication apparatus according to any one of the sixth aspect or the implementations of the sixth aspect. Alternatively, the transceiver unit is configured to perform a sending and receiving operation performed by the second communication apparatus according to any one of the eighth aspect or the implementations of the eighth aspect, and the processing unit is configured to perform an operation, other than the receiving and sending operation, performed by the second communication apparatus according to any one of the eighth aspect or the implementations of the eighth aspect.

According to a twelfth aspect, an embodiment of this application provides a first communication apparatus, including a communication interface and a processor connected to the communication interface. Through the communication interface and the processor, the first communication apparatus is configured to perform the method according to any one of the first aspect or the implementations of the first aspect, the method according to any one of the third aspect or the implementations of the third aspect, the method according to any one of the fifth aspect or the implementations of the fifth aspect, the method according to any one of the seventh aspect or the implementations of the seventh aspect, or the method according to any one of the ninth aspect or the implementations of the ninth aspect. In an example, the method performed by the first communication apparatus may be performed by a central processing unit (CPU) and a software program. In another example, the method performed by the first communication apparatus may be performed by a chip.

According to a thirteenth aspect, an embodiment of this application provides a second communication apparatus, including a communication interface and a processor connected to the communication interface. Through the communication interface and the processor, the second communication apparatus is configured to perform the method according to any one of the second aspect or the implementations of the second aspect, the method according to any one of the fourth aspect or the implementations of the fourth aspect, the method according to any one of the sixth aspect or the implementations of the sixth aspect, or the method according to any one of the eighth aspect or the implementations of the eighth aspect. In an example, the method performed by the second communication apparatus may be performed by a CPU and a software program. In another example, the method performed by the second communication apparatus may be performed by a chip.

According to a fourteenth aspect, an embodiment of this application provides a first communication apparatus. The first communication apparatus includes a memory and a processor. The memory is configured to store program code. The processor is configured to run instructions in the program code, so that the first communication apparatus performs the method according to any one of the first aspect or the implementations of the first aspect, the method according to any one of the third aspect or the implementations of the third aspect, the method according to any one of the fifth aspect or the implementations of the fifth aspect, the method according to any one of the seventh aspect or the implementations of the seventh aspect, or the method according to any one of the ninth aspect or the implementations of the ninth aspect.

According to a fifteenth aspect, an embodiment of this application provides a second communication apparatus. The second communication apparatus includes a memory and a processor. The memory is configured to store program code. The processor is configured to run instructions in the program code, so that the second communication apparatus performs the method according to any one of the second aspect or the implementations of the second aspect, the method according to any one of the fourth aspect or the implementations of the fourth aspect, the method according to any one of the sixth aspect or the implementations of the sixth aspect, or the method according to any one of the eighth aspect or the implementations of the eighth aspect.

According to a sixteenth aspect, an embodiment of this application provides a computer-readable storage medium. The computer-readable storage medium stores instructions. When the instructions are run on a computer, the computer is enabled to perform the method according to any one of the first aspect or the implementations of the first aspect, the method according to any one of the second aspect or the implementations of the second aspect, the method according to any one of the third aspect or the implementations of the third aspect, the method according to any one of the fourth aspect or the implementations of the fourth aspect, the method according to any one of the fifth aspect or the implementations of the fifth aspect, the method according to any one of the sixth aspect or the implementations of the sixth aspect, the method according to any one of the seventh aspect or the implementations of the seventh aspect, the method according to any one of the eighth aspect or the implementations of the eighth aspect, or the method according to any one of the ninth aspect or the implementations of the ninth aspect.

According to a seventeenth aspect, an embodiment of this application provides a communication system, including the first communication apparatus according to the tenth aspect, the twelfth aspect, or the fourteenth aspect and the second communication apparatus according to the eleventh aspect, the thirteenth aspect, or the fifteenth aspect.

According to an eighteenth aspect, an embodiment of this application provides a communication device, including the first communication apparatus according to the tenth aspect, the twelfth aspect, or the fourteenth aspect and the second communication apparatus according to the eleventh aspect, the thirteenth aspect, or the fifteenth aspect.

In an implementation, the communication device may be an Internet of things (IoT) device. In an example, the communication device may be a vehicle. In another example, the communication device may be an intelligent wearable device, for example, a wristband. In still another example, the communication device may be a smart home device, for example, a robotic vacuum cleaner.

In an implementation, the communication device is a T-BOX. For example, the first communication apparatus may be a network access device, and the second communication apparatus may be a microcontroller unit.

According to a nineteenth aspect, an embodiment of this application provides a communication method, performed by the communication device according to the eighteenth aspect. The method includes: The first communication apparatus performs an operation performed by the first communication apparatus according to any one of the foregoing aspects or implementations. The second communication apparatus performs an operation performed by the second communication apparatus according to any one of the foregoing aspects or implementations.

BRIEF DESCRIPTION OF THE DRAWINGS

To describe technical solutions in embodiments of this application or a conventional technology more clearly, the following briefly describes accompanying drawings for describing embodiments. It is clear that the accompanying drawings in the following descriptions show only some embodiments of this application, and persons of ordinary skill in the art may still derive other drawings from these accompanying drawings without creative efforts.

FIG. 2b-1 and FIG. 2b-2 are a signaling exchange diagram of a PSK updating method according to an embodiment of this application;

FIG. 3a is a schematic diagram of a structure of an EAP-PSK packet according to an embodiment of this application;

FIG. 3c is a schematic diagram of a structure of an EAP-PSK packet according to an embodiment of this application;

FIG. 3m is a schematic diagram of a structure of an EAP-PSK packet according to an embodiment of this application;

FIG. 5a is a schematic diagram of an MKA capability notification parameter set according to an embodiment of this application;

FIG. 5b is a schematic diagram of an MKA distributed updated PSK parameter set according to an embodiment of this application;

FIG. 5c is a schematic diagram of an MKA PSK stored result notification parameter set according to an embodiment of this application;

FIG. 7a is a schematic diagram of a structure of a notification payload field according to an embodiment of this application;

FIG. 7b is a schematic diagram of a structure of a notification data field according to an embodiment of this application;

FIG. 7c is a schematic diagram of a structure of a notification data field according to an embodiment of this application;

FIG. 7d is a schematic diagram of a structure of a key distribute payload according to an embodiment of this application;

FIG. 7e is a schematic diagram of a structure of a notification data field according to an embodiment of this application;

FIG. 10a is a schematic flowchart of an authentication key updating method according to an embodiment of this application;

DETAILED DESCRIPTION OF ILLUSTRATIVE EMBODIMENTS

Embodiments of this application provide a PSK updating method, to avoid security risks caused by cracking of a PSK.

For ease of understanding, a possible application scenario of embodiments of this application is first described.

Figure 1:
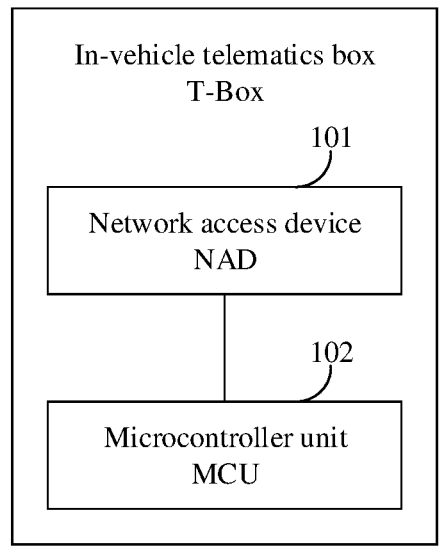
FIG. 1 is a schematic diagram of an example of an application scenario.

FIG. 1 is a schematic diagram of an example of an application scenario.

As shown in FIG. 1, an in-vehicle telematics box (T-Box) includes a network access device (NAD) 101 and a microcontroller unit (MCU) 102. The NAD bob may communicate with a device outside a vehicle, and the MCU 102 may communicate with another device in the vehicle, for example, another MCU in the vehicle.

The NAD 101 has abundant computing resources, and a central processing unit (CPU) of the NAD 101 has a strong computing capability.

The MCU 102 has few computing resources. For example, a size of a random access memory (RAM) of the MCU 102 is approximately 300 kilobytes (KBs). One or more software programs may run on the MCU 102, and the MCU 102 is very sensitive to a size of a software program package and occupation of the random access memory (RAM). In an example, the MCU 102 needs to support a communication security function. In this case, the software program package may need not to exceed 150 kilobytes (KBs), and a RAM occupied by the communication security function may need not to exceed 10 KBs. A CPU of the MCU 102 has a weak computing capability, and does not support an asymmetric algorithm. Consequently, certificate authentication cannot be performed, and a key exchange algorithm cannot be used.

In an example, when a software program needs to be updated, a device, for example, a server, outside the vehicle may send an updated software program package to the NAD 101, and then the NAD 101 sends the updated software program package to the MCU 102.

In another example, the MCU 102 may collect running data in the vehicle, and send the collected running data to the NAD 101, and the NAD 101 sends the running data to a device, for example, a server, outside the vehicle, so that the running data in the vehicle is remotely collected. To protect data privacy, the MCU 102 may encrypt the running data when sending the running data to the NAD 101.

In still another example, when the vehicle supports a remote control function, for example, a function of remotely opening a vehicle door, a device outside the vehicle may send a control packet corresponding to the remote control function to the NAD 101, and then the NAD 101 sends the control packet to the MCU 102. The MCU 102 interacts with another device in the vehicle, to control the vehicle to perform a corresponding action, for example, to open the vehicle door. To ensure safe operating of the vehicle, the MCU 102 needs to verify the control packet after receiving the control packet from the NAD 101.

In the foregoing scenarios, to ensure data security during data exchange between the NAD 101 and the MCU 102, identity authentication may be performed before the data exchange between the NAD 101 and the MCU 102. In some embodiments, an authentication packet may be transmitted between the NAD 101 and the MCU 102 to verify an identity of each other. In some examples, to ensure transmission security of the authentication packet, important information in the authentication packet may be encrypted by using a cipher key, and integrity verification information of the authentication packet may be calculated by using an integrity verification key. The cipher key and the integrity verification key may be obtained based on a PSK. The NAD 101 and the MCU 102 may each pre-store one PSK, and the PSK pre-stored in the NAD 101 is the same as the PSK pre-stored in the MCU 102. During the identity authentication, the NAD 101 and the MCU 102 may separately derive the cipher key and the integrity verification key based on the PSK stored in the NAD 101 and the MCU 102.

In some embodiments, the PSK pre-stored in the NAD 101 and the MCU 102 remains unchanged. For example, the PSK remains unchanged from delivery of the vehicle to scrapping of the vehicle. Because the PSK may be cracked, security risks may be caused accordingly. For example, after cracking the PSK, an untrusted third-party communication apparatus performs identity authentication with the MCU 102 by using a key derived from the PSK, and further, for example, sends a control packet to the MCU 102 to control the vehicle, collects core data of the vehicle through the MCU 102, or sends a software program package including a virus to the MCU 102.

It is found that, if the NAD 101 and the MCU 102 can update, for example, periodically and automatically, the PSK stored in the NAD 101 and the MCU 102, a possibility of cracking the PSK is greatly reduced, and accordingly security risks may be avoided.

It should be noted that FIG. 1 is merely shown for ease of understanding, and does not constitute a limitation on the application scenario of embodiments of this application. In embodiments of this application, communication apparatuses between which identity authentication needs to be performed are not limited to the NAD 101 and the MCU 102 shown in FIG. 1, and may be the NAD 101 and another device in the vehicle, may be the MCU 102 and another device in the vehicle, or may be any two communication apparatuses.

The communication apparatus in embodiments of this application may be a device that can exchange data with another device. For example, the communication apparatus may be the NAD 101 and the MCU 102 shown in FIG. 1, may be a network device, or may be user equipment or a server. This is not specifically limited in embodiments of this application. In addition, the communication apparatus may alternatively be a part of components on a device that can exchange data with another device, for example, may be a board or a line card on a network device, or may be a functional module on the network device. This is not limited in embodiments of this application.

In view of this, embodiments of this application provide a PSK updating method. The following describes the method with reference to accompanying drawings.

Figure 2A:
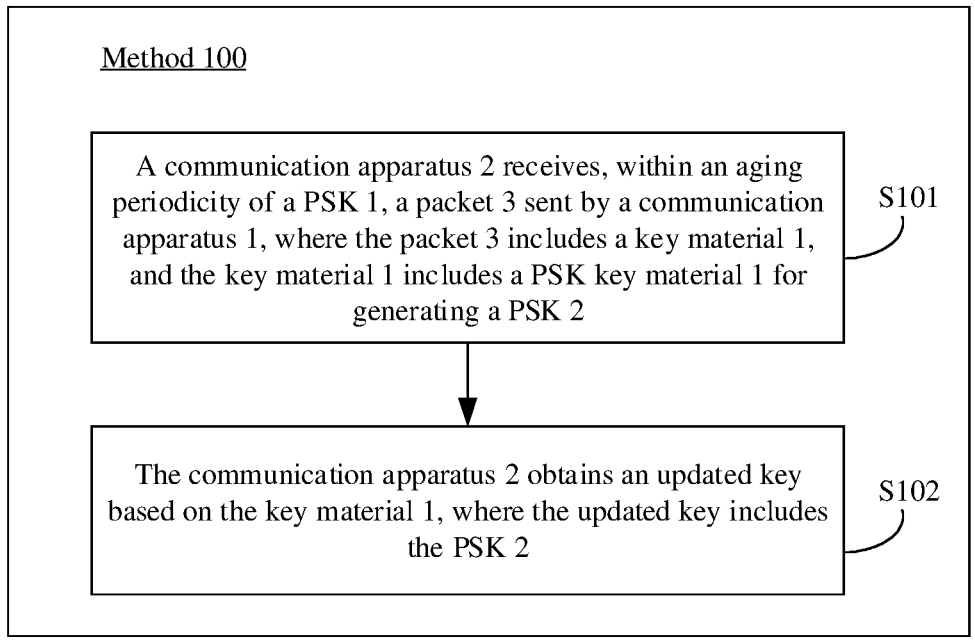
FIG. 2a is a schematic flowchart of a PSK updating method according to an embodiment of this application.

FIG. 2a is a schematic flowchart of a PSK updating method according to an embodiment of this application. The PSK updating method 100 shown in FIG. 2a may be performed by a communication apparatus 2. The communication apparatus 2 stores a PSK 1, and may process, based on the PSK 1 within an aging periodicity of the PSK 1, a packet exchanged between a communication apparatus 1 and the communication apparatus 2. For example, the processing, based on the PSK 1, a packet exchanged between a communication apparatus 1 and the communication apparatus 2 may be: A cipher key and an integrity verification key are derived based on the PSK 1; when a packet for identity authentication is transmitted between the communication apparatus 1 and the communication apparatus 2, the communication apparatus 2 encrypts, based on the cipher key derived from the PSK 1, the packet for identity authentication, and the communication apparatus 2 performs, based on the integrity verification key derived from the PSK 1, integrity verification on the packet for identity authentication.

The communication apparatus 1 in the method 100 may be, for example, the NAD 101 shown in FIG. 1, and the communication apparatus 2 in the method 100 may be, for example, the MCU 102 shown in FIG. 1. Certainly, the communication apparatus 1 and the communication apparatus 2 may alternatively be other devices. This is not limited herein.

For example, the method 100 may include the following S101 and S102.

S101: The communication apparatus 2 receives, within an aging periodicity of the PSK 1, a packet 3 sent by the communication apparatus 1, where the packet 3 includes a key material 1, and the key material 1 includes a PSK key material 1 for generating a PSK 2.

In this embodiment of this application, the packet 3 may be a protocol packet. In an example, the packet 3 may be a PSK-based extensible authentication protocol (EAP) packet, namely, an EAP-PSK packet. In another example, the packet 3 may be an Internet key exchange (IKE) protocol-based packet. In still another example, the packet 3 may be a media access control security key agreement (MKA)-based packet. If the packet 3 is the EAP-PSK packet, for the packet 3, refer to the following related descriptions in a method 100 shown in FIG. 2b-1 and FIG. 2b-2. Details are not described herein. If the packet 3 is the MKA-based packet, for the packet 3, refer to the following related descriptions in a method 200. Details are not described herein. If the packet 3 is the IKE protocol-based packet, for the packet 3, refer to the following related descriptions in a method 300. Details are not described herein. In this embodiment of this application, the PSK key material 1 may be for obtaining the PSK 2. After obtaining the PSK 2, the communication apparatus 2 may process, based on the PSK 2 within an aging periodicity of the PSK 2, a packet exchanged between the communication apparatus 1 and the communication apparatus 2.

S102: The communication apparatus 2 obtains an updated key based on the key material 1, where the updated key includes the PSK 2.

Figures 1, 2B:
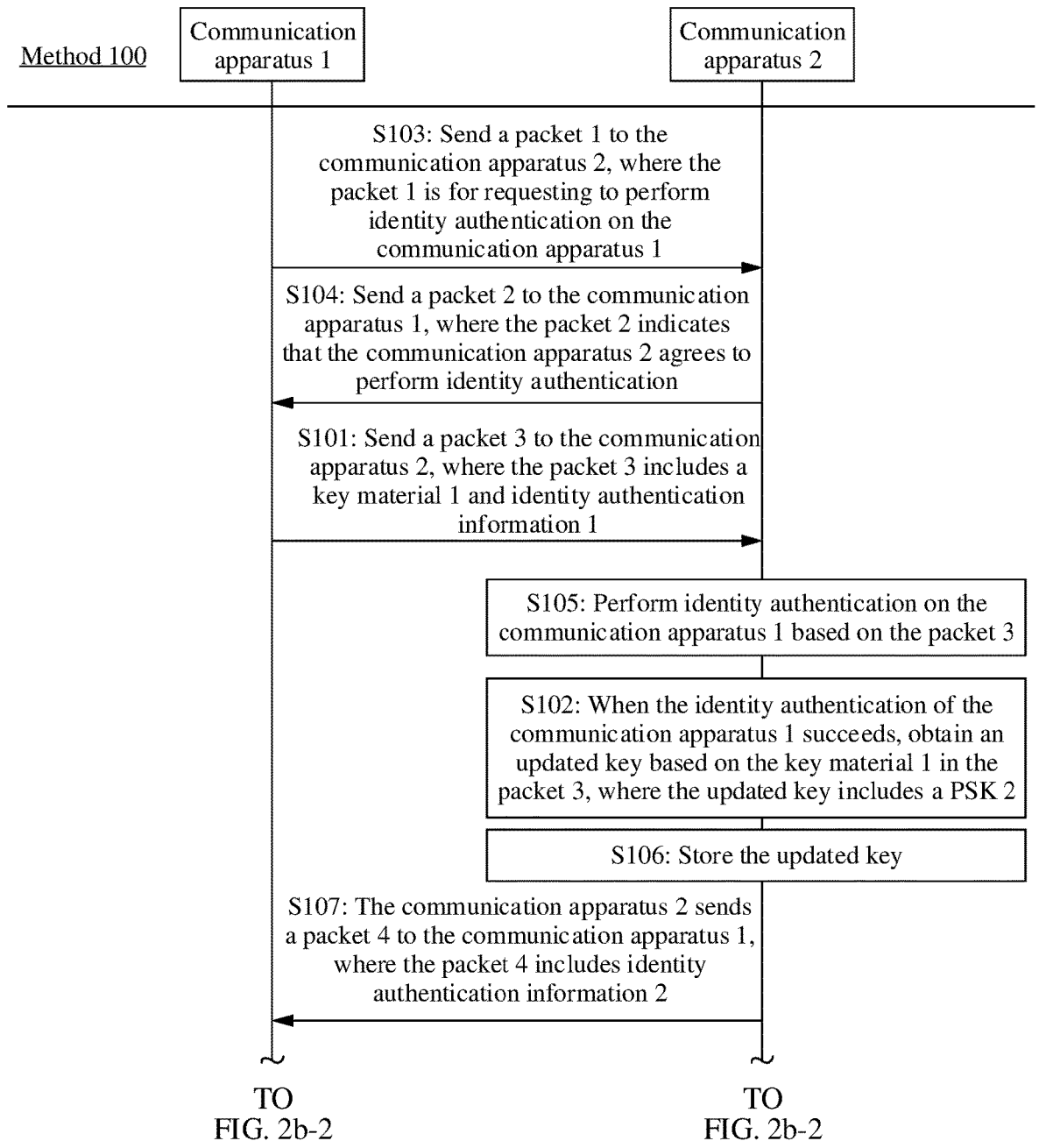
Figures 2, 2B:
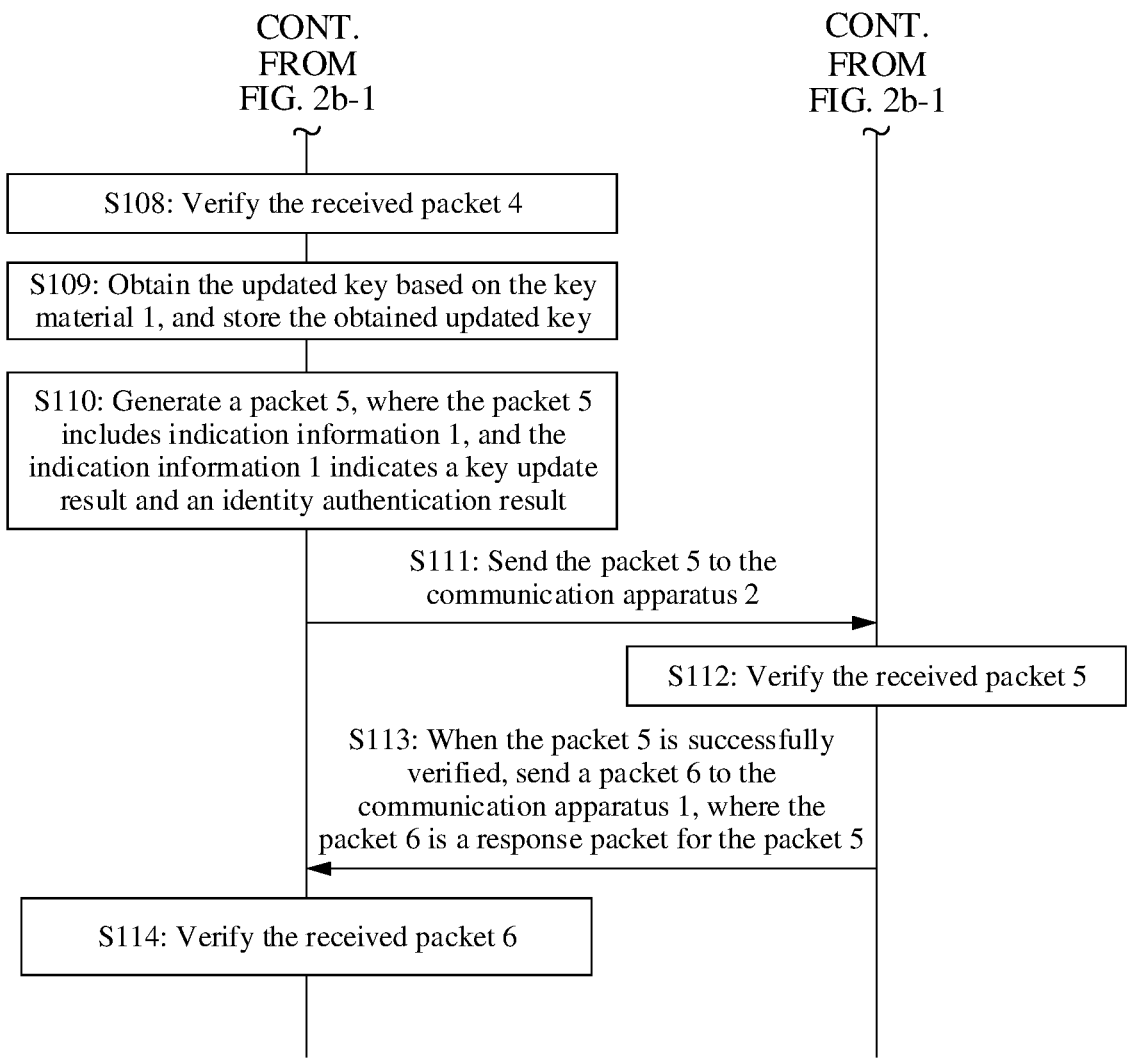

For an implementation in which the communication apparatus 2 obtains the PSK 2 based on the PSK key material 1, refer to the following related descriptions in the method 100 shown in FIG. 2b-1 and FIG. 2b-2, the method 200, and the method 300. Details are not described herein.

In an example, after obtaining the PSK 2, the communication apparatus 2 may store the PSK 2 in a non-volatile memory area of the communication apparatus 2. Correspondingly, the PSK 1 may also be stored in a non-volatile memory area of the communication apparatus 2. For example, the communication apparatus 2 includes at least two non-volatile memory areas, for example, a non-volatile memory area 1 and a non-volatile memory area 2. The non-volatile memory area 1 is for storing the PSK 1. Within the aging periodicity of the PSK 1, the communication apparatus 2 may read the PSK 1 from the non-volatile memory area 1, and process, based on the PSK 1, a packet exchanged between the communication apparatus 1 and the communication apparatus 2. Within the aging periodicity of the PSK 1, the communication apparatus 2 obtains the PSK 2 and stores the PSK 2 in the non-volatile memory area 2. Within the aging periodicity of the PSK 2, the communication apparatus 2 may read the PSK 2 from the non-volatile memory area 2, and process, based on the PSK 2, the packet exchanged between the communication apparatus 1 and the communication apparatus 2.

It can be learned from this that, according to the foregoing method 100, the PSK stored in the communication apparatus 2 may change, and the packet exchanged between the communication apparatus 1 and the communication apparatus 2 is processed based on different PSKs in different communication periodicities. For example, as described above, the packet exchanged between the communication apparatus 1 and the communication apparatus 2 is processed based on the PSK 1 in a communication periodicity corresponding to the aging periodicity of the PSK 1, and is processed based on the PSK 2 in a communication periodicity corresponding to the aging periodicity of the PSK 2. In other words, in this application, the PSK may be updated. This reduces a possibility of cracking the PSK in the communication apparatus 2, and accordingly avoids security risks.

In addition, similar to the communication apparatus 2, the communication apparatus 1 may also obtain the updated PSK 2, process, based on the PSK 1 in the communication periodicity corresponding to the aging periodicity of the PSK 1, the packet exchanged between the communication apparatus 1 and the communication apparatus 2, and process, based on the PSK 2 in the communication periodicity corresponding to the aging periodicity of the PSK 2, the packet exchanged between the communication apparatus 1 and the communication apparatus 2. This reduces a possibility of cracking the PSK in the communication apparatus 1, and accordingly avoids security risks.

FIG. 2b-1 and FIG. 2b-2 are a signaling exchange diagram of a PSK updating method according to an embodiment of this application. The PSK updating method 100 shown in FIG. 2b-1 and FIG. 2b-2 may further include S103 to S114 in addition to S101 and S102. S103 and S104 are performed before S101, S105 is performed between S101 and S102, and S106 to S114 are performed after S102.

S103: A communication apparatus 1 sends a packet 1 to a communication apparatus 2, where the packet 1 is for requesting to perform identity authentication on the communication apparatus 1.

In this embodiment of this application, the packet 1 may be an EAP-PSK packet. Refer to FIG. 3a for understanding. FIG. 3a is a schematic diagram of a structure of the packet 1 according to this embodiment of this application. As shown in FIG. 3a, the packet 1 includes an EAP header field, an EAP type field, a flags field, an extension flags (ext flags) field, a session identifier (session ID) field, a key identifier (key ID) field, a nonce (nonce) field, and an identifier (ID) field.

The EAP header field includes four bytes in total, and includes a code field, an identifier field, and a length field. The code field occupies one byte, the identifier field occupies one byte, and the length field occupies two bytes. For meanings of the fields in the EAP header, refer to related descriptions in the request for comments (RFC) 3748, and details are not described herein.

The EAP type field includes one byte, and indicates an EAP method type. In this application, the packet 1 is the EAP-PSK packet. Therefore, a value of the EAP type field may be 47 allocated by the Internet Engineering Task Force (IETF) to EAP-PSK.

The flags field includes one byte. The flags field includes a P indicator bit, an R indicator bit, a version indicator bit, a CS indicator bit, and a K indicator bit.

The P (protected) indicator bit occupies the seventh bit in the flags field, and indicates whether the current packet is an encrypted packet or includes an integrity check value (ICV) field. In a specific implementation, when a value of the P indicator bit is 1, it indicates that the current packet includes the ICV field, and may be an encrypted packet or an unencrypted packet. In this application, the packet 1 is in plaintext and does not include the ICV field. In an example, when the EAP-PSK packet is in plaintext and does not include the ICV field, the value of the P indicator bit may be 0. Correspondingly, if the EAP-PSK packet includes encrypted content or includes the ICV field, the value of the P indicator bit is 1. Unless otherwise specified, the example herein is used for describing meanings corresponding to the values of the P indicator bit in the following descriptions of embodiments of this application. The R indicator bit occupies the sixth bit in the flags field, and indicates whether the current packet is a response packet. In an example, if the EAP-PSK packet is a request packet, a value of the R indicator bit is o; if the EAP-PSK packet is the response packet, a value of the R indicator bit is 1. The packet 1 is the request packet. Unless otherwise specified, the example herein is used for describing meanings corresponding to the values of the R indicator bit in the following descriptions of embodiments of this application.

The version indicator bit occupies the fifth bit, the fourth bit, and the third bit in the flags field, and indicates a version number of the EAP-PSK protocol. The structure of the packet 1 is different from that of a conventional EAP-PSK packet, and is extended from the structure of the conventional EAP-PSK packet. In an example of this embodiment of this application, a value of the version indicator bit may be 1. Unless otherwise specified, the example herein is used for describing the value of the version indicator bit in the following descriptions of embodiments of this application.

The CS indicator bit occupies the second bit in the flags field, and indicates whether the current identity authentication includes a CSID field. When the communication apparatus 2 can perform identity authentication with a plurality of communication apparatuses, to prevent a case in which the plurality of communication apparatuses exactly allocate a same session identifier (namely, an SSID) to identity authentication and therefore the communication apparatus 2 cannot uniquely determine an authentication session based on the SSID, the communication apparatus 2 may allocate a CSID to ensure uniqueness of the authentication session. The packet 1 is generated by the communication apparatus 1, and the communication apparatus 1 cannot determine whether the communication apparatus 2 can perform identity authentication with the plurality of communication apparatuses. Therefore, the packet 1 may not include the CSID field. In an example, when a value of the CS indicator bit is 0, it indicates that the EAP-PSK packet does not have the CSID field. Correspondingly, when a value of the CS indicator bit is 1, it indicates that the EAP-PSK packet includes the CSID field. Unless otherwise specified, the example herein is used for describing meanings corresponding to the values of the CS indicator bit in the following descriptions of embodiments of this application.

The K indicator bit occupies the first bit in the flags field, and indicates whether the key ID field is included. In the packet 1, the key ID field indicates an identifier of a PSK, and may include four bytes. In an example, if the EAP-PSK packet includes the key ID field, a value of the K indicator bit is 1; if the EAP-PSK packet does not include the key ID field, a value of the K indicator bit is 0. Unless otherwise specified, the example herein is used for describing meanings corresponding to the values of the K indicator bit in the following descriptions of embodiments of this application.

For the key ID field, it should be noted that the key ID field in the packet 1 carries the identifier of the PSK. In this embodiment of this application, a key used in an identity authentication process may be derived from the PSK, or may not be derived from the PSK, for example, may be negotiated by the communication apparatus 1 and the communication apparatus 2 in advance. For ease of description, the key used in the identity authentication process is referred to as an authentication key for short. If the authentication key is derived from the PSK, the PSK for deriving the authentication key may be determined based on the key ID field. The authentication key includes an authentication cipher key (ACK), an authentication integrity key (AIK), an identity authentication key (IAK), and a key derivation key (KDK). The authentication cipher key is for encrypting content that needs to be encrypted, the authentication integrity key is for calculating an ICV of an authentication packet, the identity authentication key is for calculating identity authentication information, and the key derivation key is a key for key derivation. In an example, the authentication cipher key may be a transient EAP key (TEK). In another example, the identity authentication key and the authentication integrity key are a same key.

It should be noted that, in the following descriptions of this embodiment of this application, an integrity key and an integrity verification key may be used interchangeably.

When the K indicator bit indicates that the packet 1 includes the key ID field, the communication apparatus 1 may determine a value of the key ID field, for example, in the following manners.

(1) If the communication apparatus 1 locally has a usable PSK that is within a validity period, the PSK is determined as the PSK for key derivation used in the identity authentication process. In this case, the value of the key ID field is an ID of the PSK. Whether the PSK is usable may be determined depending on whether the PSK has a mark indicating that the PSK is usable.

(2) If the communication apparatus 1 locally has a successfully prefilled PSK that is within a validity period, the PSK is determined as the PSK for key derivation used in the identity authentication process. In this case, the value of the key ID field is an ID of the PSK. Whether the PSK is successfully installed may be determined depending on whether the PSK has a mark indicating that the PSK is successfully prefilled.

(3) If neither of the foregoing two conditions is met, to ensure that the identity authentication is normally performed, when the communication apparatus 1 locally stores a default PSK, the default PSK is determined as the PSK for key derivation used in the identity authentication process. In this case, the value of the key ID field is an ID of the PSK. In an example, if the default PSK is selected as the PSK for deriving the authentication key in the identity authentication process, the packet 1 may not include the key ID field, in other words, the value of the K indicator bit may be 0.

The zeroth bit in the flags field is a reserved bit.

The ext flags field includes one byte, and includes a reserved field and an exchange type (exch type) field. The reserved field occupies the seventh bit to the fifth bit in the ext flags field, and the exch type field occupies the fourth bit to the zeroth bit in the ext flags field. The exch type field identifies a packet exchange type. In an example, the packet exchange type may include: a packet in an initial phase, a packet in an identity authentication phase, and a packet in a result notification phase. In an example, when the packet exchange type is the packet in an initial phase, a value of the ext flags field may be 1; when the packet exchange type is the packet in an identity authentication phase, a value of the ext flags field may be 2; when the packet exchange type is the packet in a result notification phase, a value of the ext flags field may be 4. Unless otherwise specified, the example herein is used for describing meanings corresponding to the values of the exch type field in the following descriptions of embodiments of this application. The result notification phase may be for notifying an identity authentication result and a key update result.

The session ID field identifies a session between the communication apparatus 1 and the communication apparatus 2. The session ID field may include an SSID field and the CSID field. The SSID field carries a session identifier SSID allocated by the communication apparatus 1, and the CSID field carries a session identifier CSID allocated by the communication apparatus 2. The SSID field is a mandatory field, and the CSID field is optional. For details, refer to the foregoing descriptions of the CS field. When the session ID field includes the SSID field and the CSID field, the session ID field may include eight bytes, and each of the SSID field and the CSID field occupies four bytes. When the session ID field does not include the CSID field, the session ID field may include four bytes.

For the SSID, it should be noted that, in an example, the communication apparatus 1 may generate a random SSID by using a random number function, to avoid security risks caused when attackers predict an SSID that is generated according to a specific rule. In another example, the communication apparatus 1 may use, for example, a local timestamp as the SSID. If the current identity authentication ends, the communication apparatus 1 needs to re-generate an SSID when re-initiating initial identity authentication (for example, re-generating a packet 1 and sending the packet 1 to the communication apparatus 2), to prevent a replay attack. If fast re-authentication is performed after the identity authentication between the communication apparatus 1 and the communication apparatus 2 succeeds, and is directly performed by using a key obtained after the current identity authentication succeeds, the communication apparatus 1 does not need to generate a new SSID, but may use the SSID used in the current identity authentication. If the current initial identity authentication fails, the communication apparatus 1 re-initiates initial identity authentication, and needs to generate a new SSID.

Figure 3B:
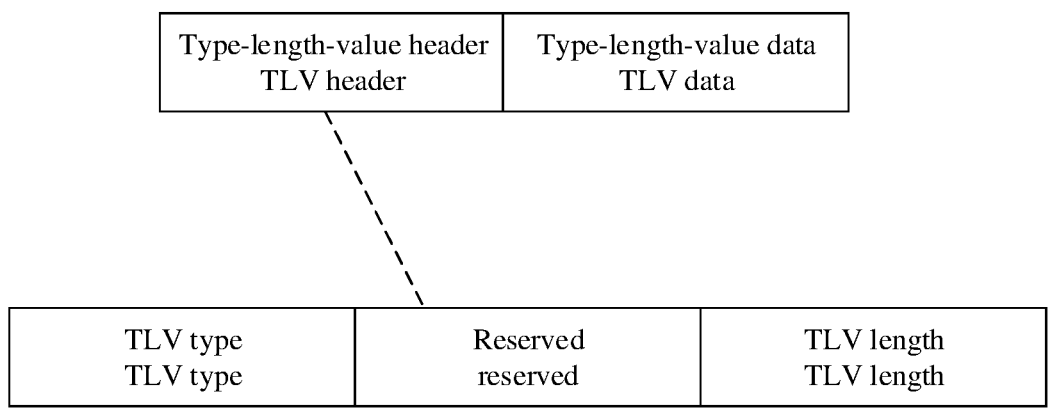
FIG. 3b is a schematic diagram of a structure of a TLV field according to an embodiment of this application.

The nonce field carries a nonce 1 generated by the communication apparatus 1. When the communication apparatus 1 and the communication apparatus 2 derive the authentication key by using the PSK, the nonce 1 may be used as a parameter for a key derivation algorithm, to increase randomness of the key derivation and improve key security. A length of the nonce 1 may range from 16 bytes to 256 bytes. A specific length may be determined based on an actual case. This is not specifically limited in this embodiment of this application. In an example, the length of the nonce 1 may be 16 bytes. In an example, the nonce 1 may be carried in a type-length-value (TLV) field. In an example, for a structure of the TLV field, refer to FIG. 3*b*. FIG. 3*b* is a schematic diagram of the structure of the TLV field according to this embodiment of this application. As shown in FIG. 3*b*, the TLV field includes a TLV header and TLV data. The TLV data carries the nonce 1, and the TLV header may include a TLV type field, a reserved field, and a TLV length field. In an example, the TLV header may include four bytes, where the TLV type field occupies one byte, the reserved field occupies one byte, and the TLV length field occupies two bytes.

For the nonce field, it should be noted that when the communication apparatus 1 and the communication apparatus 2 perform identity authentication again, a nonce carried in TLV data in a nonce field needs to be regenerated. In same identity authentication, if the packet 1 is retransmitted, the nonce carried in the TLV data in the nonce field may remain unchanged.

The ID field includes several bytes, for example, n bytes, and carries an identifier of the communication apparatus 1. A value of the ID field may be used by the communication apparatus 2 to perform whitelist verification based on the value of the ID field after the communication apparatus 2 receives the packet 1, to determine whether to agree to perform identity authentication. The value of the ID field may further indicate the communication apparatus 2 to determine the PSK used in the identity authentication process.

The identifier of the communication apparatus 1 is not specifically limited in this embodiment of this application. In an example, the identifier of the communication apparatus 1 may be a string of nonces. In another example, the identifier of the communication apparatus 1 may be an Internet protocol (IP) address or a media access control (MAC) address of the communication apparatus 1. In still another example, the identifier of the communication apparatus 1 may be a network access identifier (NAI) of the communication apparatus 1.

S104: The communication apparatus 2 sends a packet 2 to the communication apparatus 1, where the packet 2 indicates that the communication apparatus 2 agrees to perform identity authentication.

After receiving the packet 1, the communication apparatus 2 may verify the packet 1, and determine, based on a verification result, whether to agree to perform identity authentication.

During specific implementation in which the communication apparatus 2 verifies the packet 1, the communication apparatus 2 may verify the values of the fields in the packet 1.

For verification of the EAP header field, refer to related descriptions in RFC 3748, and details are not described herein.

For the flags field:

As described for the flags field in S103, when the communication apparatus 2 verifies the packet 1, the values of the P indicator bit, the R indicator bit, and the CS indicator bit need to be o, and the value of the version field needs to be 1.

The value of the K indicator bit may be 0 or 1. When the value of the K indicator bit is o, it indicates that the packet 1 does not include the key ID field. When the value of the K indicator bit is 1, it indicates that the packet 1 includes the key ID field. When the packet 1 does not include the key ID field, two cases may be included. In a first case, the authentication key is derived based on the default PSK. In a second case, it indicates that the authentication key is not derived from a PSK. When the packet 1 does not include the key ID field, the communication apparatus 2 may determine whether the communication apparatus 2 supports deriving the authentication key by using the default PSK. For example, the communication apparatus 2 determines, according to a locally configured PSK usage policy, whether to support deriving the authentication key by using the default PSK. If the communication apparatus 2 does not support deriving the authentication key by using the default PSK, the communication apparatus 2 rejects the identity authentication. When the packet 1 includes the key ID field, for example, the communication apparatus 2 may determine whether the communication apparatus 2 supports deriving the authentication key by using the PSK corresponding to a key ID carried in the key ID field. If the communication apparatus 2 does not support deriving the authentication key by using the PSK corresponding to the key ID carried in the key ID field, the communication apparatus 2 may reject the identity authentication. Certainly, if the communication apparatus 2 does not support deriving the authentication key by using the PSK corresponding to the key ID carried in the key ID field, the communication apparatus 2 may not reject the identity authentication, but continue to negotiate, in subsequent interaction, a PSK for deriving the authentication key. This is not specifically limited herein.

For the ext flags field, because the packet 1 is the first packet sent by the communication apparatus 1 to the communication apparatus 2 when the communication apparatus 1 initiates the identity authentication, the value of the exch type field needs to be 1.

For the session ID field, the session ID field in the packet 1 includes the SSID but does not include the CSID. In this case, the communication apparatus 2 may record a value of the SSID carried in the SSID field. When sending a response packet for the packet 1 to the communication apparatus 1, the communication apparatus 2 may encapsulate the value of the SSID into the response packet. For the nonce field, the communication apparatus 2 may record the nonce 1 carried in the nonce field.

For the ID field, the communication apparatus 2 may determine whether the communication apparatus 2 supports performing identity authentication with a communication apparatus corresponding to the ID carried in the ID field. In an example, the communication apparatus 2 may determine, according to a locally configured identity authentication policy, whether to support performing identity authentication with the communication apparatus corresponding to the ID carried in the ID field. In addition, the communication apparatus 2 may also determine, with reference to the ID value carried in the ID field in the packet 1, a locally supported PSK for deriving the authentication key. For example, the locally configured identity authentication policy of the communication apparatus 2 indicates: The communication apparatus 2 can perform identity authentication with the communication apparatus 1, and support, when performing identity authentication with the communication apparatus 1, using a PSK 1 to derive the authentication key.

The communication apparatus 2 may send the packet 2 to the communication apparatus 1 when the packet 1 is successfully verified, where the packet 2 indicates that the communication apparatus 2 agrees to perform identity authentication.

In this embodiment of this application, the packet 2 is also an EAP-PSK packet. In addition, a packet structure of the packet 2 is the same as that of the packet 1. For the packet structure of the packet 2, refer to FIG. 3a. For meanings of fields in the packet 2, refer to the foregoing descriptions in FIG. 3a. Details are not described herein again. For values of the fields in the packet 2, refer to Table 1 for understanding.

TABLE 1

| Field | Value and description |
|---|---|
| EAP type | 47 |
| P indicator bit | 0, indicates that the packet 2 is in plaintext and does not include an ICV. |
| R indicator bit | 1, indicates that the packet 2 is a response packet. |
| version | 1, indicates that this protocol is an extended EAP-PSK protocol. |
| CS indicator bit | 1 or 0 |
| K indicator bit | 1 or 0 |
| exch type | 1, indicates that the packet 2 is a packet in an initial phase of identity |
| Field | Value and description |
| | authentication. |
| SSID | Same as the value carried in the SSID field in the packet 1 |
| CSID | Refer to the following descriptions. |
| key ID | Refer to the following descriptions. |
| nonce | Nonce 2 generated by the communication apparatus 2 |
| ID | Identifier of the communication apparatus 2 |

For the K indicator bit in the packet 2, it should be noted that if the value of the K indicator bit included in the packet 1 is 0, the value of the K indicator bit in the packet 2 may also be 0. This indicates that the communication apparatus 1 and the communication apparatus 2 separately derive the authentication key by using the locally stored default PSK, or do not use a PSK for deriving the authentication key. If the value of the K indicator bit in the packet 1 is 1, the value of the K indicator bit in the packet 2 may also be 1. When the value of the K indicator bit in the packet 2 is 1, for a manner of determining the value of the key ID field in the packet 2, refer to the foregoing descriptions of the value of the key ID field in the packet 1. Repeated descriptions are omitted herein. It should be noted herein that the value of the key ID field in the packet 2 may be the same as or different from the value of the key ID field in the packet 1. This is not specifically limited in this embodiment of this application.

For the CS indicator bit, it should be noted that if the communication apparatus 2 needs to perform identity authentication with a plurality of different communication apparatuses, for example, the communication apparatus 2 needs to perform identity authentication with both the communication apparatus 1 and a communication apparatus 3, to prevent a case in which the communication apparatus 3 and the communication apparatus 1 allocate the same SSID and therefore the communication apparatus 2 cannot uniquely determine the corresponding identity authentication session based on the SSID, the communication apparatus 2 may allocate the CSID to ensure the uniqueness of the session. If the communication apparatus 2 does not perform identity authentication with a communication apparatus other than the communication apparatus 1, the communication apparatus 2 may not need to allocate a CSID value. Alternatively, if the communication apparatus 2 can use other information to distinguish authentication sessions to different communication apparatuses, the communication apparatus 2 may not need to allocate a CSID value. The other information herein may be, for example, an interface index (ifIndex), or may be, for example, an underlying bearer protocol.

It should be noted that, if the packet 2 includes the CSID, the following packet 3 to packet 6 also each include a CSID, and the CSIDs in the packet 3 to the packet 6 are equal to the CSID in the packet 2.

S101: The communication apparatus 1 sends the packet 3 to the communication apparatus 2, where the packet 3 includes a key material 1 and identity authentication information 1.

After receiving the packet 2, the communication apparatus 1 may verify the packet 2, and determine, based on a verification result, whether to continue to perform identity authentication.

During specific implementation in which the communication apparatus 1 verifies the packet 2, the communication apparatus 1 may verify the values of the fields in the packet 2.

For verification of the EAP header field, refer to the related descriptions in RFC 3748, and details are not described herein.

For the flags field, the P indicator bit needs to be o; the R indicator bit needs to be 1, indicating that the packet 2 is a response packet; the CS indicator bit may be 0 or 1; the version field needs to be 1.

The value of the K indicator bit may be 0 or 1. When the value of the K indicator bit is 0, it indicates that the packet 2 does not include the key ID field. When the value of the K indicator bit is 1, it indicates that the packet 2 includes the key ID field. When the packet 2 does not include the key ID field, two cases may be included. In a first case, the authentication key is derived based on the default PSK. In a second case, it indicates that the authentication key is not derived from a PSK. When the packet 2 does not include the key ID field, the communication apparatus 1 may determine whether the communication apparatus 1 supports deriving the authentication key by using the default PSK. For example, the communication apparatus 1 determines, according to a locally configured PSK usage policy, whether to support deriving the authentication key by using the default PSK. If the communication apparatus 1 does not support deriving the authentication key by using the default PSK, the identity authentication is not continued. When the packet 2 includes the key ID field, for example, the communication apparatus 1 may determine whether the communication apparatus 1 supports deriving the authentication key by using the PSK corresponding to the key ID carried in the key ID field. If the communication apparatus 1 does not support deriving the authentication key by using the PSK corresponding to the key ID carried in the key ID field, the identity authentication may not be continued.

For the ext flags field, because the packet 2 is the response packet of the communication apparatus 2 for the packet 1, when the value 1 identifies the initial phase of the identity authentication, the value of the exch type field needs to be 1.

For the session ID field, a value of the SSID field in the session ID field is the same as the value of the SSID field in the packet 1. If the value of the CS indicator bit is 1, a value carried in the CSID field is recorded.

For the nonce field, the communication apparatus 1 may record the nonce 2 carried in the nonce field.

For the ID field, the communication apparatus 1 may determine whether the communication apparatus 1 supports performing identity authentication with a communication apparatus corresponding to the ID carried in the ID field. In an example, the communication apparatus 1 may determine, according to a locally configured identity authentication policy, whether to support performing identity authentication with the communication apparatus corresponding to the ID carried in the ID field. In addition, the communication apparatus 1 may also determine, with reference to the ID value carried in the ID field in the packet 2, a locally supported PSK for deriving the authentication key. For example, the locally configured identity authentication policy of the communication apparatus 1 indicates: The communication apparatus 1 can perform identity authentication with the communication apparatus 2, and support, when performing identity authentication with the communication apparatus 2, using the PSK 1 to derive the key used in the identity authentication process.

In this embodiment of this application, if any field in the packet 2 fails to be verified, the communication apparatus 1 may not continue to perform identity authentication with the communication apparatus 2. In other words, when the packet 2 fails to be verified, the communication apparatus 1 may not perform steps to be performed by the communication apparatus 1 in the following steps.

When the packet 2 is successfully verified, the communication apparatus 1 sends the packet 3 to the communication apparatus 2, where the packet 3 includes the key material 1 and the identity authentication information 1.

When the packet 2 is successfully verified, the communication apparatus 1 may continue to perform identity authentication with the communication apparatus 2. In this application, the communication apparatus 1 may send the packet 3 to the communication apparatus 2, where the packet 3 includes the key material 1 and the identity authentication information 1. The identity authentication information 1 may be used by the communication apparatus 2 to perform identity authentication on the communication apparatus 1. The key material 1 may be for a key update. The key material 1 herein may include any one or more of a PSK key material 1, a data key material 1, and an authentication key (AK) material 1.

The PSK key material 1 is for generating the updated PSK 2.

The data key material 1 is for generating an updated data key. The data key may include a data cipher key (DCK), and the data cipher key is for encrypting a data packet transmitted between the communication apparatus 1 and the communication apparatus 2. The data key may further include a data integrity key (DIK), and the data integrity key is for performing integrity verification on the data packet transmitted between the communication apparatus 1 and the communication apparatus 2.

The authentication key material 1 is for generating an updated authentication key, and the authentication key is a key used in the identity authentication process between the communication apparatus 1 and the communication apparatus 2. For the authentication key, refer to the descriptions of the authentication key in S103. Repeated descriptions are omitted herein. In an example, the communication apparatus 1 may generate the key material 1. For example, the communication apparatus 1 may generate one or more nonces, and use the one or more nonces as the key material 1. For another example, the communication apparatus 1 may generate one or more nonces, then perform calculation on the one or more nonces by using a pre-determined calculation method, and determine a calculation result as the key material 1. In another example, the key material 1 may be preconfigured on the communication apparatus 1, and the communication apparatus 1 may obtain the key material 1 preconfigured on the communication apparatus 1.

In this embodiment of this application, the packet 3 may also be an EAP-PSK packet. For the packet 3, refer to FIG. 3c for understanding. FIG. 3c is a schematic diagram of a structure of the packet 3 according to this embodiment of this application. As shown in FIG. 3c, compared with the packet 2, the packet 3 does not include a nonce field or an ID field, but further includes an encrypted payload field and an ICV field. Fields in the packet 3 are described as follows:

For meanings of fields in an EAP header, refer to related descriptions in the request for comments (RFC) 3748, and details are not described herein.

A value of an EAP type field is 47.

For a flags field, a value of a P indicator bit is 1. The packet 3 is the third packet in the identity authentication process, and includes the key material 1 and the identity authentication information 1 that can be for verifying an identity of the communication apparatus 1. To avoid disclosure of the foregoing information in the packet 3, the packet 3 is sent in ciphertext. A value of an R indicator bit is 0, indicating that the packet 3 is a request packet. A value of a version indicator bit may be 1. A value of a CS indicator bit is the same as the value of the CS indicator bit in the packet 2. A K indicator bit indicates whether a key ID field is included. It should be noted herein that a meaning of the key ID field in the packet 3 is different from the meaning of the key ID field in the packet 1. The key ID field in the packet 3 may indicate the authentication key. It may be understood that, if the packet 3 includes the key ID field, the packet 1 and the packet 2 may not include the key ID field. The authentication key indicated by the key ID field in the packet 3 may be an authentication key obtained by the communication apparatus 1 and the communication apparatus 2 in a previous identity authentication process. In an example, if the packet 2 includes the key ID field, the packet 3 does not include the key ID field. This is because if the packet 2 includes the key ID field, the key ID field in the packet 2 already indicates that the authentication key is derived by using the PSK. In this case, the key ID field in the packet 3 is not needed to indicate the authentication key.

For an exch type field, in the packet 3, a value of the exch type field may be 2, indicating the identity authentication phase.

For a session ID field, a value of an SSID field in the session ID field is the same as the value of the SSID field in the packet 1. If the session ID field includes a CSID field, a value of the CSID field is the same as the value of the CSID field in the packet 2.

Figure 3D:
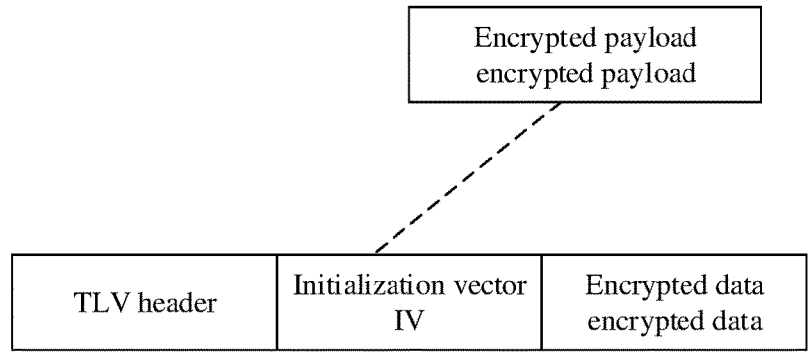
FIG. 3d is a schematic diagram of a structure of an encrypted payload field according to an embodiment of this application.

For the encrypted payload field, the field carries encrypted data. In an example, the encrypted payload field may be a TLV field. For a structure of the TLV field, refer to FIG. 3b. Repeated descriptions are omitted herein. In an example, the encrypted payload field may include a TLV header field and an encrypted data field. The encrypted data field carries the encrypted data. In an implementation of this embodiment of this application, a value of the encrypted data field in the packet 3 may be obtained through encryption by using the AES_CBC_128 encryption algorithm. In this case, the encrypted payload field may further include an initialization vector (IV) field in addition to the TLV header field and the encrypted data field, where the IV field carries an initialization vector value needed for performing encryption by using the AES_CBC_128 encryption algorithm. In this case, for the encrypted payload field, refer to FIG. 3d. FIG. 3d is a schematic diagram of a structure of the encrypted payload field according to this embodiment of this application. In this embodiment of this application, the value of the encrypted data field may be obtained by encrypting fields shown in FIG. 3e by using an encryption algorithm. The fields shown in FIG. 3e include an authentication payload (auth payload) field, a key material payload field, a padding field, and a padding length field.

The auth payload field carries the identity authentication information 1 in S101. The auth payload field includes "TLV header|auth data", where "|" indicates that byte streams of the two fields are sequentially connected. For example, if a value of the TLV header is OX55 and a value of the auth data is OXAA, a value of the auth payload field is OX55AA. For the TLV header, refer to the foregoing related descriptions, and details are not described herein again. The auth data field in the packet 3 indicates the communication apparatus 2 to perform identity authentication on the communication apparatus 1. In this embodiment of this application, the auth data value carried in the auth data field may be calculated based on the packet 1, the foregoing nonce 2, and the identifier of the communication apparatus 2. For example, the auth data value may be calculated by using the following formula (1):

$$\text{auth data}=\text{Prf}(\text{Key 1}, \{\text{Packet 1}|\text{Nonce 2}|\text{ID\_2}\}) \quad \text{formula (1)}$$

Prf may be the AES_CMAC_128 algorithm, the key 1 may be derived from the PSK indicated by the key ID in the packet 1, and the ID_2 is the identifier of the communication apparatus 2.

In an example, during initial identity authentication, the communication apparatus 1 and the communication apparatus 2 may derive respective authentication keys in the following manner:

{AIK|KDK|ACK|IAK}=KDF(PSK, "Initial authentication keys", SSID|Nonce 1|Nonce 2)

This manner means that iteration is continuously performed by using the KDF until a length of output bits meets requirements of all the keys. "{AIK|KDK|ACK|IAK}" indicates that the keys in the authentication key are obtained from an output result of the KDF in sequence. For example, the AIK, the KDK, the ACK, and the IAK each have 128 bits. The first 128 bits output from the KDF are used as the AIK, the following 128 bits are used as the KDK, and the rest can be deduced by analogy. The PSK is a PSK currently used by the communication apparatus 1 and the communication apparatus 2, and "Initial authentication keys" represents a character string "Initial authentication keys".

In another example, during initial identity authentication, the communication apparatus 1 and the communication apparatus 2 may derive respective authentication keys in the following manner: IntermediateValue1=AES-128(PSK, {0}128 bit);

AIK=AES-128(PSK, {1}128 bit ED IntermediateValue1);

KDK=AES-128(PSK, {2}128 bit ED IntermediateValue1)IntermediateValue2=AES-128(KDK, Nonce 2); and ACK=AES-128(KDK, {1}128 bit ED IntermediateValue2).

{x}128 bit indicates that a value is x and a length is an integer of 128 bits.

⊕ indicates that two values are calculated by bitwise exclusive OR.

AES-128 is an encryption algorithm, and a value of the IV field is fixed to 0.

The initial identity authentication above may be identity authentication performed after the communication apparatus 1 or the communication apparatus 2 is just powered on, or may be identity authentication performed after an EAP-PSK connection between the communication apparatus 1 and the communication apparatus 2 is broken and then reestablished.

The key material payload field carries the key material 1. In an example, the key material payload field may be a TLV field. For a structure of the TLV field, refer to FIG. 3b. Repeated descriptions are omitted herein. In an example, FIG. 3f is a schematic diagram of the key material payload field according to this embodiment of this application. The key material payload field may include a TLV header field, a key number (keynumbers, keynums) field, and a key material field.

For the TLV header field, refer to the foregoing related descriptions of the TLV header field. Details are not described herein again.

The keynums field indicates a number of key materials 1 carried in the encrypted payload field. As described above, the key material 1 may include one or more of the PSK key material 1, the data key material 1, and the authentication key material 1. For example, the keynums field may occupy one byte.

The key material field carries the key material 1. For a structure of the key material field, refer to FIG. 3g. As shown in FIG. 3g, the key material field includes a key type field, a key ID field, and several material data fields.

The key type field indicates a key type. The key type herein may be a PSK key, a data key, or an authentication key. For the PSK key, it should be noted that the PSK key may include two types: a PSK key of type 1 (PSK_normal for short below), where the PSK_normal may be for deriving all keys used in the identity authentication process that include a key for performing integrity verification on the packet 3, a key for encrypting the encrypted payload, and a key for calculating the auth data (namely, the foregoing key 1); and a PSK key of type 2 (PSK_auth for short below), only for deriving the key 1 for calculating the auth data. In other words, in this embodiment of this application, the PSK for deriving the key for calculating the auth data may be different from the PSK for deriving the key for performing integrity verification on the packet 3 and the key for encrypting the encrypted payload. For example, the key for performing integrity verification on the packet 3 and the key for encrypting the encrypted payload are derived from the PSK 1, and the key for calculating the auth data is derived from the PSK 2, where both the PSK 1 and a PSK 2 are PSKs stored in the communication apparatus 1 and the communication apparatus 2. In this case, the communication apparatus 1 or the communication apparatus 2 may suffer from a network attack only when both the two PSKs are cracked. This further improves network security. Certainly, the key for performing integrity verification on the packet 3, the key for encrypting the encrypted payload, and the key for calculating the auth data may be derived from a same PSK, for example, the PSK 1. This is not specifically limited in this embodiment of this application.

The material data field carries the key material 1. Usually, the key material 1 may be a nonce. For the key material field, one material data field is for deriving one type of key. For example, a key material field for the PSK may carry one nonce, or may carry two nonces. If one nonce is carried, a PSK_normal is derived by using the nonce. If two nonces are carried, a PSK_normal is derived by using the first nonce, and a PSK_auth is derived by using the second nonce. For another example, a key material field for the authentication key may carry four nonces, where the first nonce is for deriving an authentication integrity key, the second nonce is for deriving a key derivation key (KDK), the third nonce is for deriving an authentication cipher key, and the fourth nonce is for deriving an identity authentication key. In another example, a key material field for the authentication key may carry three nonces, where the first nonce is for deriving an authentication integrity key AIK, the second nonce is for deriving a key derivation key (KDK), and the third nonce is for deriving an authentication cipher key ACK. In this case, an identity authentication key is the authentication integrity key AIK. The KDK participates in the derivation of the authentication cipher key. For still another example, a key material field of the data key may carry two nonces, where the first nonce is for deriving a data integrity key, and the second nonce is for deriving a data cipher key.

The key ID field indicates an identifier of the key material 1 carried in the material data field. In an example, after a key is derived by using the key material 1 carried in the material data field, the key ID field may be used as an identifier of the derived key. It should be noted herein that, a group of authentication keys, for example, the key for performing integrity verification on the packet 3 and the key for encrypting the encrypted payload in the packet 3, correspond to a same key ID.

For FIG. 3f and FIG. 3g, it should be noted that when the packet 3 carries at least two types of key materials 1, a case shown in FIG. 3f and FIG. 3g in which the at least two types of key materials 1 are carried in one TLV field (namely, the key material payload field) and key type fields are for distinguishing key types is only a possible implementation. In another implementation, each key material 1 may be carried by using an independent TLV field. For example, the PSK key material 1 is carried in a PSK material payload, and the data key material 1 is carried in a data key material payload. This is not specifically limited in this embodiment of this application.

The padding field is a padding field, and is for enabling a length of an encrypted packet to meet a requirement of the AES_CBC_128 algorithm on a packet length. A value of the padding field may be determined by the communication apparatus 1. In an example, the value of the padding field may be all zeroes.

The padding length field carries a byte length of the padding field, and occupies one byte. A value of the padding length field may be determined based on an encryption algorithm for calculating the encrypted payload field. For example, if the encryption algorithm is the AES_CBC_128 encryption algorithm, the value carried in the padding length field ranges from 0 to 15. For another example, if the encryption algorithm is the AES_CBC_256 encryption algorithm, the value carried in the padding length field ranges from 0 to 31. The byte length n1 of the padding field may be calculated by using the following formula (2):

$$n1=(n\text{==BlockSize})?0:n \qquad \text{formula (2)}$$

The formula (2) is a formula expression used in a C language programming environment. A meaning of the formula 2 is as follows: (n==BlockSize) is for determining whether n is equal to BlockSize. If the values are equal, n1=0; if the values are not equal, n1=n.

n=BlockSize−(sizeof(auth payload)+sizeof(key material payload)+sizeof(padding length))% BlockSize.

sizeof is a function whose return value is a number of bytes of an input parameter. For example, a return value of sizeof(auth payload) is a number of bytes of the auth payload field.

BlockSize is a block size of the encryption algorithm for calculating the encrypted payload field. For example, a block size of the AES_CBC_128 encryption algorithm is 16 bytes, and therefore a value of BlockSize is 16. For another example, a block size of the AES_CBC_256 encryption algorithm is 32 bytes, and therefore a value of BlockSize is 32.

For the ICV field, the field carries an integrity check value of the packet 3. The ICV field may be calculated by using the following formula (3):

$$ICV=Prf(AIK,\text{message 3}) \qquad \text{formula (3)}$$

In the formula (3): Prf may be the AES_CMAC_128 algorithm; AIK is the authentication integrity key; and message 3 is a part of fields in the packet 3. In an example, message 3 includes the EAP header of the packet 3 to a byte previous to the ICV field, in other words, message 3 includes the EAP header of the packet 3 to a last byte of the encrypted payload field, and does not include the ICV field. That is:

message 3={EAP header|EAP type|flags|ext flags|session ID|keyID|encrypted payload}.

In an example, if the packet 3 includes the data key material 1, after sending the packet 3 to the communication apparatus 2, the communication apparatus 1 may derive the data integrity key and the data cipher key by using the data key material 1, and process a received data packet by using the data integrity key and the data cipher key. It should be noted herein that, because the communication apparatus 1 has not verified an identity of the communication apparatus 2, the communication apparatus 1 cannot use the derived integrity verification key and data cipher key to process a data packet to be sent to the communication apparatus 2.

S105: The communication apparatus 2 performs identity authentication on the communication apparatus 1 based on the packet 3.

S102: When the identity authentication of the communication apparatus 1 succeeds, the communication apparatus 2 obtains an updated key based on the key material 1 in the packet 3, where the updated key includes the PSK 2.

S106: The communication apparatus 2 stores the updated key.

After receiving the packet 3, the communication apparatus 2 may verify the packet 3, to determine whether the identity authentication of the communication apparatus 1 succeeds.

During specific implementation in which the communication apparatus 2 verifies the packet 3, the communication apparatus 2 may verify the values of the fields in the packet 3.

For verification of the EAP header field, refer to the related descriptions in RFC 3748, and details are not described herein.

For the flags field, the P indicator bit needs to be 1 because the packet 3 is a packet in the authentication phase and includes an encrypted field, in other words, includes the encrypted payload field. The R indicator bit needs to be o because the packet 3 is the request packet. The value of the CS indicator bit should be the same as that of the CS indicator bit in the packet 2. When a version of the current EAP-PSK protocol is 1, the value of the version field needs to be 1. In an example, if the value of the version field is not 1, the communication apparatus 2 may directly determine, without verifying another field, that the identity authentication fails, and terminate the identity authentication process. In this case, the communication apparatus 2 may send, to the communication apparatus 1, a response packet indicating that the identity authentication is terminated. For example, the response packet may include one piece of indication information, and the indication information indicates that a reason for terminating the identity authentication is that the version number of the EAP-PSK protocol does not match.

The value of the K indicator bit may be 1, or may be o. If the value of the K indicator bit is 0, it indicates that the packet 3 does not include the key ID field. Therefore, the key ID field does not need to be verified subsequently. If the value of the K indicator bit is 1, it indicates that the packet 3 includes the key ID field. Therefore, the communication apparatus 2 further needs to verify the key ID field. When the packet 3 includes the key ID field, it indicates that the communication apparatus 1 and the communication apparatus 2 have updated the authentication key during the previous identity authentication. When verifying the key ID field, the communication apparatus 2 needs to verify whether the key ID field matches a key ID of an available authentication key that is locally stored.

For the ext flags field, because the packet 3 is an authentication packet sent by the communication apparatus 1 to the communication apparatus 2, the value of the exch type field needs to be 2 when the value 2 identifies the identity authentication phase.

For the session ID field, the value of the SSID field in the session ID field is the same as the value of the SSID field in the packet 1. If the packet 3 includes the CSID field, the value of the CSID field is the same as the value of the CSID field in the packet 2.

In this embodiment of this application, the communication apparatus 2 may first verify the ICV field in the packet 3, to verify integrity of the packet 3. When integrity verification of the packet 3 succeeds, the encrypted payload field in the packet 3 is verified. This is because only successful integrity verification of the packet 3 indicates that the packet 3 is not tampered with in a transmission process, and therefore indicates a high possibility that the content in the encrypted payload field is trusted.

When verifying the ICV field in the packet 3, the communication apparatus 2 may perform ICV calculation on a field other than the ICV field in the packet 3, and compare a value obtained through calculation with the value of the ICV field carried in the packet 3. If the two values are the same, the communication apparatus 2 determines that the integrity verification of the packet 3 succeeds; otherwise, the communication apparatus 2 determines that the integrity verification of the packet 3 fails. An algorithm and a key used by the communication apparatus 2 to calculate the ICV field are the same as those used by the communication apparatus 1 to calculate the ICV field in the packet 3.

In an example, if the communication apparatus 2 determines that the integrity verification of the packet 3 fails, the communication apparatus 2 may ignore the packet, and continue to wait for a valid authentication packet from the communication apparatus 1.

After determining that the integrity verification of the packet 3 succeeds, the communication apparatus 2 may continue to verify the encrypted payload field. When verifying the encrypted payload field, the communication apparatus 2 may first decrypt the encrypted payload field to obtain the auth payload field and the key material payload field. It should be noted herein that an algorithm and a key used by the communication apparatus 2 to decrypt the encrypted payload field match an encryption algorithm and a key used by the communication apparatus 1 to calculate the encrypted payload field.

After obtaining the auth payload field and the key material payload field through decryption, the communication apparatus 2 may separately process the auth payload field and the key material payload field. A manner of processing the auth payload field is: verifying the auth payload field, to verify an identity of the communication apparatus 1. A manner of processing the key material payload field may be determined based on a result of verifying the auth payload field. In an example, if the auth payload field is successfully verified, the communication apparatus 2 may obtain the updated key based on the key material 1 in the packet 3. For example, the communication apparatus 2 may obtain the updated key based on the key material 1 in the packet 3 and a key derivation algorithm 1. For another example, the communication apparatus 2 may directly determine the key material 1 as the updated key. If the auth payload field fails to be verified, it indicates that the packet 3 is tampered with, or a sending party of the packet 3 is untrusted. In this case, the communication apparatus 2 may ignore the key material payload field, and skip performing the steps such as obtaining the updated key based on the key material 1 and subsequently storing the updated key.

For the auth payload field, the communication apparatus 2 may first verify the TLV header of the auth payload field, and may further verify the auth data field of the auth payload field after the TLV header of the auth payload field is successfully verified. When the auth data field of the auth payload is verified, auth data may be calculated by using the foregoing formula (1), and the calculated auth data is compared with the auth data in the auth payload field. If the calculated auth data is the same as the auth data in the auth payload field, it is determined that the auth payload field is successfully verified; otherwise, it is determined that the auth payload field fails to be verified. It should be noted herein that, when the communication apparatus 1 calculates the auth data by using the formula (1), the packet 1 in the formula (1) is sent by the communication apparatus 1 to the communication apparatus 2, and the nonce 2 and the ID_2 are carried in the packet 2 received by the communication apparatus 1. When the communication apparatus 2 calculates the auth data by using the formula (1), the packet 1 in the formula (1) is received by the communication apparatus 2, and the nonce 2 and the ID_2 are generated by the communication apparatus 2. Verifying the TLV header may be, for example, verifying whether the TLV type of the TLV header is the auth payload or whether the value of the TLV length field of the TLV header is correct.

It may be understood that, because the packet 1 participates in the calculation of the auth data, validity of the packet 1 is further verified as the auth data is successfully verified, thereby avoiding a potential security risk caused because the packet 1 is transmitted in plaintext.

In an example, if the auth payload field fails to be verified, the communication apparatus 2 may determine that the identity authentication fails, and terminate the identity authentication process. In this case, the communication apparatus 2 may send, to the communication apparatus 1, a response packet indicating that the identity authentication is terminated. For example, the response packet may include one piece of indication information, and the indication information indicates that a reason for terminating the identity authentication is an identity authentication failure.

For the key material payload field, when the auth payload field is successfully verified, it indicates that the identity authentication of the communication apparatus 1 succeeds. In this case, the communication apparatus 2 may extract the key material 1 carried in the key material payload field, and perform key derivation by using the key material 1 and the key derivation algorithm.

In an example, if the packet 3 carries the PSK key material 1, the communication apparatus 2 may derive the updated PSK 2 based on the PSK key material 1 and the key derivation algorithm 1. In an example, the updated PSK 2 may be derived by using the following formula (4) or formula (5):

$$PSK2=KDF(AES(PSK1,MSK[0\text{-}63]),\text{``PSK''},PSK \text{ key material } 1) \quad \text{formula (4)}$$

$$PSK2=KDF(PSK1,\text{``PSK''},PSK \text{ key material } 1|MSK[0\text{-}63]) \quad \text{formula (5)}$$

In the formula (4) and the formula (5): KDF is the key derivation algorithm 1, where for the KDF, refer to descriptions in "6.2.1 Key derivation function (KDF)" in IEEE 802.1x-2010, and details are not described herein again; AES refers to the advanced encryption standard (AES); PSK1 is a PSK currently used by the communication apparatus 1 and the communication apparatus 2 to perform identity authentication, and for example, may be the PSK indicated by the key ID field in the packet 1; MSK[0-63] is the zeroth bit to the $63^{rd}$ bit of a master session key (MSK); and "PSK" is a character string.

In another example, the updated PSK 2 may alternatively be calculated by using the following formula (6):

$$PSK2=KDF(PSK1,\text{``PSK''},MSK[0\text{-}63]) \quad \text{formula (6)}$$

In this case, MSK[0-63] may be used as the PSK key material 1.

In still another example, when both the communication apparatus 1 and the communication apparatus 2 support an asymmetric key algorithm, the communication apparatus 2 may generate the updated PSK 2 based on the PSK key material 1 sent by the communication apparatus 1 and a locally stored PSK key material 2. Correspondingly, in this case, the communication apparatus 2 may further send a PSK key material 3 to the communication apparatus 1, so that the communication apparatus 1 generates the updated PSK 2 based on the PSK key material 3 and a local PSK key material 4 of the communication apparatus 1.

After deriving the updated PSK 2, the communication apparatus 2 may store the updated PSK 2 in a non-volatile memory area of the communication apparatus 2, for example, in a hardware security module (HSM) or a trusted execution environment (TEE) of the communication apparatus 2. In some embodiments, the updated PSK 2 may be derived in a memory, and the updated PSK 2 cached in the memory may be deleted after the updated PSK 2 is stored in the non-volatile memory area. In some embodiments, the updated PSK 2 may be derived in a trusted application (TA) of the TEE. In this embodiment of this application, if the updated PSK 2 is obtained by using the PSK key material 1, and is successfully stored in the non-volatile memory area of the communication apparatus 2, it may be considered that the communication apparatus 2 successfully processes a PSK key material. If either of the step of obtaining the updated PSK 2 by using the PSK key material 1 and the step of storing the updated PSK 2 in the non-volatile memory area fails, it indicates that the communication apparatus 2 fails to process the PSK key material 1. In addition, when storing the updated PSK 2, the communication apparatus 2 further needs to correspondingly store a key ID of the updated PSK 2. The key ID may be stored in a non-volatile memory area, or may be stored in another memory. For example, the communication apparatus 2 corresponds to the MCU 102 shown in FIG. 1, and the MCU 102 may derive the updated PSK 2 in the memory, then store the updated PSK 2 in an unreadable memory area of the HSM, and store the key ID of the updated PSK 2 in a flash memory.

In an example, if the packet 3 carries the authentication key material 1, the communication apparatus 2 may derive the updated authentication key based on the authentication key material 1 and a key derivation algorithm 2.

In an example, the authentication key material 1 may include four nonces: a nonce 1', a nonce 2', a nonce 3', and a nonce 4', which are respectively for deriving four types of keys in the authentication key. For a derivation manner, refer to the following formula (7-1):

$$\{AIK|KDK|ACK|IAK\}=KDF(KDK_{old},\text{``New authentication keys''},MSK[0\text{-}63]|Nonce\ 1'|Nonce\ 2'|Nonce\ 3'|Nonce\ 4') \quad \text{formula (7-1)}$$

Using the formula (7-1) means that iteration is continuously performed by using the KDF until a length of output bits meets requirements of all the keys.

In the formula (7-1), KDKom represents a KDK not updated; MSK[0-63] represents the zeroth bit to the $63^{rd}$ bit of the MSK; and $\{AIK|KDK|ACK|IAK\}$ indicates that the AIK, the KDK, the ACK, and the IAK are obtained from an output result of the KDF in sequence. For example, the AIK, the KDK, the ACK, and the IAK each have 128 bits. The first 128 bits in the output result of the KDF may be determined as the AIK, 128 bits following the AIK may be determined as the KDK, 128 bits following the KDK may be determined as the ACK, and 128 bits following the ACK may be determined as the IAK.

In another example, the AIK may be derived by using the following formula (7-2), the KDK may be derived by using the following formula (7-3), the ACK may be derived by using the following formula (7-4), and the IAK may be derived by using the following formula (7-5):

$$AIK=KDF(KDK_{old},\text{``AIK''},MSK[0\text{-}15]|Nonce\ 1') \quad \text{formula (7-2)}$$

$$KDK=KDF(KDK_{old},\text{``KDK''},MSK[16\text{-}31]|Nonce\ 2') \quad \text{formula (7-3)}$$

ACK=KDF(KDK$_{old}$,"ACK",MSK[32-47]|Nonce 3')    formula (7-4)

IAK=KDF(KDK$_{old}$,"IAK",MSK[48-63]|Nonce 4')    formula (7-5)

In the formulas (7-2), (7-3), (7-4), and (7-5): KDKom represents a KDK not updated, or may represent a KDK in a currently used authentication key; "AIK" represents a character string AIK; MSK[0-15] represents the zeroth bit to the 15$^{th}$ bit of the MSK; "KDK" represents a character string KDK; MSK[16-31] represents the 16$^{th}$ bit to the 31$^{st}$ bit of the MSK; "ACK" represents a character string ACK; MSK [32-47] represents the 32$^{nd}$ bit to the 47$^{th}$ bit of the MSK; and MSK[48-63] represents the 48$^{th}$ bit to the 63$^{rd}$ bit of the MSK, where MSK[0-15]=AES-128(KDK, $\{2\}_{128\ bit}$ ⊕ IntermediateValue2); MSK[16-31]=AES-128(KDK, $\{3\}_{128\ bit}$ ⊕ IntermediateValue2); MSK[32-47]=AES-128 (KDK, $\{4\}_{128\ bit}$ ⊕ IntermediateValue2); MSK[48-63]=AES-128(KDK, $\{5\}_{128\ bit}$ ⊕ IntermediateValue2); EMSK[0-15]=AES-128(KDK, $\{6\}_{128\ bit}$ ⊕ IntermediateValue2); EMSK[16-31]=AES-128(KDK, $\{7\}_{128\ bit}$ ⊕ IntermediateValue2); EMSK[32-47]=AES-128 (KDK, $\{8\}_{128\ bit}$ ⊕ IntermediateValue2); EMSK [48-63]=AES-128(KDK, $\{9\}_{128\ bit}$ ⊕ IntermediateValue2)

For IntermediateValue2, refer to the foregoing descriptions of IntermediateValue2. Details are not described herein again.

In another example, the authentication key material 1 may include three nonces: a nonce 1', a nonce 2', and a nonce 3', which are respectively for deriving three types of keys in the authentication key. For a derivation manner, refer to the following formula (8-1), formula (8-2), and formula (8-3):

AIK=KDF(KDK$_{old}$,"AIK",MSK[0-15]|Nonce 1')    formula (8-1)

KDK=KDF(KDK$_{old}$,"KDK",MSK[16-31]|Nonce 2')    formula (8-2)

ACK=KDF(KDK$_{old}$,"ACK",MSK[32-47]|Nonce 3')    formula (8-3)

In the formulas (8-1), (8-2), and (8-3): KDKom represents a KDK not updated, or may represent a KDK in a currently used authentication key; "AIK" represents a character string AIK; MSK[0-15] represents the zeroth bit to the 15$^{th}$ bit of the MSK; "KDK" represents a character string KDK; MSK [16-31] represents the 16$^{th}$ bit to the 31$^{st}$ bit of the MSK; "ACK" represents a character string ACK; and MSK[32-47] is the 32$^{nd}$ bit to the 47$^{th}$ bit of the MSK. In this manner, the identity authentication key IAK is the same as the authentication integrity key AIK.

In still another example, the authentication key material 1 may include three nonces: a nonce 1', a nonce 2', and a nonce 3', which are respectively for deriving three types of keys in the authentication key. The authentication key may be derived by using the following formula (9):

{AIK|KDK|ACK}=KDF(KDK$_{old}$,"New authentication keys",MSK[0-63]|Nonce 1'|Nonce 2'|Nonce 3')    formula (9)

In the formula (9): KDK$_{old}$ represents a KDK not updated, or may represent a KDK in a currently used authentication key; "New authentication keys" represents a character string New authentication keys; MSK[0-15] represents the zeroth bit to the 63$^{rd}$ bit of the MSK; and the identity authentication key IAK is the same as the authentication integrity key AIK.

In an example, when the communication apparatus 1 and the communication apparatus 2 communicate with each other through a non-Ethernet port, and both use the asymmetric key algorithm, the communication apparatus 2 may generate the updated authentication key based on the authentication key material 1 sent by the communication apparatus 1 and a locally stored authentication key material 2. Correspondingly, in this case, the communication apparatus 2 may further send an authentication key material 3 to the communication apparatus 1, so that the communication apparatus 1 generates the updated authentication key based on the authentication key material 3 and a local authentication key material 4 of the communication apparatus 1.

After deriving the updated authentication key, the communication apparatus 2 may store the updated authentication key. The authentication key may be stored in a non-volatile memory area, or may be stored in another memory. This is not specifically limited in this embodiment of this application.

In an example, if the packet 3 carries the data key material, the communication apparatus 2 may derive the updated data key based on the data key material and a key derivation algorithm 3. In an example, the communication apparatus 2 may derive the updated data key based on the data key material 1 and the key derivation algorithm 3. In an example, the updated data key may be derived by using the following formula (10) or formula (11):

DIK=KDF(MSK[0-16],"DIK",DIK key material 1)    formula (10)

DCK=KDF(MSK[16-31],"DCK",DCK key material 1)    formula (11)

In the formula (10) and the formula (11): the data key material 1 includes the DIK key material 1 and the DCK key material 1; DIK is an updated data integrity key; KDF is the key derivation algorithm 3; and DCK is an updated data cipher key.

In another example, when the communication apparatus 1 and the communication apparatus 2 communicate with each other through a non-Ethernet port, and both use the asymmetric key algorithm, the communication apparatus 2 may generate the updated data key based on the data key material 1 sent by the communication apparatus 1 and a locally stored data key material 2. Correspondingly, in this case, the communication apparatus 2 may further send a data key material 3 to the communication apparatus 1, so that the communication apparatus 1 generates the updated data key based on the data key material 3 and a local data key material 4 of the communication apparatus 1.

After deriving the updated data key, the communication apparatus 2 may store the updated data key. The data key may be stored in a non-volatile memory area, or may be stored in another memory. This is not specifically limited in this embodiment of this application.

S107: The communication apparatus 2 sends a packet 4 to the communication apparatus 1, where the packet 4 includes identity authentication information 2.

After determining, based on the identity authentication information 1 in the packet 3, that the identity authentication of the communication apparatus 1 succeeds, the communication apparatus 2 may generate the packet 4, and send the packet 4 to the communication apparatus 1. The packet 4 includes the identity authentication information 2. The identity authentication information 2 is for performing identity authentication on the communication apparatus 2. In an example, the packet 4 may further include key material confirmed information. The key material confirmed information indicates a result of processing the key material 1 in the packet 3 by the communication apparatus 2. Certainly, in an example, if the communication apparatus 2 successfully processes all the key materials 1 carried in the packet 3, the packet 4 may not carry key material 1 confirmed information. After the communication apparatus 1 receives the packet 4, if the packet 4 does not carry the key material 1 confirmed information, the communication apparatus 1 considers by default that the communication apparatus 2 successfully processes all the key materials 1 carried in the packet 3, in other words, the communication apparatus 2 has updated the keys based on the key material 1.

In this embodiment of this application, the packet 4 may also be an EAP-PSK packet, and a structure of the packet 4 is the same as that of the packet 3. For understanding, refer to FIG. 3c. Fields in the packet 4 are described as follows:

For meanings of fields in an EAP header, refer to the related descriptions in the request for comments (RFC) 3748, and details are not described herein.

A value of an EAP type field is 47.

For a flags field, a value of a P indicator bit is 1. The packet 4 is the fourth packet in the identity authentication process, and includes the identity authentication information 2 that can be for verifying the identity of the communication apparatus 2 and the key material confirmed information. To avoid disclosure of the foregoing information in the packet 4, the packet 4 is sent in ciphertext. A value of an R indicator bit is 1, indicating that the packet 4 is a response packet. A value of a version indicator bit may be 1. A value of a CS indicator bit is the same as the value of the CS indicator bit in the packet 2. A K indicator bit indicates whether a key ID field is included. It should be noted herein that a meaning of the key ID field in the packet 4 is the same as the meaning of the key ID field in the packet 3. For details, refer to the descriptions of the key ID field in S101. The details are not described herein again.

For an exch type field, in the packet 4, a value of the exch type field may be 2, indicating the identity authentication phase.

For a session ID field, a value of an SSID field in the session ID field is the same as the value of the SSID field in the packet 1. If the session ID field includes a CSID field, a value of the CSID field is the same as the value of the CSID in the packet 2.

For an encrypted payload field, the field carries encrypted data. In an example, the encrypted payload field may be a TLV field. For a structure of the TLV field, refer to FIG. 3b. Repeated descriptions are omitted herein. In an example, the encrypted payload field may include a TLV header field and an encrypted data field. The encrypted data field carries the encrypted data. In an implementation of this embodiment of this application, a value of the encrypted data field in the packet 4 may be obtained through encryption by using the AES_CBC_128 encryption algorithm. In this case, the encrypted payload field may further include an initialization vector (IV) field in addition to the TLV header field and the encrypted data field, where the IV field carries an initialization vector value needed for performing encryption by using the AES_CBC_128 encryption algorithm. In this case, for the encrypted payload field, refer to FIG. 3d. In this embodiment of this application, the value of the encrypted data field may be obtained by encrypting fields shown in FIG. 3h by using an encryption algorithm. The fields shown in FIG. 3h include an authentication payload field, a key material confirmed (key confirmed payload) field, a padding field, and a padding length field.

The auth payload field carries the identity authentication information 2 in S107. The auth payload field includes "TLV header|auth data". For the TLV header, refer to the foregoing related descriptions, and details are not described herein again. The auth data field indicates the communication apparatus 1 to perform identity authentication on the communication apparatus 2. In this embodiment of this application, an auth data value carried in the auth data field in the packet 4 may be calculated based on the packet 2, the foregoing nonce 1, and the identifier of the communication apparatus 1. For example, the auth data value may be calculated by using the following formula (12):

$$\text{auth data} = \text{Prf}(\text{Key 2}, \{\text{Packet 2}|\text{Nonce 1}|\text{ID\_1}\}) \quad \text{formula (12)}$$

Prf may be the AES_CMAC_128 algorithm, and the key 2 may be derived from the PSK indicated by the key ID in the packet 1. The key 2 herein may be the same as or different from the key 1 in the formula (1). This is not specifically limited in this embodiment of this application. The ID_1 is the identifier of the communication apparatus 2.

In this embodiment of this application, a calculation manner of the auth data field in the packet 3 is different from that of the auth data field in the packet 4. In this manner, a replay attack and a brute-force cracking attack can be prevented to some extent.

The key confirmed payload field carries the key material confirmed information. In an example, the key confirmed payload field may be a TLV field. For a structure of the TLV field, refer to FIG. 3b. Repeated descriptions are omitted herein. In an example, FIG. 3i is a schematic diagram of the key confirmed payload field according to this embodiment of this application. The key confirmed payload field may include a TLV header field, a key number (keynumbers, keynums) field, and a key confirmed field.

For the TLV header field, refer to the foregoing related descriptions of the TLV header field. Details are not described herein again.

The keynums field indicates a number of pieces of key confirmed information carried in the key confirmed payload field. For example, the keynums field may occupy one byte. The key confirmed field carries the key confirmed information. In an example, a value of the keynums field in the packet 4 may be the same as the value of the keynums field in the packet 3. To be specific, if the packet 3 carries m groups of key materials 1, the packet 4 may correspondingly carry m groups of key confirmed information, where one group of key materials 1 corresponds to one piece of key confirmed information. For example, if the packet 3 carries the PSK key material 1, the packet 4 carries confirmed information corresponding to the PSK key material 1. For another example, if the packet 3 carries the PSK key material 1 and the authentication key material 1, the packet 4 carries confirmed information corresponding to the PSK key material 1 and confirmed information corresponding to the authentication key material 1. For still another example, if the packet 3 carries the PSK key material 1, the authentication key material 1, and the data key material 1, the packet 4 carries confirmed information corresponding to the PSK key material 1, confirmed information corresponding to the authentication key material 1, and confirmed information corresponding to the data key material 1.

In another example, for a key material 1 that is not successfully processed by the communication apparatus 2, the packet 4 may not carry confirmed information corresponding to the key material 1. For example, if the packet 3 carries the PSK key material 1, the authentication key material 1, and the data key material 1, and the communication apparatus 2 successfully processes the authentication key material 1 and the data key material 1, but fails to process the PSK key material 1, the packet 4 may carry confirmed information corresponding to the authentication key material 1 and confirmed information corresponding to the data key material 1, but not carry confirmed information corresponding to the PSK key material 1. In this case, the value of the keynums field in the packet 4 may be less than the value of the keynums field in the packet 3. For a structure of the key confirmed field in this case, refer to FIG. 3*j*. As shown in FIG. 3*j*, the key confirmed field includes a key type field, a key ID field, and a check value field (namely, a MAC_K field in FIG. 3*j*).

For the key type field and the key ID field, refer to the foregoing descriptions in FIG. 3*g*. Repeated descriptions are omitted herein.

The MAC_K field is for performing integrity verification on the key material 1. Using a MAC_K field corresponding to the PSK key material 1 as an example for description, a value of the MAC_K field corresponding to the PSK key material 1 may be implemented by using the following formula (13) or (14):

$$MAC\_K(PSK)=Prf(Key\ 3, key\ type|keyID|PSK\ key\ material\ 1) \quad \text{formula (13)}$$

$$MAC\_K(PSK)=Prf(Key\ 3, key\ type|keyID|Updated\ PSK2) \quad \text{formula (14)}$$

In the formula (13) and the formula (14): the key 3 may be derived from the PSK indicated by the key ID in the packet 1, where the key 3, the key 1 in the formula (1), and the key 2 in the formula (12) may be the same or different, and this is not specifically limited in this embodiment of this application; key type is a PSK; keyID is the key ID of the updated PSK 2; and the PSK key material 1 is the PSK key material 1 carried in the packet 3 received by the communication apparatus 2.

For the padding field and the padding length field, refer to the related descriptions in S101. Details are not described herein again.

For the ICV field, the field carries an integrity check code of the packet 4. The ICV field may be calculated by using the following formula (15):

$$ICV=Prf(AIK, message\ 4) \quad \text{formula (15)}$$

In the formula (15): Prf may be the AES_CMAC_128 algorithm; message 4 is a part of fields in the packet 4. In an example, message 4 includes the EAP header of the packet 4 to a byte previous to the ICV field, in other words, message 4 includes the EAP header of the packet 4 to a last byte of the encrypted payload field, and does not include the ICV field. That is:

message 4={EAP header51 EAP type|flags|ext flags|session ID|keyID encrypted payload}.

S108: The communication apparatus 1 verifies the received packet 4.

After receiving the packet 4, the communication apparatus 1 may verify the packet 4. Whether the identity authentication of the communication apparatus 2 succeeds may be determined by using the packet 4, and a result of processing, by the communication apparatus 2, the key material 1 carried in the packet 3 may be determined by using the packet 4.

During specific implementation in which the communication apparatus 1 verifies the packet 4, the communication apparatus 1 may verify the values of the fields in the packet 4.

For verification of the EAP header field, refer to the related descriptions in RFC 3748, and details are not described herein.

For the flags field, the P indicator bit needs to be 1 because the packet 4 is a packet in the authentication phase and includes an encrypted field, in other words, includes the encrypted payload field. The R indicator bit needs to be 1 because the packet 4 is a response packet. The value of the CS indicator bit should be the same as that of the CS indicator bit in the packet 2. When the version of the current EAP-PSK protocol is 1, the value of the version field needs to be 1. In an example, if the value of the version field is not 1, the communication apparatus 1 may directly determine, without verifying another field, that the identity authentication fails, and terminate the identity authentication process. In this case, the communication apparatus 1 may send, to the communication apparatus 2, a response packet indicating that the identity authentication fails. For example, the response packet may include one piece of indication information, and the indication information indicates that a reason for terminating the identity authentication is that a version number of the EAP-PSK protocol does not match.

The value of the K indicator bit may be 1, or may be 0. If the value of the K indicator bit is 0, it indicates that the packet 4 does not include the key ID field. Therefore, the key ID field does not need to be verified subsequently. If the value of the K indicator bit is 1, it indicates that the packet 4 includes the key ID field. Therefore, the communication apparatus 1 further needs to verify the key ID field. When the packet 4 includes the key ID field, it indicates that the communication apparatus 1 and the communication apparatus 2 have updated the authentication key during the previous identity authentication. When verifying the key ID field, the communication apparatus 1 needs to verify whether the key ID field matches a key ID of an available authentication key that is locally stored.

For the ext flags field, because the packet 4 is an authentication packet sent by the communication apparatus 2 to the communication apparatus 1, the value of the exch type field needs to be 2 when the value 2 identifies the identity authentication phase.

For the session ID field, the value of the SSID field in the session ID field is the same as the value of the SSID field in the packet 1. If the packet 4 includes the CSID field, the value of the CSID field is the same as the value of the CSID field in the packet 2.

In this embodiment of this application, the communication apparatus 1 may first verify the ICV field in the packet 4, to verify integrity of the packet 4. When integrity verification of the packet 4 succeeds, the encrypted payload field in the packet 4 is verified. This is because only successful integrity verification of the packet 4 indicates that the packet 4 is not tampered with in a transmission process, and therefore indicates a high possibility that the content in the encrypted payload field is trusted.

When verifying the ICV field in the packet 4, the communication apparatus 1 may perform ICV calculation on a field other than the ICV field in the packet 4, and compare a value obtained through calculation with the value of the ICV field carried in the packet 4. If the two values are the same, the communication apparatus 1 determines that the integrity verification of the packet 4 succeeds; otherwise, the communication apparatus 1 determines that the integrity verification of the packet 4 fails. An algorithm and a key used by the communication apparatus 1 to calculate the ICV field in the packet 4 are the same as those used by the communication apparatus 2 to calculate the ICV field in the packet 4. If the communication apparatus 1 includes a plurality of keys, the communication apparatus 1 may determine, for example, a corresponding key based on the SSID in the packet 4, and perform ICV calculation on a field other than the ICV field in the packet 4 by using the key.

In an example, if the communication apparatus 1 determines that the integrity verification of the packet 4 fails, the communication apparatus 1 may ignore the packet, and continue to wait for a valid authentication packet from the communication apparatus 2.

After determining that the integrity verification of the packet 4 succeeds, the communication apparatus 1 may continue to verify the encrypted payload field. When verifying the encrypted payload field, the communication apparatus 1 may first decrypt the encrypted payload field to obtain the auth payload field and the key confirmed payload field. It should be noted herein that an algorithm and a key used by the communication apparatus 1 to decrypt the encrypted payload field match an encryption algorithm and a key used by the communication apparatus 2 to calculate the encrypted payload field.

After obtaining the auth payload field and the key confirmed payload field through decryption, the communication apparatus 1 may separately process the auth payload field and the key confirmed payload field. A manner of processing the auth payload field is: verifying the auth payload, to verify the identity of the communication apparatus 2. A manner of processing the key confirmed payload may be determined based on a result of verifying the auth payload. In an example, if the auth payload is successfully verified, the communication apparatus 1 may further verify integrity of the key confirmed payload.

For the auth payload field, the communication apparatus 1 may first verify the TLV header of the auth payload, and may further verify the auth data field of the auth payload after the TLV header of the auth payload is successfully verified. When the auth data field of the auth payload is verified, auth data may be calculated by using the foregoing formula (12), and the calculated auth data is compared with the auth data in the auth payload field in the packet 4. If the calculated auth data is the same as the auth data in the auth payload field, it is determined that the auth payload field is successfully verified; otherwise, it is determined that the auth payload field fails to be verified. It should be noted herein that, when the communication apparatus 2 calculates the auth data by using the formula (12), the packet 2 in the formula (12) is sent by the communication apparatus 2 to the communication apparatus 1, and the nonce 1 and the ID_1 are carried in the packet 1 received by the communication apparatus 2. When the communication apparatus 1 calculates the auth data by using the formula (12), the packet 2 in the formula (12) is received by the communication apparatus 1, and the nonce 1 and the ID_1 are generated by the communication apparatus 1. Verifying the TLV header may be, for example, verifying whether the TLV type of the TLV header is the auth payload or whether the value of the TLV length field of the TLV header is correct.

It may be understood that, because the packet 2 participates in the calculation of the auth data, validity of the packet 2 is further verified as the auth data is successfully verified, thereby avoiding a potential security risk caused because the packet 2 is transmitted in plaintext.

In an example, if the auth payload field fails to be verified, the communication apparatus 1 may determine that the identity authentication fails, and terminate the identity authentication process. In this case, the communication apparatus 1 may send, to the communication apparatus 2, a response packet indicating that the identity authentication fails. For example, the response packet may include one piece of indication information, and the indication information indicates that the identity authentication fails.

In an example, if the auth payload field is successfully verified, the communication apparatus 1 may continue to verify the key confirmed payload field. When the key confirmed payload field is verified, each key confirmed field in the key confirmed payload field may be verified. Using a key confirmed field corresponding to a PSK (a PSK key confirmed field for short below) as an example, the communication apparatus 1 may calculate a value of a MAC_K field in the PSK key confirmed field in a manner in which the communication apparatus 2 calculates the MAC_K field. For example, the communication apparatus 1 may perform calculation on the PSK key confirmed field by using the foregoing formula (13) and formula (14). After calculating a corresponding value, the communication apparatus 1 may compare the calculated value with the value of the MAC_K field in the PSK key confirmed field in the packet 4. If the two values are the same, the PSK key confirmed field is successfully verified; otherwise, the PSK key confirmed field fails to be verified.

It should be noted herein that if the communication apparatus 1 performs calculation by using the foregoing formula (14), the communication apparatus 1 needs to obtain the updated PSK 2 by using the PSK key material 1 carried in the packet 3. Similarly, when the communication apparatus 1 verifies a key confirmed field corresponding to the authentication key, if the communication apparatus 1 performs calculation by using the foregoing formula (14), the communication apparatus 1 needs to obtain the updated authentication key by using the authentication key material 1 carried in the packet 3. When the communication apparatus 1 verifies a key confirmed field corresponding to the data key, if the communication apparatus 1 performs calculation by using the foregoing formula (14), the communication apparatus 1 needs to obtain the updated data key by using the data key material 1 carried in the packet 3.

S109: The communication apparatus 1 obtains the updated key based on the key material 1, and stores the obtained updated key.

In this embodiment of this application, S109 may be performed after S101 and before S108, or may be performed after S108. This is not specifically limited in this embodiment of this application.

If S109 is performed between S101 and S108, the communication apparatus 1 may perform corresponding processing with reference to a result of verifying the key confirmed payload field in S108. The following describes several possible cases.

In an example, the packet 4 has key material 1 confirmed information corresponding to all the key materials 1 included in the packet 3, and the communication apparatus 1 determines that all the key material 1 confirmed information in the packet 4 is successfully verified. In this case, the communication apparatus 1 may immediately perform the following S110 and S111, to notify the communication apparatus 2 that the identity authentication and the key update succeed. If the packet 3 includes the data key material 1, the communication apparatus 2 may communicate with the communication apparatus 1 by using the data key derived from the data key material 1.

In another example, a number of pieces of key material 1 confirmed information in the packet 4 is less than the number of key materials 1 in the packet 3. In other words, the value of the keynumbers field in the packet 4 is smaller than the value of the keynumbers field in the packet 3. To be specific, the communication apparatus 2 completes updates of a part of keys. Correspondingly, when verifying the key confirmed payload field, the communication apparatus 1 determines that a part or all of the key confirmed fields are successfully verified. In this case, the communication apparatus 1 may retain an updated key corresponding to the successfully verified key confirmed field, and delete a key, other than the updated key corresponding to the successfully verified key confirmed field, stored in S109.

For example, the packet 3 includes the PSK key material 1, the authentication key material 1, and the data key material 1, and the communication apparatus 1 performs S109, to store the updated PSK 2, the updated authentication key, and the updated data key. The packet 4 includes the PSK key material 1 confirmed information and the authentication key material 1 confirmed information. If the communication apparatus 1 determines that both the PSK key material 1 confirmed information and the authentication key material 1 confirmed information are successfully verified, the communication apparatus 1 may delete the stored updated data key because the communication apparatus 2 fails to update the data key.

For example, the packet 3 includes the PSK key material 1, the authentication key material 1, and the data key material 1, and the communication apparatus 1 performs S109, to store the updated PSK 2, the updated authentication key, and the updated data key. The packet 4 includes the PSK key material 1 confirmed information and the authentication key material 1 confirmed information. If the communication apparatus 1 determines that the PSK key material 1 confirmed information is successfully verified, the communication apparatus 1 may delete the stored updated data key and updated authentication key because the communication apparatus 2 fails to update the data key, and the communication apparatus 1 determines that the authentication key material confirmed information in the packet 4 fails to be verified.

If S109 is performed after S108, during specific implementation of S109, the communication apparatus 1 may obtain a related updated key with reference to a result of verifying the key confirmed payload field in S108, and store the related updated key. The following describes several possible cases.

In an example, the packet 4 has key material 1 confirmed information corresponding to all the key materials 1 included in the packet 3, and the communication apparatus 1 determines that all the key material 1 confirmed information in the packet 4 is successfully verified. In this case, the communication apparatus 1 may obtain the corresponding updated keys based on all the key materials 1 in the packet 3, and store the updated keys. It should be noted herein that, after obtaining the updated PSK 2 based on the PSK key material 1, the communication apparatus 1 needs to store the updated PSK 2 in a non-volatile memory area of the communication apparatus 1. If either of the step in which the communication apparatus 1 obtains the updated PSK 2 based on the PSK key material 1 and the step in which the communication apparatus 1 stores the updated PSK 2 in the non-volatile memory area of the communication apparatus 1 fails, the communication apparatus 1 fails to update the PSK.

In an example, the communication apparatus 1 may first store the key material 1. For example, when the key material 1 includes the PSK key material 1, before an aging periodicity of the PSK 2 starts, the communication apparatus 1 may read the PSK key material 1, and obtain the PSK 2 based on the PSK key material 1. For another example, when the key material 1 includes the data key material 1, before an aging periodicity of the updated data key starts, the communication apparatus 1 may read the data key material 1, and obtain the updated data key based on the PSK key material 1. For still another example, when the key material 1 includes the authentication key material 1, before an aging periodicity of the updated authentication key starts, the communication apparatus 1 may read the authentication key material 1, and obtain the updated authentication key based on the authentication key material 1.

In another example, the number of pieces of key material confirmed information in the packet 4 is less than the number of key materials 1 in the packet 3. In other words, the value of the keynumbers field in the packet 4 is smaller than the value of the keynumbers field in the packet 3. To be specific, the communication apparatus 2 completes updates of a part of keys. Correspondingly, when verifying the key confirmed payload field, the communication apparatus 1 determines that a part or all of the key confirmed fields are successfully verified. In this case, the communication apparatus 1 may obtain an updated key based on a key material 1 corresponding to the successfully verified key confirmed field, and store the updated key. For a key material 1 corresponding to a key confirmed field that fails to be verified, the communication apparatus 1 may not perform processing, to be specific, not perform the step of obtaining the updated key based on the key material 1 and storing the updated key.

For example, the packet 3 includes the PSK key material 1, the authentication key material 1, and the data key material 1. The packet 4 includes the PSK key material 1 confirmed information and the authentication key material 1 confirmed information. If the communication apparatus 1 determines that both the PSK key material 1 confirmed information and the authentication key material 1 confirmed information are successfully verified, the communication apparatus 1 may obtain the updated PSK 2 based on the PSK key material 1 and store the updated PSK 2, and may obtain the updated authentication key based on the authentication key material 1 and store the updated authentication key. The communication apparatus 1 may not need to perform the step of obtaining the updated data key based on the data key material 1.

For another example, the packet 3 includes the PSK key material 1, the authentication key material 1, and the data key material 1. The packet 4 includes the PSK key material 1 confirmed information and the authentication key material 1 confirmed information. If the communication apparatus 1 determines that the PSK key material 1 confirmed information is successfully verified, the communication apparatus 1 may obtain the updated PSK 2 based on the PSK key material 1 and store the updated PSK 2. The communication apparatus 1 may not need to perform the step of obtaining the updated data key based on the data key material 1 or the step of obtaining the updated authentication key based on the authentication key material 1.

In an example, if the packet 4 includes only the data key material 1 confirmed information, in other words, includes only the key material 1 confirmed information corresponding to the data key material 1, and the communication apparatus 1 determines that the data key material 1 confirmed information is successfully verified, the communication apparatus 1 may process, by using the updated data key obtained based on the data key material 1, a data packet received and a data packet to be sent by the communication apparatus 1.

In an example, if the packet 3 includes the PSK key material 1, and the packet 4 does not include the PSK key material 1 confirmed information, it indicates that the communication apparatus 2 fails to process the PSK key material 1, and the communication apparatus 1 may determine that the PSK update fails. The communication apparatus 1 may re-initiate a PSK update. For a specific implementation in which the communication apparatus 1 obtains the updated key by using the key material 1, refer to the foregoing specific implementation in which the communication apparatus 2 obtains the updated key by using the key material 1. Repeated descriptions are omitted herein.

S110: The communication apparatus 1 generates a packet 5, where the packet 5 includes indication information 1, and the indication information 1 indicates a key update result and an identity authentication result.

In this application, the packet 5 may be an EAP-PSK packet. For a packet structure of the packet 5, refer to FIG. 3c. Fields in the packet 5 are described as follows:

For an EAP header, it should be noted that:

A value of an identifier field is the value of the identifier field in the packet 3 plus 1. For other fields, refer to related descriptions in the request for comments (RFC) 3748. Details are not described herein.

A value of an EAP type field is 47.

For a flags field, a value of a P indicator bit is 1, and the packet 5 is sent in ciphertext. A value of an R indicator bit is 0, indicating that the packet 5 is a request packet. A value of a version indicator bit may be 1. A value of a CS indicator bit is the same as the value of the CS indicator bit in the packet 2. A K indicator bit indicates whether a key ID field is included. It should be noted herein that if the packet 4 carries the authentication key material 1 confirmed information, and the communication apparatus 1 determines that the authentication key material 1 confirmed information is successfully verified, the packet 5 may include the key ID field. Therefore, in an example, a value of the K indicator bit may be 1. In this case, a value of the key ID field is a key ID corresponding to the updated authentication key. Correspondingly, an encrypted field in the packet 5 is encrypted by using the updated authentication cipher key, and an ICV field in the packet 5 is calculated by using the updated authentication integrity key. If the packet 4 does not include the authentication key material 1 confirmed information, or the communication apparatus 1 determines, when verifying the packet 4, that the authentication key material 1 confirmed information in the packet 4 fails to be verified, the value of the K indicator bit in the packet 5 may be the same as the value of the K indicator bit in the packet 3, and the value of the key ID field in the packet 5 may be the same as the value of the key ID field in the packet 3.

For an exch type field, in the packet 5, a value of the exch type field may be 4, indicating a notification phase of the identity authentication result and the key update result.

For a session ID field, a value of an SSID field in the session ID field is the same as the value of the SSID field in the packet 1. If the session ID field includes a CSID field, a value of the CSID field is the same as the value of the CSID in the packet 2.

For an encrypted payload field, the field carries encrypted data. In an example, the encrypted payload field may be a TLV field. For a structure of the TLV field, refer to FIG. 3b. Repeated descriptions are omitted herein. In an example, the encrypted payload field may include a TLV header field and an encrypted data field. The encrypted data field carries the encrypted data. For a structure of the encrypted data field, refer to FIG. 3d and the foregoing descriptions in FIG. 3d. Details are not described herein again. In this embodiment of this application, a value of the encrypted data field in the packet 5 may be obtained by encrypting fields shown in FIG. 3k by using an encryption algorithm. The fields shown in FIG. 3k include a result payload field, a padding field, and a padding length field.

The result payload field carries the key update result and/or the identity authentication result that exist/exists in S110. In an example, the result payload field may be a TLV field. For the TLV field, refer to FIG. 3l. FIG. 3l is a schematic diagram of the result payload field according to this embodiment of this application. The result payload field may include a TLV header field, a result field, a key update result field, and an error code field.

The result field indicates the identity authentication result. In an example, the result field may occupy one byte. The identity authentication result may be a result of authentication performed by the communication apparatus 1 on the communication apparatus 2 because the communication apparatus 2 has determined that the authentication of the communication apparatus 1 succeeds. The communication apparatus 1 may perform identity authentication on the communication apparatus 2 by using the identity authentication information 2 in the packet 4. The key update result field indicates the key update result of the communication apparatus 1. In an example, the key update result field may occupy one byte. The error code field indicates a reason for the identity authentication failure. In an example, the error code field may occupy two bytes. When the result field indicates that the identity authentication succeeds, the key update result field is valid, and the error code field is invalid. When the result field indicates that the identity authentication fails, the key update result field is invalid, and the error code field is valid.

The key update result field may include a plurality of key update result indicator bits, where one indicator bit occupies one bit. In an example, the key update result field may include a PSK update result indicator bit, an authentication key update result indicator bit, and a data key update result indicator bit.

The PSK update result indicator bit indicates a PSK update result. In this embodiment of this application, if the packet 4 includes the PSK key material 1 confirmed information, the communication apparatus 1 determines that the PSK key material 1 confirmed information is successfully verified, and the communication apparatus 1 locally updates the PSK successfully, the PSK update result indicator bit carries a value indicating that the PSK is successfully updated. For example, a value of the PSK update result indicator bit is 1. Otherwise, the PSK update result indicator bit carries a value indicating that the PSK fails to be updated.

The authentication key update result indicator bit indicates an authentication key update result. In this embodiment of this application, if the packet 4 includes the authentication key material 1 confirmed information, the communication apparatus 1 determines that the authentication key material 1 confirmed information is successfully verified, and the communication apparatus 1 locally updates the authentication key successfully, the authentication key update result indicator bit carries a value indicating that the authentication key is successfully updated. For example, a value of the authentication key update result indicator bit is 1. Otherwise, the authentication key update result indicator bit carries a value indicating that the authentication key fails to be updated.

The data key update result indicator bit indicates a data key update result. In this embodiment of this application, if the packet 4 includes the data key material 1 confirmed information, the communication apparatus 1 determines that the data key material 1 confirmed information is successfully verified, and the communication apparatus 1 locally updates the data key successfully, the data key update result indicator bit carries a value indicating that the data key is successfully updated. For example, a value of the data key update result indicator bit is 1. Otherwise, the data key update result indicator bit carries a value indicating that the data key fails to be updated.

In an example, during data key derivation, the KDK derived from the authentication key may be used. In this case, when deriving the data key and the authentication key, the communication apparatus 1 and the communication apparatus 2 may first derive the updated authentication key by using the authentication key material 1, and then derive the data key by using the KDK in the derived authentication key and a data key material. In this case, if the packet 4 includes the data key material 1 confirmed information and the authentication key material 1 confirmed information, and the communication apparatus 1 determines that the authentication key material 1 confirmed information fails to be verified, or the communication apparatus 1 fails to locally update the authentication key, in an implementation, the communication apparatus 1 may determine that both the data key and the authentication key fail to be updated. To be specific, the data key update result indicator bit carries the value indicating that the data key fails to be updated, and the authentication key update result indicator bit carries the value indicating that the authentication key fails to be updated. In another implementation, the communication apparatus 1 may derive the data key by using the KDK in the authentication key not updated and the data key material 1, and determine that the data key is successfully updated. To be specific, the data key update result indicator bit carries the value indicating that the data key is successfully updated, and the authentication key update result indicator bit carries the value indicating that the authentication key fails to be updated.

After determining that the data key is successfully updated, the communication apparatus 1 may receive data by using the updated data key.

It should be noted that, if the result field indicates that the identity authentication succeeds, but the key update result field indicates that all the keys fail to be updated, the communication apparatus 1 may re-initiate a key update.

The error code field indicates a type of the identity authentication failure. The type of the authentication failure may include one of an authentication failure, authentication timeout, and authentication termination. For example, the authentication failure may be that the identity authentication information 2 fails to be verified when the communication apparatus 1 verifies the identity authentication information 2. For example, the authentication timeout may be that duration for waiting for the packet 4 exceeds a waiting time threshold after the communication apparatus 1 sends the packet 3 to the communication apparatus 2. For example, the authentication termination may be that a keyword field, for example, the version field or the session ID field, in the packet 4 fails to be verified when the communication apparatus 1 verifies the packet 4.

An ICV field in the packet 5 carries an integrity check code of the packet 5. The ICV field may be calculated by using the following formula (16):

ICV=Prf(AIK,message 5)  formula (16)

In the formula (16): Prf may be the AES_CMAC_128 algorithm; message 5 is a part of fields in the packet 5. In an example, message 5 includes the EAP header of the packet 5 to a byte previous to the ICV field, in other words, message 5 includes the EAP header of the packet 5 to a last byte of the encrypted payload field, and does not include the ICV field. That is:

message 5={EAP header|EAP type|flags|ext flags|session ID|keyID encrypted payload}.

If the packet 5 includes the key ID field, AIK in the formula (16) is an AIK corresponding to the key ID carried in the key ID field in the packet 5. If the packet 5 does not include the key ID field, and the packet 3 includes the key ID field, AIK in the formula (16) is an AIK corresponding to the key ID carried in the key ID field in the packet 3. If neither the packet 5 nor the packet 3 includes the key ID field, AIK in the formula (16) is derived from the PSK corresponding to the key ID carried in the key ID field in the packet 1, or is derived from the default PSK of the communication apparatus 1.

S11: The communication apparatus 1 sends the packet 5 to the communication apparatus 2.

After generating the packet 5, the communication apparatus 1 may send the packet 5 to the communication apparatus 2, so that the communication apparatus 2 determines the identity authentication result and the key update result.

S112: The communication apparatus 2 verifies the received packet 5.

After receiving the packet 5, the communication apparatus 2 may verify the packet 5, to determine the identity authentication result and the key update result.

During specific implementation in which the communication apparatus 2 verifies the packet 5, the communication apparatus 2 may verify the values of the fields in the packet 5.

For verification of the EAP header field, refer to the related descriptions in RFC 3748, and details are not described herein.

For the flags field, the P indicator bit needs to be 1 because the packet 5 includes the encrypted field, in other words, includes the encrypted payload field. The R indicator bit needs to be 0 because the packet 5 is the request packet. The value of the CS indicator bit should be the same as that of the CS indicator bit in the packet 2. When the version of the current EAP-PSK protocol is 1, a value of the version field needs to be 1. In an example, if the value of the version field is not 1, the communication apparatus 2 may not need to verify another field, ignore the packet, and continue to wait for a valid packet 5.

The value of the K indicator bit may be 1, or may be 0. If the value of the K indicator bit is 0, it indicates that the packet 5 does not include the key ID field. Therefore, the key ID field does not need to be verified subsequently. If the value of the K indicator bit is 1, it indicates that the packet 5 includes the key ID field. Therefore, the communication apparatus 2 further needs to verify the key ID field. When the packet 5 includes the key ID field, it indicates that the communication apparatus 1 and the communication apparatus 2 implement exchange of the authentication key by exchanging the four packets, namely, the packet 1 to the packet 4. In this case, the value of the key ID field should be the key ID of the updated authentication key.

For an ext flags field, because the packet 5 is a notification packet sent by the communication apparatus 1 to the communication apparatus 2, the value of the exch type field needs to be 4 when the value 4 indicates the notification phase of the identity authentication result and the key update result.

For the session ID field, the value of the SSID field in the session ID field is the same as the value of the SSID field in the packet 1. If the packet 5 includes the CSID field, the value of the CSID field is the same as the value of the CSID field in the packet 2.

In this embodiment of this application, the communication apparatus 2 may first verify the ICV field in the packet 5, to verify integrity of the packet 5. When integrity verification of the packet 5 succeeds, the encrypted payload field in the packet 5 is verified. This is because only successful integrity verification of the packet 5 indicates that the packet 5 is not tampered with in a transmission process, and therefore indicates a high possibility that the content in the encrypted payload field is trusted. If the ICV field in the packet 5 fails to be verified, the communication apparatus 2 may ignore the packet 5, and continue to wait for a valid packet 5.

After determining that the integrity verification of the packet 5 succeeds, the communication apparatus 2 may continue to verify the encrypted payload field. When verifying the encrypted payload field, the communication apparatus 2 may first decrypt the encrypted payload field to obtain the result payload field. It should be noted herein that an algorithm and a key used by the communication apparatus 2 to decrypt the encrypted payload field in the packet 5 match the encryption algorithm and a key used by the communication apparatus 1 to calculate the encrypted payload field in the packet 5.

After obtaining the result payload field, the communication apparatus 2 may separately parse the result field, the key update result field, and the error code field, to determine the identity authentication result and the key update result. For the result field, the key update result field, and the error code field, refer to the related descriptions in S110. Repeated descriptions are omitted herein.

Before receiving the packet 5, the communication apparatus 2 may have locally completed key derivation and storage operations. Therefore, if the communication apparatus 2 completes the key update, but the communication apparatus 1 does not complete the update, the communication apparatus 2 needs to delete the updated key to ensure key synchronization between the communication apparatus 1 and the communication apparatus 2. Examples are provided for description herein:

EXAMPLE 1

If the packet 4 includes the PSK key material 1 confirmed information, and the PSK update result indicator bit in the packet 5 indicates that the PSK fails to be updated, the communication apparatus 2 may delete the updated PSK 2 from the non-volatile memory area. Alternatively, the communication apparatus 2 may set the updated PSK 2 as an unavailable PSK. If the PSK is updated again, a PSK 2 updated again may be stored in the non-volatile memory area in which the updated PSK 2 is located, to overwrite the updated PSK 2. If the packet 4 does not include the PSK key material 1 confirmed information, the communication apparatus 2 may ignore the PSK update result indicator bit in the packet 5.

EXAMPLE 2

If the packet 4 includes the data key material 1 confirmed information, and the data key update result indicator bit in the packet 5 indicates that the data key fails to be updated, the communication apparatus 2 may delete the updated data key. Alternatively, the communication apparatus 2 may set the updated data key as an unavailable data key. In this case, if the communication apparatus 1 or the communication apparatus 2 has processed the data packet by using the updated data key, the communication apparatus 1 or the communication apparatus 2 should stop processing the data packet by using the updated data key. If the packet 4 does not include the data key material 1 confirmed information, the communication apparatus 2 may ignore the data key update result indicator bit in the packet 5.

EXAMPLE 3

If the packet 4 includes the authentication key material 1 confirmed information, and the authentication key update result indicator bit in the packet 5 indicates that the authentication key fails to be updated, the communication apparatus 2 may delete the updated authentication key. Alternatively, the communication apparatus 2 may set the updated authentication key as an unavailable authentication key. If the packet 4 does not include the authentication key material 1 confirmed information, the communication apparatus 2 may ignore the authentication key update result indicator bit in the packet 5.

In addition, in an example, when the result field indicates that the identity authentication fails, the communication apparatus 2 may further record a value of the error code field to generate a log file, or report alarm information to a control management device. In another example, when the result field indicates that the identity authentication fails, after performing S113, the communication apparatus 2 enters a state of waiting for performing identity authentication again.

As described in S110, during the data key derivation, the KDK derived from the authentication key may be used. In this case, in some embodiments, if the data key update result indicator bit in the packet 5 carries the value indicating that the data key is successfully updated, and the authentication key update result indicator bit carries the value indicating that the authentication key fails to be updated, the communication apparatus 2 may delete the originally generated data key derived based on the KDK in the updated authentication key, derive a data key by using the KDK in the authentication key not updated and the data key material 1, and store the data key. After storing the data key, the communication apparatus 2 may process the data packet by using the data key.

S113: When the packet 5 is successfully verified, the communication apparatus 2 sends a packet 6 to the communication apparatus 1, where the packet 6 is a response packet for the packet 5.

In this application, the packet 6 may be an EAP-PSK packet. For a packet structure of the packet 6, refer to FIG. 3*m*. The structure of the packet 6 is similar to that of the packet 5, but the packet 6 does not include an encrypted payload field.

Values of fields in the packet 6 are described as follows:

For meanings of fields in an EAP header, refer to the related descriptions in the request for comments (RFC) 3748, and details are not described herein.

A value of an EAP type field is 47.

For a flags field, a value of a P indicator bit is 1 because the packet 6 includes an ICV field. A value of an R indicator bit is 1, indicating that the packet 6 is a response packet. A value of a version indicator bit may be 1. A value of a CS indicator bit is the same as the value of the CS indicator bit in the packet 2. A K indicator bit indicates whether a key ID field is included. The K indicator bit and the key ID field are the same as those in the packet 5. For details, refer to the related descriptions of the packet 5.

For an exch type field, in the packet 6, a value of the exch type field may be 4, indicating the notification phase of the identity authentication result and the key update result.

For a session ID field, a value of an SSID field in the session ID field is the same as the value of the SSID field in the packet 1. If the session ID field includes a CSID field, a value of the CSID field is the same as the value of the CSID in the packet 2.

The ICV field in the packet 6 carries an integrity check code of the packet 6. The ICV field may be calculated by using the following formula (17):

$$ICV=Prf(AIK, message\ 6) \quad \text{formula (17)}$$

In the formula (17): Prf may be the AES_CMAC_128 algorithm; message 6 is a part of fields in the packet 6. In an example, message 6 includes the EAP header of the packet 6 to a byte previous to the ICV field, in other words, message 6 includes the EAP header of the packet 6 to a last byte of the key ID field, and does not include the ICV field. That is:

message 6={EAP header|EAP type|flags|ext flags|session ID|keyID}.

AIK in the formula (17) may be the same as AIK in the formula (16). Therefore, for AIK in the formula (17), refer to the foregoing related descriptions of the formula (16). Repeated descriptions are omitted herein.

S114: The communication apparatus 1 verifies the received packet 6.

After receiving the packet 6, the communication apparatus 1 may verify the packet 6, and an identity authentication procedure and a key update procedure end.

During specific implementation in which the communication apparatus 1 verifies the packet 6, the communication apparatus 1 may verify the values of the fields in the packet 6.

For verification of the EAP header field, refer to the related descriptions in RFC 3748, and details are not described herein.

For the flags field, the P indicator bit needs to be 1 because the packet 6 includes the ICV field. The R indicator bit needs to be 1 because the packet 6 is the response packet. The value of the CS indicator bit should be the same as that of the CS indicator bit in the packet 2. When the version of the current EAP-PSK protocol is 1, the value of the version field needs to be 1.

A value of the K indicator bit may be 1, or may be 0. If the value of the K indicator bit is 0, it indicates that the packet 6 does not include the key ID field. Therefore, the key ID field does not need to be verified subsequently. If the value of the K indicator bit is 0, it indicates that the packet 6 includes the key ID field. Therefore, the communication apparatus 1 further needs to verify the key ID field. When the packet 6 includes the key ID field, it indicates that the communication apparatus 1 and the communication apparatus 2 implement the exchange of the authentication key by exchanging the four packets, namely, the packet 1 to the packet 4. In this case, a value of the key ID field should be the key ID of the updated authentication key.

For an ext flags field, because the packet 6 is a response packet for the packet 5, a value of the ext flags field in the packet 6 is the same as the value of the ext flags field in the packet 5. When the value 4 indicates the notification phase of the identity authentication result and the key update result, the value of the exch type field in the packet 5 is 4. Therefore, the value of the exch type field in the packet 6 also needs to be 4.

For the session ID field, the value of the SSID field in the session ID field is the same as the value of the SSID field in the packet 1. If the packet 6 includes the CSID field, the value of the CSID field is the same as the value of the CSID field in the packet 2.

In this embodiment of this application, the communication apparatus 1 may verify the ICV field in the packet 6, to verify integrity of the packet 6. The communication apparatus 1 may calculate an ICV value of the packet 6 by using the foregoing formula (17), and compare the calculated ICV value with the ICV value carried in the packet 6. If the two values are the same, it indicates that integrity verification of the packet 6 succeeds.

According to S101 to S114, the communication apparatus 1 and the communication apparatus 2 may complete the key update when performing identity authentication.

In an example, before S101, the communication apparatus 2 may further send indication information 1 to the communication apparatus 1. The indication information 1 indicates that the communication apparatus 2 has a capability of automatically updating a key. The automatically updating a key herein may be one or more of automatically updating a PSK, automatically updating a data key, and automatically updating an authentication key. After the communication apparatus 2 receives the indication information 1, if the communication apparatus 2 determines that the communication apparatus 2 also has the capability of automatically updating a key, S101 may be performed, so that the communication apparatus 1 and the communication apparatus 2 can implement an automatic key update by using the foregoing method 100.

Compared with a conventional EAP-PSK identity authentication method, S101 to S114 further specifically have the following advantages. Before the advantages are introduced, the conventional EAP-PSK identity authentication method is first described briefly.

In the conventional EAP-PSK identity authentication, the communication apparatus 1 and the communication apparatus 2 may implement identity authentication by exchanging four packets. A structure of a conventional EAP-PSK packet is that shown in FIG. 3n. As shown in FIG. 3n, the conventional EAP-PSK packet includes an EAP header field, an EAP type field, a flags field, and an EAP-PSK data field. During the identity authentication, content included in EAP-PSK data fields of the four packets is that listed in Table2.

TABLE 2

| | Sending party | Receiving party | Packet content |
|---|---|---|---|
| First packet | Communication apparatus 1 | Communication apparatus 2 | RAND_S and ID_S |
| Second packet | Communication apparatus 2 | Communication apparatus 1 | RAND_S, RAND_P, MAC_P, and ID_S |
| Third packet | Communication apparatus 1 | Communication apparatus 2 | RAND_S, MAC_S, and PCHANNEL_S |
| Fourth packet | Communication apparatus 2 | Communication apparatus 1 | RAND_S and PCHANNEL_P |

MAC_P=CMAC-AES-128(AK, ID_P∥ID_S∥RAND_S∥RAND_P)

MAC_S=CMAC-AES-128(AK, ID_S∥RAND_P)

First, MAC_P is for performing identity authentication on the communication apparatus 2, MAC_S is for performing identity authentication on the communication apparatus 1, and MAC_P cannot implement integrity verification on the packet 1 and the packet 2 because none of the EAP header field, the EAP type field, and the flags field in the first packet participates in calculation of MAC_P. Similarly, MAC_S cannot implement the integrity verification on the packet 1 and the packet 2 either.

In this embodiment of this application, as described in the foregoing formula (1), calculation factors for the auth data in the packet 3 include the entire packet 1. Therefore, integrity verification of the packet 1 is implemented, and security risks caused by transmitting the packet 1 in plaintext are avoided. As described in the foregoing formula (12), calculation factors for the auth data in the packet 4 include the entire packet 2. Therefore, integrity verification of the packet 2 is implemented, and security risks caused by transmitting the packet 2 in plaintext are avoided.

Second, in the conventional EAP-PSK identity authentication, MAC_S and MAC_P are transmitted in plaintext, and are not encrypted, resulting in low security. In this embodiment of this application, the packet 3 carries the encrypted identity authentication information 1, and the packet 4 carries the encrypted identity authentication information 2. This is beneficial to higher security.

Third, in the conventional EAP-PSK identity authentication, RAND_S is used as a session identifier for the identity authentication, and occupies 16 bytes. In this embodiment of this application, the SSID identifies the identity authentication session, and occupies four bytes. This greatly reduces memory space occupied by the session identifier for the identity authentication.

Fourth, in the conventional EAP-PSK identity authentication, only the identity authentication can be implemented by using the foregoing four packets, and the key update as described in this embodiment of this application cannot be implemented.

For the content listed in Table 2 and the conventional EAP-PSK identity authentication process, refer to descriptions in RFC 4764. Details are not described herein.

In an example, if the communication apparatus 2 fails to verify the packet 3 after receiving the packet 3, for example, the ICV field in the packet 3 fails to be verified, or the identity authentication information 1 in the packet 3 fails to be verified, the communication apparatus 2 may generate a packet 4', to notify the communication apparatus 1 that the identity authentication fails. A packet structure of the packet 4' is the same as that of the packet 4, and a difference lies in that an encrypted payload field in the packet 4' carries an encrypted result payload. To be specific, a value of an encrypted data field in the packet 4' may be obtained by encrypting the result payload by using an encryption algorithm. For a structure of the result payload, refer to FIG. 3l and the foregoing descriptions in FIG. 3l. Repeated descriptions are omitted herein. In this case, the communication apparatus 2 enters a state of waiting for the packet 1 for requesting the identity authentication.

In an example, if the communication apparatus 2 does not receive the packet 3 from the communication apparatus 1 within the waiting time threshold after performing "sending a packet 2 to the communication apparatus 1" (S104), the communication apparatus 2 enters a held state. After entering the held state, if the communication apparatus 2 receives a packet from the communication apparatus 1, the communication apparatus 2 directly discards the packet. In an example, after entering the held state, the communication apparatus 2 may further start a held timer. The timer is for recording duration in which the communication apparatus 2 remains in the held state. When the held timer indicates that the duration in which the communication apparatus 2 remains in the held state exceeds a specific time threshold, the communication apparatus 2 may re-initiate identity authentication. In an example, the communication apparatus 2 may send a notification message to the communication apparatus 1, to indicate the communication apparatus 1 to re-initiate the identity authentication. In this embodiment of this application, after the duration in which the communication apparatus 2 remains in the held state exceeds the specific time threshold, if the communication apparatus 2 receives a packet 3 from the communication apparatus 1, the communication apparatus 2 ignores the packet. If the communication apparatus 2 receives a packet 1 from the communication apparatus 1, the communication apparatus 2 may perform identity authentication again based on the packet 1.

In an example, if the communication apparatus 2 does not receive the packet 5 from the communication apparatus 1 within the waiting time threshold after the communication apparatus 2 performs "sending a packet 4 to the communication apparatus 1" (S107), in an example, if the packet 3 sent by the communication apparatus 1 to the communication apparatus 2 in S101 includes the data key material 1, and the communication apparatus 2 receives a data packet that is from the communication apparatus 1 and that is processed by using a data key derived from a new key material 1, the communication apparatus 2 may determine that the identity authentication and the data key update succeed. This is because only when the communication apparatus 1 determines that the identity authentication succeeds and the data key is successfully updated does the communication apparatus 1 use the updated data key to process the data packet sent to the communication apparatus 2. In another example, if the communication apparatus 2 does not receive the data packet from the communication apparatus 1, the communication apparatus 2 may suspect that the identity authentication fails. This is because once the communication apparatus 1 determines that the identity authentication succeeds, the communication apparatus 1 may send the data packet to the communication apparatus 2 even if the communication apparatus 1 does not send the packet 5, or there may be no data packet to be sent or no data key available currently. If the communication apparatus 1 does not send the data packet to the communication apparatus 2, it indicates that the communication apparatus 1 determines that the identity authentication fails, there is no data packet to be sent currently, the data key fails to be updated, or a current communication link is faulty, and the packet cannot be sent to the communication apparatus 2. In this case, if the communication apparatus 2 receives the packet 1 from the communication apparatus 1, in an example, the communication apparatus 2 may perform identity authentication again based on the packet 1. In another example, the communication apparatus 2 may enter a held state, and start a held timer. The timer is for recording duration in which the communication apparatus 2 remains in the held state. When the held timer indicates that the duration in which the communication apparatus 2 remains in the held state does not exceed a specific time threshold, the communication apparatus 2 may ignore the packet 1 and continue to wait.

In an example, if the communication apparatus 1 does not receive the packet 4 within specific duration after sending the packet 3, the communication apparatus 1 may retransmit the packet 3 to the communication apparatus 2. If a quantity of times that the communication apparatus 1 retransmits the packet 3 exceeds a specific quantity threshold, the communication apparatus 1 may consider that the identity authentication fails. In an example, the communication apparatus 1 may enter a held state, and start a held timer. The timer is for recording duration in which the communication apparatus 1 remains in the held state. When the held timer indicates that the duration in which the communication apparatus 1 remains in the held state exceeds a specific time threshold, the communication apparatus 1 may re-initiate identity authentication.

In an example, if the communication apparatus 1 does not receive the packet 6 within specific duration after sending the packet 5 to the communication apparatus 2, the communication apparatus 1 may retransmit the packet 5 to the communication apparatus 2. If a quantity of times that the communication apparatus 1 retransmits the packet 5 exceeds a specific quantity threshold, the communication apparatus 1 may determine that the identity authentication fails. In another example, if the communication apparatus 1 does not receive the packet 6 within specific duration after sending the packet 5 to the communication apparatus 2, the communication apparatus 1 may retransmit the packet 5 to the communication apparatus 2.

If a quantity of times that the communication apparatus 1 retransmits the packet 5 exceeds a specific quantity threshold, the communication apparatus 1 may perform separate processing based on an identity authentication status of the communication apparatus 1: If the result payload in the packet 5 indicates that the identity authentication succeeds and each piece of key material 1 confirmed information in the packet 4 is successfully verified, the communication apparatus 1 may consider that the authentication succeeds. If the packet 5 includes indication information indicating that the data key is successfully updated, the data key may be for processing the data packet. If the result payload in the packet 5 indicates that the authentication fails, the communication apparatus 1 may determine that the identity authentication fails. In an example, the communication apparatus 1 may send a notification message to the communication apparatus 2, to indicate that the identity authentication fails. After determining that the identity authentication fails, the communication apparatus 1 may enter a held state, and start a held timer. The timer is for recording duration in which the communication apparatus 1 remains in the held state. When the held timer indicates that the duration in which the communication apparatus 1 remains in the held state exceeds a specific time threshold, the communication apparatus 1 may re-initiate identity authentication.

In some examples, some exceptions may occur in a process in which the communication apparatus 1 and the communication apparatus 2 perform S101 to S114, to interrupt the foregoing process. For example, the communication apparatus 1 or the communication apparatus 2 is powered off. For another example, as described above, after performing S104, the communication apparatus 2 does not receive the packet 3 from the communication apparatus 1 when waiting duration exceeds the waiting time threshold.

In an example, if the communication apparatus 2 re-initiates identity authentication, the communication apparatus 2 may send a notification message to the communication apparatus 1 by using an underlying bearer protocol, to indicate the communication apparatus 1 to re-initiate the identity authentication. In an example, if the communication apparatus 1 is the NAD 101 shown in FIG. 1, and the communication apparatus 2 is the MCU 102 shown in FIG. 1, the notification message may be, for example, an extensible authentication protocol over local area networks (EAP over LAN, EAPoL) start message. In an example, after receiving the notification message, if the communication apparatus 1 cannot determine authenticity of the notification message (for example, the notification message is transmitted in plaintext), the communication apparatus 1 may determine, based on a local identity authentication status, a next action to be performed. In an example, if the communication apparatus 1 has not completed the identity authentication, for example, the communication apparatus 1 receives the notification message after sending the packet 2, the communication apparatus 1 may re-initiate identity authentication immediately or after waiting for specific duration. This is not specifically limited in this embodiment of this application. In another example, if the communication apparatus 1 has completed the identity authentication, for example, the communication apparatus 1 receives the notification message after receiving the packet 4, the communication apparatus 1 may send a status query message to the communication apparatus 2, to determine a status of the communication apparatus 2, and therefore determine validity of the received notification message that indicates to re-initiate the identity authentication. If determining that the notification message is valid, the communication apparatus 1 may re-initiate the identity authentication; otherwise, the communication apparatus 1 may ignore the notification message.

In an example, if the communication apparatus 1 re-initiates the identity authentication, in an example, the communication apparatus 1 may directly re-generate a packet 1, and send the re-generated packet 1 to the communication apparatus 2, to restart an identity authentication process. In another example, the communication apparatus 1 may send a notification message to the communication apparatus 2, to notify the communication apparatus 2 that the identity authentication is to be restarted.

In some examples, in a process in which the communication apparatus 1 and the communication apparatus 2 perform S101 to S114, an identity authentication function of the communication apparatus 1 or the communication apparatus 2 may be disabled. In other words, the communication apparatus 1 and the communication apparatus 2 do not meet a condition for continuing the identity authentication. For example, a user performs a corresponding operation to disable the identity authentication function of the communication apparatus. For another example, the identity authentication function of the communication apparatus is re-enabled.

In an example, if the identity authentication function of the communication apparatus 1 is disabled, the communication apparatus 1 may send a notification message to the communication apparatus 2. The notification message indicates the communication apparatus 2 to delete the identity authentication session. For example, if the identity authentication function of the communication apparatus 1 is disabled in a process of waiting for the packet 2, the communication apparatus 1 may indicate, by using a packet 3', the communication apparatus 2 to delete the identity authentication session. In this case, the packet 3' is transmitted in plaintext, and does not carry the key material 1, but carries a result payload field as shown in FIG. 3*l*, where a result field in the result payload field indicates that the identity authentication fails. If the communication apparatus 2 receives the packet 3' carrying the result payload field after receiving the packet 1, the communication apparatus 2 may directly delete the identity authentication session. For another example, if the identity authentication function of the communication apparatus 1 is disabled in a process of waiting for the packet 4, the communication apparatus 1 may indicate, by using a packet 5', the communication apparatus 2 to delete the identity authentication session. In this case, the packet 5' is transmitted in ciphertext, a cipher key or an integrity key for the packet 5' may be determined based on the key ID field in the packet 2, and the packet 5' carries a result payload field as shown in FIG. 3*l*, where a result field in the result payload field indicates that the identity authentication fails. If the communication apparatus 2 receives the packet 5' carrying the result payload field after receiving the packet 3, the communication apparatus 2 may directly delete the identity authentication session. For still another example, if the identity authentication function of the communication apparatus 1 is disabled in a process of waiting for the packet 6, the communication apparatus 1 may indicate, by using an underlying bearer protocol packet, the communication apparatus 2 to delete the identity authentication session. After receiving the underlying bearer protocol packet, the communication apparatus 2 may delete the identity authentication session.

In an example, if the identity authentication function of the communication apparatus 2 is disabled, the communication apparatus 2 may send a notification message to the communication apparatus 1. The notification message indicates the communication apparatus 1 to delete the identity authentication session. In an example, the notification message may be an underlying bearer protocol packet. After the communication apparatus 1 receives the underlying bearer protocol packet, if the packet is in ciphertext and is successfully verified, the communication apparatus 1 may immediately delete the identity authentication session. If the packet is in plaintext, the communication apparatus 1 may start bottom-layer keepalive to prevent a denial of service (DoS) network attack. For example, when EAP-PSK is combined with EAPoL-EAP to provide identity authentication and a PSK update for MKA, the communication apparatus 1 may use a keepalive function of an MKA protocol field to assist in determining a protocol status of the communication apparatus 2. If the foregoing packet 3 includes the data key material 1, after receiving the underlying bearer protocol packet transmitted in plaintext, the communication apparatus 1 may wait for specific duration to determine whether a packet processed by using the data key is received. If the communication apparatus 1 receives the packet processed by using the data key, the communication apparatus 1 may determine that the underlying bearer protocol packet transmitted in plaintext is invalid. Therefore, the communication apparatus 1 may not perform an operation of deleting the identity authentication session. If the communication apparatus 1 does not receive, after waiting for the specific duration, the packet processed by using the data key, the communication apparatus 1 may determine that the underlying bearer protocol packet transmitted in plaintext is valid. Therefore, the communication apparatus 1 may delete the identity authentication session.

Currently, EAP may be combined with EAPoL to implement identity authentication. The combination of EAP and EAPoL may be referred to as EAPoL-EAP. EAP may alternatively be combined with the media access control security key agreement (MKA) to derive a MACsec key. In an example, after identity authentication, an MSK may be generated by using a PSK. The MSK may be for deriving a secure connectivity association key (CAK), and the CAK may be for deriving the MACsec key.

In an example, identity authentication may be implemented through EAPoL-EAP and EAP transport layer security (EAP TLS), and a MACsec key is derived by using an MSK obtained through the identity authentication. However, according to the Institute of Electrical and Electronics Engineers standard (IEEE std) 802.1X-2020 or 802.1X-2010, when the identity authentication is performed through EAPoL-EAP and EAP-TLS, because a plurality of protocols are involved, a protocol stack for a packet exchanged in the identity authentication process is complex. A plurality of layers of protocol stack encapsulation and decapsulation for the packet are needed in the identity authentication process, causing a complex processing procedure. FIG. 30 is a schematic diagram of the protocol stack according to this embodiment of this application. For FIG. 30, refer to related descriptions in IEEE std 802.1X-2010 (or 2020), and details are not described herein. Completing identity authentication by using the method 100 shown in FIG. 2*b*-1 and FIG. 2*b*-2 does not involve a plurality of protocols (where the EAP-PSK protocol extended in this embodiment of this application is involved). Therefore, a plurality of layers of protocol stack encapsulation and decapsulation are not involved in an identity authentication process, so that efficiency of the identity authentication can be improved. In an example, after the identity authentication is completed by using the method shown in FIG. 2*b*-1 and FIG. 2*b*-2, a CAK may be further derived based an MSK obtained through the identity authentication, and a MACsec key is derived by using the CAK. For a specific implementation of deriving the CAK by using the MSK and deriving the MACsec key by using the CAK, refer to related descriptions in IEEE std 802.1X-2010 (or 2020). Details are not described herein.

When the CAK is derived by using the MSK, a parameter, namely, a session ID further needs to be derived. The session ID herein has a different meaning from the session ID field in the method 100. The session ID herein is for deriving a CAK key name (CKN), and the CKN may identify the CAK for deriving the MACsec key. In an example, the session ID herein may be equal to nonce 1|nonce 2. In another example, the session ID herein may be equal to SSID|nonce 1|nonce 2, where the SSID may be the value carried in the SSID field in the packet 1 in the method 100.

In an example, when the MACsec key is derived by using the CAK, the PSK may be directly used as the CAK. In other words, the CAK may be directly derived by using the PSK. It may be understood that if the PSK is updated by using the method 100 provided in this embodiment of this application, the MACsec key may be derived by using the updated PSK 2, to avoid a case in which the MACsec key is cracked because the PSK remains unchanged for a long time period. This reduces a risk of cracking the MACsec key, and improves communication security.

In this embodiment of this application, the communication apparatus 1 and the communication apparatus 2 may alternatively update the PSK by using an MKA-based packet, and derive a MACsec key by using an updated PSK.

Figure 4A:
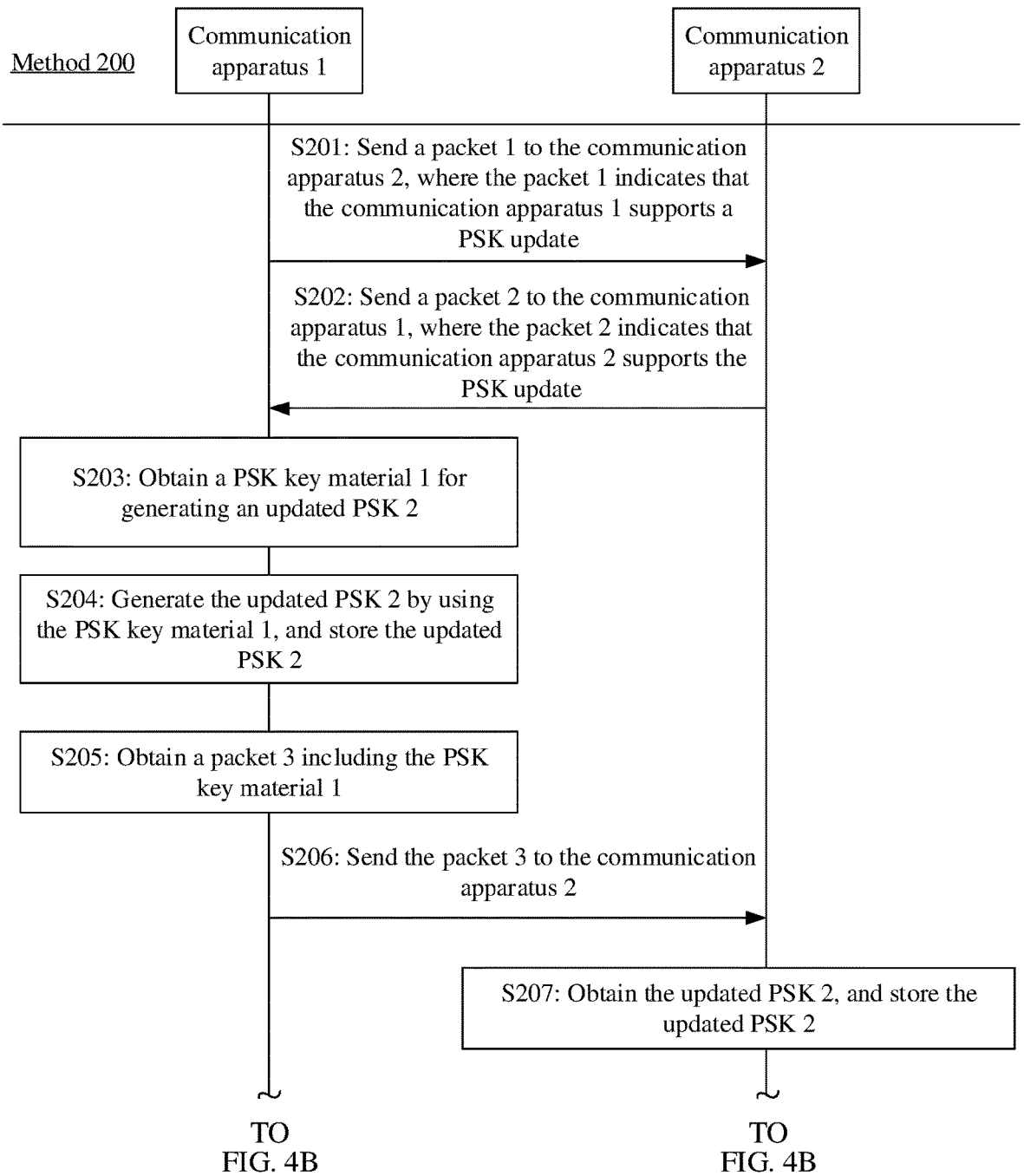
FIG. 4A and FIG. 4B are a signaling exchange diagram of a PSK updating method according to an embodiment of this application.
Figure 4B:
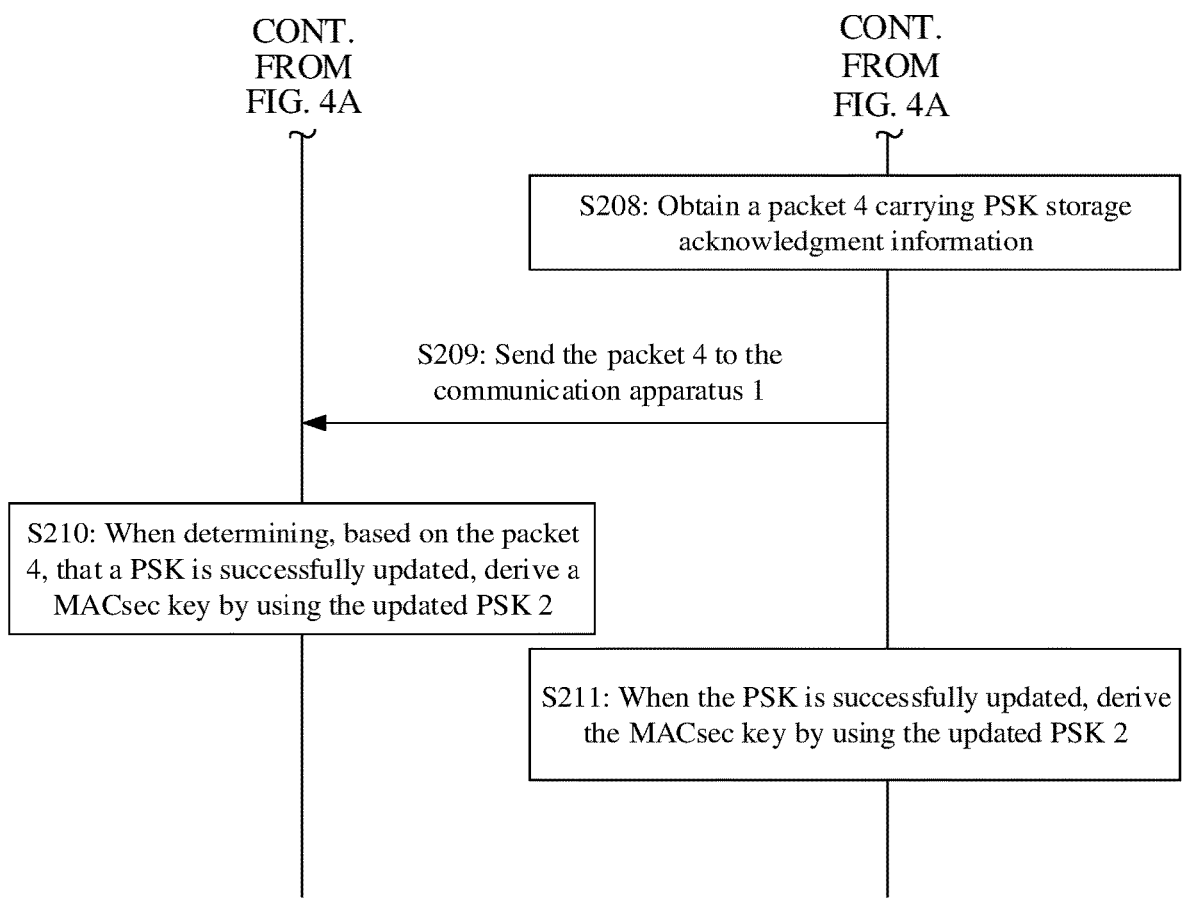

FIG. 4A and FIG. 4B are a signaling exchange diagram of a PSK updating method according to an embodiment of this application. The method 200 shown in FIG. 4A and FIG. 4B may be performed by a communication apparatus 1 and a communication apparatus 2. For the communication apparatus 1 and the communication apparatus 2, refer to the descriptions of the communication apparatus 1 and the communication apparatus 2 in the method 100. Repeated descriptions are omitted herein.

In an example, the method 200 shown in FIG. 4A and FIG. 4B may be performed after the communication apparatus 1 and the communication apparatus 2 complete identity authentication. A specific implementation in which the communication apparatus 1 and the communication apparatus 2 perform identity authentication is not specifically limited in this embodiment of this application. In an example, the communication apparatus 1 and the communication apparatus 2 may perform identity authentication based on an extended EAP-PSK protocol. In another example, the communication apparatus 1 and the communication apparatus 2 may perform identity authentication based on other protocols, namely, EAPoL-EAP and EAP TLS. This is not specifically limited in this embodiment of this application.

The method 200 shown in FIG. 4A and FIG. 4B may be, for example, implemented by performing the following S201 to S211.

S201: The communication apparatus 1 sends a packet 1 to the communication apparatus 2, where the packet 1 indicates that the communication apparatus 1 supports a PSK update.

In this embodiment of this application, the packet 1 may be an MKA-based packet. The packet 1 may include indication information 1, and the indication information 1 indicates that the communication apparatus 1 supports the PSK update.

In an implementation of this embodiment of this application, the MKA-based packet may be extended, where a parameter set field is extended to carry the indication information 1, in other words, a parameter set field is extended to indicate that the communication apparatus 1 supports the PSK update. For example, refer to FIG. 5a for understanding. FIG. 5a is a schematic diagram of an MKA capability notification parameter set according to this embodiment of this application. As shown in FIG. 5a, the MKA capability notification parameter set field may include a plurality of bytes. The bytes of the MKA capability notification parameter set field are described as follows:

The first byte carries a parameter set type. A specific value of the parameter set type field may be allocated by the IEEE. Currently, a value 1 to a value 8 have been defined for the parameter set type field. Therefore, in an example, the value of the parameter set type field may be greater than or equal to 9. For example, the value of the parameter set type field may be 9.

The second byte and the first four bits of the third byte of the MKA capability notification parameter set are reserved bits. This is similar to a case of another parameter set of the MKA-based packet. In FIG. 5a, "X" represents a reserved bit. In an example, a PSK update capability may be indicated by one or more bits in the reserved bits. For example, as shown in FIG. 5a, a leftmost bit of the second byte indicates the PSK update capability.

The last four bits of the third byte and the fourth byte carry a length of the MKA capability notification parameter set field.

The fifth byte indicates a capability type. In this embodiment of this application, the capability type is a PSK update, and a value of the field may be, for example, allocated by the IEEE. In an example, the capability type field is optional.

The sixth byte carries a length of a capability notification, namely, a byte length from the seventh byte to the last byte of the MKA capability notification parameter set.

The seventh byte carries PSK update requirement information indicating whether a PSK needs to be updated. The field is optional. In an example, if the MKA capability notification parameter set carries the PSK update requirement information, whether to update the PSK may be determined based on the PSK update requirement information.

The eighth byte to the eleventh byte carry a remaining lifetime of the current PSK, and the field is optional. In an example, if the MKA capability notification parameter set carries the remaining lifetime of the current PSK, whether to update the PSK may be determined based on the remaining lifetime of the current PSK. For example, if the remaining lifetime of the current PSK is less than a specific threshold, the PSK update is started, so that an updated PSK 2 may start to be used when the remaining lifetime of the current PSK is 0.

The twelfth byte is a padding field. In an example, a value of the padding field may be all zeroes. The padding field enables the length of the MKA capability notification parameter set field to be an integer multiple of four bytes.

S202: The communication apparatus 2 sends a packet 2 to the communication apparatus 1, where the packet 2 indicates that the communication apparatus 2 supports the PSK update.

In this embodiment of this application, the packet 2 may be an MKA-based packet. In an example, the packet 2 may carry indication information 2 indicating that the communication apparatus 2 supports the PSK update. In an implementation of this embodiment of this application, the MKA-based packet may be extended, where a parameter set field is extended to carry the indication information 2, in other words, a parameter set field is extended to indicate that the communication apparatus 2 supports the PSK update. For example, refer to FIG. 5a for understanding. For the extended parameter set, refer to the related descriptions in S201. Repeated descriptions are omitted herein.

S203: The communication apparatus 1 obtains a PSK key material 1 for obtaining the updated PSK 2.

S204: The communication apparatus 1 obtains the updated PSK 2 by using the PSK key material 1, and stores the updated PSK 2.

In an example, the communication apparatus 1 may generate the PSK key material 1. For example, the communication apparatus 1 may generate one nonce, and use the nonce as the PSK key material 1. For another example, the communication apparatus 1 may generate one nonce, then perform calculation on the nonce by using a pre-determined calculation method, and determine a calculation result as the PSK key material 1. In another example, the PSK key material 1 may be preconfigured on the communication apparatus 1, and the communication apparatus 1 may obtain the PSK key material 1 preconfigured on the communication apparatus 1.

In this embodiment of this application, the PSK key material 1 is for generating the updated PSK 2. For related descriptions of generating the updated PSK 2 by using the PSK key material 1, refer to the related descriptions in the foregoing method 100. If derivation of the PSK 2 is short of an MSK, for example, if identity authentication is performed without EAP, the MSK may not be included during the derivation. Repeated descriptions are omitted herein. After generating the updated PSK 2, the communication apparatus 1 may store the updated PSK 2.

S205: The communication apparatus 1 obtains a packet 3 including the PSK key material 1.

S206: The communication apparatus 1 sends the packet 3 to the communication apparatus 2.

In this embodiment of this application, the packet 3 may be an MKA-based packet. The communication apparatus 1 may generate the packet 3, and send the packet 3 to the communication apparatus 2, to indicate the communication apparatus 2 to update the PSK based on the packet 3.

In an implementation of this embodiment of this application, the PSK key material 1 may be carried in a distributed CAK parameter set. In an example, the PSK key material 1 may be carried in the fifth to the $28^{th}$ bytes of the distributed CAK parameter set, and an identifier of the PSK is carried in the $29^{th}$ to an $n^{th}$ (where n is greater than 29) bytes of the distributed CAK parameter set. It may be understood that when the PSK is directly used as a CAK to derive a MACsec key, the identifier of the PSK is equivalent to a CKN. For the distributed CAK parameter set, refer to FIG. 11 to FIG. 13 in IEEE std 802.1X-2020 and descriptions of FIG. 11 to FIG. 13 in IEEE std 802.1X-2020. Details are not described herein.

In another implementation of this embodiment of this application, the distributed CAK parameter set may be extended, and an information type carried in the distributed CAK parameter set is indicated by a reserved field in the distributed CAK parameter set. In an example, the information type carried in the distributed CAK parameter set may be indicated by the first four bits of the second byte in the distributed CAK parameter set. For example, when values of the first four bits of the second byte are all o, it indicates that the distributed CAK parameter set carries CAK information. For a specific usage of the CAK information, refer to IEEE std 802.1X-2020. When values of the first four bits of the second byte are 1, it indicates that the distributed CAK parameter set carries the updated PSK, where the updated PSK is carried in the fifth to the 28$^{th}$ bytes of the distributed CAK parameter set. When values of the first four bits of the second byte are 2, it indicates that the distributed CAK parameter set carries the PSK key material 1, where the PSK key material 1 is carried in the fifth to the 28th bytes of the distributed CAK parameter set.

In still another implementation of this embodiment of this application, a new parameter set field may be extended to carry the PSK key material 1, to indicate the communication apparatus 2 to update the PSK. For example, an MKA distributed updated PSK parameter set may be extended. Refer to FIG. 5*b* for understanding. FIG. 5*b* is a schematic diagram of the MKA distributed updated PSK parameter set according to this embodiment of this application. As shown in FIG. 5*b*, the MKA distributed updated PSK parameter set field may include a plurality of bytes. The bytes of the MKA distributed updated PSK parameter set field are described as follows:

The first byte carries a parameter set type. A specific value of the parameter set type field may be allocated by the IEEE. Currently, a value 1 to a value 8 have been defined for the parameter set type field. Therefore, in an example, the value of the parameter set type field may be greater than or equal to 9. For example, the value of the parameter set type field may be 11.

The second byte and the first four bits of the third byte of the MKA distributed updated PSK parameter set are reserved bits. This is similar to another parameter set of the MKA-based packet. In FIG. 5*b*, "X" represents a reserved bit. In an example, an information type carried in the MKA distributed updated PSK parameter set may be indicated by the first byte of the MKA distributed updated PSK parameter set. For example, when a value of the first byte is 1, it indicates that the MKA distributed updated PSK parameter set carries the updated PSK 2. When a value of the first byte is 2, it indicates that the MKA distributed updated PSK parameter set carries the PSK key material 1 for generating the PSK 2.

The last four bits of the third byte and the fourth byte carry a length of the MKA distributed updated PSK parameter set field.

The fifth byte to an x1$^{st}$ byte are a TLV field carrying the PSK key material 1.

The fifth byte is a TLV type field, the sixth byte is a TLV length field, and the seventh byte to the x1$^{st}$ byte are a TLV value field that may carry the PSK key material 1.

An (x1-1)$^{th}$ byte to an X2$^{nd}$ byte are a TLV field that may carry the CKN.

The (x1+1)$^{th}$ byte is a TLV type field, the (x1+2)$^{th}$ byte is a TLV length field, and the (x1+3)$^{th}$ byte to the x2$^{nd}$ byte are a TLV value field that carries the CKN.

An (x2+1)$^{th}$ byte to an x3$^{rd}$ byte are a padding field. In an example, a value of the padding field may be all zeroes.

For a sequence of performing steps S203 to S206, it should be noted that in this embodiment of this application, if the packet 3 carries the PSK key material 1 for generating the PSK 2, the communication apparatus 1 may generate the packet 3 including the PSK key material 1 after obtaining the PSK key material 1, and send the packet 3 to the communication apparatus 2, and S205 does not need to be performed after S204 is completed. If the PSK key material 1 carried in the packet 3 is the updated PSK 2, after generating the updated PSK 2, the communication apparatus 1 needs to generate, based on the updated PSK 2, the packet 3 carrying the updated PSK2, and further send the packet 3 to the communication apparatus 2.

S207: The communication apparatus 2 obtains the updated PSK 2, and stores the updated PSK 2.

After receiving the packet 3, the communication apparatus 2 may obtain the updated PSK 2 based on the packet 3. In an example, if the packet 3 carries the updated PSK 2, the communication apparatus 2 may directly parse the packet 3, and extract the updated PSK 2 carried in the packet 3. In another example, if the packet 3 carries the PSK key material 1 for generating the PSK 2, after obtaining the PSK key material 1, the communication apparatus 2 may derive the updated PSK 2 by using a key derivation algorithm and the PSK key material 1. After obtaining the updated PSK 2, the communication apparatus 2 may store the updated PSK in a non-volatile memory area of the communication apparatus 2.

S208: The communication apparatus 2 obtains a packet 4 carrying PSK storage acknowledgment information.

S209: The communication apparatus 2 sends the packet 4 to the communication apparatus 1.

In this embodiment of this application, the packet 4 may be an MKA-based packet. The communication apparatus 2 may generate the packet 4, and send the packet 4 to the communication apparatus 1, to notify the communication apparatus 1 whether the communication apparatus 2 has successfully updated the PSK. The successfully updating the PSK herein means successfully storing the updated PSK 2 in the non-volatile memory area of the communication apparatus 2.

In an implementation of this embodiment of this application, a new parameter set field may be extended to carry the PSK storage acknowledgment information. For example, an MKA PSK stored result notification parameter set may be extended. Refer to FIG. 5*c* for understanding. FIG. 5*c* is a schematic diagram of the MKA PSK stored result notification parameter set according to this embodiment of this application. As shown in FIG. 5*c*, the MKA PSK stored result notification parameter set field may include a plurality of bytes. The bytes of the MKA PSK stored result notification parameter set field are described as follows:

The first byte carries a parameter set type. A specific value of the parameter set type field may be allocated by the IEEE. Currently, a value 1 to a value 8 have been defined for the parameter set type field. Therefore, in an example, the value of the parameter set type field may be greater than or equal to 9. For example, the value of the parameter set type field may be 12.

The second byte and the first four bits of the third byte of the MKA PSK stored result notification parameter set are reserved bits. This is similar to another parameter set of the MKA-based packet. In FIG. 5c, "X" represents a reserved bit.

The last four bits of the third byte and the fourth byte carry a length of the MKA PSK stored result notification parameter set field.

The fifth byte to the eighth byte are a TLV field that carries a stored result of the updated PSK.

The fifth byte is a TLV type field, the sixth byte is a TLV length field, and the seventh byte and the eighth byte are a TLV value field that carries the stored result of the updated PSK. The stored result of the PSK may include, for example, a success or a failure.

The ninth byte to an x4$^{th}$ byte are a TLV field that carries the CKN.

The ninth byte is a TLV type field, the tenth byte is a TLV length field, and the eleventh byte to the x4$^{th}$ byte are a TLV value field that carries the CKN.

An (x4+1)$^{th}$ byte to an x5$^{th}$ byte are a padding field. In an example, a value of the padding field may be all zeroes.

S210: When determining, based on the packet 4, that the PSK is successfully updated, the communication apparatus 1 derives the MACsec key by using the updated PSK 2.

In this embodiment of this application, after receiving the packet 4, the communication apparatus 1 may determine, based on the packet 4, whether the communication apparatus 2 has successfully stored the updated PSK. In an example, the communication apparatus 1 may determine, based on the MKA PSK stored result notification parameter set in the packet 4, whether the communication apparatus 2 has successfully stored the updated PSK. If the communication apparatus 1 determines, based on the packet 4, that the communication apparatus 2 has successfully stored the updated PSK, and the communication apparatus 1 also successfully stores the updated PSK, the communication apparatus 1 may derive the MACsec key by using the updated PSK.

In an example, if the communication apparatus 1 determines that the PSK fails to be updated, for example, the communication apparatus 1 fails to store the updated PSK locally, the communication apparatus 1 may send a packet 5 to the communication apparatus 2, to indicate that the communication apparatus 1 fails to store the updated PSK. The packet 5 may be an MKA-based packet, and may carry the MKA PSK stored result notification parameter set that is described in S209.

There may be two implementations in which the communication apparatus 1 derives the MACsec key by using the PSK 2. In an implementation, the communication apparatus 1 may derive the MSK by using the PSK 2, derive the CAK by using the MSK, and finally derive the MACsec key by using the CAK. In another implementation, the PSK 2 may be directly used as the CAK to derive the MACsec key. A specific implementation of deriving the MSK by using the PSK 2, deriving the CAK by using the MSK, and deriving the MACsec key by using the CAK is not described in detail herein.

S211: When the PSK is successfully updated, the communication apparatus 2 derives the MACsec key by using the updated PSK 2.

In an example, if the communication apparatus 2 successfully stores the updated PSK 2 locally, and does not receive the packet 5 indicating that the communication apparatus 1 fails to store the updated PSK, the communication apparatus 2 may derive the MACsec key by using the updated PSK.

It can be learned from S201 to S211 that, according to the solution in this embodiment of this application, the communication apparatus 1 and the communication apparatus 2 may alternatively update the PSK by using the MKA-based packet, and derive the MACsec key by using the updated PSK 2, to avoid a case in which the MACsec key is cracked because the PSK remains unchanged for a long time period. This reduces a risk of cracking the MACsec key, and improves communication security.

In an example, the communication apparatus 1 and the communication apparatus 2 may perform identity authentication by using the Internet key exchange (IKE) protocol. When performing identity authentication by using the IKE protocol, the communication apparatus 1 and the communication apparatus 2 may perform identity authentication by using a PSK. If the PSK remains unchanged, security risks may be caused once the PSK is cracked. In view of this, embodiments of this application provide a PSK updating method to update the PSK, to reduce a possibility of cracking the PSK, and accordingly reduce security risks.

In an example, when performing identity authentication by using the Internet key exchange (IKE) protocol, the communication apparatus 1 and the communication apparatus 2 may process an IKE protocol-based packet by using an IKE SA key. If the IKE SA key remains unchanged, security risks may be caused once the IKE SA key is cracked. In view of this, embodiments of this application provide an IKE SA key updating method, to update the IKE SA key, and therefore reduce security risks caused by cracking of the IKE SA key.

In an example, when a data packet is exchanged between the communication apparatus 1 and the communication apparatus 2, the data packet may be processed by using a data key, to ensure security of the data packet. If the data key remains unchanged for a long time period, a possibility of cracking the data key is increased, bringing a security risk. Therefore, it is particularly important to update the data key. Currently, when interacting with each other by using the IKE protocol, the communication apparatus 1 and the communication apparatus 2 may negotiate the data key by using an asymmetric key algorithm. However, in some scenarios, for example, in the scenario shown in FIG. 1, the MCU 102 has a limited computing capability, and does not support the asymmetric key algorithm. As a result, in some scenarios, if one of the two communication apparatuses that perform communication by using the IKE protocol does not support the asymmetric key algorithm, the data key cannot be updated, and security risks are high. For another example, when the communication apparatus 1 and the communication apparatus 2 communicate with each other through a non-Ethernet port, the data key cannot be updated, and therefore security risks are high. To resolve this problem, embodiments of this application provide a data key updating method, so that the communication apparatus 1 and the communication apparatus 2 can update the data key even if the communication apparatus 1 or the communication apparatus 2 does not support the asymmetric key algorithm.

Figure 6:
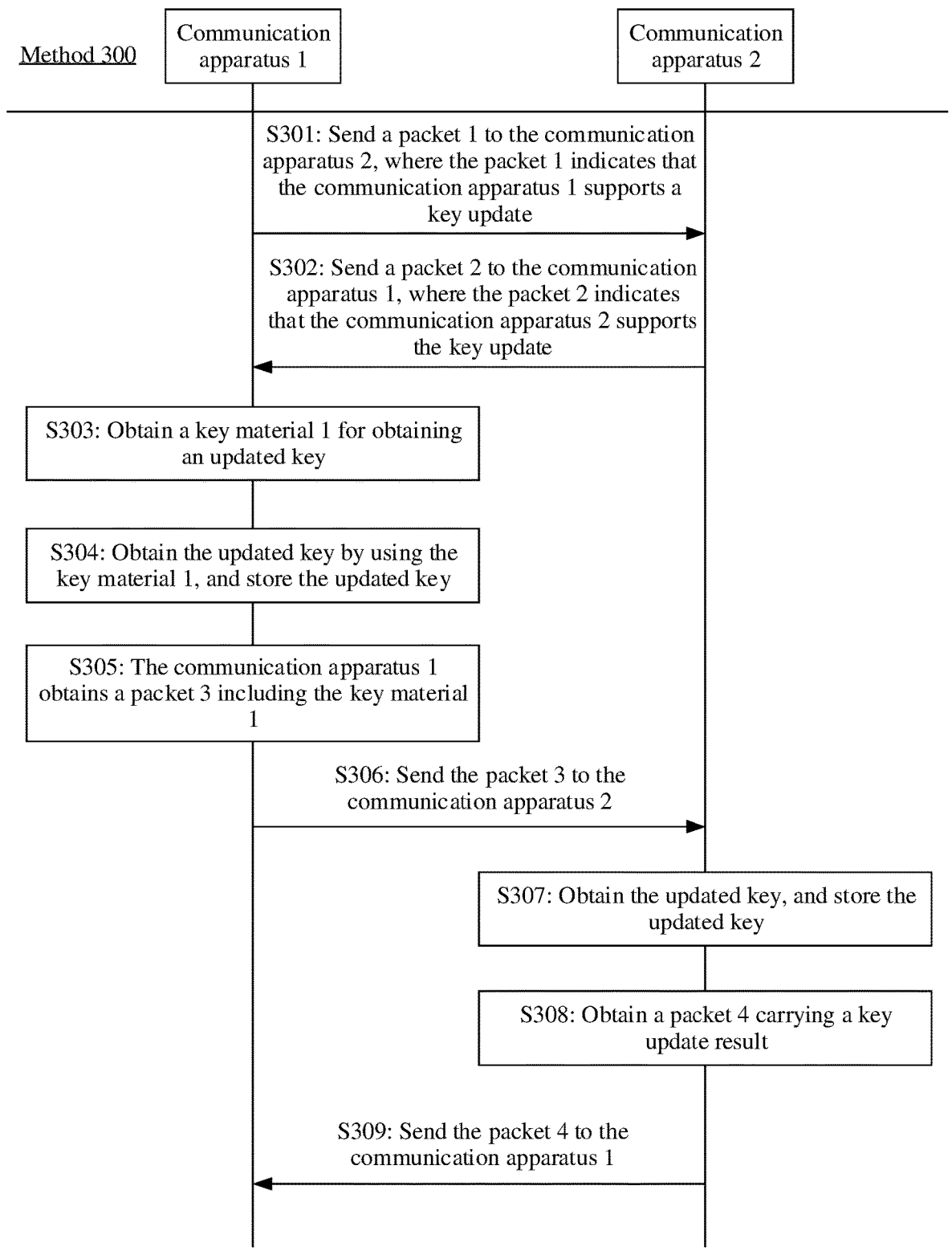
FIG. 6 is a signaling exchange diagram of a key updating method according to an embodiment of this application.

With reference to FIG. 6, the following describes a key updating method, to update the foregoing PSK, IKE SA key, and data key.

The IKE SA key herein includes any one or more of the following: a key used by the communication apparatus 1 to encrypt the IKE protocol-based packet, a key used by the communication apparatus 1 to perform integrity verification on the IKE protocol-based packet, a key used by the communication apparatus 1 to calculate an auth payload in the IKE protocol-based packet, a key used by the communication apparatus 2 to encrypt the IKE protocol-based packet, a key used by the communication apparatus 2 to perform integrity verification on the IKE protocol-based packet, and a key used by the communication apparatus 2 to calculate the auth payload in the IKE protocol-based packet.

The data key herein may be an Internet protocol security (IPsec) SA key. In an example, the IPsec SA key may include an integrity verification key for performing integrity verification on an authentication header (AH). In another example, the IPsec SA key may include an integrity verification key and a cipher key. The integrity verification key is for performing integrity verification on an encapsulating security payload, and the cipher key is for encrypting the encapsulating security payload.

With reference to FIG. 6, the following describes a method for updating a PSK, an IKE SA key, and a data key by using an IKE protocol-based packet.

FIG. 6 is a signaling exchange diagram of a key updating method according to an embodiment of this application. The method 300 shown in FIG. 6 may be performed by a communication apparatus 1 and a communication apparatus 2. For the communication apparatus 1 and the communication apparatus 2, refer to the descriptions of the communication apparatus 1 and the communication apparatus 2 in the method 100. Repeated descriptions are omitted herein.

The method 300 shown in FIG. 6 may be, for example, implemented by performing the following S301 to S309.

S301: The communication apparatus 1 sends a packet 1 to the communication apparatus 2, where the packet 1 indicates that the communication apparatus 1 supports a key update.

In this embodiment of this application, the packet 1 may be an IKE protocol-based packet. In an implementation of this embodiment of this application, the packet 1 may carry indication information 1 indicating that the communication apparatus 1 supports a PSK update.

In an implementation of this embodiment of this application, the indication information 1 may be carried in a notification payload of the IKE protocol-based packet. For the notification payload, refer to FIG. 7a. FIG. 7a is a schematic diagram of a structure of the notification payload field according to this embodiment of this application. For fields shown in FIG. 7a, refer to related descriptions in RFC 7296. Details are not described herein.

In an example of this embodiment of this application, a new notify message type may be defined to indicate a PSK update capability. For example, a new notify message type, namely, PSK update supported (psk_update_supported), is defined. When the notify message type in the notification payload field indicates psk_update_supported, the notification payload carries the indication information 1 indicating that the communication apparatus 1 supports the PSK update. In an example, when the notification payload of the packet 1 carries the indication information 1, a value of the notify message type may be greater than or equal to 16439 because meanings of 16438 and values less than 16438 have been clearly defined by the IETF. For example, the value of the notify message type may be 16439. In this case, a notification data field may carry a PSK update mode, or may be null. This is not specifically limited in this embodiment of this application. When the notification data field carries the PSK update mode, the notification data field may be that shown in FIG. 7b. FIG. 7b is a schematic diagram of a structure of the notification data field according to this embodiment of this application. As shown in FIG. 7b, the notification data field includes a key type bit information (keytypebitmap) field, a key material type field, a reserved field, and a key ID field.

The keytypebitmap field indicates a key type that supports being updated by using a symmetric key algorithm. In an example, the keytypebitmap field indicates whether to support updating a PSK by using the symmetric key algorithm. The keytypebitmap field is optional.

The key material type field indicates the PSK update mode. There may be three PSK update modes. In a first mode, a PSK is derived by using a conventional IKE SA key derivation method or a conventional IPsec SA key derivation algorithm. In a second mode, an updated PSK is derived by using an obtained PSK key material 1. In a third mode, an updated PSK is directly obtained. In an example, when a value of the key material type field is 1, it indicates to update the PSK in the first mode; when a value of the key material type field is 2, it indicates to update the PSK in the second mode; when a value of the key material type field is 3, it indicates to update the PSK in the third mode.

The key material length field carries a length, and indicates a length (for example, a number of bytes) of a key data field.

The key ID field carries an ID of the updated PSK, and the ID of the updated PSK is also an ID of the PSK key material 1.

In an implementation of this embodiment of this application, the packet 1 may carry indication information 1' indicating that the communication apparatus 1 supports an IKE SA key update.

In an implementation of this embodiment of this application, the indication information 1' may be carried in a notification payload of the IKE protocol-based packet. For the notification payload, refer to FIG. 7a.

In an example of this embodiment of this application, a new notify message type may be redefined to indicate an IKE SA key update capability. For example, a notify message type, namely, IKE SA key update supported (IKE-SA_update_supported), is redefined. When the notify message type in the notification payload field indicates IKESA_update_supported, the notification payload carries the indication information 1' indicating that the communication apparatus 1 supports the IKE SA key update. In an example, when the notification payload of the packet 1 carries the indication information 1', a value of the notify message type may be greater than or equal to 16439 because meanings of 16438 and values less than 16438 have been clearly defined by the IETF. For example, the value of the notify message type may be 16440. In an example, when the notification payload carries the indication information 1', a notification data field includes a keytypebitmap field shown in FIG. 7b. In an example, the keytypebitmap field indicates whether to support updating an IKE SA key by using a symmetric key algorithm.

In an implementation of this embodiment of this application, the packet 1 may carry indication information 1" indicating that the communication apparatus 1 supports a data key update.

In an implementation of this embodiment of this application, the indication information 1" may be carried in a notification payload of the IKE protocol-based packet. For the notification payload, refer to FIG. 7a.

In an example of this embodiment of this application, a new notify message type may be redefined to indicate a data key update capability. For example, a notify message type, namely, data key update supported (datakey_update_supported), is redefined. When the notify message type in the notification payload field indicates datakey_update_supported, the notification payload carries the indication information 1" indicating that the communication apparatus 1 supports the data key update. In an example, when the notification payload of the packet 1 carries the indication information 1", a value of the notify message type may be greater than or equal to 16439 because meanings of 16438 and values less than 16438 have been clearly defined by the IETF. For example, the value of the notify message type may be 16441. In an example, when the notification payload carries the indication information 1", a notification data field includes a keytypebitmap field shown in FIG. 7b. In an example, the keytypebitmap field indicates whether to support updating a data key by using a symmetric key algorithm.

It should be noted that, in this embodiment of this application, the values of the notify message types corresponding to the notification payloads that respectively carry the indication information 1, the indication information 1', and the indication information 1" may be the same. For example, the value of the notify message type is 16439, to indicate that the key update is supported. In this case, the notification data field includes the keytypebitmap field shown in FIG. 7b, and a key type whose update is supported by the communication apparatus 1 may be further determined based on the value of the keytypebitmap field. In an example, the keytypebitmap field may include one byte. One bit, for example, the first bit, in the keytypebitmap field indicates whether to support updating the PSK by using the symmetric key algorithm. One bit, for example, the second bit, in the keytypebitmap field indicates whether to support updating the IKE SA key by using the symmetric key algorithm. One bit, for example, the third bit, in the keytypebitmap field indicates whether to support updating the data key by using the symmetric key algorithm.

It should be noted that the packet 1 in S301 may be an IKE initial exchange (init exchange) packet, an IKE authentication exchange (auth exchange) packet, an IKE create child security association exchange (create child SA exchange) packet, or an IKE informational exchange packet.

S302: The communication apparatus 2 sends a packet 2 to the communication apparatus 1, where the packet 2 indicates that the communication apparatus 2 supports the key update.

In this embodiment of this application, the packet 2 may be an IKE protocol-based packet. In an example, the packet 2 may carry indication information 2 indicating that the communication apparatus 2 supports the PSK update.

In an implementation of this embodiment of this application, the indication information 2 may be carried in a notification payload of the IKE protocol-based packet. For the notification payload, refer to FIG. 7a, FIG. 7b, and the foregoing descriptions of FIG. 7a and FIG. 7b. Repeated descriptions are omitted herein.

In an example, the packet 2 may carry indication information 2' indicating that the communication apparatus 2 supports the IKE SA key update.

In an implementation of this embodiment of this application, the indication information 2' may be carried in a notification payload of the IKE protocol-based packet. For the notification payload, refer to FIG. 7a, FIG. 7b, and the foregoing descriptions of FIG. 7a and FIG. 7b. Repeated descriptions are omitted herein.

In an example, the packet 2 may carry indication information 2" indicating that the communication apparatus 2 supports the data key update.

In an implementation of this embodiment of this application, the indication information 2" may be carried in a notification payload of the IKE protocol-based packet. For the notification payload, refer to FIG. 7a, FIG. 7b, and the foregoing descriptions of FIG. 7a and FIG. 7b. Repeated descriptions are omitted herein.

Similar to the packet 1 in S301, the packet 2 in S302 may be an IKE init exchange packet, an IKE auth exchange packet, an IKE create child SA exchange packet, or an IKE informational exchange packet.

S303: The communication apparatus 1 obtains a key material 1 for obtaining an updated key.

In an example, the key material 1 may include the PSK key material 1 for generating the updated PSK. In another example, the key material 1 may include an IKE SA key material 1 for generating an updated IKE SA key. In still another example, the key material 1 may include a data key material 1 for generating an updated data key.

During specific implementation of S303, for example, the communication apparatus 1 may generate the key material 1. For example, the communication apparatus 1 may generate one nonce, and use the nonce as the key material 1. For another example, the communication apparatus 1 may generate one nonce, then perform calculation on the nonce by using a pre-determined calculation method, and determine a calculation result as the key material 1. In another example, the key material 1 may be preconfigured on the communication apparatus 1, and the communication apparatus 1 may obtain the key material 1 preconfigured on the communication apparatus 1.

S304: The communication apparatus 1 obtains the updated key by using the key material 1, and stores the updated key.

In this embodiment of this application, when the key material includes the PSK key material 1, the communication apparatus 1 may generate the updated PSK by using the PSK key material 1. In this embodiment of this application, the communication apparatus 1 may generate an updated PSK 2 based on the PSK key material 1 in at least two calculation manners.

In an example, the communication apparatus 1 may calculate the updated PSK 2 by using the following formula (18) and formula (19):

$$\{SK\_d|SK\_ai|SK\_ar|SK\_ei|SK\_er|SK\_pi|SK\_pr|PSK2\}=prf{+}(SKEYSEED, Ni|Nr|SPIi|SPIr) \quad \text{formula (18)}$$

$$SKEYSEED=prf(Ni|Nr,g\hat{\ }ir) \quad \text{formula (19)}$$

In the formula (18) and the formula (19): prf and prf+ are key derivation algorithms. In the formula (18), one more time of iteration is performed on the basis of original IKE SA key derivation to derive PSK2 on the left side of the formula (18).

For the formula (18) and the formula (19), refer to descriptions in "2.14. Generating Keying Material for the IKE SA" in RFC 7296. Details are not described herein. In another example, the communication apparatus 1 may derive the updated PSK 2 by using the following formula (20):

$$PSK2=prf{+}(SKEYSEED, Key\ ID|key\ material|SPIi|SPIr) \quad \text{formula (20)}$$

In the formula (20): SKEYSEED may be calculated according to the formula (19), where for the formula (19), refer to the descriptions in "2.14. Generating Keying Material for the IKE SA" in RFC 7296, and details are not described herein; key ID is the key ID of the PSK key material 1 and the key ID of the updated PSK 2; key material is the PSK key material 1; and SPIi represents "IKE SA initiator's security parameter indexes (initiator's security parameter indexes, SPIi)" in an IKE protocol-based packet header, and SPIr represents "IKE SA responder's security parameter indexes (SPIi)", where for SPIi and SPIr, refer to related descriptions in RFC 7296, and details are not described herein.

In this embodiment of this application, when the key includes the IKE SA key material 1, the communication apparatus 1 may generate an updated IKE SA key by using the IKE SA key material 1. In this embodiment of this application, the communication apparatus 1 may calculate the updated IKE SA key based on the IKE SA key material 1 by using the following formula (21) and formula (22):

$$SKEYSEED=prf(Ni|Nr,g\hat{ }ir) \qquad \text{formula (21)}$$

$$\{SK\_d|SK\_ai|SK\_ar|SK\_ei|SK\_er|SK\_pi|SK\_pr\}=prf+ \\ (SKEYSEED,Ni|Nr|SPIi|SPIr) \qquad \text{formula (22)}$$

In the formula (21): a value of $g\hat{ }ir$ is the IKE SA key material 1.

It should be noted that because the IKE SA key material 1 is carried in a packet 3, the packet 3 needs to be encrypted and integrity-protected to prevent an attacker from obtaining the IKE SA key material 1 and generating the same key. In this case, if a cipher key for encrypting the packet 3, an integrity verification key, and the like are derived based on the IKE SA key material 1 carried in the packet 3, the communication apparatus 2 cannot obtain the IKE SA key material 1 before decrypting the packet 3, and consequently cannot calculate the cipher key and the integrity verification key. Therefore, IKE SA keys on which the packet 3 and a subsequent packet 4 rely may be obtained in the following two scenarios:

In an initial identity authentication (where no other IKE SA key is available when a device is powered on and IKE is enabled) scenario, the PSK negotiated by using the packet 1 and the packet 2 may be directly used as SKEYSEED, and then a temporary IKE SA key is derived through calculation by using the formula (22) to protect the packet 3 and the packet 4.

In an IKE re-authentication scenario and an IKE SA rekey scenario, the formula (21) and the formula (22) may be used, and then an IKE SA key material 1' negotiated by using an IKE SA key that is currently in use is used as $g\hat{ }ir$ in the formula (21).

If the packet 1 and the packet 2 are IKE init exchange packets, IKE auth exchange packets, or IKE create child SA exchange packets, Ni is a nonce carried in the packet 1, Nr is a nonce carried in the packet 2, SPIT is carried in a packet header of the packet 1, and SPIr is carried in a packet header of the packet 2.

If the packet 1 and the packet 2 are IKE informational exchange packets, Ni, Nr, SPIT, and SPIr are Ni, Nr, SPIT, and SPIr that correspond to an IKE SA key currently used by the communication apparatus 1.

SK_d is a key for deriving a data key.

SK_ai is a key used by the communication apparatus 1 to perform integrity verification on the IKE protocol-based packet sent to the communication apparatus 2.

SK_ar is a key used by the communication apparatus 2 to perform integrity verification on the IKE protocol-based packet sent to the communication apparatus 1.

SK_ei is a key used by the communication apparatus 1 to encrypt the IKE protocol-based packet sent to the communication apparatus 2.

SK_er is a key used by the communication apparatus 2 to encrypt the IKE protocol-based packet sent to the communication apparatus 1.

SK_pi is a key used by the communication apparatus 1 to calculate an auth payload in the IKE protocol-based packet.

SK_pr is a key used by the communication apparatus 2 to calculate an auth payload in the IKE protocol-based packet.

For SK_d, SK_ai, SK_ar, SK_ei, SK_er, SK_pi, and SK_pr, refer to related descriptions in RFC 7296. Details are not described herein.

In this embodiment of this application, when the key includes the data key material 1, the communication apparatus 1 may generate the updated data key by using the data key material 1. In this embodiment of this application, the communication apparatus 1 may generate an updated IPsec SA key based on the data key material 1 in a plurality of derivation manners. The following describes two possible implementations.

In an example, if the communication apparatus 1 and the communication apparatus 2 enable a perfect forward secrecy (PFS) function, the communication apparatus 1 may calculate the updated data key by using the following formula (23) and formula (24):

$$KEYMAT=prf+(SK\_d,g\hat{ }ir|Ni|Nr) \qquad \text{formula (23)}$$

In the formula (23): KEYMAT is a key bit sequence, where after obtaining the key bit sequence, the communication apparatus 1 may obtain the data key from the key bit sequence according to a specification in RFC 7296; a value of $g\hat{ }ir$ is the data key material 1; SK_d is a key for deriving the data key, and may be derived by using the following formula (24):

$$\{SK\_d|SK\_ai|SK\_ar|SK\_ei|SK\_er|SK\_pi|SK\_pr\}=prf+ \\ (SKEYSEED,Ni|Nr|SPIi|SPIr) \qquad \text{formula (24)}$$

SKEYSEED in the formula (24) may be calculated by using the following formula (25):

$$SKEYSEED=prf(Ni|Nr,g\hat{ }ir) \qquad \text{formula (25)}$$

A value of $g\hat{ }ir$ in the formula (25) may be the data key material 1.

In another example, if the communication apparatus 1 and the communication apparatus 2 do not enable a PFS function, the communication apparatus 1 may calculate the updated data key by using the following formula (26):

$$KEYMAT=prf+(SK\_d,Ni|Nr) \qquad \text{formula (26)}$$

In the formula (26): KEYMAT is a key bit sequence, where after obtaining the key bit sequence, the communication apparatus 1 may obtain the data key from the key bit sequence according to a specification in RFC 7296.

SK_d in the formula (26) may be derived by using the formula (22). For related content, refer to the foregoing descriptions of the formula (22). Repeated descriptions are omitted herein.

In another implementation of this embodiment of this application, the communication apparatus 1 may directly determine the key material 1 as the updated key. For example, the communication apparatus 1 may determine the PSK key material 1 as an updated PSK 2. For another example, the communication apparatus 1 may determine the IKE SA key material 1 as an updated IKE SA key. For still another example, the communication apparatus 1 may determine the data key material 1 as an updated data key.

S305: The communication apparatus 1 obtains the packet 3 including the key material 1.

S306: The communication apparatus 1 sends the packet 3 to the communication apparatus 2.

In this embodiment of this application, the packet 3 may be an IKE protocol-based packet. The communication apparatus 1 may generate the packet 3, and send the packet 3 to the communication apparatus 2, to indicate the communication apparatus 2 to update the key based on the packet 3.

The packet 3 includes the key material 1. In an example, the PSK key material 1 may be carried in a notification payload field. For a structure of the notification payload field, refer to FIG. 7*a*.

In an example of this embodiment of this application, a new notify message type may be redefined to indicate the PSK update. For example, a notify message type, namely, a PSK update (psk_update), is redefined. When the notify message type in the notification payload field indicates psk_update, the notification payload carries the PSK key material 1. In an example, when the notification payload of the packet 3 carries the PSK key material 1, a value of the notify message type may be greater than or equal to 16439 because meanings of 16438 and values less than 16438 have been clearly defined by the IETF. For example, the value of the notify message type may be 16442. In this case, a notification data field may carry the PSK key material 1. For the notification data field, refer to FIG. 7*c* for understanding. FIG. 7*c* is a schematic diagram of a structure of the notification data field according to this embodiment of this application. As shown in FIG. 7*c*, the notification data field includes a key type field, a key material type field, a key material length field, a key ID field, and a key data field.

The key type field indicates a key type corresponding to the key material carried in the current notification payload. For example, when a value of the key type field is 1, it indicates that the carried key material type is a PSK. The field is optional.

For the key material type field, refer to the foregoing descriptions of the key material type field in FIG. 7*b*. Details are not described herein again. It should be noted that, if the packet 1 includes the key material type field, the packet 3 may not include the key material type field because the packet 1 has indicated the PSK update mode. If the packet 1 does not include the key material type field, the packet 3 may include the key material type field to indicate the PSK key update mode. The key material length field carries a length, and indicates a length (for example, a number of bytes) of the key data field.

The key ID field carries the ID of the PSK key material 1.

The key data field carries the PSK key material 1.

In another example of this embodiment of this application, a new payload field may be extended to carry the PSK key material 1. In an example, a key distribute payload may be extended to carry the PSK key material 1. FIG. 7*d* is a schematic diagram of a structure of the key distribute payload according to this embodiment of this application. For the first four fields shown in FIG. 7*d*, refer to related descriptions in RFC 7296. Details are not described herein. For a key type field, a key material type field, a key material length field, a key ID field, and a key data field shown in FIG. 7*d*, refer to the foregoing descriptions of FIG. 7*c*. Repeated descriptions are omitted herein.

In an example, the packet 3 includes the IKE SA key material 1. In an example, the IKE SA key material 1 may be carried in a notification payload field. For a structure of the notification payload field, refer to FIG. 7*a*.

In an example of this embodiment of this application, a new notify message type may be redefined to indicate the IKE SA key update. For example, a notify message type, namely, an IKE SA update (IKESA_update), is redefined. When the notify message type in the notification payload field indicates IKESA_update, the notification payload carries the IKE SA key material 1. In an example, when the notification payload of the packet 3 carries the IKE SA key material 1, a value of the notify message type may be greater than or equal to 16439 because meanings of 16438 and values less than 16438 have been clearly defined by the IETF. For example, the value of the notify message type may be 16443. In this case, a notification data field may carry the IKE SA key material 1. The notification data field may include a key type field, a key material length field, a key ID field, and a key data field shown in FIG. 7*c*.

The key type field indicates a key material type carried in the current notification payload. For example, when a value of the key type field is 2, it indicates that the carried key material type is an IKE SA key. The field is optional.

The key material length field carries a length, and indicates a length (for example, a number of bytes) of the key data field.

The key ID field carries an ID of the IKE SA key material 1.

The key data field carries the IKE SA key material 1.

In another example of this embodiment of this application, a new payload field may be extended to carry the IKE SA key material 1. In an example, a key distribute payload may be extended to carry the IKE SA key material 1. For the key distribute payload, refer to FIG. 7*d* and the foregoing descriptions of FIG. 7*d*. Repeated descriptions are omitted herein.

In an example, the packet 3 includes the data key material 1. In an example, the data key material 1 may be carried in a notification payload field. For a structure of the notification payload field, refer to FIG. 7*a*.

In an example of this embodiment of this application, a new notify message type may be redefined to indicate the data key update. For example, a notify message type, namely, a data key update (datakey_update), is redefined. When the notify message type in the notification payload field indicates datakey_update, the notification payload carries the data key material 1. In an example, when the notification payload of the packet 3 carries the data key material 1, a value of the notify message type may be greater than or equal to 16439 because meanings of 16438 and values less than 16438 have been clearly defined by the IETF. For example, the value of the notify message type may be 16444. In this case, a notification data field may carry the data key material 1. The notification data field may include a key type field, a key material length field, a key ID field, and a key data field shown in FIG. 7*c*.

The key type field indicates a key material type carried in the current notification payload. For example, when a value of the key type field is 3, it indicates that the carried key material type is a data key. The field is optional.

The key material length field carries a length, and indicates a length (for example, a number of bytes) of the key data field.

The key ID field carries an ID of the data key material 1.

The key data field carries the data key material 1.

In another example of this embodiment of this application, a new payload field may be extended to carry the data key material 1. In an example, a key distribute payload may be extended to carry the data key material 1. For the key distribute payload, refer to FIG. 7*d* and the foregoing descriptions of FIG. 7*d*. Repeated descriptions are omitted herein.

It should be noted that, in this embodiment of this application, the values of the notify message types corresponding to the notification payloads that respectively carry the PSK key material 1, the IKE SA key material 1, and the data key material 1 may be the same. For example, the value of the notify message type is 16442, to indicate that the key update is supported. In this case, the notification data field includes a key type field shown in FIG. 7d, and the key type that the communication apparatus 1 indicates to update may be further determined based on a value of the key type field. In an example, when a value of the key type field is 1, it indicates that the carried key type or key material type is a PSK; when a value of the key type field is 2, it indicates that the carried key type or key material type is an IKE SA key; when a value of the key type field is 3, it indicates that the carried key type or key material type is a data key.

It should be noted that the packet 3 in S305 may be an authentication exchange (IKE auth exchange) packet, a create child security association exchange (create child SA exchange) packet, or an informational exchange packet.

For a sequence of performing steps S303 to S306, it should be noted that in this embodiment of this application, if the packet 3 carries the key material 1 for generating the updated key, the communication apparatus 1 may generate the packet 3 including the key material 1 after obtaining the key material 1, and send the packet 3 to the communication apparatus 2, and S305 does not need to be performed after S304 is completed. If the key material 1 carried in the packet 3 is the updated key, after generating the updated key, the communication apparatus 1 needs to generate, based on the updated key, the packet 3 carrying the updated key, and further send the packet 3 to the communication apparatus 2.

S307: The communication apparatus 2 obtains the updated key, and stores the updated key.

After receiving the packet 3, the communication apparatus 2 may obtain the updated key based on the packet 3.

In an example, if the PSK key material 1 carried in the packet 3 is the updated PSK 2, the communication apparatus 2 may directly parse the packet 3, and extract the updated PSK 2 carried in the packet 3. In another example, if the packet 3 carries the PSK key material 1 for generating the PSK 2, after obtaining the PSK key material 1, the communication apparatus 2 may derive the updated PSK by using a key derivation algorithm and the PSK key material 1. After obtaining the updated PSK 2, the communication apparatus 2 may store the updated PSK 2 in a non-volatile memory area of the communication apparatus 2. For a specific implementation of deriving the updated PSK by the communication apparatus 2, refer to the related descriptions in S304. Details are not described herein again.

In an example, if the IKE SA key material 1 carried in the packet 3 is the updated IKE SA key, the communication apparatus 2 may directly parse the packet 3, and extract the updated IKE SA key carried in the packet 3. In another example, if the packet 3 carries the IKE SA key material 1 for generating the IKE SA key, after obtaining the IKE SA key material 1, the communication apparatus 2 may derive the updated IKE SA key by using a key derivation algorithm and the IKE SA key material 1. After obtaining the updated IKE SA key, the communication apparatus 2 may store the updated IKE SA key. For a specific implementation of deriving the updated IKE SA key by the communication apparatus 2, refer to the related descriptions in S304. Details are not described herein again.

In an example, if the data key material 1 carried in the packet 3 is the updated data key, the communication apparatus 2 may directly parse the packet 3, and extract the updated data key carried in the packet 3. In another example, if the packet 3 carries the data key material 1 for generating the data key, after obtaining the data key material 1, the communication apparatus 2 may derive the updated data key by using a key derivation algorithm and the data key material 1. After obtaining the updated data key, the communication apparatus 2 may store the updated data key. For a specific implementation of deriving the updated data key by the communication apparatus 2, refer to the related descriptions in S304. Details are not described herein again.

S308: The communication apparatus 2 obtains the packet 4 carrying a key update result.

S309: The communication apparatus 2 sends the packet 4 to the communication apparatus 1.

In this embodiment of this application, the packet 4 may be an IKE protocol-based packet. The communication apparatus 2 may generate the packet 4, and send the packet 4 to the communication apparatus 1. The packet 4 carries the key update result, and the key update result is a result of updating the key by the communication apparatus 2. In other words, the key update result in the packet 4 may indicate whether the communication apparatus 2 has successfully updated the key. The successfully updating the key herein means successfully storing the updated key. When the updated key is the PSK, successfully updating the PSK means successfully storing the updated PSK 2 in the non-volatile memory area of the communication apparatus 2.

In an implementation of this embodiment of this application, the key update result may be carried in a notification payload of the IKE protocol-based packet. For the notification payload, refer to FIG. 7a. For fields shown in FIG. 7a, refer to related descriptions in RFC 7296. Details are not described herein.

In an example of this embodiment of this application, a new notify message type may be redefined to carry the key update result.

In an example, if the packet 3 indicates the communication apparatus 2 to update the PSK, the packet 4 may carry a PSK update result. In an example, a notify message type, namely, a PSK update result (result_PSK_update), may be redefined. When the notify message type in the notification payload field indicates result_PSK_update, the notification payload carries the PSK update result. In an example, when the notification payload of the packet 4 carries the PSK update result, a value of the notify message type may be greater than or equal to 16439 because meanings of 16438 and values less than 16438 have been clearly defined by the IETF. For example, the value of the notify message type may be 16445. For a notification data field, refer to FIG. 7e for understanding. FIG. 7e is a schematic diagram of a structure of the notification data field according to this embodiment of this application. As shown in FIG. 7e, the notification data field includes a key type field, a key material type field, a result field, a key ID field, and a result data field.

For the key type field, the key material type field, and the key ID field, refer to the foregoing related descriptions of FIG. 7c. Repeated descriptions are omitted herein.

The result field carries the PSK update result, and the PSK update result may be a success, a failure, or discarding.

The result data field is optional. In an example, when the PSK fails to be updated, the result data field may carry a reason for the PSK update failure. The reason for the PSK update failure may be, for example, a derivation failure or a storage failure.

In an example, if the packet 3 indicates the communication apparatus 2 to update the IKE SA key, the packet 4 carries an IKE SA key update result. In an example, a notify message type, namely, an IKE SA key update result (result_KESA_update), may be redefined. When the notify message type in the notification payload field indicates result_KESA_update, the notification payload carries the IKE SA key update result. In an example, when the notification payload of the packet 4 carries the IKE SA key update result, a value of the notify message type may be greater than or equal to 16439 because meanings of 16438 and values less than 16438 have been clearly defined by the IETF. For example, the value of the notify message type may be 16446. For the notification data field, refer to FIG. 7e for understanding. Repeated descriptions are omitted herein. It should be noted that, when the notification data field carries the IKE SA key update result, a result field carries the IKE SA key update result, and the IKE SA key update result may be a success, a failure, or discarding. A result data field is optional. In an example, when the IKE SA key fails to be updated, the result data field may carry a reason for the IKE SA key update failure. The reason for the IKE SA key update failure may be, for example, a derivation failure or a storage failure.

In an example, if the packet 3 indicates the communication apparatus 2 to update the data key, the packet 4 may carry a data key update result. In an example, a notify message type, namely, a data key update result (result_datakey_update), may be redefined. When the notify message type in the notification payload field indicates result_datakey_update, the notification payload carries the data key update result. In an example, when the notification payload of the packet 4 carries the data key update result, a value of the notify message type may be greater than or equal to 16439 because meanings of 16438 and values less than 16438 have been clearly defined by the IETF. For example, the value of the notify message type may be 16447. For a notification data field, refer to FIG. 7e for understanding. Repeated descriptions are omitted herein. It should be noted that, when the notification data field carries the data key update result, a result field carries the data key update result, and the data key update result may be a success, a failure, or discarding. A result data field is optional. In an example, when the data key fails to be updated, the result data field may carry a reason for the data key update failure. The reason for the data key update failure may be, for example, a derivation failure or a storage failure.

It should be noted that, in this embodiment of this application, the values of the notify message types corresponding to the notification payloads that respectively carry the PSK update result, the IKE SA key update result, and the data key update result may be the same. For example, the value of the notify message type is 16445, and indicates that the notification payload carries the key update result. In this case, the key type field in the notification data field may indicate a key type corresponding to the key result. In an example, when the value of the key type field in the notification data field is 1, it indicates that the notification payload carries the PSK update result. When the value of the key type field in the notification data field is 2, it indicates that the notification payload carries the IKE SA key update result. When the value of the key type field in the notification data field is 3, it indicates that the notification payload carries the data key update result.

A packet exchanged between two communication apparatuses may be processed by using a PSK, to ensure data security when the two communication apparatuses perform data exchange. For example, when a first communication apparatus and a second communication apparatus perform identity authentication, an authentication packet exchanged between the first communication apparatus and the second communication apparatus is processed by using a key derived from the PSK.

In some embodiments, the PSK has a specific aging periodicity. A communication apparatus, for example, the first communication apparatus, may process, by using the PSK within the aging periodicity of the PSK, the packet exchanged between the first communication apparatus and the second communication apparatus. Currently, if the first communication apparatus cannot process, by using the PSK within the aging periodicity of the PSK, the packet exchanged between the first communication apparatus and the second communication apparatus, the first communication apparatus and the second communication apparatus may fail to communicate with each other normally.

To resolve this problem, an embodiment of this application provides a PSK processing method. The first communication apparatus and the second communication apparatus can communicate with each other normally even if the first communication apparatus cannot process, by using a first PSK within an aging periodicity of the first PSK, a packet exchanged between the first communication apparatus and the second communication apparatus.

The PSK processing method provided in embodiments of this application may be performed by a communication apparatus 1 or a communication apparatus 2. The following provides descriptions by using an example in which the communication apparatus 2 performs the PSK processing method.

The communication apparatus 2 stores a PSK 1, and may process, based on the PSK 1 within an aging periodicity of the PSK 1, a packet exchanged between the communication apparatus 1 and the communication apparatus 2. For example, the processing, based on the PSK 1, a packet exchanged between the communication apparatus 1 and the communication apparatus 2 may be: A cipher key and an integrity verification key are derived based on the PSK 1; when a packet for identity authentication is transmitted between the communication apparatus 1 and the communication apparatus 2, the communication apparatus 2 encrypts, based on the cipher key derived from the PSK 1, the packet for identity authentication, and the communication apparatus 2 performs, based on the integrity verification key derived from the PSK 1, integrity verification on the packet for identity authentication.

Correspondingly, the communication apparatus 1 also stores the PSK 1, and may process, based on the PSK 1 within the aging periodicity of the PSK 1, the packet exchanged between the communication apparatus 1 and the communication apparatus 2.

The PSK processing method may include the following steps A and B.

Step A: The communication apparatus 2 determines, within the aging periodicity of the PSK 1, that the communication apparatus 2 cannot process, based on the PSK 1, the packet exchanged between the communication apparatus 1 and the communication apparatus 2.

In this embodiment of this application, the PSK 1 may be stored in a non-volatile memory area of the communication apparatus 2. When the communication apparatus 2 needs to process, by using the PSK 1, the packet exchanged between the communication apparatus 1 and the communication apparatus 2, the communication apparatus 2 may read the PSK 1 from the non-volatile memory area, and further process, by using the read PSK 1, the packet exchanged between the communication apparatus 1 and the communication apparatus 2. In an example, if the communication apparatus 2 fails to read the PSK 1 from the non-volatile memory area, the communication apparatus 2 may determine that the packet exchanged between the communication apparatus 1 and the communication apparatus 2 cannot be processed based on the PSK 1. A reason why the communication apparatus 2 fails to read the PSK 1 from the non-volatile memory area is not specifically limited in this embodiment of this application. In an example, the reason why the communication apparatus 2 fails to read the PSK 1 from the non-volatile memory area may be that the non-volatile memory area is damaged.

Step B: The communication apparatus 2 processes, based on a PSK 2 locally stored in the communication apparatus 2, the packet exchanged between the communication apparatus 1 and the communication apparatus 2.

In this embodiment of this application, the communication apparatus 2 may further locally store the PSK 2 in addition to the PSK 1. The PSK 2 may also be stored in a non-volatile memory area of the communication apparatus 2. For example, the communication apparatus 2 includes two non-volatile memory areas: a non-volatile memory area 1 and a non-volatile memory area 2. The non-volatile memory area 1 stores the PSK 1, and the non-volatile memory area 2 stores the PSK 2.

It may be understood that normal communication between the communication apparatus 1 and the communication apparatus 2 may be affected if the communication apparatus 2 cannot process, by using the PSK 1, the packet exchanged between the communication apparatus 1 and the communication apparatus 2. For example, the communication apparatus 2 expects to perform identity authentication with the communication apparatus 1 by using an authentication key derived from the PSK 1. However, due to a failure to read the PSK 1 or another reason, the communication apparatus 2 cannot perform identity authentication with the communication apparatus 1 by using the authentication key derived from the PSK 1. In this case, the identity authentication may fail to be normally performed, and correspondingly, the communication apparatus 2 cannot normally communicate with the communication apparatus 1. To avoid this problem, in this embodiment of this application, the communication apparatus 2 may process, by using the PSK 2, the packet exchanged between the communication apparatus 1 and the communication apparatus 2, so that the communication apparatus 1 and the communication apparatus 2 can normally communicate with each other.

In this embodiment of this application, for example, during specific implementation in which the communication apparatus 2 processes, by using the PSK 2, the packet exchanged between the communication apparatus 1 and the communication apparatus 2, the communication apparatus 2 may derive a key by using the PSK 2, and process, by using the derived key, the packet exchanged between the communication apparatus 1 and the communication apparatus 2.

In an example, the communication apparatus 2 may derive an authentication key by using the PSK 2, and process, by using the authentication key, a packet 1 exchanged between the communication apparatus 1 and the communication apparatus 2, where the packet 1 is for performing identity authentication on the communication apparatus 2. The authentication key may include one or more of a cipher key, an integrity verification key, and an identity authentication key. The cipher key may be for encrypting crucial information in an authentication packet, the integrity verification key may be for performing integrity verification on the authentication packet, and the identity authentication key may be for calculating identity authentication information in the authentication packet. In this embodiment of this application, the communication apparatus 1 may perform identity authentication by using the EAP-PSK protocol, for example, perform identity authentication by using the foregoing method 100. The communication apparatus 1 may alternatively perform identity authentication by using the IKE protocol. This is not specifically limited in this embodiment of this application.

In another example, the communication apparatus 2 may derive a key by using the PSK 2, and process, by using the derived key, a packet 2 exchanged between the communication apparatus 1 and the communication apparatus 2, where the packet 2 may be for updating the PSK 1 stored in the communication apparatus 2. For example, the communication apparatus 2 may update the PSK by using the foregoing method 100, method 200, or method 300. In an example, after successfully updating the PSK, the communication apparatus 2 may process, by using an updated PSK instead of the PSK 2, the packet exchanged between the communication apparatus 1 and the communication apparatus 2.

For the PSK 2, it should be noted that in an example, the PSK 2 may be generated by the communication apparatus 2 based on a PSK key material 1 within the aging periodicity of the PSK 1. For a specific implementation in which the communication apparatus 2 generates the PSK 2 based on the PSK key material 1 within the aging periodicity of the PSK 1, refer to the related descriptions in the foregoing method 100, method 200, and method 300. Details are not described herein.

In another example, the PSK 2 may be a PSK preconfigured at delivery of the communication apparatus 2. In an example of this embodiment of this application, if the PSK 2 is the PSK preconfigured at delivery of the communication apparatus 2, when there is another available PSK in the communication apparatus 2, the communication apparatus 2 does not use the PSK 2 to process the packet exchanged between the communication apparatus 1 and the communication apparatus 2. In other words, before the communication apparatus 2 determines that the PSK 1 cannot be for processing the packet exchanged between the communication apparatus 1 and the communication apparatus 2, the communication apparatus 2 does not use the PSK 2 to process the packet exchanged between the communication apparatus 1 and the communication apparatus 2.

In some embodiments, the PSK 2 is the PSK preconfigured at delivery of the communication apparatus 2, and the communication apparatus 2 further locally stores a PSK 3 in addition to the PSK 1 and the PSK 2. In this case, after determining that the PSK 1 cannot be for processing the packet exchanged between the communication apparatus 1 and the communication apparatus 2, the communication apparatus 2 first determines whether the communication apparatus 2 locally stores an available PSK in addition to an available PSK in addition to the PSK. If the another available PSK exists, the communication apparatus 2 uses the another available PSK to process the packet exchanged between the communication apparatus 1 and the communication apparatus 2. If no other available PSK exists, the communication apparatus 2 uses the PSK 2 to process the packet exchanged between the communication apparatus 1 and the communication apparatus 2. In an example, the communication apparatus 2 further locally stores the PSK 3 in addition to the PSK 1 and the PSK 2. After determining that the PSK 1 cannot be for processing the packet exchanged between the communication apparatus 1 and the communication apparatus 2, the communication apparatus 2 further determines whether the PSK 3 can be for processing the packet exchanged between the communication apparatus 1 and the communication apparatus 2. After determining that the PSK 3 cannot be for processing the packet exchanged between the communication apparatus 1 and the communication apparatus 2, for example, failing to read the PSK 3 from a non-volatile memory area that stores the PSK 3, the communication apparatus 2 determines to use the PSK 2 to process the packet exchanged between the communication apparatus 1 and the communication apparatus 2.

In an implementation, after determining, within the aging periodicity of the PSK 1, that the packet exchanged between the communication apparatus 1 and the communication apparatus 2 cannot be processed based on the PSK 1, the communication apparatus 2 may send alarm information to a control management device, where the alarm information indicates that the communication apparatus 2 cannot process, based on the PSK 1 within the aging periodicity of the PSK 1, the packet exchanged between the communication apparatus 1 and the communication apparatus 2. This helps operation and maintenance personnel determine a status of the PSK in the communication apparatus 1 based on the alarm information, and determine whether manual intervention is needed. The control management device in this embodiment of this application may be, for example, a device on which network management software is run, or may be, for example, a controller. This is not specifically limited in this embodiment of this application.

Figure 8A:
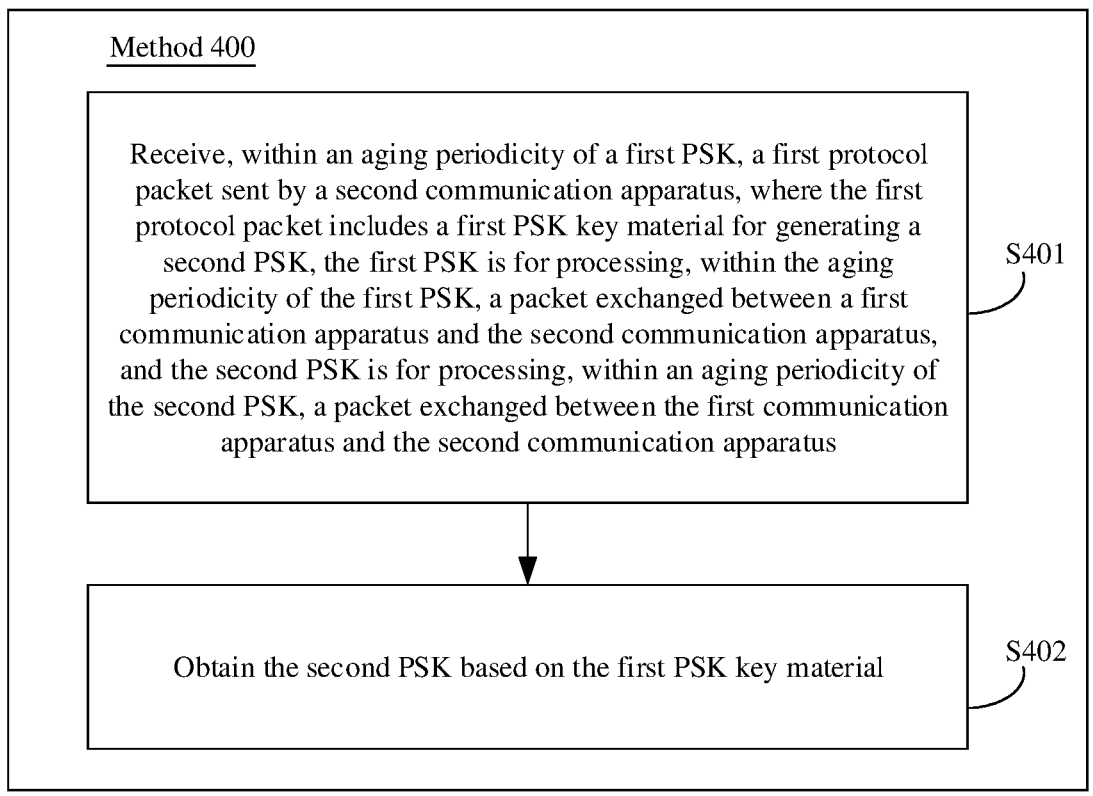
FIG. 8a is a schematic flowchart of a PSK updating method according to an embodiment of this application.

An embodiment of this application further provides a PSK updating method 400. FIG. 8a is a schematic flowchart of the PSK updating method according to this embodiment of this application. The method 400 shown in FIG. 8a may be performed by a first communication apparatus. The first communication apparatus may be the communication apparatus 2 in the foregoing embodiments. The method 400 shown in FIG. 8a may be applied to specifically implement the method 100, the method 200, and the method 300 in the foregoing embodiments, and is for performing the steps performed by the communication apparatus 2 in the foregoing method 100, method 200, and method 300. A second communication apparatus in the method 400 may be the communication apparatus 1 in the foregoing embodiments. The method 400 may include, for example, the following S401 and S402.

S401: Receive, within an aging periodicity of a first PSK, a first protocol packet sent by the second communication apparatus, where the first protocol packet includes a first PSK key material for generating a second PSK, the first PSK is for processing, within the aging periodicity of the first PSK, a packet exchanged between the first communication apparatus and the second communication apparatus, and the second PSK is for processing, within an aging periodicity of the second PSK, a packet exchanged between the first communication apparatus and the second communication apparatus.

S402: Obtain the second PSK based on the first PSK key material.

The first PSK herein may correspond to the PSK 1 in the foregoing method 100, method 200, and method 300. The first protocol packet herein may correspond to the packet 3 in the method 100, the method 200, and the method 300. The first PSK key material herein may correspond to the PSK key material 1 in the method 100, the method 200, and the method 300. The second PSK herein may correspond to the PSK 2 in the method 100, the method 200, and the method 300.

In an implementation, the method further includes: storing the second PSK in a non-volatile memory area of the first communication apparatus.

In an implementation, the obtaining the second PSK based on the first PSK key material includes: obtaining the second PSK based on the first PSK key material and a second PSK key material of the first communication apparatus.

The second PSK key material herein may correspond to the PSK key material 2 in the method 10ft In an implementation, the method further includes: sending a third PSK key material to the second communication apparatus, to enable the second communication apparatus to generate the second PSK based on the third PSK key material.

The third PSK key material herein may correspond to the PSK key material 3 in the method 10ft In an implementation, the obtaining the second PSK based on the first PSK key material includes: determining the first PSK key material as the second PSK.

In an implementation, the obtaining the second PSK based on the first PSK key material includes: obtaining the second PSK based on the first PSK key material and a first key derivation algorithm.

The first key derivation algorithm herein may correspond to the key derivation algorithm 1 in the method 10ft In an implementation, the obtaining the second PSK based on the first PSK key material and a first key derivation algorithm includes: performing calculation on the first PSK key material by using a first algorithm, to obtain an intermediate value; and generating the second PSK based on the intermediate value and the first key derivation algorithm.

The first algorithm herein may correspond to the prf algorithm in the method 300, the intermediate value herein may correspond to SKEYSEED in the method 300, and the first key derivation algorithm herein may correspond to the prf derivation algorithm in the method 300.

In an implementation, the first PSK key material includes a nonce.

In an implementation, the first protocol packet is a PSK-based extensible authentication protocol EAP-PSK packet.

In an implementation, the first protocol packet includes an extended type-length-value TLV field, and the extended TLV field includes the first PSK key material.

In an implementation, the first PSK key material is encrypted in the first protocol packet by using a first key.

Figure 3E:
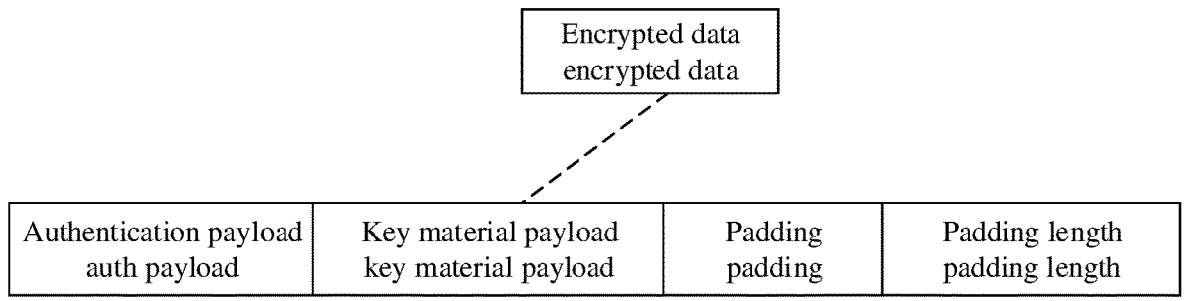
FIG. 3e is a schematic diagram of a structure of a to-be-encrypted field according to an embodiment of this application.
Figure 3F:
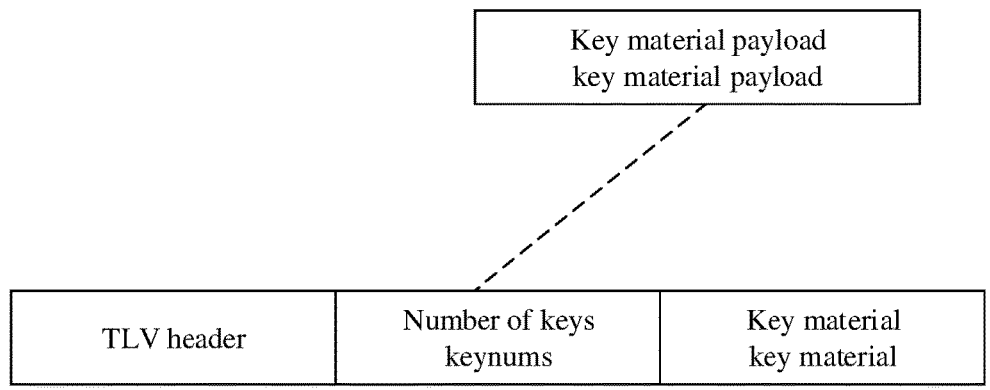
FIG. 3f is a schematic diagram of a key material payload field according to an embodiment of this application.
Figure 3G:
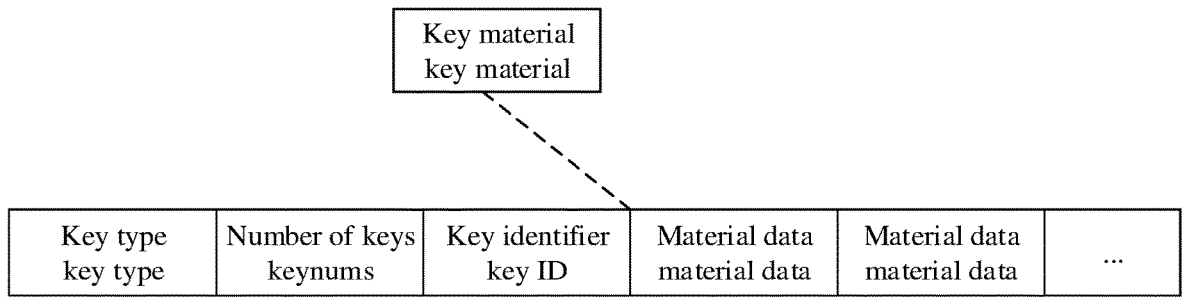
FIG. 3g is a schematic diagram of a key material field according to an embodiment of this application.
Figure 3H:
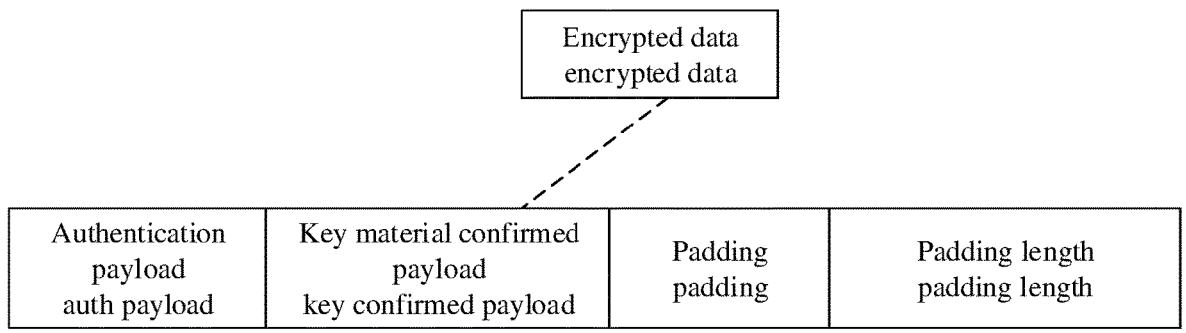
FIG. 3h is a schematic diagram of a structure of a to-be-encrypted field according to an embodiment of this application.
Figure 3I:
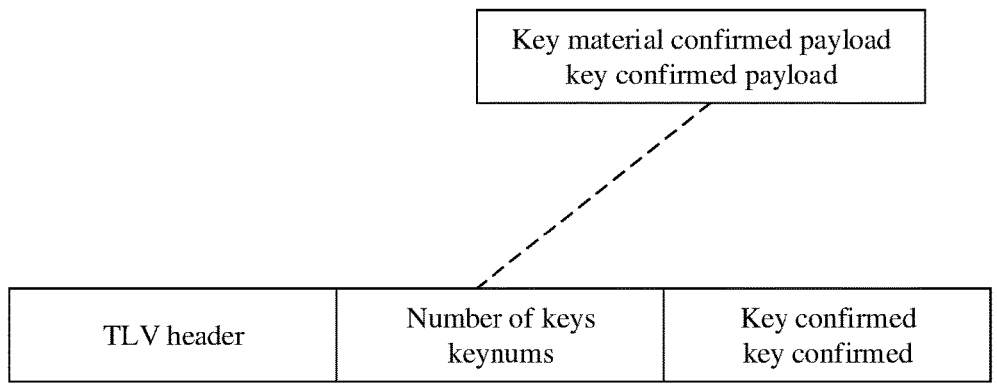
FIG. 3i is a schematic diagram of a key confirmed payload field according to an embodiment of this application.
Figure 3J:
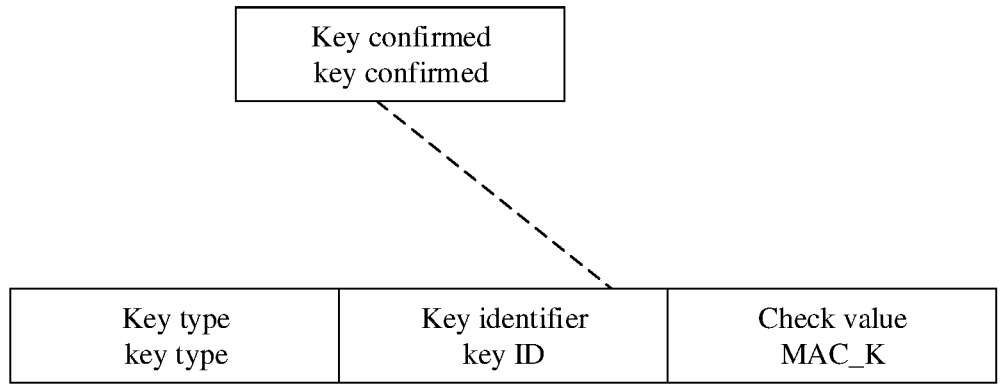
FIG. 3j is a schematic diagram of a key confirmed field according to an embodiment of this application.
Figure 3K:
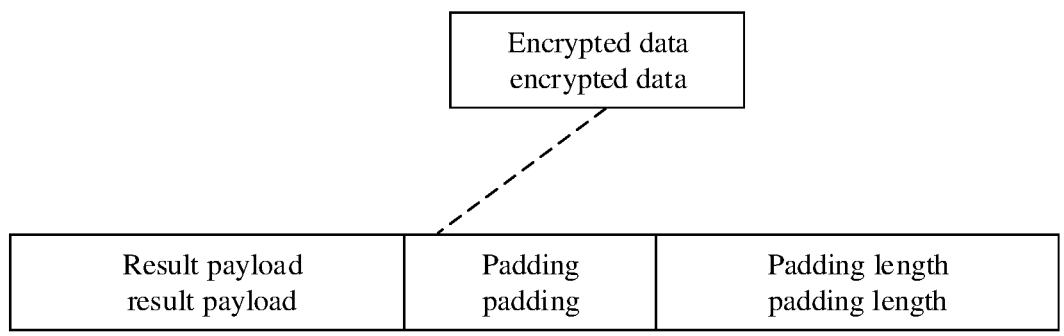
FIG. 3k is a schematic diagram of a structure of a to-be-encrypted field according to an embodiment of this application.
Figure 3L:
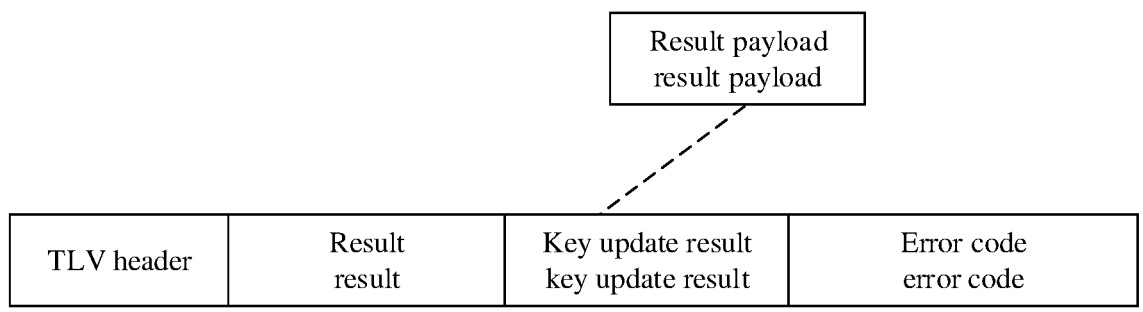
FIG. 3l is a schematic diagram of a result payload field according to an embodiment of this application.
Figures 3N, 3O:
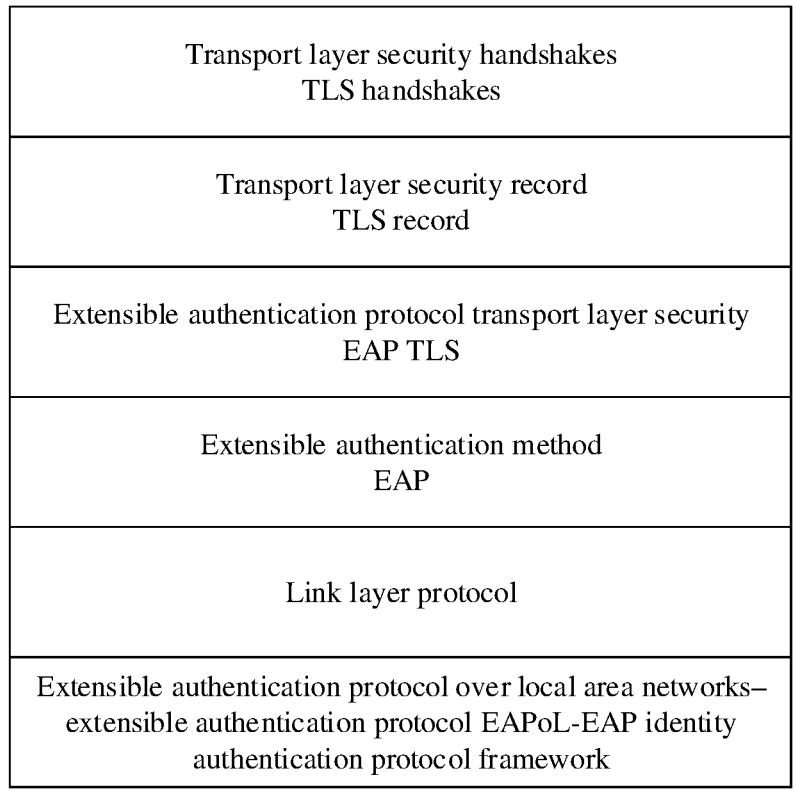
FIG. 3n is a schematic diagram of a structure of a conventional EAP-PSK packet.
FIG. 3o is a schematic diagram of a protocol stack according to an embodiment of this application.

The first key herein may be the foregoing key for encrypting the fields shown in FIG. 3e.

In an implementation, the first protocol packet further includes first integrity verification information, and the first integrity verification information is for performing integrity verification on the first protocol packet.

The first integrity verification information herein may correspond to the value carried in the ICV field of the packet 3 in the method 100.

In an implementation, before the obtaining the second PSK based on the first PSK key material, the method further includes: performing integrity verification on the first protocol packet based on the first integrity verification information.

In an implementation, the first protocol packet carries an identifier of the first key, and the obtaining the second PSK based on the first PSK key material includes: determining the first key based on the identifier of the first key; decrypting the first PSK key material by using the first key; and obtaining the second PSK based on the decrypted first PSK key material.

In an implementation, the first protocol packet includes an identifier of a second key, the identifier of the second key identifies the second key, and the performing integrity verification on the first protocol packet based on the first integrity verification information includes: determining the second key based on the identifier of the second key; and performing integrity verification on the first protocol packet based on the second key and the first integrity verification information.

The second key herein may correspond to AIK in the formula (3) in the method 100.

In an implementation, before the receiving a first protocol packet, the method further includes: sending a second protocol packet to the second communication apparatus, where the second protocol packet carries an identifier of a third key, the identifier of the third key identifies the third key, and the third key is for deriving the first key.

The second protocol packet herein may correspond to the packet 2 in the method 100, and the identifier of the third key may be carried in the key ID field of the packet 2.

In an implementation, before the receiving a first protocol packet, the method further includes: sending a second protocol packet to the second communication apparatus, where the second protocol packet carries an identifier of a third key, the identifier of the third key identifies the third key, the third key is for deriving a second key, and the second key is for calculating the first integrity verification information.

In an implementation, the third key includes the first PSK.

In an implementation, before the sending a second protocol packet to the second communication apparatus, the method further includes: receiving a third protocol packet from the second communication apparatus, where the third protocol packet is for requesting to perform identity authentication on the second communication apparatus.

The third protocol packet herein may correspond to the packet 1 in the method 100.

In an implementation, the third protocol packet carries the identifier of the third key.

In an implementation, the first protocol packet includes first identity authentication information, and the first identity authentication information is for performing identity authentication on the second communication apparatus.

The first identity authentication information herein may correspond to the identity authentication information 1 in the method 100.

In an implementation, the first identity authentication information is encrypted in the first protocol packet by using the first key.

In an implementation, the first identity authentication information is obtained by performing calculation on one or more of the following based on a fourth key: a part or all of fields in the third protocol packet or a part or all of fields in the second protocol packet.

The fourth key herein may correspond to the key 1 in the formula (1) in the method 100.

In an implementation, the method further includes: performing identity authentication on the second communication apparatus by using the first identity authentication information.

In an implementation, the performing identity authentication on the second communication apparatus by using the first identity authentication information includes: performing calculation on a target field by using the fourth key, to obtain third identity authentication information; and performing matching verification on the third identity authentication information and the first identity authentication information that is carried in the first protocol packet, where the target field includes one or more of the following: a part or all of the fields in the third protocol packet or a part or all of the fields in the second protocol packet.

In an implementation, the performing calculation on a target field by using the fourth key, to obtain third identity authentication information includes: performing calculation on the target field by using the fourth key, to obtain a first calculation result; and encrypting the first calculation result by using the first key, to obtain the third identity authentication information.

In an implementation, the fourth key is derived from the third key.

In an implementation, the fourth key is derived from a third PSK stored in the first communication apparatus and the second communication apparatus.

The third PSK herein may be a PSK different from the first PSK.

In an implementation, the second protocol packet carries an identifier of the third PSK, and the identifier of the third PSK identifies the third PSK.

In an implementation, the method further includes: sending a fourth protocol packet to the second communication apparatus, where the fourth protocol packet carries first indication information, and the first indication information indicates that the first communication apparatus has stored the second PSK.

The fourth protocol packet herein may correspond to the packet 4 in the method 100. The first indication information may be carried in the key material confirmed information in the packet 4.

In an implementation, the fourth protocol packet includes an extended TLV field, and the extended TLV field includes the first indication information.

In an implementation, the fourth protocol packet carries second integrity verification information, and the second integrity verification information is for performing integrity verification on the fourth protocol packet.

The second integrity verification information herein may be carried in the ICV field of the packet 4 in the method 100.

In an implementation, the fourth protocol packet includes second identity authentication information, and the second identity authentication information is for performing identity authentication on the first communication apparatus.

The second identity authentication information herein may correspond to the identity authentication information 2 in the method 100.

In an implementation, the second identity authentication information is encrypted in the fourth protocol packet by using the first key.

In an implementation, the second identity authentication information is obtained by performing calculation on one or more of the following based on the fourth key: a part or all of the fields in the second protocol packet or a part or all of the fields in the third protocol packet.

In an implementation, the method further includes: receiving a fifth protocol packet from the second communication apparatus, where the fifth protocol packet carries an identity authentication result and a PSK update result.

The fifth protocol packet herein may correspond to the packet 5 in the method 100.

In an implementation, the method further includes: deleting the second PSK if the identity authentication result in the fifth protocol packet indicates that the identity authentication fails or the PSK update result in the fifth protocol packet indicates that a PSK update fails.

In an implementation, the method further includes: sending a sixth protocol packet to the second communication apparatus, where the sixth protocol packet indicates that the first communication apparatus has received the fifth protocol packet.

The sixth protocol packet herein may correspond to the packet 6 in the method 100.

In an implementation, the method further includes: performing integrity verification on the fifth protocol packet.

In an implementation, the first communication apparatus stores a first data key, the first protocol packet includes a data key material, the data key material is for generating an updated second data key, the first communication apparatus processes, based on the first data key within an aging periodicity of the first data key, a data packet exchanged between the first communication apparatus and the second communication apparatus, and the first communication apparatus processes, based on the second data key within an aging periodicity of the second data key, a data packet exchanged between the first communication apparatus and the second communication apparatus. The method further includes: obtaining the second data key based on the data key material.

The data key material herein may correspond to the data key material 1 in the method 100. The second data key herein may correspond to the updated data key in the method 100.

In an implementation, the second data key includes: an integrity verification key and/or a cipher key, where the integrity verification key is for performing integrity verification on the data packet, and the cipher key is for encrypting the data packet.

In an implementation, the first communication apparatus stores a first authentication key, the first protocol packet includes an authentication key material, the authentication key material is for generating an updated second authentication key, the first communication apparatus processes, based on the first authentication key within an aging periodicity of the first authentication key, an identity authentication packet exchanged between the first communication apparatus and the second communication apparatus, and the first communication apparatus processes, based on the second authentication key within an aging periodicity of the second authentication key, an identity authentication packet exchanged between the first communication apparatus and the second communication apparatus. The method further includes: obtaining the second authentication key based on the authentication key material.

The authentication key material herein may correspond to the authentication key material 1 in the method 100. The second authentication key herein may correspond to the updated authentication key in the method 100.

In an implementation, the second authentication key includes any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, the method further includes: deriving a media access control security MACsec key by using the second PSK.

In an implementation, the deriving a MACsec key by using the second PSK includes: generating a master session key MSK based on the second PSK; deriving a secure connectivity association key CAK by using the MSK; and deriving the media access control security MACsec key by using the CAK.

In an implementation, the deriving a MACsec key by using the second PSK includes: deriving the MACsec key by using the second PSK as a CAK.

In an implementation, the deriving the media access control security MACsec key by using the CAK includes: determining the CAK based on an identifier of the CAK; and deriving the media access control security MACsec key by using the CAK.

In an implementation, the identifier of the CAK is generated based on any one or more of the following parameters: a first nonce generated by the first communication apparatus, a second nonce generated by the second communication apparatus, and a session identifier of the first protocol packet.

The first nonce herein may correspond to the nonce 2 in the method 100. The second nonce herein may correspond to the nonce 1 in the method 100. The session identifier of the first protocol packet herein may correspond to the value of the SSID field in the packet 3.

In an implementation, the EAP-PSK packet includes: an extensible authentication protocol EAP header, an EAP extension header, and a keyword field.

The EAP header may correspond to the EAP header field in FIG. 3c, the EAP extension header may correspond to the EAP type field in FIG. 3c, and the keyword field may correspond to the other fields in FIG. 3c.

In an implementation, the first PSK key material is carried in the keyword field.

In an implementation, the keyword field includes any one or more of the following fields: a protocol version number field, a session identifier field, a key identifier field, an encrypted data field, a nonce field, an identifier field, and an integrity verification field.

The protocol version number field may correspond to the flags field in FIG. 3c, the session identifier field may correspond to the session ID field in FIG. 3c, the key identifier field may correspond to the key ID field in FIG. 3c, the encrypted data field may correspond to the encrypted payload field in FIG. 3c, the nonce field may correspond to the nonce field in FIG. 3b or FIG. 3a, the identifier field may correspond to the ID field in FIG. 3a or FIG. 3b, and the integrity verification field may correspond to the ICV field in FIG. 3c.

In an implementation, the first PSK key material is carried in the encrypted data field.

In an implementation, the method further includes: sending second indication information to the second communication apparatus, where the second indication information indicates that the first communication apparatus has a capability of automatically updating a PSK.

The second indication information herein may correspond to the indication information 1 in the method 100.

In an implementation, the first protocol packet is an Internet key exchange IKE protocol-based packet.

When the first protocol packet is the IKE protocol-based packet, the first protocol packet may correspond to the packet 3 in the method 300.

In an implementation, the first PSK key material is carried in a payload field of the first protocol packet.

In an implementation, the first PSK key material is carried in a notification payload field of the first protocol packet.

In an implementation, the first PSK key material is carried in an extended TLV field of the first protocol packet.

In an implementation, the method further includes: sending third indication information to the second communication apparatus, where the third indication information indicates that the first communication apparatus has a capability of automatically updating a PSK.

The third indication information herein may correspond to the indication information 1 in the method 300.

In an implementation, the third indication information is carried in a notification payload field of an IKE protocol-based packet.

In an implementation, the third indication information is carried in a notification message type field of the IKE protocol-based packet, and the notification payload field of the IKE protocol-based packet includes the notification message type field.

In an implementation, the method further includes: sending a seventh protocol packet to the second communication apparatus, where the seventh protocol packet indicates that the first communication apparatus has stored the second PSK.

The seventh protocol packet herein may correspond to the packet 4 in the method 300.

In an implementation, the seventh protocol packet includes fourth indication information, and the fourth indication information indicates that the first communication apparatus has stored the second PSK.

The fourth indication information herein may correspond to the key update result in the method 300.

In an implementation, the seventh protocol packet is an IKE protocol-based packet, and the fourth indication information is carried in a notification message type field of the seventh protocol packet.

In an implementation, the first protocol packet (corresponding to the packet 3 in the method 300) is an authentication exchange AUTH exchange packet.

In an implementation, the first protocol packet (corresponding to the packet 3 in the method 300) is a create child security association exchange CREATE_CHILD_SA exchange packet.

In an implementation, the first protocol packet (corresponding to the packet 3 in the method 300) is an informational exchange packet.

In an implementation, the first protocol packet is a media access control security key agreement MKA-based packet.

When the first protocol packet is the MKA-based packet, the first protocol packet may correspond to the packet 3 in the method 200.

In an implementation, the first PSK key material is carried in an extended parameter set field of the first protocol packet.

In an implementation, the method further includes: sending fifth indication information to the second communication apparatus, where the fifth indication information indicates that the first communication apparatus has a capability of automatically updating a PSK.

The fifth indication information herein may correspond to the indication information 1 in the method 200.

In an implementation, the fifth indication information is carried in a parameter set field of an MKA-based packet.

In an implementation, the fifth indication information is carried in a parameter set type field of the MKA-based packet, and the parameter set field includes the parameter set type field.

In an implementation, the method further includes: sending an eighth protocol packet to the second communication apparatus, where the eighth protocol packet indicates that the first communication apparatus has stored the second PSK.

The eighth protocol packet herein may correspond to the packet 4 in the method 200.

In an implementation, the eighth protocol packet includes sixth indication information, and the sixth indication information indicates that the first communication apparatus has stored the second PSK.

The sixth indication information herein may correspond to the PSK storage acknowledgment information in the method 200.

In an implementation, the eighth protocol packet is an MKA-based packet, and the sixth indication information is carried in a parameter set type field of the MKA-based packet.

In an implementation, the first communication apparatus is an in-vehicle apparatus.

In an implementation, the second communication apparatus is an in-vehicle apparatus.

Figure 8B:
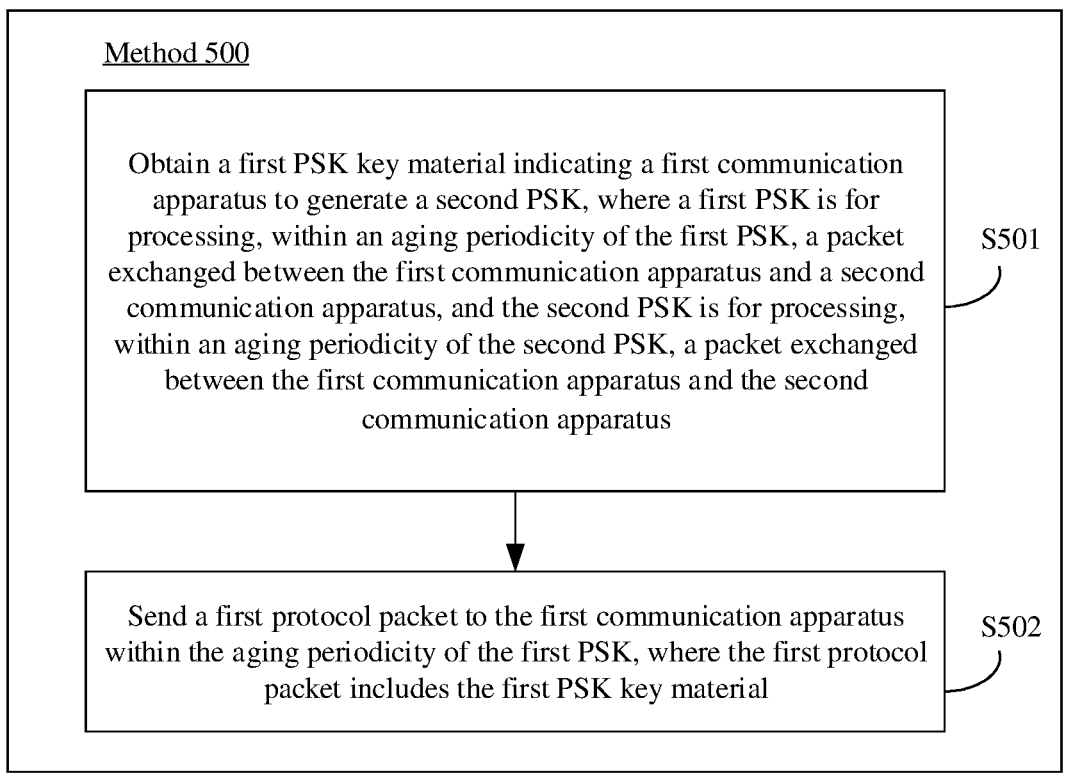
FIG. 8b is a schematic flowchart of a PSK updating method according to an embodiment of this application.

An embodiment of this application further provides a PSK updating method 500. FIG. 8b is a schematic flowchart of the PSK updating method according to this embodiment of this application. The method 500 shown in FIG. 8b may be performed by a second communication apparatus. The second communication apparatus may be the communication apparatus 1 in the foregoing embodiments, and a first communication apparatus in the method 500 may correspond to the communication apparatus 2 in the foregoing embodiments. The method 500 shown in FIG. 8b may be applied to specifically implement the method 100, the method 200, and the method 300 in the foregoing embodiments, and is for performing the steps performed by the communication apparatus 1 in the method 100, the method 200, and the method 300. For example, the method 500 may include the following S501 and S502.

S501: Obtain a first PSK key material indicating the first communication apparatus to generate a second PSK, where a first PSK is for processing, within an aging periodicity of the first PSK, a packet exchanged between the first communication apparatus and the second communication apparatus, and the second PSK is for processing, within an aging periodicity of the second PSK, a packet exchanged between the first communication apparatus and the second communication apparatus.

S502: Send a first protocol packet to the first communication apparatus within the aging periodicity of the first PSK, where the first protocol packet includes the first PSK key material.

The first PSK herein may correspond to the PSK 1 in the foregoing method 100, method 200, and method 300. The first protocol packet herein may correspond to the packet 3 in the method 100, the method 200, and the method 300. The first PSK key material herein may correspond to the PSK key material 1 in the method 100, the method 200, and the method 300. The second PSK herein may correspond to the PSK 2 in the method 100, the method 200, and the method 300.

In an implementation, the method further includes: storing the first PSK key material.

In an implementation, the method further includes: receiving a third PSK key material sent by the first communication apparatus; and obtaining the second PSK based on the third PSK key material.

The second PSK key material herein may correspond to the PSK key material 2 in the method 100.

In an implementation, the method further includes: obtaining the second PSK based on the first PSK key material.

In an implementation, the obtaining the second PSK based on the first PSK key material includes: obtaining the second PSK based on the first PSK key material before the aging periodicity of the second PSK starts.

In an implementation, the obtaining the second PSK based on the first PSK key material includes: determining the first PSK key material as the second PSK.

In an implementation, the obtaining the second PSK based on the first PSK key material includes: obtaining the second PSK based on the first PSK key material and a first key derivation algorithm.

The first key derivation algorithm herein may correspond to the key derivation algorithm 1 in the method 100.

In an implementation, the obtaining the second PSK based on the first PSK key material and a first key derivation algorithm includes: performing calculation on the first PSK key material by using a first algorithm, to obtain an intermediate value; and generating the second PSK based on the intermediate value and the first key derivation algorithm.

The first algorithm herein may correspond to the prf algorithm in the method 300, the intermediate value herein may correspond to SKEYSEED in the method 300, and the first key derivation algorithm herein may correspond to the prf derivation algorithm in the method 300.

In an implementation, the method further includes: storing the second PSK in a non-volatile memory area of the second communication apparatus.

In an implementation, the first PSK key material includes a nonce.

In an implementation, the first protocol packet is a PSK-based extensible authentication protocol EAP-PSK packet.

In an implementation, the first protocol packet includes an extended type-length-value TLV field, and the extended TLV field includes the first PSK key material.

In an implementation, the first PSK key material is encrypted in the first protocol packet by using a first key.

The first key herein may be the foregoing key for encrypting the fields shown in FIG. 3*e*.

In an implementation, the first protocol packet further includes first integrity verification information, and the first integrity verification information is for performing integrity verification on the first protocol packet.

The first integrity verification information herein may correspond to the value carried in the ICV field of the packet 3 in the method 100.

In an implementation, the first protocol packet carries an identifier of the first key.

In an implementation, the first protocol packet includes an identifier of a second key, the identifier of the second key identifies the second key, and the second key is for calculating the first integrity verification information.

In an implementation, before the sending a first protocol packet to the first communication apparatus, the method further includes: receiving a second protocol packet sent by the first communication apparatus, where the second protocol packet carries an identifier of a third key, the identifier of the third key identifies the third key, and the third key is for deriving the first key.

The second protocol packet herein may correspond to the packet 2 in the method 100, and the identifier of the third key may be carried in the key ID field of the packet 2.

In an implementation, before the sending a first protocol packet to the first communication apparatus, the method further includes: receiving a second protocol packet sent by the first communication apparatus, where the second protocol packet carries an identifier of a third key, the identifier of the third key identifies the third key, the third key is for deriving a second key, and the second key is for calculating the first integrity verification information.

In an implementation, the third key includes the first PSK.

In an implementation, before the receiving a second protocol packet sent by the first communication apparatus, the method further includes: sending a third protocol packet to the first communication apparatus, where the third protocol packet is for requesting to perform identity authentication on the second communication apparatus.

The third protocol packet herein may correspond to the packet 1 in the method 100.

In an implementation, the third protocol packet carries the identifier of the third key.

In an implementation, the first protocol packet includes first identity authentication information, and the first identity authentication information is for performing identity authentication on the second communication apparatus.

The first identity authentication information herein may correspond to the identity authentication information 1 in the method 100.

In an implementation, the first identity authentication information is encrypted in the first protocol packet by using the first key.

In an implementation, the first identity authentication information is obtained by performing calculation on one or more of the following based on a fourth key: a part or all of fields in the third protocol packet or a part or all of fields in the second protocol packet.

The fourth key herein may correspond to the key 1 in the formula (1) in the method 100.

In an implementation, the fourth key is derived from the third key.

In an implementation, the fourth key is derived from a third PSK stored in the first communication apparatus and the second communication apparatus.

The third PSK herein may be a PSK different from the first PSK.

In an implementation, the second protocol packet carries an identifier of the third PSK, and the identifier of the third PSK identifies the third PSK.

In an implementation, the method further includes: receiving a fourth protocol packet sent by the first communication apparatus, where the fourth protocol packet carries first indication information, and the first indication information indicates that the first communication apparatus has stored the second PSK.

The fourth protocol packet herein may correspond to the packet 4 in the method 100. The first indication information may be carried in the key material confirmed information in the packet 4.

In an implementation, the fourth protocol packet includes an extended TLV field, and the extended TLV field includes the first indication information.

In an implementation, the fourth protocol packet carries second integrity verification information, and the second integrity verification information is for performing integrity verification on the fourth protocol packet.

The second integrity verification information herein may be carried in the ICV field of the packet 4 in the method 100.

In an implementation, the fourth protocol packet includes second identity authentication information, and the second identity authentication information is for performing identity authentication on the first communication apparatus.

The second identity authentication information herein may correspond to the identity authentication information 2 in the method 100.

In an implementation, the second identity authentication information is encrypted in the fourth protocol packet by using the first key.

In an implementation, the second identity authentication information is obtained by performing calculation on one or more of the following based on the fourth key: a part or all of the fields in the second protocol packet or a part or all of the fields in the third protocol packet.

In an implementation, the method further includes: performing identity authentication on the first communication apparatus by using the second identity authentication information.

In an implementation, the performing identity authentication on the first communication apparatus by using the second identity authentication information includes: performing calculation on a target field by using the fourth key, to obtain fourth identity authentication information; and performing matching verification on the fourth identity authentication information and the second identity authentication information carried in the fourth protocol packet, where the target field includes one or more of the following: a part or all of the fields in the third protocol packet or a part or all of the fields in the second protocol packet.

In an implementation, the performing calculation on a target field by using the fourth key, to obtain fourth identity authentication information includes: performing calculation on the target field by using the fourth key, to obtain a second calculation result; and encrypting the second calculation result by using the first key, to obtain the fourth identity authentication information.

In an implementation, the method further includes: sending a fifth protocol packet to the first communication apparatus, where the fifth protocol packet carries an identity authentication result and a PSK update result.

The fifth protocol packet herein may correspond to the packet 5 in the method 100.

In an implementation, the method further includes: receiving a sixth protocol packet sent by the first communication apparatus, where the sixth protocol packet indicates that the first communication apparatus has received the fifth protocol packet.

The sixth protocol packet herein may correspond to the packet 6 in the method 100.

In an implementation, the second communication apparatus stores a first data key, the first protocol packet further includes a data key material, the data key material indicates the first communication apparatus to generate an updated second data key, the second communication apparatus processes, based on the first data key within an aging periodicity of the first data key, a data packet exchanged between the first communication apparatus and the second communication apparatus, and the second communication apparatus processes, based on the second data key within an aging periodicity of the second data key, a data packet exchanged between the first communication apparatus and the second communication apparatus.

The data key material herein may correspond to the data key material 1 in the method 100. The second data key herein may correspond to the updated data key in the method 100.

In an implementation, the method further includes: obtaining the second data key based on the data key material.

In an implementation, the second data key includes: an integrity verification key and/or a cipher key, where the integrity verification key is for performing integrity verification on the data packet, and the cipher key is for encrypting the data packet.

In an implementation, the second communication apparatus stores a first authentication key, the first protocol packet further includes an authentication key material, the authentication key material indicates the first communication apparatus to generate an updated second authentication key, the second communication apparatus processes, based on the first authentication key within an aging periodicity of the first authentication key, an identity authentication packet exchanged between the first communication apparatus and the second communication apparatus, and the second communication apparatus processes, based on the second authentication key within an aging periodicity of the second authentication key, an identity authentication packet exchanged between the first communication apparatus and the second communication apparatus.

The authentication key material herein may correspond to the authentication key material 1 in the method 100. The second authentication key herein may correspond to the updated authentication key in the method 100.

In an implementation, the method further includes: obtaining the second authentication key based on the authentication key material.

In an implementation, the second authentication key includes any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, the method further includes: deriving a media access control security MACsec key by using the second PSK.

In an implementation, the deriving a MACsec key by using the second PSK includes: generating a master session key MSK based on the second PSK; deriving a secure connectivity association key CAK by using the MSK; and deriving the media access control security MACsec key by using the CAK.

In an implementation, the deriving a MACsec key by using the second PSK includes: deriving the MACsec key by using the second PSK as a CAK.

In an implementation, the deriving the media access control security MACsec key by using the CAK includes: determining the CAK based on an identifier of the CAK; and deriving the media access control security MACsec key by using the CAK.

In an implementation, the identifier of the CAK is generated based on any one or more of the following parameters: a first nonce generated by the first communication apparatus, a second nonce generated by the second communication apparatus, and a session identifier of the first protocol packet.

In an implementation, the first protocol packet includes: an extensible authentication protocol EAP header, an EAP extension header, and a keyword field.

In an implementation, the first PSK key material is carried in the keyword field.

In an implementation, the keyword field includes any one or more of the following fields: a protocol version number field, a session identifier field, a key identifier field, an encrypted data field, a nonce field, an identifier field, and an integrity verification field.

In an implementation, the first PSK key material is carried in the encrypted data field.

In an implementation, the method further includes: receiving second indication information sent by the first communication apparatus, where the second indication information indicates that the first communication apparatus has a capability of automatically updating a PSK.

The second indication information herein may correspond to the indication information 1 in the method 100.

In an implementation, the first protocol packet is an Internet key exchange IKE protocol-based packet.

In an implementation, the first PSK key material is carried in a payload field of the first protocol packet.

In an implementation, the first PSK key material is carried in a notification payload field of the first protocol packet.

In an implementation, the first PSK key material is carried in an extended TLV field of the first protocol packet.

In an implementation, the method further includes: receiving third indication information sent by the first communication apparatus, where the third indication information indicates that the first communication apparatus has a capability of automatically updating a PSK.

In an implementation, the third indication information is carried in a notification payload field of an IKE protocol-based packet.

In an implementation, the third indication information is carried in a notification message type field of the IKE protocol-based packet, and the notification payload field of the IKE protocol-based packet includes the notification message type field.

In an implementation, the method further includes: receiving a seventh protocol packet sent by the first communication apparatus, where the seventh protocol packet indicates that the first communication apparatus has stored the second PSK.

In an implementation, the seventh protocol packet includes fourth indication information, and the fourth indication information indicates that the first communication apparatus has stored the second PSK.

In an implementation, the seventh protocol packet is an IKE protocol-based packet, and the fourth indication information is carried in a notification message type field of the seventh protocol packet.

In an implementation, the first protocol packet is an authentication exchange AUTH exchange packet.

In an implementation, the first protocol packet is a create child security association exchange CREATE_CHILD_SA exchange packet.

In an implementation, the first protocol packet is an informational exchange packet.

In an implementation, the first protocol packet is a media access control security key agreement MKA-based packet.

In an implementation, the first PSK key material is carried in an extended parameter set field of the first protocol packet.

In an implementation, the method further includes: receiving fifth indication information sent by the first communication apparatus, where the fifth indication information indicates that the first communication apparatus has a capability of automatically updating a PSK.

In an implementation, the fifth indication information is carried in a parameter set field of an MKA-based packet.

In an implementation, the fifth indication information is carried in a parameter set type field of the MKA-based packet, and the parameter set field includes the parameter set type field.

In an implementation, the method further includes: receiving an eighth protocol packet sent by the first communication apparatus, where the eighth protocol packet indicates that the first communication apparatus has stored the second PSK.

In an implementation, the eighth protocol packet includes sixth indication information, and the sixth indication information indicates that the first communication apparatus has stored the second PSK.

In an implementation, the eighth protocol packet is an MKA-based packet, and the sixth indication information is carried in a parameter set type field of the MKA-based packet.

In an implementation, the first communication apparatus is an in-vehicle apparatus.

In an implementation, the second communication apparatus is an in-vehicle apparatus.

It should be noted that the method 500 corresponds to the method 400, and includes the steps performed by the second communication apparatus. Therefore, for the method 500, refer to the foregoing descriptions of the method 400. Repeated descriptions are omitted herein.

Figure 9A:
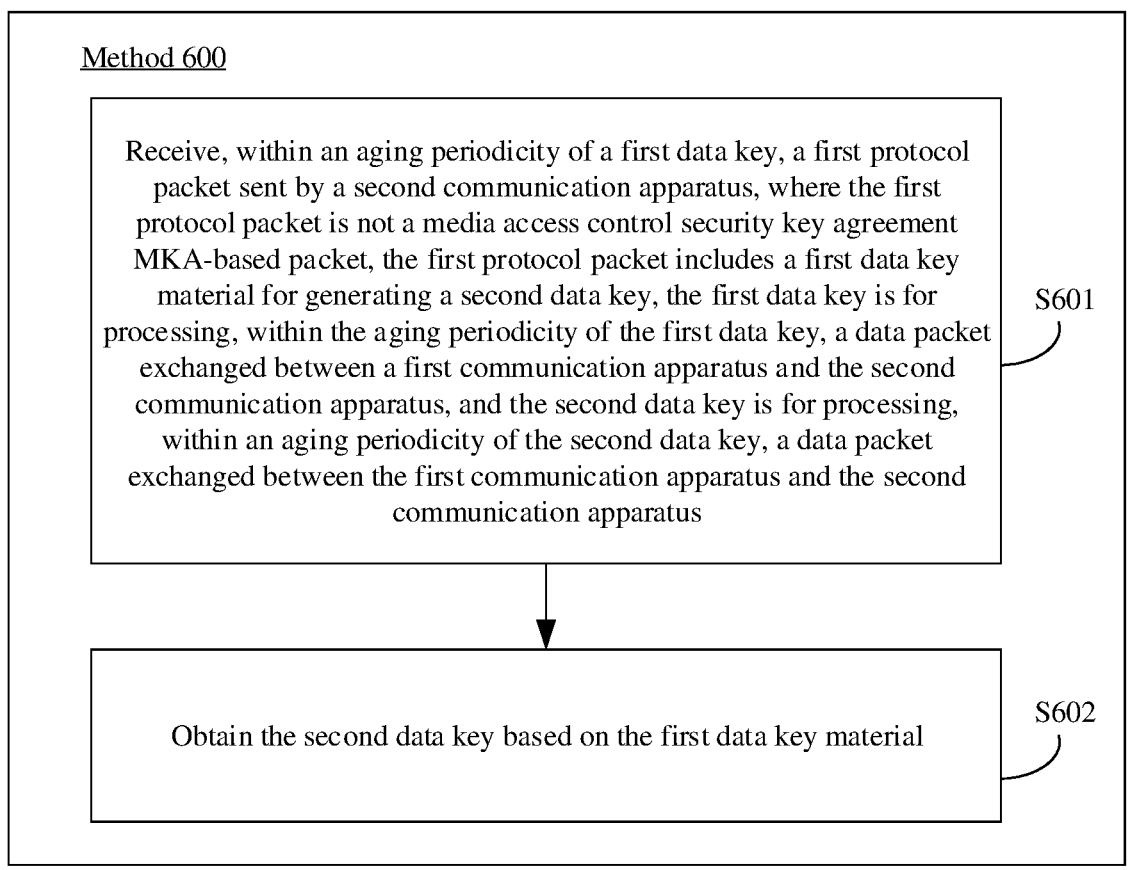
FIG. 9a is a schematic flowchart of a data key updating method according to an embodiment of this application.

An embodiment of this application further provides a data key updating method 600. FIG. 9a is a schematic flowchart of the data key updating method according to this embodiment of this application. The method 600 shown in FIG. 9a may be performed by a first communication apparatus. The first communication apparatus may be the communication apparatus 2 in the foregoing embodiments, and a second communication apparatus in the method 600 may correspond to the communication apparatus 1 in the foregoing embodiments. The method 600 shown in FIG. 9a may be applied to specifically implement the method 100 and the method 300 in the foregoing embodiments, and is for performing the steps performed by the communication apparatus 2 in the method 100 and the method 300. For example, the method 100 may include the following S601 and S602.

S601: Receive, within an aging periodicity of a first data key, a first protocol packet sent by the second communication apparatus, where the first protocol packet is not a media access control security key agreement MKA-based packet, the first protocol packet includes a first data key material for generating a second data key, the first data key is for processing, within the aging periodicity of the first data key, a data packet exchanged between the first communication apparatus and the second communication apparatus, and the second data key is for processing, within an aging periodicity of the second data key, a data packet exchanged between the first communication apparatus and the second communication apparatus.

S602: Obtain the second data key based on the first data key material.

The first protocol packet herein may correspond to the packet 3 in the method 100 and the method 300. The first data key material herein may correspond to the data key material 1 in the method 100 and the method 300. The second data key herein may correspond to the updated data key in the method 100 and the method 300.

In an implementation, the method further includes: storing the second data key.

In an implementation, the first communication apparatus and the second communication apparatus communicate with each other through a non-Ethernet port.

In an implementation, the first communication apparatus and the second communication apparatus communicate with each other through an Ethernet port, and the first communication apparatus or the second communication apparatus does not use an asymmetric algorithm.

In an implementation, the second data key includes: an integrity verification key and/or a cipher key, where the integrity verification key is for performing integrity verification on the data packet, and the cipher key is for encrypting the data packet.

In an implementation, the generating the second data key based on the first data key material includes: generating the second data key based on the first data key material and a second data key material of the first communication apparatus.

The second data key material herein may correspond to the data key material 2 in the method loft In an implementation, the method further includes: sending a third data key material to the second communication apparatus, to enable the second communication apparatus to generate the second data key based on the third data key material.

The third data key material herein may correspond to the data key material 3 in the method loft In an implementation, the obtaining the second data key based on the first data key material includes: determining the first data key material as the second data key.

In an implementation, the obtaining the second data key based on the first data key material includes: generating the second data key based on the first data key material and a first key derivation algorithm.

The first key derivation algorithm herein may correspond to the key derivation algorithm 3 in the method 100.

In an implementation, the generating the second data key based on the first data key material and a first key derivation algorithm includes: performing calculation on the first data key material by using a first algorithm to obtain an intermediate value; and generating the second data key based on the intermediate value and the first key derivation algorithm.

In an implementation, the first data key material includes: a nonce.

In an implementation, the first data key material includes: a nonce for generating the integrity verification key and/or a nonce for generating the cipher key.

In an implementation, the first protocol packet is a PSK-based extensible authentication protocol EAP-PSK packet.

In an implementation, the first protocol packet includes an extended type-length-value TLV field, and the extended TLV field includes the first data key material.

In an implementation, the first data key material is encrypted in the first protocol packet by using a first key.

The first key herein may be the foregoing key for encrypting the fields shown in FIG. 3*e*.

In an implementation, the first protocol packet further includes first integrity verification information, and the first integrity verification information is for performing integrity verification on the first protocol packet.

The first integrity verification information herein may correspond to the value carried in the ICV field of the packet 3 in the method 100.

In an implementation, before the obtaining the second data key based on the first data key material, the method further includes: performing integrity verification on the first protocol packet based on the first integrity verification information.

In an implementation, the first protocol packet carries an identifier of the first key, and the obtaining the second data key based on the first data key material includes: determining the first key based on the identifier of the first key; decrypting the first data key material by using the first key; and obtaining the second data key based on the decrypted first data key material.

In an implementation, the first protocol packet includes an identifier of a second key, the identifier of the second key identifies the second key, and the performing integrity verification on the first protocol packet based on the first integrity verification information includes: determining the second key based on the identifier of the second key; and performing integrity verification on the first protocol packet based on the second key and the first integrity verification information.

The second key herein may correspond to AIK in the formula (3) in the method 100.

In an implementation, before the receiving a first protocol packet, the method further includes: sending a second protocol packet to the second communication apparatus, where the second protocol packet carries an identifier of a third key, the identifier of the third key identifies the third key, and the third key is for deriving the first key.

The second protocol packet herein may correspond to the packet 2 in the method 100, and the identifier of the third key may be carried in the key ID field of the packet 2.

In an implementation, before the receiving a first protocol packet, the method further includes: sending a second protocol packet to the second communication apparatus, where the second protocol packet carries an identifier of a third key, the identifier of the third key identifies the third key, the third key is for deriving a second key, and the second key is for calculating the first integrity verification information.

In an implementation, the third key includes a first PSK stored in the first communication apparatus.

In an implementation, before the sending a second protocol packet to the second communication apparatus, the method further includes: receiving a third protocol packet from the second communication apparatus, where the third protocol packet is for requesting to perform identity authentication on the second communication apparatus.

The third protocol packet herein may correspond to the packet 1 in the method 100.

In an implementation, the third protocol packet carries the identifier of the third key.

In an implementation, the first protocol packet includes first identity authentication information, and the first identity authentication information is for performing identity authentication on the second communication apparatus.

The first identity authentication information herein may correspond to the identity authentication information 1 in the method 100.

In an implementation, the first identity authentication information is encrypted in the first protocol packet by using the first key.

In an implementation, the first identity authentication information is obtained by performing calculation on one or more of the following based on a fourth key: a part or all of fields in the third protocol packet or a part or all of fields in the second protocol packet.

The fourth key herein may correspond to the key 1 in the formula (1) in the method 100.

In an implementation, the method further includes: performing identity authentication on the second communication apparatus by using the first identity authentication information.

In an implementation, the performing identity authentication on the second communication apparatus by using the first identity authentication information includes: performing calculation on a target field by using the fourth key, to obtain third identity authentication information; and performing matching verification on the third identity authentication information and the first identity authentication information that is carried in the first protocol packet, where the target field includes one or more of the following: a part or all of the fields in the third protocol packet or a part or all of the fields in the second protocol packet.

In an implementation, the performing calculation on a target field by using the fourth key, to obtain third identity authentication information includes: performing calculation on the target field by using the fourth key, to obtain a first calculation result; and encrypting the first calculation result by using the first key, to obtain the third identity authentication information.

In an implementation, the fourth key is derived from the third key.

In an implementation, the fourth key is derived from a third PSK, and the first communication apparatus stores the third PSK.

The third PSK herein may be a PSK different from the first PSK.

In an implementation, the second protocol packet carries an identifier of the third PSK, and the identifier of the third PSK identifies the third PSK.

In an implementation, the method further includes: sending a fourth protocol packet to the second communication apparatus, where the fourth protocol packet carries first indication information, and the first indication information indicates that the first communication apparatus has stored the second data key.

The fourth protocol packet herein may correspond to the packet 4 in the method 100. The first indication information may be carried in the key material confirmed information in the packet 4.

In an implementation, the fourth protocol packet includes an extended TLV field, and the extended TLV field includes the first indication information.

In an implementation, the fourth protocol packet carries second integrity verification information, and the second integrity verification information is for performing integrity verification on the fourth protocol packet.

The second integrity verification information herein may be carried in the ICV field of the packet 4 in the method loft In an implementation, the fourth protocol packet includes second identity authentication information, and the second identity authentication information is for performing identity authentication on the first communication apparatus.

The second identity authentication information herein may correspond to the identity authentication information 2 in the method 100.

In an implementation, the second identity authentication information is encrypted in the fourth protocol packet by using the first key.

In an implementation, the second identity authentication information is obtained by performing calculation on one or more of the following based on the fourth key: a part or all of the fields in the second protocol packet or a part or all of the fields in the third protocol packet.

In an implementation, the method further includes: receiving a fifth protocol packet from the second communication apparatus, where the fifth protocol packet carries an identity authentication result and a data key update result.

The fifth protocol packet herein may correspond to the packet 5 in the method 100.

In an implementation, the method further includes: deleting the second data key if the identity authentication result in the fifth protocol packet indicates that the identity authentication fails or the data key update result in the fifth protocol packet indicates that a data key update fails.

In an implementation, the method further includes: sending a sixth protocol packet to the second communication apparatus, where the sixth protocol packet indicates that the first communication apparatus has received the fifth protocol packet.

The sixth protocol packet herein may correspond to the packet 6 in the method loft In an implementation, the method further includes: performing integrity verification on the fifth protocol packet.

In an implementation, the first communication apparatus stores the first PSK, the first protocol packet includes a PSK key material, the PSK key material is for generating an updated second PSK, the first communication apparatus processes, based on the first PSK within an aging periodicity of the first PSK, a packet exchanged between the first communication apparatus and the second communication apparatus, and the first communication apparatus processes, based on the second PSK within an aging periodicity of the second PSK, a packet exchanged between the first communication apparatus and the second communication apparatus; and the method further includes: obtaining the second PSK based on the PSK key material.

The PSK key material herein may correspond to the PSK key material 1 in the method 100. The second PSK herein may correspond to the PSK 2 in the method loft In an implementation, the first communication apparatus stores a first authentication key, the first protocol packet includes an authentication key material, the authentication key material is for generating an updated second authentication key, the first communication apparatus processes, based on the first authentication key within an aging periodicity of the first authentication key, an identity authentication packet exchanged between the first communication apparatus and the second communication apparatus, and the first communication apparatus processes, based on the second authentication key within an aging periodicity of the second authentication key, an identity authentication packet exchanged between the first communication apparatus and the second communication apparatus. The method further includes: obtaining the second authentication key based on the authentication key material.

The authentication key material herein may correspond to the authentication key material 1 in the method 100. The second authentication key herein may correspond to the updated authentication key in the method 100.

In an implementation, the second authentication key includes any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, the first protocol packet includes: an EAP header, an EAP extension header, and a keyword field.

The EAP header may correspond to the EAP header field in FIG. 3c, the EAP extension header may correspond to the EAP type field in FIG. 3c, and the keyword field may correspond to the other fields in FIG. 3c.

In an implementation, the first data key material is carried in the keyword field.

In an implementation, the keyword field includes any one or more of the following fields: a protocol version number field, a session identifier field, a key identifier field, an encrypted data field, a nonce field, an identifier field, and an integrity verification field.

The protocol version number field may correspond to the flags field in FIG. 3c, the session identifier field may correspond to the session ID field in FIG. 3c, the key identifier field may correspond to the key ID field in FIG. 3c, the encrypted data field may correspond to the encrypted payload field in FIG. 3c, the nonce field may correspond to the nonce field in FIG. 3b or FIG. 3a, the identifier field may correspond to the ID field in FIG. 3a or FIG. 3b, and the integrity verification field may correspond to the ICV field in FIG. 3c.

In an implementation, the first data key material is carried in the encrypted data field.

In an implementation, the method further includes: sending second indication information to the second communication apparatus, where the second indication information indicates that the first communication apparatus has a capability of automatically updating a data key.

The second indication information herein may correspond to the indication information 1 in the method 100.

In an implementation, the first protocol packet is an Internet key exchange IKE protocol-based packet.

In an implementation, the first data key material is carried in a payload field of the first protocol packet.

In an implementation, the first data key material is carried in a notification payload field of the first protocol packet.

In an implementation, the first data key material is carried in an extended TLV field of the first protocol packet.

In an implementation, the method further includes: sending third indication information to the second communication apparatus, where the third indication information indicates that the first communication apparatus has a capability of automatically updating a data key.

The third indication information herein may correspond to the indication information 1" in the method 300.

In an implementation, the third indication information is carried in a notification payload field of an IKE protocol-based packet.

In an implementation, the third indication information is carried in a notification message type field of the IKE protocol-based packet, and the notification payload field of the IKE protocol-based packet includes the notification message type field.

In an implementation, the method further includes: sending a seventh protocol packet to the second communication apparatus, where the seventh protocol packet indicates that the first communication apparatus has stored the second data key.

The seventh protocol packet herein may correspond to the packet 4 in the method 300.

In an implementation, the seventh protocol packet includes fourth indication information, and the fourth indication information indicates that the first communication apparatus has stored the second data key.

The fourth indication information herein may correspond to the key update result in the method 300.

In an implementation, the seventh protocol packet is an IKE protocol-based packet, and the fourth indication information is carried in a notification message type field of the seventh protocol packet.

In an implementation, the first protocol packet (corresponding to the packet 3 in the method 300) is an authentication exchange AUTH exchange packet.

In an implementation, the first protocol packet (corresponding to the packet 3 in the method 300) is a create child security association exchange CREATE_CHILD_SA exchange packet.

In an implementation, the first protocol packet (corresponding to the packet 3 in the method 300) is an informational exchange packet.

In an implementation, the first communication apparatus is an in-vehicle apparatus.

In an implementation, the second communication apparatus is an in-vehicle apparatus.

Figure 9B:
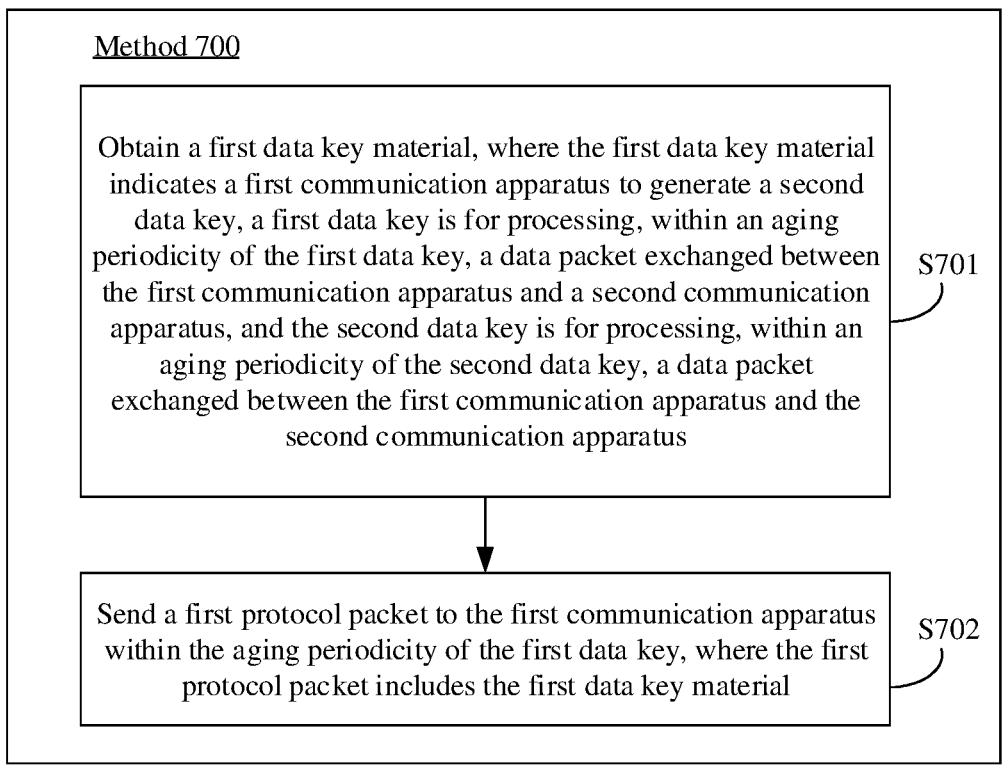
FIG. 9b is a schematic flowchart of a data key updating method according to an embodiment of this application.

An embodiment of this application further provides a data key updating method 700. FIG. 9b is a schematic flowchart of the data key updating method according to this embodiment of this application. The method 700 shown in FIG. 9b may be performed by a second communication apparatus. The second communication apparatus may be the communication apparatus 1 in the foregoing embodiments, and a first communication apparatus in the method 700 may correspond to the communication apparatus 2 in the foregoing embodiments. The method 700 shown in FIG. 9b may be applied to specifically implement the method 100 and the method 300 in the foregoing embodiments, and is for performing the steps performed by the communication apparatus 1 in the method 100 and the method 300. For example, the method 700 may include the following S701 and S702.

S701: Obtain a first data key material, where the first data key material indicates the first communication apparatus to generate a second data key, a first data key is for processing, within an aging periodicity of the first data key, a data packet exchanged between the first communication apparatus and the second communication apparatus, and the second data key is for processing, within an aging periodicity of the second data key, a data packet exchanged between the first communication apparatus and the second communication apparatus.

S702: Send a first protocol packet to the first communication apparatus within the aging periodicity of the first data key, where the first protocol packet includes the first data key material.

In an implementation, the method further includes: storing the first data key material.

In an implementation, the method further includes: receiving a third data key material sent by the first communication apparatus; and obtaining the second data key based on the third data key material.

In an implementation, the method further includes: obtaining the second data key based on the first data key material.

In an implementation, the obtaining the second data key based on the first data key material includes: obtaining the second data key based on the first data key material before the aging periodicity of the second data key starts.

In an implementation, the obtaining the second data key based on the first data key material includes: determining the first data key material as the second data key.

In an implementation, the obtaining the second data key based on the first data key material includes: obtaining the second data key based on the first data key material and a first key derivation algorithm.

In an implementation, the obtaining the second data key based on the first data key material and a first key derivation algorithm includes: performing calculation on the first data key material by using a first algorithm to obtain an intermediate value; and generating the second data key based on the intermediate value and the first key derivation algorithm.

In an implementation, the method further includes: storing the second data key.

In an implementation, the first communication apparatus and the second communication apparatus communicate with each other through a non-Ethernet port.

In an implementation, the first communication apparatus and the second communication apparatus communicate with each other through an Ethernet port, and the first communication apparatus or the second communication apparatus does not use an asymmetric algorithm.

In an implementation, the second data key includes: an integrity verification key and/or a cipher key, where the integrity verification key is for performing integrity verification on the data packet, and the cipher key is for encrypting the data packet.

In an implementation, the first data key material includes a nonce.

In an implementation, the first data key material includes: a nonce for generating the integrity verification key and/or a nonce for generating the cipher key.

In an implementation, the first protocol packet is a PSK-based extensible authentication protocol EAP-PSK packet.

In an implementation, the first protocol packet includes an extended type-length-value TLV field, and the extended TLV field includes the first data key material.

In an implementation, the first data key material is encrypted in the first protocol packet by using a first key.

In an implementation, the first protocol packet further includes first integrity verification information, and the first integrity verification information is for performing integrity verification on the first protocol packet.

In an implementation, the first protocol packet carries an identifier of the first key.

In an implementation, the first protocol packet includes an identifier of a second key, the identifier of the second key identifies the second key, and the second key is for calculating the first integrity verification information.

In an implementation, before the sending a first protocol packet to the first communication apparatus, the method further includes: receiving a second protocol packet sent by the first communication apparatus, where the second protocol packet carries an identifier of a third key, the identifier of the third key identifies the third key, and the third key is for deriving the first key.

In an implementation, before the sending a first protocol packet to the first communication apparatus, the method further includes: receiving a second protocol packet sent by the first communication apparatus, where the second protocol packet carries an identifier of a third key, the identifier of the third key identifies the third key, the third key is for deriving a second key, and the second key is for calculating the first integrity verification information.

In an implementation, the third key includes a first PSK stored in the first communication apparatus and the second communication apparatus.

In an implementation, before the receiving a second protocol packet sent by the first communication apparatus, the method further includes: sending a third protocol packet to the first communication apparatus, where the third protocol packet is for requesting to perform identity authentication on the second communication apparatus.

In an implementation, the third protocol packet carries the identifier of the third key.

In an implementation, the first protocol packet includes first identity authentication information, and the first identity authentication information is for performing identity authentication on the second communication apparatus.

In an implementation, the first identity authentication information is encrypted in the first protocol packet by using the first key.

In an implementation, the first identity authentication information is obtained by performing calculation on one or more of the following based on a fourth key: a part or all of fields in the third protocol packet or a part or all of fields in the second protocol packet.

In an implementation, the fourth key is derived from the third key.

In an implementation, the fourth key is derived from a third PSK stored in the first communication apparatus and the second communication apparatus.

In an implementation, the second protocol packet carries an identifier of the third PSK, and the identifier of the third PSK identifies the third PSK.

In an implementation, the method further includes: receiving a fourth protocol packet sent by the first communication apparatus, where the fourth protocol packet carries first indication information, and the first indication information indicates that the first communication apparatus has stored the second data key.

In an implementation, the fourth protocol packet includes an extended TLV field, and the extended TLV field includes the first indication information.

In an implementation, the fourth protocol packet carries second integrity verification information, and the second integrity verification information is for performing integrity verification on the fourth protocol packet.

In an implementation, the fourth protocol packet includes second identity authentication information, and the second identity authentication information is for performing identity authentication on the first communication apparatus.

In an implementation, the second identity authentication information is encrypted in the fourth protocol packet by using the first key.

In an implementation, the second identity authentication information is obtained by performing calculation on one or more of the following based on the fourth key: a part or all of the fields in the second protocol packet or a part or all of the fields in the third protocol packet.

In an implementation, the method further includes: performing identity authentication on the first communication apparatus by using the second identity authentication information.

In an implementation, the performing identity authentication on the first communication apparatus by using the second identity authentication information includes: performing calculation on a target field by using the fourth key, to obtain fourth identity authentication information; and performing matching verification on the fourth identity authentication information and the second identity authentication information carried in the fourth protocol packet, where the target field includes one or more of the following: a part or all of the fields in the third protocol packet or a part or all of the fields in the second protocol packet.

In an implementation, the performing calculation on a target field by using the fourth key, to obtain fourth identity authentication information includes: performing calculation on the target field by using the fourth key, to obtain a second calculation result; and encrypting the second calculation result by using the first key, to obtain the fourth identity authentication information.

In an implementation, the method further includes: sending a fifth protocol packet to the first communication apparatus, where the fifth protocol packet carries an identity authentication result and a data key update result.

In an implementation, the method further includes: receiving a sixth protocol packet sent by the first communication apparatus, where the sixth protocol packet indicates that the first communication apparatus has received the fifth protocol packet.

In an implementation, the second communication apparatus stores the first PSK, the first protocol packet further includes a PSK key material, the PSK key material indicates the first communication apparatus to generate an updated second PSK, the second communication apparatus processes, based on the first PSK within an aging periodicity of the first PSK, a packet exchanged between the first communication apparatus and the second communication apparatus, and the second communication apparatus processes, based on the second PSK within an aging periodicity of the second PSK, a packet exchanged between the first communication apparatus and the second communication apparatus.

In an implementation, the method further includes: obtaining the second PSK based on the PSK key material.

In an implementation, the second communication apparatus stores a first authentication key, the first protocol packet further includes an authentication key material, the authentication key material indicates the first communication apparatus to generate an updated second authentication key, the second communication apparatus processes, based on the first authentication key within an aging periodicity of the first authentication key, an identity authentication packet exchanged between the first communication apparatus and the second communication apparatus, and the second communication apparatus processes, based on the second authentication key within an aging periodicity of the second authentication key, an identity authentication packet exchanged between the first communication apparatus and the second communication apparatus.

In an implementation, the method further includes: obtaining the second authentication key based on the authentication key material.

In an implementation, the second authentication key includes any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, the first protocol packet includes: an extensible authentication protocol EAP header, an EAP extension header, and a keyword field.

In an implementation, the first data key material is carried in the keyword field.

In an implementation, the keyword field includes any one or more of the following fields: a protocol version number field, a session identifier field, a key identifier field, an encrypted data field, a nonce field, an identifier field, and an integrity verification field.

In an implementation, the first data key material is carried in the encrypted data field.

In an implementation, the method further includes: receiving second indication information sent by the first communication apparatus, where the second indication information indicates that the first communication apparatus has a capability of automatically updating a data key.

In an implementation, the first protocol packet is an Internet key exchange IKE protocol-based packet.

In an implementation, the first data key material is carried in a payload field of the first protocol packet.

In an implementation, the first data key material is carried in a notification payload field of the first protocol packet.

In an implementation, the first data key material is carried in an extended TLV field of the first protocol packet.

In an implementation, the method further includes: receiving third indication information sent by the first communication apparatus, where the third indication information indicates that the first communication apparatus has a capability of automatically updating a data key.

In an implementation, the third indication information is carried in a notification payload field of an IKE protocol-based packet.

In an implementation, the third indication information is carried in a notification message type field of the IKE protocol-based packet, and the notification payload field of the IKE protocol-based packet includes the notification message type field.

In an implementation, the method further includes: receiving a seventh protocol packet sent by the first communication apparatus, where the seventh protocol packet indicates that the first communication apparatus has stored the second data key.

In an implementation, the seventh protocol packet includes fourth indication information, and the fourth indication information indicates that the first communication apparatus has stored the second data key.

In an implementation, the seventh protocol packet is an IKE protocol-based packet, and the fourth indication information is carried in a notification message type field of the seventh protocol packet.

In an implementation, the first protocol packet is an authentication exchange AUTH exchange packet.

In an implementation, the first protocol packet is a create child security association exchange CREATE_CHILD_SA exchange packet.

In an implementation, the first protocol packet is an informational exchange packet.

In an implementation, the first communication apparatus is an in-vehicle apparatus.

In an implementation, the second communication apparatus is an in-vehicle apparatus.

It should be noted that the method 700 corresponds to the method 600, and includes the steps performed by the second communication apparatus. Therefore, for the method 700, refer to the foregoing descriptions of the method 600. Repeated descriptions are omitted herein.

An embodiment of this application further provides an authentication key updating method 800. FIG. boa is a schematic flowchart of the authentication key updating method according to this embodiment of this application. The method 800 shown in FIG. 10*a* may be performed by a first communication apparatus. The first communication apparatus may be the communication apparatus 2 in the foregoing embodiments, and a second communication apparatus in the method 800 may correspond to the communication apparatus 1 in the foregoing embodiments. The method 800 shown in FIG. 10*a* may be applied to specifically implement the method 100 and the method 300 in the foregoing embodiments, and is for performing the steps performed by the communication apparatus 2 in the method 100 and the method 300. For example, the method 800 may include the following S801 and S802.

S801: Receive, within an aging periodicity of a first authentication key, a first protocol packet sent by the second communication apparatus, where the first protocol packet includes a first authentication key material for generating a second authentication key, the first authentication key is for processing, within the aging periodicity of the first authentication key, an identity authentication packet exchanged between the first communication apparatus and the second communication apparatus, and the second authentication key is for processing, within an aging periodicity of the second authentication key, an identity authentication packet exchanged between the first communication apparatus and the second communication apparatus.

S802: Obtain the second authentication key based on the first authentication key material, where the first communication apparatus and the second communication apparatus communicate with each other through a non-Ethernet interface, and/or the first communication apparatus or the second communication apparatus does not use an asymmetric key algorithm.

The first protocol packet herein may correspond to the packet 3 in the method 100 and the method 300. The first data key material herein may correspond to the authentication key material 1 in the method 100 and the method 300. The second authentication key herein may correspond to the updated authentication key in the method 100 and the method 300.

In an implementation, the method further includes: storing the second authentication key.

In an implementation, the first protocol packet includes first indication information, and the first indication information indicates the first communication apparatus to derive the second authentication key by using a symmetric key algorithm.

In this case, the first protocol packet may be an IKE protocol-based packet, and the first indication information herein may correspond to the keytypebitmap field of the packet 3 in the method 300.

In an implementation, the second authentication key includes any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, the generating the second authentication key based on the first authentication key material includes: generating the second authentication key based on the first authentication key material and a second authentication key material of the first communication apparatus.

The second authentication key material herein may correspond to the authentication key material 2 in the method 100.

In an implementation, the method further includes: sending a third authentication key material to the second communication apparatus, to enable the second communication apparatus to generate the second authentication key based on the third authentication key material.

The third authentication key material herein may correspond to the authentication key material 3 in the method 100.

In an implementation, the obtaining the second authentication key based on the first authentication key material includes: determining the first authentication key material as the second authentication key.

In an implementation, the obtaining the second authentication key based on the first authentication key material includes: generating the second authentication key based on the first authentication key material and a first key derivation algorithm.

The first key derivation algorithm herein may correspond to the key derivation algorithm 2 in the method 100.

In an implementation, the generating the second authentication key based on the first authentication key material and a first key derivation algorithm includes: performing calculation on the first authentication key material by using a first algorithm, to obtain an intermediate value; and generating the second authentication key based on the intermediate value and the first key derivation algorithm.

In an implementation, the first authentication key material includes: a nonce.

In an implementation, the first authentication key material includes any one or more of the following: a nonce for generating the integrity verification key, a nonce for generating the cipher key, a nonce for generating the key derivation key, and a nonce for generating the identity authentication key.

In an implementation, the first protocol packet is a PSK-based extensible authentication protocol EAP-PSK packet.

In an implementation, the first protocol packet includes an extended type-length-value TLV field, and the extended TLV field includes the first authentication key material.

In an implementation, the first authentication key material is encrypted in the first protocol packet by using a first key.

The first key herein may be the foregoing key for encrypting the fields shown in FIG. 3e.

In an implementation, the first protocol packet further includes first integrity verification information, and the first integrity verification information is for performing integrity verification on the first protocol packet.

The first integrity verification information herein may correspond to the value carried in the ICV field of the packet 3 in the method 100.

In an implementation, before the obtaining the second authentication key based on the first authentication key material, the method further includes: performing integrity verification on the first protocol packet based on the first integrity verification information.

In an implementation, the first protocol packet carries an identifier of the first key, and the obtaining the second authentication key based on the first authentication key material includes: determining the first key based on the identifier of the first key; decrypting the first authentication key material by using the first key; and obtaining the second authentication key based on the decrypted first authentication key material.

In an implementation, the first protocol packet includes an identifier of a second key, the identifier of the second key identifies the second key, and the performing integrity verification on the first protocol packet based on the first integrity verification information includes: determining the second key based on the identifier of the second key; and performing integrity verification on the first protocol packet based on the second key and the first integrity verification information.

The second key herein may correspond to AIK in the formula (3) in the method 100.

In an implementation, before the receiving a first protocol packet, the method further includes: sending a second protocol packet to the second communication apparatus, where the second protocol packet carries an identifier of a third key, the identifier of the third key identifies the third key, and the third key is for deriving the first key.

The second protocol packet herein may correspond to the packet 2 in the method 100, and the identifier of the third key may be carried in the key ID field of the packet 2.

In an implementation, before the receiving a first protocol packet, the method further includes: sending a second protocol packet to the second communication apparatus, where the second protocol packet carries an identifier of a third key, the identifier of the third key identifies the third key, the third key is for deriving a second key, and the second key is for calculating the first integrity verification information.

In an implementation, the third key includes a first PSK stored in the first communication apparatus.

In an implementation, before the sending a second protocol packet to the second communication apparatus, the method further includes: receiving a third protocol packet from the second communication apparatus, where the third protocol packet is for requesting to perform identity authentication on the second communication apparatus.

The third protocol packet herein may correspond to the packet 1 in the method loft In an implementation, the third protocol packet carries the identifier of the third key.

In an implementation, the first protocol packet includes first identity authentication information, and the first identity authentication information is for performing identity authentication on the second communication apparatus.

The first identity authentication information herein may correspond to the identity authentication information 1 in the method 100.

In an implementation, the first identity authentication information is encrypted in the first protocol packet by using the first key.

In an implementation, the first identity authentication information is obtained by performing calculation on one or more of the following based on a fourth key: a part or all of fields in the third protocol packet or a part or all of fields in the second protocol packet.

The fourth key herein may correspond to the key 1 in the formula (1) in the method 100.

In an implementation, the method further includes: performing identity authentication on the second communication apparatus by using the first identity authentication information.

In an implementation, the performing identity authentication on the second communication apparatus by using the first identity authentication information includes: performing calculation on a target field by using the fourth key, to obtain third identity authentication information; and performing matching verification on the third identity authentication information and the first identity authentication information that is carried in the first protocol packet, where the target field includes one or more of the following: a part or all of the fields in the third protocol packet or a part or all of the fields in the second protocol packet.

In an implementation, the performing calculation on a target field by using the fourth key, to obtain third identity authentication information includes: performing calculation on the target field by using the fourth key, to obtain a first calculation result; and encrypting the first calculation result by using the first key, to obtain the third identity authentication information.

In an implementation, the fourth key is derived from the third key.

A third PSK herein may be a PSK different from the first PSK.

In an implementation, the fourth key is derived from the third PSK, and the first communication apparatus stores the third PSK.

In an implementation, the second protocol packet carries an identifier of the third PSK, and the identifier of the third PSK identifies the third PSK.

In an implementation, the method further includes: sending a fourth protocol packet to the second communication apparatus, where the fourth protocol packet carries second indication information, and the second indication information indicates that the first communication apparatus has stored the second authentication key.

The fourth protocol packet herein may correspond to the packet 4 in the method 100. The first indication information may be carried in the key material confirmed information in the packet 4.

In an implementation, the fourth protocol packet includes an extended TLV field, and the extended TLV field includes the second indication information.

In an implementation, the fourth protocol packet carries second integrity verification information, and the second integrity verification information is for performing integrity verification on the fourth protocol packet.

The second integrity verification information herein may be carried in the ICV field of the packet 4 in the method 100.

In an implementation, the fourth protocol packet includes second identity authentication information, and the second identity authentication information is for performing identity authentication on the first communication apparatus.

The second identity authentication information herein may correspond to the identity authentication information 2 in the method 100.

In an implementation, the second identity authentication information is encrypted in the fourth protocol packet by using the first key.

In an implementation, the second identity authentication information is obtained by performing calculation on one or more of the following based on the fourth key: a part or all of the fields in the second protocol packet or a part or all of the fields in the third protocol packet.

In an implementation, the method further includes: receiving a fifth protocol packet from the second communication apparatus, where the fifth protocol packet carries an identity authentication result and an authentication key update result.

The fifth protocol packet herein may correspond to the packet 5 in the method 100.

In an implementation, the method further includes: deleting the second authentication key if the identity authentication result in the fifth protocol packet indicates that the identity authentication fails or the authentication key update result in the fifth protocol packet indicates that an authentication key update fails.

In an implementation, the method further includes: sending a sixth protocol packet to the second communication apparatus, where the sixth protocol packet indicates that the first communication apparatus has received the fifth protocol packet.

The sixth protocol packet herein may correspond to the packet 6 in the method 100.

In an implementation, the method further includes: performing integrity verification on the fifth protocol packet.

In an implementation, the first communication apparatus stores the first PSK, the first protocol packet includes a PSK key material, the PSK key material is for generating an updated second PSK, the first communication apparatus processes, based on the first PSK within an aging periodicity of the first PSK, a packet exchanged between the first communication apparatus and the second communication apparatus, and the first communication apparatus processes, based on the second PSK within an aging periodicity of the second PSK, a packet exchanged between the first communication apparatus and the second communication apparatus; and the method further includes: obtaining the second PSK based on the PSK key material.

The PSK key material herein may correspond to the PSK key material 1 in the method 100 or the method 300. The first PSK herein may correspond to the PSK 1 in the method 100 or the method 300. The second PSK herein may correspond to the PSK 2 in the method 100 or the method 300.

In an implementation, the first communication apparatus stores a first data key, the first protocol packet includes a data key material, the data key material is for generating an updated second data key, the first communication apparatus processes, based on the first data key within an aging periodicity of the first data key, a data packet exchanged between the first communication apparatus and the second communication apparatus, and the first communication apparatus processes, based on the second data key within an aging periodicity of the second data key, a data packet exchanged between the first communication apparatus and the second communication apparatus. The method further includes: obtaining the second data key based on the data key material.

The data key material herein may correspond to the data key material 1 in the method 100. The second data key herein may correspond to the updated data key in the method 100.

In an implementation, the second data key includes any one or more of the following: an integrity verification key and a cipher key, where the integrity verification key is for performing integrity verification on the data packet, and the cipher key is for encrypting the data packet.

In an implementation, the first protocol packet includes: an EAP header, an EAP extension header, and a keyword field.

The EAP header may correspond to the EAP header field in FIG. 3c, the EAP extension header may correspond to the EAP type field in FIG. 3c, and the keyword field may correspond to the other fields in FIG. 3c.

In an implementation, the first authentication key material is carried in the keyword field.

In an implementation, the keyword field includes any one or more of the following fields: a protocol version number field, a session identifier field, a key identifier field, an encrypted data field, a nonce field, an identifier field, and an integrity verification field.

The protocol version number field may correspond to the flags field in FIG. 3c, the session identifier field may correspond to the session ID field in FIG. 3c, the key identifier field may correspond to the key ID field in FIG. 3c, the encrypted data field may correspond to the encrypted payload field in FIG. 3c, the nonce field may correspond to the nonce field in FIG. 3b or FIG. 3a, the identifier field may correspond to the ID field in FIG. 3a or FIG. 3b, and the integrity verification field may correspond to the ICV field in FIG. 3c.

In an implementation, the first authentication key material is carried in the encrypted data field.

In an implementation, the method further includes: sending third indication information to the second communication apparatus, where the third indication information indicates that the first communication apparatus has a capability of automatically updating an authentication key.

The third indication information herein may correspond to the indication information 1 in the method 100.

In an implementation, the first protocol packet is an Internet key exchange IKE protocol-based packet.

In an implementation, the first authentication key material is carried in a payload field of the first protocol packet.

In an implementation, the first authentication key material is carried in a notification payload field of the first protocol packet.

In an implementation, the first authentication key material is carried in an extended TLV field of the first protocol packet.

In an implementation, the method further includes: sending fourth indication information to the second communication apparatus, where the fourth indication information indicates that the first communication apparatus has a capability of automatically updating an authentication key.

The fourth indication information herein may correspond to the indication information 1' in the method 300.

In an implementation, the fourth indication information is carried in a notification payload field of an IKE protocol-based packet.

In an implementation, the fourth indication information is carried in a notification message type field of the IKE protocol-based packet, and the notification payload field of the IKE protocol-based packet includes the notification message type field.

In an implementation, the method further includes: sending a seventh protocol packet to the second communication apparatus, where the seventh protocol packet indicates that the first communication apparatus has stored the second authentication key.

The seventh protocol packet herein may correspond to the packet 4 in the method 300.

In an implementation, the seventh protocol packet includes fifth indication information, and the fifth indication information indicates that the first communication apparatus has stored the second authentication key.

The fifth indication information herein may correspond to the key update result in the method 300.

In an implementation, the seventh protocol packet is an IKE protocol-based packet, and the fifth indication information is carried in a notification message type field of the seventh protocol packet.

In an implementation, the first protocol packet is an authentication exchange AUTH exchange packet.

In an implementation, the first protocol packet is a create child security association exchange CREATE_CHILD_SA exchange packet.

In an implementation, the first protocol packet is an informational exchange packet.

In an implementation, the identity authentication key and the integrity verification key are the same.

In an implementation, the first communication apparatus is an in-vehicle apparatus.

In an implementation, the second communication apparatus is an in-vehicle apparatus.

Figure 10B:
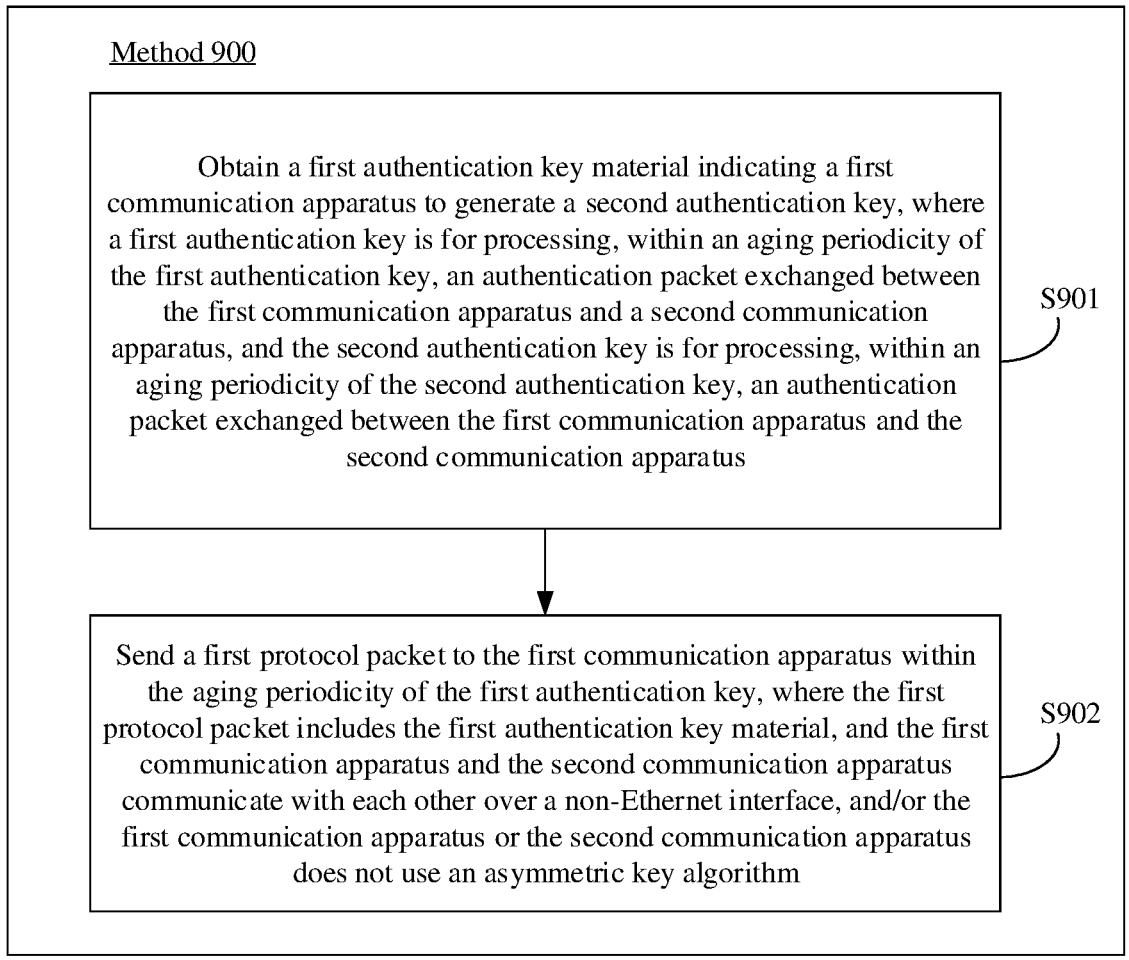
FIG. 10b is a schematic flowchart of an authentication key updating method according to an embodiment of this application.

An embodiment of this application further provides an authentication key updating method 900. FIG. 10b is a schematic flowchart of the authentication key updating method according to this embodiment of this application. The method 900 shown in FIG. 10b may be performed by a second communication apparatus. The second communication apparatus may be the communication apparatus 1 in the foregoing embodiments, and a first communication apparatus in the method 900 may be the communication apparatus 2 in the foregoing embodiments. The method 900 shown in FIG. 10b may be applied to specifically implement the method 100, the method 200, and the method 300 in the foregoing embodiments, and is for performing the steps performed by the communication apparatus 1 in the method 100, the method 200, and the method 300. For example, the method 900 may include the following S901 and S902.

S901: Obtain a first authentication key material indicating the first communication apparatus to generate a second authentication key, where a first authentication key is for processing, within an aging periodicity of the first authentication key, an authentication packet exchanged between the first communication apparatus and the second communication apparatus, and the second authentication key is for processing, within an aging periodicity of the second authentication key, an authentication packet exchanged between the first communication apparatus and the second communication apparatus.

S902: Send a first protocol packet to the first communication apparatus within the aging periodicity of the first authentication key, where the first protocol packet includes the first authentication key material, and the first communication apparatus and the second communication apparatus communicate with each other through a non-Ethernet interface, and/or the first communication apparatus or the second communication apparatus does not use an asymmetric key algorithm.

In an implementation, the method further includes: storing the first authentication key material.

In an implementation, the method further includes: receiving a third authentication key material sent by the first communication apparatus; and obtaining the second authentication key based on the third authentication key material.

In an implementation, the method further includes: obtaining the second authentication key based on the first authentication key material.

In an implementation, the obtaining the second authentication key based on the first authentication key material includes: obtaining the second authentication key based on the first authentication key material before the aging periodicity of the second authentication key starts.

In an implementation, the obtaining the second authentication key based on the first authentication key material includes: determining the first authentication key material as the second authentication key.

In an implementation, the obtaining the second authentication key based on the first authentication key material includes: obtaining the second authentication key based on the first authentication key material and a first key derivation algorithm.

In an implementation, the obtaining the second authentication key based on the first authentication key material and a first key derivation algorithm includes: performing calculation on the first authentication key material by using a first algorithm, to obtain an intermediate value; and generating the second authentication key based on the intermediate value and the first key derivation algorithm.

In an implementation, the method further includes: storing the second authentication key. In an implementation, the second authentication key includes any one or more of the following: an integrity verification key, a cipher key, a key derivation key, and an identity authentication key, where the integrity verification key is for performing integrity verification on the identity authentication packet, the cipher key is for encrypting the identity authentication packet, the key derivation key is for deriving another key, and the identity authentication key is for calculating identity authentication information in the authentication packet.

In an implementation, the first authentication key material includes a nonce.

In an implementation, the first authentication key material includes any one or more of the following: a nonce for generating the integrity verification key, a nonce for generating the cipher key, a nonce for generating the key derivation key, and a nonce for generating the identity authentication key.

In an implementation, the identity authentication key and the integrity verification key are the same.

In an implementation, the first protocol packet is a PSK-based extensible authentication protocol EAP-PSK packet.

In an implementation, the first protocol packet includes an extended type-length-value TLV field, and the extended TLV field includes the first authentication key material.

In an implementation, the first authentication key material is encrypted in the first protocol packet by using a first key.

In an implementation, the first protocol packet further includes first integrity verification information, and the first integrity verification information is for performing integrity verification on the first protocol packet.

In an implementation, the first protocol packet carries an identifier of the first key.

In an implementation, the first protocol packet includes an identifier of a second key, the identifier of the second key identifies the second key, and the second key is for calculating the first integrity verification information.

In an implementation, before the sending a first protocol packet to the first communication apparatus, the method further includes: receiving a second protocol packet sent by the first communication apparatus, where the second protocol packet carries an identifier of a third key, the identifier of the third key identifies the third key, and the third key is for deriving the first key.

In an implementation, before the sending a first protocol packet to the first communication apparatus, the method further includes: receiving a second protocol packet sent by the first communication apparatus, where the second protocol packet carries an identifier of a third key, the identifier of the third key identifies the third key, the third key is for deriving a second key, and the second key is for calculating the first integrity verification information.

In an implementation, the third key includes a first PSK stored in the first communication apparatus and the second communication apparatus.

In an implementation, before the receiving a second protocol packet sent by the first communication apparatus, the method further includes: sending a third protocol packet to the first communication apparatus, where the third protocol packet is for requesting to perform identity authentication on the second communication apparatus.

In an implementation, the third protocol packet carries the identifier of the third key.

In an implementation, the first protocol packet includes first identity authentication information, and the first identity authentication information is for performing identity authentication on the second communication apparatus.

In an implementation, the first identity authentication information is encrypted in the first protocol packet by using the first key.

In an implementation, the first identity authentication information is obtained by performing calculation on one or more of the following based on a fourth key: a part or all of fields in the third protocol packet or a part or all of fields in the second protocol packet.

In an implementation, the fourth key is derived from the third key.

In an implementation, the fourth key is derived from a third PSK stored in the first communication apparatus and the second communication apparatus.

In an implementation, the second protocol packet carries an identifier of the third PSK, and the identifier of the third PSK identifies the third PSK.

In an implementation, the method further includes: receiving a fourth protocol packet sent by the first communication apparatus, where the fourth protocol packet carries first indication information, and the first indication information indicates that the first communication apparatus has stored the second authentication key.

In an implementation, the fourth protocol packet includes an extended TLV field, and the extended TLV field includes the first indication information.

In an implementation, the fourth protocol packet carries second integrity verification information, and the second integrity verification information is for performing integrity verification on the fourth protocol packet.

In an implementation, the fourth protocol packet includes second identity authentication information, and the second identity authentication information is for performing identity authentication on the first communication apparatus.

In an implementation, the second identity authentication information is encrypted in the fourth protocol packet by using the first key.

In an implementation, the second identity authentication information is obtained by performing calculation on one or more of the following based on the fourth key: a part or all of the fields in the second protocol packet or a part or all of the fields in the third protocol packet.

In an implementation, the method further includes: performing identity authentication on the first communication apparatus by using the second identity authentication information.

In an implementation, the performing identity authentication on the first communication apparatus by using the second identity authentication information includes: performing calculation on a target field by using the fourth key, to obtain fourth identity authentication information; and performing matching verification on the fourth identity authentication information and the second identity authentication information carried in the fourth protocol packet, where the target field includes one or more of the following: a part or all of the fields in the third protocol packet or a part or all of the fields in the second protocol packet.

In an implementation, the performing calculation on a target field by using the fourth key, to obtain fourth identity authentication information includes: performing calculation on the target field by using the fourth key, to obtain a second calculation result; and encrypting the second calculation result by using the first key, to obtain the fourth identity authentication information.

In an implementation, the method further includes: sending a fifth protocol packet to the first communication apparatus, where the fifth protocol packet carries an identity authentication result and an authentication key update result.

In an implementation, the method further includes: receiving a sixth protocol packet sent by the first communication apparatus, where the sixth protocol packet indicates that the first communication apparatus has received the fifth protocol packet.

In an implementation, the second communication apparatus stores the first PSK, the first protocol packet further includes a PSK key material, the PSK key material indicates the first communication apparatus to generate an updated second PSK, the second communication apparatus processes, based on the first PSK within an aging periodicity of the first PSK, a packet exchanged between the first communication apparatus and the second communication apparatus, and the second communication apparatus processes, based on the second PSK within an aging periodicity of the second PSK, a packet exchanged between the first communication apparatus and the second communication apparatus.

In an implementation, the method further includes: obtaining the second PSK based on the PSK key material.

In an implementation, the second communication apparatus stores a first data key, the first protocol packet further includes a data key material, the data key material indicates the first communication apparatus to generate an updated second data key, the second communication apparatus processes, based on the first data key within an aging periodicity of the first data key, an identity data packet exchanged between the first communication apparatus and the second communication apparatus, and the second communication apparatus processes, based on the second data key within an aging periodicity of the second data key, an identity data packet exchanged between the first communication apparatus and the second communication apparatus.

In an implementation, the method further includes: obtaining the second data key based on the data key material.

In an implementation, the second data key includes any one or more of the following: an integrity verification key and a cipher key, where the integrity verification key is for performing integrity verification on the data packet, and the cipher key is for encrypting the data packet.

In an implementation, the first protocol packet includes: an extensible authentication protocol EAP header, an EAP extension header, and a keyword field.

In an implementation, the first authentication key material is carried in the keyword field.

In an implementation, the keyword field includes any one or more of the following fields: a protocol version number field, a session identifier field, a key identifier field, an encrypted data field, a nonce field, an identifier field, and an integrity verification field.

In an implementation, the first authentication key material is carried in the encrypted data field.

In an implementation, the method further includes: receiving second indication information sent by the first communication apparatus, where the second indication information indicates that the first communication apparatus has a capability of automatically updating an authentication key.

In an implementation, the first protocol packet is an Internet key exchange IKE protocol-based packet.

In an implementation, the first authentication key material is carried in a payload field of the first protocol packet.

In an implementation, the first authentication key material is carried in a notification payload field of the first protocol packet.

In an implementation, the first authentication key material is carried in an extended TLV field of the first protocol packet.

In an implementation, the method further includes: receiving third indication information sent by the first communication apparatus, where the third indication information indicates that the first communication apparatus has a capability of automatically updating an authentication key.

In an implementation, the third indication information is carried in a notification payload field of an IKE protocol-based packet.

In an implementation, the third indication information is carried in a notification message type field of the IKE protocol-based packet, and the notification payload field of the IKE protocol-based packet includes the notification message type field.

In an implementation, the method further includes: receiving a seventh protocol packet sent by the first communication apparatus, where the seventh protocol packet indicates that the first communication apparatus has stored the second authentication key.

In an implementation, the seventh protocol packet includes fourth indication information, and the fourth indication information indicates that the first communication apparatus has stored the second authentication key.

In an implementation, the seventh protocol packet is an IKE protocol-based packet, and the fourth indication information is carried in a notification message type field of the seventh protocol packet.

In an implementation, the first protocol packet is an authentication exchange AUTH exchange packet.

In an implementation, the first protocol packet is a create child security association exchange CREATE_CHILD_SA exchange packet.

In an implementation, the first protocol packet is an informational exchange packet.

In an implementation, the first communication apparatus is an in-vehicle apparatus.

In an implementation, the second communication apparatus is an in-vehicle apparatus.

It should be noted that the method 900 corresponds to the method 800, and includes the steps performed by the second communication apparatus. Therefore, for the method 900, refer to the foregoing descriptions of the method 800. Repeated descriptions are omitted herein.

Figure 11A:
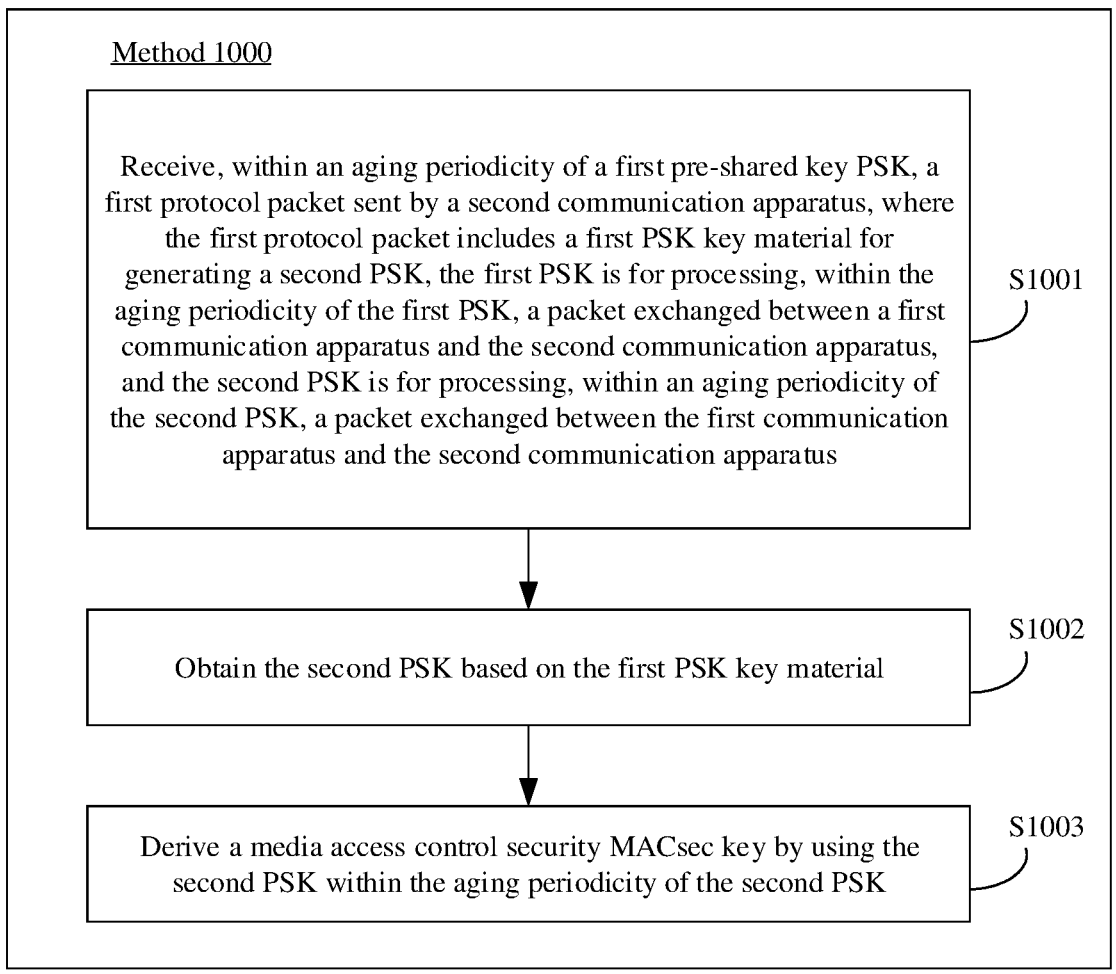
FIG. 11a is a schematic flowchart of a PSK-based MACsec communication method according to an embodiment of this application.

An embodiment of this application further provides a PSK-based MACsec communication method 1000. FIG. 11a is a schematic flowchart of the PSK-based MACsec communication method according to this embodiment of this application. The method 1000 shown in FIG. 11a may be performed by a first communication apparatus. The first communication apparatus may be the communication apparatus 2 in the foregoing embodiments, and a second communication apparatus in the method 1000 may be the communication apparatus 1 in the foregoing embodiments. The method 1000 shown in FIG. 11a may be applied to specifically implement the method 100, the method 200, and the method 300 in the foregoing embodiments, and is for performing the related steps performed by the communication apparatus 2 in the method 100, the method 200, and the method 300. For example, the method 1000 may include the following S1001 to S1003.

S1001: Receive, within an aging periodicity of a first pre-shared key PSK, a first protocol packet sent by the second communication apparatus, where the first protocol packet includes a first PSK key material for generating a second PSK, the first PSK is for processing, within the aging periodicity of the first PSK, a packet exchanged between the first communication apparatus and the second communication apparatus, and the second PSK is for processing, within an aging periodicity of the second PSK, a packet exchanged between the first communication apparatus and the second communication apparatus.

S1002: Obtain the second PSK based on the first PSK key material.

S1003: Derive a media access control security MACsec key by using the second PSK within the aging periodicity of the second PSK.

The first PSK herein may correspond to the PSK 1 in the foregoing method 100, method 200, and method 300. The first protocol packet herein may correspond to the packet 3 in the method 100, the method 200, and the method 300. The first PSK key material herein may correspond to the PSK key material 1 in the method 100, the method 200, and the method 300. The second PSK herein may correspond to the PSK 2 in the method 100, the method 200, and the method 300.

In an implementation, the method further includes: storing the second PSK in a non-volatile memory area of the first communication apparatus.

In an implementation, the deriving a MACsec key by using the second PSK includes: deriving the MACsec key by using the second PSK as a secure connectivity association key CAK.

In an implementation, the deriving a MACsec key by using the second PSK includes: generating a master session key MSK based on the second PSK; deriving a secure connectivity association key CAK by using the MSK; and deriving the media access control security MACsec key by using the CAK.

In an implementation, the method further includes: deriving the MACsec key by using the first PSK within the aging periodicity of the first PSK.

In addition, in the method 1000, the first communication apparatus may further perform other steps performed by the first communication apparatus in the foregoing method 400. For details, refer to the foregoing descriptions of the method 400. Repeated descriptions are omitted herein.

Figure 11B:
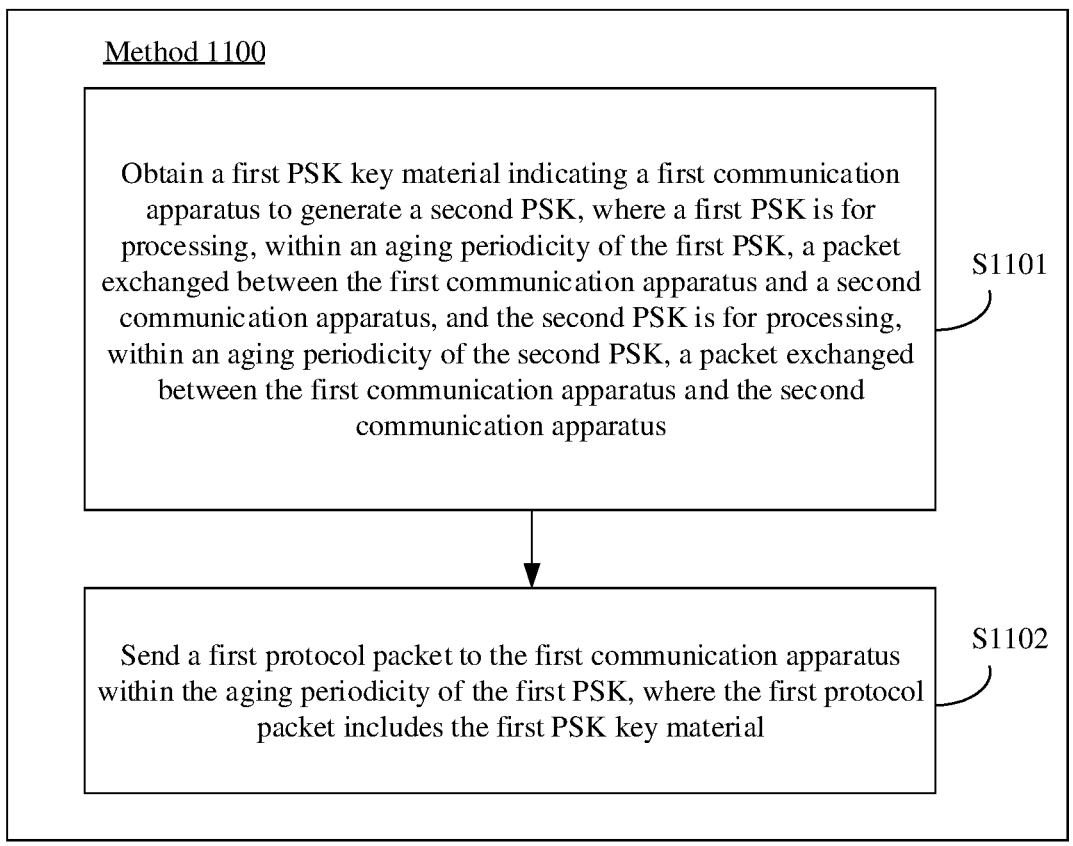
FIG. 11b is a schematic flowchart of a PSK-based MACsec communication method according to an embodiment of this application.

An embodiment of this application further provides a PSK-based MACsec communication method 1100. FIG. 11b is a schematic flowchart of the PSK-based MACsec communication method according to this embodiment of this application. The method 1100 shown in FIG. 11b may be performed by a second communication apparatus. The second communication apparatus may be the communication apparatus 1 in the foregoing embodiments, and a first communication apparatus in the method 1100 may be the communication apparatus 2 in the foregoing embodiments. The method 1100 shown in FIG. 11b may be applied to specifically implement the method 100, the method 200, and the method 300 in the foregoing embodiments, and is for performing the related steps performed by the communication apparatus 1 in the method 100, the method 200, and the method 300. For example, the method 1100 may include the following S1101 and S1102.

S1101: Obtain a first PSK key material indicating the first communication apparatus to generate a second PSK, where a first PSK is for processing, within an aging periodicity of the first PSK, a packet exchanged between the first communication apparatus and the second communication apparatus, and the second PSK is for processing, within an aging periodicity of the second PSK, a packet exchanged between the first communication apparatus and the second communication apparatus.

S1102: Send a first protocol packet to the first communication apparatus within the aging periodicity of the first PSK, where the first protocol packet includes the first PSK key material.

In an implementation, the method further includes: storing the first PSK key material.

In an implementation, the method further includes: deriving a media access control security MACsec key by using the second PSK within the aging periodicity of the second PSK.

In an implementation, the deriving a MACsec key by using the second PSK includes: deriving the MACsec key by using the second PSK as a secure connectivity association key CAK.

In an implementation, the deriving a MACsec key by using the second PSK includes: generating a master session key MSK based on the second PSK; deriving a secure connectivity association key CAK by using the MSK; and deriving the media access control security MACsec key by using the CAK.

In an implementation, the method further includes: deriving the MACsec key by using the first PSK in the aging periodicity of the first PSK.

In an implementation, an identifier of the CAK is generated based on any one or more of the following parameters: a first nonce generated by the first communication apparatus, a second nonce generated by the second communication apparatus, and a session identifier of the first protocol packet.

In an implementation, the first communication apparatus is an in-vehicle apparatus.

In an implementation, the second communication apparatus is an in-vehicle apparatus.

In addition, in the method 1100, the second communication apparatus may further perform other steps performed by the second communication apparatus in the foregoing method 500. For details, refer to the foregoing descriptions of the method 500. Repeated descriptions are omitted herein.

In addition, the method 1100 corresponds to the method 1000, and includes the steps performed by the second communication apparatus. Therefore, for the method 1100, refer to the foregoing descriptions of the method moo. Repeated descriptions are omitted herein.

Figure 12:
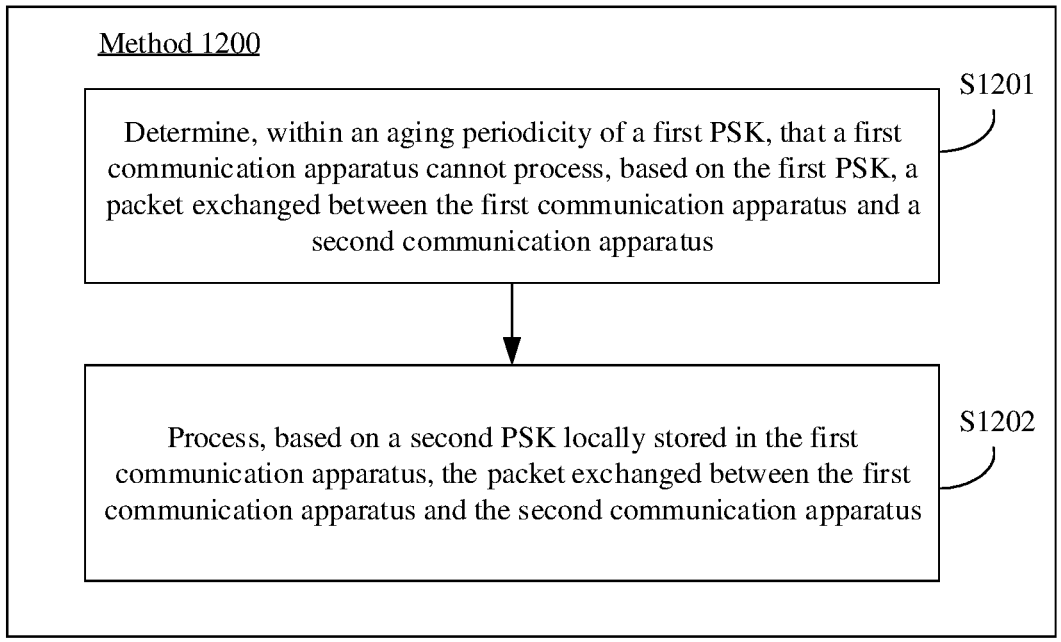
FIG. 12 is a schematic flowchart of a PSK processing method according to an embodiment of this application.

An embodiment of this application further provides a PSK processing method 1200. FIG. 12 is a schematic flowchart of the PSK processing method according to this embodiment of this application. The method 1200 shown in FIG. 12 may be performed by a first communication apparatus or a second communication apparatus. The first communication apparatus may be the communication apparatus 2 in the foregoing embodiments, and the second communication apparatus may be the communication apparatus 1 in the foregoing embodiments. The method 1200 shown in FIG. 12 may be applied to specifically implement step A and step B in the foregoing embodiments. In the method 1200, an example in which the first communication apparatus performs the method is used for description. For example, the method 1200 may include the following S1201 and S1202.

S1201: Determine, within an aging periodicity of a first PSK, that the first communication apparatus cannot process, based on the first PSK, a packet exchanged between the first communication apparatus and the second communication apparatus.

S1202: Process, based on a second PSK locally stored in the first communication apparatus, the packet exchanged between the first communication apparatus and the second communication apparatus.

The first PSK herein may correspond to the PSK 1 in step A, and the second PSK herein may correspond to the PSK 2 in step B.

In an implementation, the determining that the first communication apparatus cannot process, based on the first PSK, a packet exchanged between the first communication apparatus and the second communication apparatus includes: failing to read the first PSK from a non-volatile memory area corresponding to the first PSK.

In an implementation, the second PSK is generated by the first communication apparatus based on a PSK key material within the aging periodicity of the first PSK.

The PSK key material herein may correspond to the PSK key material 1 in the foregoing descriptions of step A and step B.

In an implementation, the method further includes: receiving, within the aging periodicity of the first PSK, a first protocol packet sent by the second communication apparatus, where the first protocol packet includes the PSK key material, the PSK key material is for generating the second PSK, the first communication apparatus processes, based on the first PSK within the aging periodicity of the first PSK, the packet exchanged between the first communication apparatus and the second communication apparatus, and the first communication apparatus processes, based on the second PSK within an aging periodicity of the second PSK, the packet exchanged between the first communication apparatus and the second communication apparatus; obtaining the second PSK based on the PSK key material; and storing the second PSK.

The first protocol packet herein may be a same packet as the first protocol packet in the method 400. For the first protocol packet, refer to the descriptions of the first protocol packet in the method 400. Repeated descriptions are omitted herein.

In an implementation, the second PSK is a PSK preconfigured at delivery of the first communication apparatus.

In an implementation, the first communication apparatus further stores a third PSK, and the method further includes: determining that the first communication apparatus cannot process, based on the third PSK, the packet exchanged between the first communication apparatus and the second communication apparatus; and the processing, based on a second PSK locally stored in the first communication apparatus, the packet exchanged between the first communication apparatus and the second communication apparatus includes: when determining that the first communication apparatus cannot process, based on the third PSK, the packet exchanged between the first communication apparatus and the second communication apparatus, processing, based on the second PSK locally stored in the first communication apparatus, the packet exchanged between the first communication apparatus and the second communication apparatus.

The third PSK herein may correspond to the PSK 3 in the foregoing descriptions of step A and step B.

In an implementation, the determining that the first communication apparatus cannot process, based on the third PSK, the packet exchanged between the first communication apparatus and the second communication apparatus includes: failing to read the third PSK from a non-volatile memory area corresponding to the third PSK.

In an implementation, the processing, based on a second PSK, the packet exchanged between the first communication apparatus and the second communication apparatus includes: deriving a key by using the second PSK; and processing, by using the derived key, the packet exchanged between the first communication apparatus and the second communication apparatus.

In an implementation, before determining that the first communication apparatus cannot process, based on the first PSK, the packet exchanged between the first communication apparatus and the second communication apparatus, the first communication apparatus does not use the second PSK to process the packet exchanged between the first communication apparatus and the second communication apparatus.

In an implementation, the second PSK is stored in a non-volatile memory area of the first communication apparatus.

In an implementation, the processing, based on a second PSK locally stored in the first communication apparatus, the packet exchanged between the first communication apparatus and the second communication apparatus includes: processing, by using the key derived from the second PSK, a first packet exchanged between the first communication apparatus and the second communication apparatus, where the first packet is for performing identity authentication on the first communication apparatus.

The first packet herein may correspond to the packet 1 in the foregoing descriptions of step A and step B.

In an implementation, the processing, based on a second PSK locally stored in the first communication apparatus, the packet exchanged between the first communication apparatus and the second communication apparatus includes: processing, by using the key derived from the second PSK, a second packet exchanged between the first communication apparatus and the second communication apparatus, where the second packet is for updating the first PSK stored in the first communication apparatus.

The second packet herein may correspond to the packet 2 in the foregoing descriptions of step A and step B.

In an implementation, the method further includes: sending alarm information to a control management device, where the alarm information indicates that the first communication apparatus cannot process, based on the first PSK within the aging periodicity of the first PSK, the packet exchanged between the first communication apparatus and the second communication apparatus.

Figure 13:
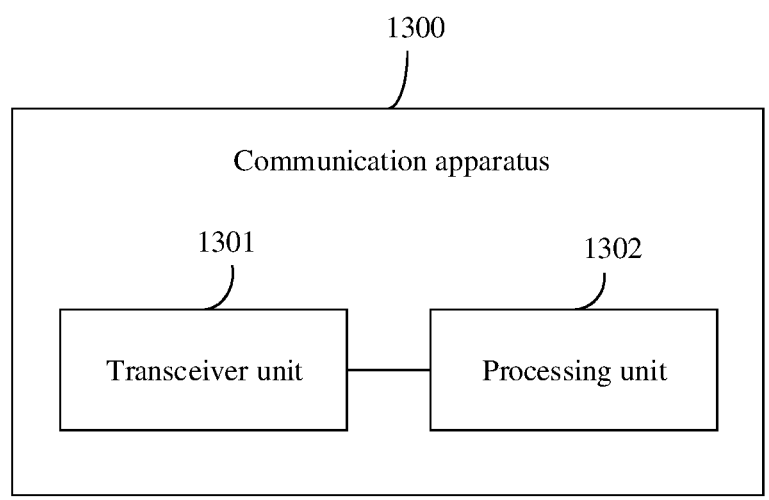
FIG. 13 is a schematic diagram of a structure of a communication apparatus according to an embodiment of this application.

In addition, an embodiment of this application further provides a communication apparatus 1300, as shown in FIG. 13. FIG. 13 is a schematic diagram of a structure of the communication apparatus according to this embodiment of this application. The communication apparatus 1300 includes a transceiver unit 1301 and a processing unit 1302. The communication apparatus 1300 may be configured to perform the method 100, the method 200, the method 300, the method 400, the method 500, the method 600, the method 700, the method 800, the method 900, the method moo, the method 1100, or the method 1200 in the foregoing embodiments.

In an example, the communication apparatus 1300 may perform the method 100 in the foregoing embodiment. When the communication apparatus 1300 is configured to perform the method 100 in the foregoing embodiment, the communication apparatus 1300 is equivalent to the communication apparatus 1 in the method 100. The transceiver unit 1301 is configured to perform receiving and sending operations performed by the communication apparatus 1 in the method 100. The processing unit 1302 is configured to perform an operation, other than the receiving and sending operations, performed by the communication apparatus 1 in the method 100. For example, the processing unit 1302 is configured to obtain a key material 1, and obtain a packet 3 including the key material 1. The transceiver unit 1301 is configured to send the packet 3 to a communication apparatus 2.

In an example, the communication apparatus 1300 may perform the method 100 in the foregoing embodiment. When the communication apparatus 1300 is configured to perform the method 100 in the foregoing embodiment, the communication apparatus 1300 is equivalent to the communication apparatus 2 in the method 100. The transceiver unit 1301 is configured to perform receiving and sending operations performed by the communication apparatus 2 in the method 100. The processing unit 1302 is configured to perform an operation, other than the receiving and sending operations, performed by the communication apparatus 2 in the method 100. For example, the transceiver unit 1301 is configured to receive a packet 3 within an aging periodicity of a first key, where the packet 3 includes a key material 1. The processing unit 1302 is configured to obtain an updated key based on the key material 1.

In an example, the communication apparatus 1300 may perform the method 200 in the foregoing embodiment. When the communication apparatus 1300 is configured to perform the method 200 in the foregoing embodiment, the communication apparatus 1300 is equivalent to the communication apparatus 1 in the method 200. The transceiver unit 1301 is configured to perform receiving and sending operations performed by the communication apparatus 1 in the method 200. The processing unit 1302 is configured to perform an operation, other than the receiving and sending operations, performed by the communication apparatus 1 in the method 200. For example, the processing unit 1302 is configured to obtain a key material 1, and obtain a packet 3 including the key material 1. The transceiver unit 1301 is configured to send the packet 3 to a communication apparatus 2.

In an example, the communication apparatus 1300 may perform the method 200 in the foregoing embodiment. When the communication apparatus 1300 is configured to perform the method 200 in the foregoing embodiment, the communication apparatus 1300 is equivalent to the communication apparatus 2 in the method 200. The transceiver unit 1301 is configured to perform receiving and sending operations performed by the communication apparatus 2 in the method 200. The processing unit 1302 is configured to perform an operation, other than the receiving and sending operations, performed by the communication apparatus 2 in the method 200. For example, the transceiver unit 1301 is configured to receive a packet 3 within an aging periodicity of a first key, where the packet 3 includes a key material 1. The processing unit 1302 is configured to obtain an updated key based on the key material 1.

In an example, the communication apparatus 1300 may perform the method 300 in the foregoing embodiment. When the communication apparatus 1300 is configured to perform the method 300 in the foregoing embodiment, the communication apparatus 1300 is equivalent to the communication apparatus 1 in the method 300. The transceiver unit 1301 is configured to perform receiving and sending operations performed by the communication apparatus 1 in the method 300. The processing unit 1302 is configured to perform an operation, other than the receiving and sending operations, performed by the communication apparatus 1 in the method 300. For example, the processing unit 1302 is configured to obtain a key material 1, and obtain a packet 3 including the key material 1. The transceiver unit 1301 is configured to send the packet 3 to a communication apparatus 2.

In an example, the communication apparatus 1300 may perform the method 300 in the foregoing embodiment. When the communication apparatus 1300 is configured to perform the method 300 in the foregoing embodiment, the communication apparatus 1300 is equivalent to the communication apparatus 2 in the method 300. The transceiver unit 1301 is configured to perform receiving and sending operations performed by the communication apparatus 2 in the method 300. The processing unit 1302 is configured to perform an operation, other than the receiving and sending operations, performed by the communication apparatus 2 in the method 300. For example, the transceiver unit 1301 is configured to receive a packet 3 within an aging periodicity of a first key, where the packet 3 includes a key material 1. The processing unit 1302 is configured to obtain an updated key based on the key material 1.

In an example, the communication apparatus 1300 may perform the method 400 in the foregoing embodiment. When the communication apparatus 1300 is configured to perform the method 400 in the foregoing embodiment, the communication apparatus 1300 is equivalent to the first communication apparatus in the method 400. The transceiver unit 1301 is configured to perform receiving and sending operations performed by the first communication apparatus in the method 400. The processing unit 1302 is configured to perform an operation, other than the receiving and sending operations, performed by the first communication apparatus in the method 400. For example, the transceiver unit 1301 is configured to receive, within an aging periodicity of a first PSK, a first protocol packet sent by a second communication apparatus, where the first protocol packet includes a first PSK key material, and the first PSK key material is for generating an updated second PSK. The processing unit 1302 is configured to obtain the second PSK based on the first PSK key material.

In an example, the communication apparatus 1300 may perform the method 500 in the foregoing embodiment. When the communication apparatus 1300 is configured to perform the method 500 in the foregoing embodiment, the communication apparatus 1300 is equivalent to the second communication apparatus in the method 500. The transceiver unit 1301 is configured to perform receiving and sending operations performed by the second communication apparatus in the method 500. The processing unit 1302 is configured to perform an operation, other than the receiving and sending operations, performed by the second communication apparatus in the method 500. For example, the processing unit 1302 is configured to obtain a first PSK key material, where the first PSK key material indicates a first communication apparatus to generate an updated second PSK. The transceiver unit 1301 is configured to send a first protocol packet to the first communication apparatus within an aging periodicity of a first PSK, where the first protocol packet includes the first PSK key material.

In an example, the communication apparatus 1300 may perform the method 600 in the foregoing embodiment. When the communication apparatus 1300 is configured to perform the method 600 in the foregoing embodiment, the communication apparatus 1300 is equivalent to the first communication apparatus in the method 600. The transceiver unit 1301 is configured to perform receiving and sending operations performed by the first communication apparatus in the method 600. The processing unit 1302 is configured to perform an operation, other than the receiving and sending operations, performed by the first communication apparatus in the method 600. For example, the transceiver unit 1301 is configured to receive, within an aging periodicity of a first data key, a first protocol packet sent by a second communication apparatus, where the first protocol packet includes a first data key material, and the first data key material is for generating an updated second data key. The processing unit 1302 is configured to obtain the second data key based on the first data key material.

In an example, the communication apparatus 1300 may perform the method 700 in the foregoing embodiment. When the communication apparatus 1300 is configured to perform the method 700 in the foregoing embodiment, the communication apparatus 1300 is equivalent to the second communication apparatus in the method 700. The transceiver unit 1301 is configured to perform receiving and sending operations performed by the second communication apparatus in the method 700. The processing unit 1302 is configured to perform an operation, other than the receiving and sending operations, performed by the second communication apparatus in the method 700. For example, the processing unit 1302 is configured to obtain a first data key material, where the first data key material indicates a first communication apparatus to generate an updated second data key. The transceiver unit 1301 is configured to send a first protocol packet to the first communication apparatus within an aging periodicity of a first data key, where the first protocol packet includes the first data key material.

In an example, the communication apparatus 1300 may perform the method 800 in the foregoing embodiment. When the communication apparatus 1300 is configured to perform the method 800 in the foregoing embodiment, the communication apparatus 1300 is equivalent to the first communication apparatus in the method 800. The transceiver unit 1301 is configured to perform receiving and sending operations performed by the first communication apparatus in the method 800. The processing unit 1302 is configured to perform an operation, other than the receiving and sending operations, performed by the first communication apparatus in the method 800. For example, the transceiver unit 1301 is configured to receive, within an aging periodicity of a first authentication key, a first protocol packet sent by a second communication apparatus, where the first protocol packet includes a first authentication key material, and the first authentication key material is for generating an updated second authentication key. The processing unit 1302 is configured to obtain the second authentication key based on the first authentication key material.

In an example, the communication apparatus 1300 may perform the method 900 in the foregoing embodiment. When the communication apparatus 1300 is configured to perform the method 900 in the foregoing embodiment, the communication apparatus 1300 is equivalent to the second communication apparatus in the method 900. The transceiver unit 1301 is configured to perform receiving and sending operations performed by the second communication apparatus in the method 900. The processing unit 1302 is configured to perform an operation, other than the receiving and sending operations, performed by the second communication apparatus in the method 900. For example, the processing unit 1302 is configured to obtain a first authentication key material, where the first authentication key material indicates a first communication apparatus to generate an updated second authentication key. The transceiver unit 1301 is configured to send a first protocol packet to the first communication apparatus within an aging periodicity of a first authentication key, where the first protocol packet includes the first authentication key material.

In an example, the communication apparatus 1300 may perform the method 1000 in the foregoing embodiment. When the communication apparatus 1300 is configured to perform the method 1000 in the foregoing embodiment, the communication apparatus 1300 is equivalent to the first communication apparatus in the method 1000. The transceiver unit 1301 is configured to perform receiving and sending operations performed by the first communication apparatus in the method 1000. The processing unit 1302 is configured to perform an operation, other than the receiving and sending operations, performed by the first communication apparatus in the method 1000. For example, the transceiver unit 1301 is configured to receive, within an aging periodicity of a first PSK, a first protocol packet sent by a second communication apparatus, where the first protocol packet includes a first PSK key material, and the first PSK key material is for generating an updated second PSK. The processing unit 1302 is configured to: obtain the second PSK based on the first PSK key material, and derive a MACsec key by using the second PSK within an aging periodicity of the second PSK.

In an example, the communication apparatus 1300 may perform the method 1100 in the foregoing embodiment. When the communication apparatus 1300 is configured to perform the method 1100 in the foregoing embodiment, the communication apparatus 1300 is equivalent to the second communication apparatus in the method 1100. The transceiver unit 1301 is configured to perform receiving and sending operations performed by the second communication apparatus in the method 1100. The processing unit 1302 is configured to perform an operation, other than the receiving and sending operations, performed by the second communication apparatus in the method 1100. For example, the processing unit 1302 is configured to obtain a first PSK key material, where the first PSK key material indicates a first communication apparatus to generate an updated second PSK. The transceiver unit 1301 is configured to send a first protocol packet to the first communication apparatus within an aging periodicity of a first PSK, where the first protocol packet includes the first PSK key material.

In an example, the communication apparatus 1300 may perform the method 1200 in the foregoing embodiment. When the communication apparatus 1300 is configured to perform the method 1200 in the foregoing embodiment, the communication apparatus 1300 is equivalent to the first communication apparatus in the method 1200. The transceiver unit 1301 is configured to perform receiving and sending operations performed by the first communication apparatus in the method 1200. The processing unit 1302 is configured to perform an operation, other than the receiving and sending operations, performed by the first communication apparatus in the method 1200. For example, the processing unit 1302 is configured to: determine, within an aging periodicity of a first PSK, that the first communication apparatus cannot process, based on the first PSK, a packet exchanged between the first communication apparatus and a second communication apparatus, and process, based on a second PSK locally stored in the first communication apparatus, the packet exchanged between the first communication apparatus and the second communication apparatus. In an example, the transceiver unit is configured to send alarm information to a control management device, where the alarm information indicates that the first communication apparatus cannot process, based on the first PSK within the aging periodicity of the first PSK, the packet exchanged between the first communication apparatus and the second communication apparatus.

Figure 14:
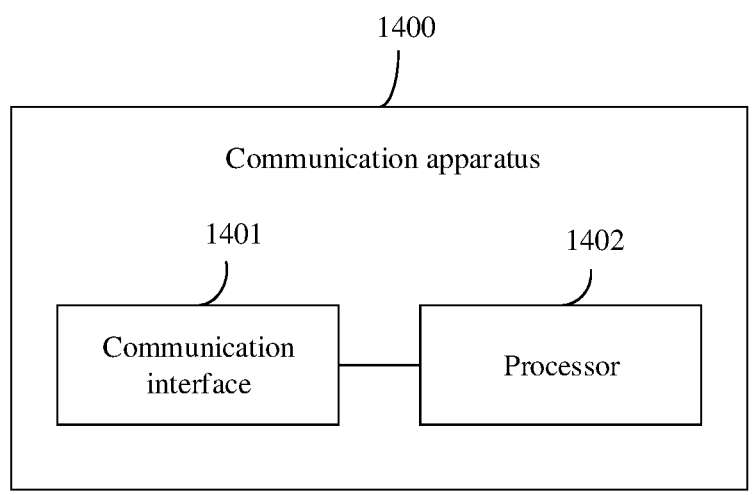
FIG. 14 is a schematic diagram of a structure of a communication apparatus according to an embodiment of this application.

In addition, an embodiment of this application further provides a communication apparatus 1400. FIG. 14 is a schematic diagram of a structure of the communication apparatus according to this embodiment of this application. The communication apparatus 1400 includes a communication interface 1401 and a processor 1402 connected to the communication interface 1401. The communication apparatus 1400 may be configured to perform the method 100, the method 200, the method 300, the method 400, the method 500, the method 600, the method 700, the method 800, the method 900, the method moo, the method 1100, or the method 1200 in the foregoing embodiments.

In an example, the communication apparatus 1400 may perform the method 100 in the foregoing embodiment. When the communication apparatus 1400 is configured to perform the method 100 in the foregoing embodiment, the communication apparatus 1400 is equivalent to the communication apparatus 1 in the method 100. The communication interface 1401 is configured to perform receiving and sending operations performed by the communication apparatus 1 in the method 100. The processor 1402 is configured to perform an operation, other than the receiving and sending operations, performed by the communication apparatus 1 in the method 100. For example, the processor 1402 is configured to obtain a key material 1, and obtain a packet 3 including the key material 1. The communication interface 1401 is configured to send the packet 3 to a communication apparatus 2.

In an example, the communication apparatus 1400 may perform the method 100 in the foregoing embodiment. When the communication apparatus 1400 is configured to perform the method 100 in the foregoing embodiment, the communication apparatus 1400 is equivalent to the communication apparatus 2 in the method 100. The communication interface 1401 is configured to perform receiving and sending operations performed by the communication apparatus 2 in the method 100. The processor 1402 is configured to perform an operation, other than the receiving and sending operations, performed by the communication apparatus 2 in the method 100. For example, the communication interface 1401 is configured to receive a packet 3 within an aging periodicity of a first key, where the packet 3 includes a key material 1. The processor 1402 is configured to obtain an updated key based on the key material 1.

In an example, the communication apparatus 1400 may perform the method 200 in the foregoing embodiment. When the communication apparatus 1400 is configured to perform the method 200 in the foregoing embodiment, the communication apparatus 1400 is equivalent to the communication apparatus 1 in the method 200. The communication interface 1401 is configured to perform receiving and sending operations performed by the communication apparatus 1 in the method 200. The processor 1402 is configured to perform an operation, other than the receiving and sending operations, performed by the communication apparatus 1 in the method 200. For example, the processor 1402 is configured to obtain a key material 1, and obtain a packet 3 including the key material 1. The communication interface 1401 is configured to send the packet 3 to a communication apparatus 2.

In an example, the communication apparatus 1400 may perform the method 200 in the foregoing embodiment. When the communication apparatus 1400 is configured to perform the method 200 in the foregoing embodiment, the communication apparatus 1400 is equivalent to the communication apparatus 2 in the method 200. The communication interface 1401 is configured to perform receiving and sending operations performed by the communication apparatus 2 in the method 200. The processor 1402 is configured to perform an operation, other than the receiving and sending operations, performed by the communication apparatus 2 in the method 200. For example, the communication interface 1401 is configured to receive a packet 3 within an aging periodicity of a first key, where the packet 3 includes a key material 1. The processor 1402 is configured to obtain an updated key based on the key material 1.

In an example, the communication apparatus 1400 may perform the method 300 in the foregoing embodiment. When the communication apparatus 1400 is configured to perform the method 300 in the foregoing embodiment, the communication apparatus 1400 is equivalent to the communication apparatus 1 in the method 300. The communication interface 1401 is configured to perform receiving and sending operations performed by the communication apparatus 1 in the method 300. The processor 1402 is configured to perform an operation, other than the receiving and sending operations, performed by the communication apparatus 1 in the method 300. For example, the processor 1402 is configured to obtain a key material 1, and obtain a packet 3 including the key material 1. The communication interface 1401 is configured to send the packet 3 to a communication apparatus 2.

In an example, the communication apparatus 1400 may perform the method 300 in the foregoing embodiment. When the communication apparatus 1400 is configured to perform the method 300 in the foregoing embodiment, the communication apparatus 1400 is equivalent to the communication apparatus 2 in the method 300. The communication interface 1401 is configured to perform receiving and sending operations performed by the communication apparatus 2 in the method 300. The processor 1402 is configured to perform an operation, other than the receiving and sending operations, performed by the communication apparatus 2 in the method 300. For example, the communication interface 1401 is configured to receive a packet 3 within an aging periodicity of a first key, where the packet 3 includes a key material 1. The processor 1402 is configured to obtain an updated key based on the key material 1.

In an example, the communication apparatus 1400 may perform the method 400 in the foregoing embodiment. When the communication apparatus 1400 is configured to perform the method 400 in the foregoing embodiment, the communication apparatus 1400 is equivalent to the first communication apparatus in the method 400. The communication interface 1401 is configured to perform receiving and sending operations performed by the first communication apparatus in the method 400. The processor 1402 is configured to perform an operation, other than the receiving and sending operations, performed by the first communication apparatus in the method 400. For example, the communication interface 1401 is configured to receive, within an aging periodicity of a first PSK, a first protocol packet sent by a second communication apparatus, where the first protocol packet includes a first PSK key material, and the first PSK key material is for generating an updated second PSK. The processor 1402 is configured to obtain the second PSK based on the first PSK key material.

In an example, the communication apparatus 1400 may perform the method 500 in the foregoing embodiment. When the communication apparatus 1400 is configured to perform the method 500 in the foregoing embodiment, the communication apparatus 1400 is equivalent to the second communication apparatus in the method 500. The communication interface 1401 is configured to perform receiving and sending operations performed by the second communication apparatus in the method 500. The processor 1402 is configured to perform an operation, other than the receiving and sending operations, performed by the second communication apparatus in the method 500. For example, the processor 1402 is configured to obtain a first PSK key material, where the first PSK key material indicates a first communication apparatus to generate an updated second PSK. The communication interface 1401 is configured to send a first protocol packet to the first communication apparatus within an aging periodicity of a first PSK, where the first protocol packet includes the first PSK key material.

In an example, the communication apparatus 1400 may perform the method 600 in the foregoing embodiment. When the communication apparatus 1400 is configured to perform the method 600 in the foregoing embodiment, the communication apparatus 1400 is equivalent to the first communication apparatus in the method 600. The communication interface 1401 is configured to perform receiving and sending operations performed by the first communication apparatus in the method 600. The processor 1402 is configured to perform an operation, other than the receiving and sending operations, performed by the first communication apparatus in the method 600. For example, the communication interface 1401 is configured to receive, within an aging periodicity of a first data key, a first protocol packet sent by a second communication apparatus, where the first protocol packet includes a first data key material, and the first data key material is for generating an updated second data key. The processor 1402 is configured to obtain the second data key based on the first data key material.

In an example, the communication apparatus 1400 may perform the method 700 in the foregoing embodiment. When the communication apparatus 1400 is configured to perform the method 700 in the foregoing embodiment, the communication apparatus 1400 is equivalent to the second communication apparatus in the method 700. The communication interface 1401 is configured to perform receiving and sending operations performed by the second communication apparatus in the method 700. The processor 1402 is configured to perform an operation, other than the receiving and sending operations, performed by the second communication apparatus in the method 700. For example, the processor 1402 is configured to obtain a first data key material, where the first data key material indicates a first communication apparatus to generate an updated second data key. The communication interface 1401 is configured to send a first protocol packet to the first communication apparatus within an aging periodicity of a first data key, where the first protocol packet includes the first data key material.

In an example, the communication apparatus 1400 may perform the method 800 in the foregoing embodiment. When the communication apparatus 1400 is configured to perform the method 800 in the foregoing embodiment, the communication apparatus 1400 is equivalent to the first communication apparatus in the method 800. The communication interface 1401 is configured to perform receiving and sending operations performed by the first communication apparatus in the method 800. The processor 1402 is configured to perform an operation, other than the receiving and sending operations, performed by the first communication apparatus in the method 800. For example, the communication interface 1401 is configured to receive, within an aging periodicity of a first authentication key, a first protocol packet sent by a second communication apparatus, where the first protocol packet includes a first authentication key material, and the first authentication key material is for generating an updated second authentication key. The processor 1402 is configured to obtain the second authentication key based on the first authentication key material.

In an example, the communication apparatus 1400 may perform the method 900 in the foregoing embodiment. When the communication apparatus 1400 is configured to perform the method 900 in the foregoing embodiment, the communication apparatus 1400 is equivalent to the second communication apparatus in the method 900. The communication interface 1401 is configured to perform receiving and sending operations performed by the second communication apparatus in the method 900. The processor 1402 is configured to perform an operation, other than the receiving and sending operations, performed by the second communication apparatus in the method 900. For example, the processor 1402 is configured to obtain a first authentication key material, where the first authentication key material indicates a first communication apparatus to generate an updated second authentication key. The communication interface 1401 is configured to send a first protocol packet to the first communication apparatus within an aging periodicity of a first authentication key, where the first protocol packet includes the first authentication key material.

In an example, the communication apparatus 1400 may perform the method 1000 in the foregoing embodiment. When the communication apparatus 1400 is configured to perform the method 1000 in the foregoing embodiment, the communication apparatus 1400 is equivalent to the first communication apparatus in the method moo. The communication interface 1401 is configured to perform receiving and sending operations performed by the first communication apparatus in the method woo. The processor 1402 is configured to perform an operation, other than the receiving and sending operations, performed by the first communication apparatus in the method woo. For example, the communication interface 1401 is configured to receive, within an aging periodicity of a first PSK, a first protocol packet sent by a second communication apparatus, where the first protocol packet includes a first PSK key material, and the first PSK key material is for generating an updated second PSK. The processor 1402 is configured to: obtain the second PSK based on the first PSK key material, and derive a MACsec key by using the second PSK within an aging periodicity of the second PSK.

In an example, the communication apparatus 1400 may perform the method 1100 in the foregoing embodiment. When the communication apparatus 1400 is configured to perform the method 1100 in the foregoing embodiment, the communication apparatus 1400 is equivalent to the second communication apparatus in the method 1100. The communication interface 1401 is configured to perform receiving and sending operations performed by the second communication apparatus in the method 1100. The processor 1402 is configured to perform an operation, other than the receiving and sending operations, performed by the second communication apparatus in the method 1100. For example, the processor 1402 is configured to obtain a first PSK key material, where the first PSK key material indicates a first communication apparatus to generate an updated second PSK. The communication interface 1401 is configured to send a first protocol packet to the first communication apparatus within an aging periodicity of a first PSK, where the first protocol packet includes the first PSK key material.

In an example, the communication apparatus 1400 may perform the method 1200 in the foregoing embodiment. When the communication apparatus 1400 is configured to perform the method 1200 in the foregoing embodiment, the communication apparatus 1400 is equivalent to the first communication apparatus in the method 1200. The communication interface 1401 is configured to perform receiving and sending operations performed by the first communication apparatus in the method 1200. The processor 1402 is configured to perform an operation, other than the receiving and sending operations, performed by the first communication apparatus in the method 1200. For example, the processor 1402 is configured to: determine, within an aging periodicity of a first PSK, that the first communication apparatus cannot process, based on the first PSK, a packet exchanged between the first communication apparatus and a second communication apparatus; and process, based on a second PSK locally stored in the first communication apparatus, the packet exchanged between the first communication apparatus and the second communication apparatus. In an example, the transceiver unit is configured to send alarm information to a control management device, where the alarm information indicates that the first communication apparatus cannot process, based on the first PSK within the aging periodicity of the first PSK, the packet exchanged between the first communication apparatus and the second communication apparatus.

Figure 15:
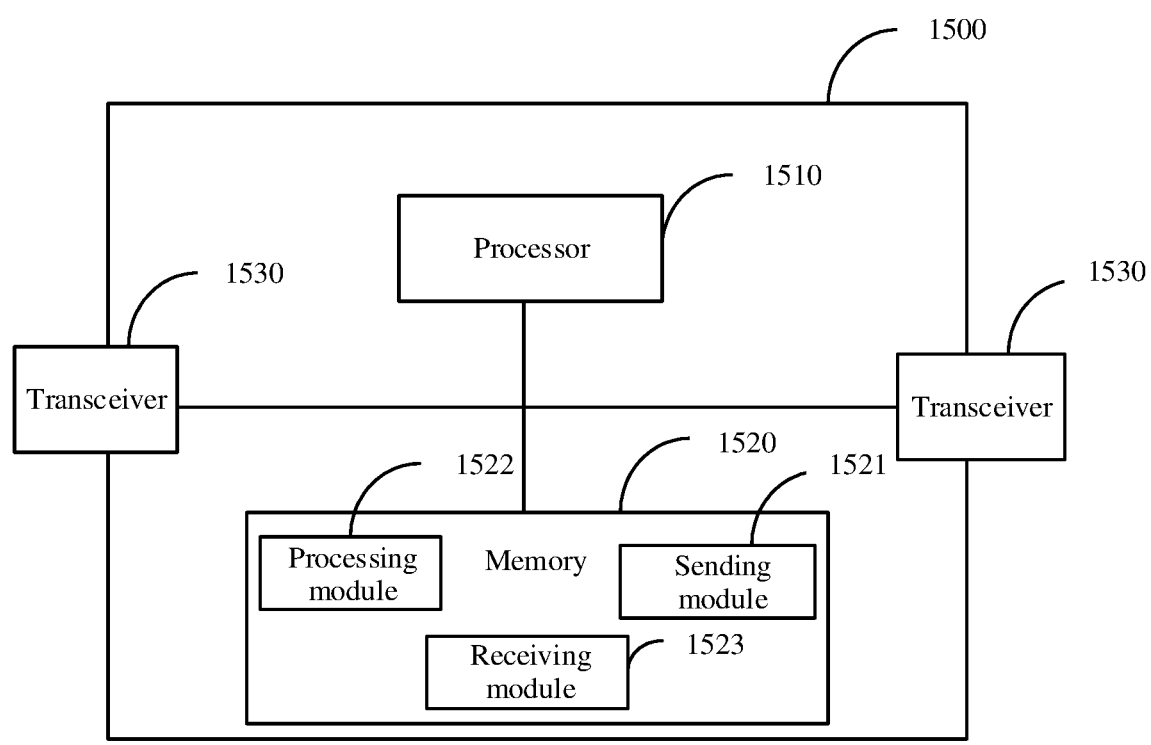
FIG. 15 is a schematic diagram of a structure of a communication apparatus according to an embodiment of this application.

In addition, an embodiment of this application further provides a communication apparatus 1500. FIG. 15 is a schematic diagram of a structure of the communication apparatus according to this embodiment of this application.

The communication apparatus 1500 may be configured to perform the method 100, the method 200, the method 300, the method 400, the method 500, the method 600, the method 700, the method 800, the method 900, the method woo, the method 1100, or the method 1200 in the foregoing embodiments.

As shown in FIG. 15, the communication apparatus 1500 may include a processor 1510, a memory 1520 coupled to the processor 1510, and a transceiver 1530. The transceiver 1530 may be, for example, a communication interface or an optical module. The processor 1510 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 1510 may be one processor, or may include a plurality of processors. The memory 1520 may include a volatile memory, for example, a random access memory (RAM); or may include a non-volatile memory, for example, a read-only memory (ROM), a flash memory, a hard disk drive (HDD), or a solid-state drive (SSD). The memory 1520 may alternatively include a combination of the foregoing types of memories. The memory 1520 may be one memory, or may include a plurality of memories. In an implementation, the memory 1520 stores computer-readable instructions. The computer-readable instructions include a plurality of software modules, for example, a sending module 1521, a processing module 1522, and a receiving module 1523. After executing each software module, the processor 1510 may perform a corresponding operation as indicated by each software module. In this embodiment, an operation performed by a software module is actually an operation performed by the processor 1510 based on the indication of the software module.

In an example, the communication apparatus 1500 may perform the method 100 in the foregoing embodiment. When the communication apparatus 1500 is configured to perform the method 100 in the foregoing embodiment, the communication apparatus 1500 is equivalent to the communication apparatus 1 in the method 100. The transceiver 1530 is configured to perform receiving and sending operations performed by the communication apparatus 1 in the method 100. The processor 1510 is configured to perform an operation, other than the receiving and sending operations, performed by the communication apparatus 1 in the method 100. For example, the processor 1510 is configured to obtain a key material 1, and obtain a packet 3 including the key material 1. The transceiver 1530 is configured to send the packet 3 to a communication apparatus 2.

In an example, the communication apparatus 1500 may perform the method 100 in the foregoing embodiment. When the communication apparatus 1500 is configured to perform the method 100 in the foregoing embodiment, the communication apparatus 1500 is equivalent to the communication apparatus 2 in the method 100. The transceiver 1530 is configured to perform receiving and sending operations performed by the communication apparatus 2 in the method 100. The processor 1510 is configured to perform an operation, other than the receiving and sending operations, performed by the communication apparatus 2 in the method 100. For example, the transceiver 1530 is configured to receive a packet 3 within an aging periodicity of a first key, where the packet 3 includes a key material 1. The processor 1510 is configured to obtain an updated key based on the key material 1.

In an example, the communication apparatus 1500 may perform the method 200 in the foregoing embodiment. When the communication apparatus 1500 is configured to perform the method 200 in the foregoing embodiment, the communication apparatus 1500 is equivalent to the communication apparatus 1 in the method 200. The transceiver 1530 is configured to perform receiving and sending operations performed by the communication apparatus 1 in the method 200. The processor 1510 is configured to perform an operation, other than the receiving and sending operations, performed by the communication apparatus 1 in the method 200. For example, the processor 1510 is configured to obtain a key material 1, and obtain a packet 3 including the key material 1. The transceiver 1530 is configured to send the packet 3 to a communication apparatus 2.

In an example, the communication apparatus 1500 may perform the method 200 in the foregoing embodiment. When the communication apparatus 1500 is configured to perform the method 200 in the foregoing embodiment, the communication apparatus 1500 is equivalent to the communication apparatus 2 in the method 200. The transceiver 1530 is configured to perform receiving and sending operations performed by the communication apparatus 2 in the method 200. The processor 1510 is configured to perform an operation, other than the receiving and sending operations, performed by the communication apparatus 2 in the method 200. For example, the transceiver 1530 is configured to receive a packet 3 within an aging periodicity of a first key, where the packet 3 includes a key material 1. The processor 1510 is configured to obtain an updated key based on the key material 1.

In an example, the communication apparatus 1500 may perform the method 300 in the foregoing embodiment. When the communication apparatus 1500 is configured to perform the method 300 in the foregoing embodiment, the communication apparatus 1500 is equivalent to the communication apparatus 1 in the method 300. The transceiver 1530 is configured to perform receiving and sending operations performed by the communication apparatus 1 in the method 300. The processor 1510 is configured to perform an operation, other than the receiving and sending operations, performed by the communication apparatus 1 in the method 300. For example, the processor 1510 is configured to obtain a key material 1, and obtain a packet 3 including the key material 1. The transceiver 1530 is configured to send the packet 3 to a communication apparatus 2.

In an example, the communication apparatus 1500 may perform the method 300 in the foregoing embodiment. When the communication apparatus 1500 is configured to perform the method 300 in the foregoing embodiment, the communication apparatus 1500 is equivalent to the communication apparatus 2 in the method 300. The transceiver 1530 is configured to perform receiving and sending operations performed by the communication apparatus 2 in the method 300. The processor 1510 is configured to perform an operation, other than the receiving and sending operations, performed by the communication apparatus 2 in the method 300. For example, the transceiver 1530 is configured to receive a packet 3 within an aging periodicity of a first key, where the packet 3 includes a key material 1. The processor 1510 is configured to obtain an updated key based on the key material 1.

In an example, the communication apparatus 1500 may perform the method 400 in the foregoing embodiment. When the communication apparatus 1500 is configured to perform the method 400 in the foregoing embodiment, the communication apparatus 1500 is equivalent to the first communication apparatus in the method 400. The transceiver 1530 is configured to perform receiving and sending operations performed by the first communication apparatus in the method 400. The processor 1510 is configured to perform an operation, other than the receiving and sending operations, performed by the first communication apparatus in the method 400. For example, the transceiver 1530 is configured to receive, within an aging periodicity of a first PSK, a first protocol packet sent by a second communication apparatus, where the first protocol packet includes a first PSK key material, and the first PSK key material is for generating an updated second PSK. The processor 1510 is configured to obtain the second PSK based on the first PSK key material.

In an example, the communication apparatus 1500 may perform the method 500 in the foregoing embodiment. When the communication apparatus 1500 is configured to perform the method 500 in the foregoing embodiment, the communication apparatus 1500 is equivalent to the second communication apparatus in the method 500. The transceiver 1530 is configured to perform receiving and sending operations performed by the second communication apparatus in the method 500. The processor 1510 is configured to perform an operation, other than the receiving and sending operations, performed by the second communication apparatus in the method 500. For example, the processor 1510 is configured to obtain a first PSK key material, where the first PSK key material indicates a first communication apparatus to generate an updated second PSK. The transceiver 1530 is configured to send a first protocol packet to the first communication apparatus within an aging periodicity of a first PSK, where the first protocol packet includes the first PSK key material.

In an example, the communication apparatus 1500 may perform the method 600 in the foregoing embodiment. When the communication apparatus 1500 is configured to perform the method 600 in the foregoing embodiment, the communication apparatus 1500 is equivalent to the first communication apparatus in the method 600. The transceiver 1530 is configured to perform receiving and sending operations performed by the first communication apparatus in the method 600. The processor 1510 is configured to perform an operation, other than the receiving and sending operations, performed by the first communication apparatus in the method 600. For example, the transceiver 1530 is configured to receive, within an aging periodicity of a first data key, a first protocol packet sent by a second communication apparatus, where the first protocol packet includes a first data key material, and the first data key material is for generating an updated second data key. The processor 1510 is configured to obtain the second data key based on the first data key material.

In an example, the communication apparatus 1500 may perform the method 700 in the foregoing embodiment. When the communication apparatus 1500 is configured to perform the method 700 in the foregoing embodiment, the communication apparatus 1500 is equivalent to the second communication apparatus in the method 700. The transceiver 1530 is configured to perform receiving and sending operations performed by the second communication apparatus in the method 700. The processor 1510 is configured to perform an operation, other than the receiving and sending operations, performed by the second communication apparatus in the method 700. For example, the processor 1510 is configured to obtain a first data key material, where the first data key material indicates a first communication apparatus to generate an updated second data key. The transceiver 1530 is configured to send a first protocol packet to the first communication apparatus within an aging periodicity of a first data key, where the first protocol packet includes the first data key material.

In an example, the communication apparatus 1500 may perform the method 800 in the foregoing embodiment. When the communication apparatus 1500 is configured to perform the method 800 in the foregoing embodiment, the communication apparatus 1500 is equivalent to the first communication apparatus in the method 800. The transceiver 1530 is configured to perform receiving and sending operations performed by the first communication apparatus in the method 800. The processor 1510 is configured to perform an operation, other than the receiving and sending operations, performed by the first communication apparatus in the method 800. For example, the transceiver 1530 is configured to receive, within an aging periodicity of a first authentication key, a first protocol packet sent by a second communication apparatus, where the first protocol packet includes a first authentication key material, and the first authentication key material is for generating an updated second authentication key. The processor 1510 is configured to obtain the second authentication key based on the first authentication key material.

In an example, the communication apparatus 1500 may perform the method 900 in the foregoing embodiment. When the communication apparatus 1500 is configured to perform the method 900 in the foregoing embodiment, the communication apparatus 1500 is equivalent to the second communication apparatus in the method 900. The transceiver 1530 is configured to perform receiving and sending operations performed by the second communication apparatus in the method 900. The processor 1510 is configured to perform an operation, other than the receiving and sending operations, performed by the second communication apparatus in the method 900. For example, the processor 1510 is configured to obtain a first authentication key material, where the first authentication key material indicates a first communication apparatus to generate an updated second authentication key. The transceiver 1530 is configured to send a first protocol packet to the first communication apparatus within an aging periodicity of a first authentication key, where the first protocol packet includes the first authentication key material.

In an example, the communication apparatus 1500 may perform the method 1000 in the foregoing embodiment. When the communication apparatus 1500 is configured to perform the method 1000 in the foregoing embodiment, the communication apparatus 1500 is equivalent to the first communication apparatus in the method 1000. The transceiver 1530 is configured to perform receiving and sending operations performed by the first communication apparatus in the method moo. The processor 1510 is configured to perform an operation, other than the receiving and sending operations, performed by the first communication apparatus in the method 1000. For example, the transceiver 1530 is configured to receive, within an aging periodicity of a first PSK, a first protocol packet sent by a second communication apparatus, where the first protocol packet includes a first PSK key material, and the first PSK key material is for generating an updated second PSK. The processor 1510 is configured to: obtain the second PSK based on the first PSK key material, and derive a MACsec key by using the second PSK within an aging periodicity of the second PSK.

In an example, the communication apparatus 1500 may perform the method 1100 in the foregoing embodiment. When the communication apparatus 1500 is configured to perform the method 1100 in the foregoing embodiment, the communication apparatus 1500 is equivalent to the second communication apparatus in the method 1100. The transceiver 1530 is configured to perform receiving and sending operations performed by the second communication apparatus in the method 1100. The processor 1510 is configured to perform an operation, other than the receiving and sending operations, performed by the second communication apparatus in the method 1100. For example, the processor 1510 is configured to obtain a first PSK key material, where the first PSK key material indicates a first communication apparatus to generate an updated second PSK. The transceiver 1530 is configured to send a first protocol packet to the first communication apparatus within an aging periodicity of a first PSK, where the first protocol packet includes the first PSK key material.

In an example, the communication apparatus 1500 may perform the method 1200 in the foregoing embodiment. When the communication apparatus 1500 is configured to perform the method 1200 in the foregoing embodiment, the communication apparatus 1500 is equivalent to the first communication apparatus in the method 1200. The transceiver 1530 is configured to perform receiving and sending operations performed by the first communication apparatus in the method 1200. The processor 1510 is configured to perform an operation, other than the receiving and sending operations, performed by the first communication apparatus in the method 1200. For example, the processor 1510 is configured to: determine, within an aging periodicity of a first PSK, that the first communication apparatus cannot process, based on the first PSK, a packet exchanged between the first communication apparatus and a second communication apparatus; and process, based on a second PSK locally stored in the first communication apparatus, the packet exchanged between the first communication apparatus and the second communication apparatus. In an example, the transceiver unit is configured to send alarm information to a control management device, where the alarm information indicates that the first communication apparatus cannot process, based on the first PSK within the aging periodicity of the first PSK, the packet exchanged between the first communication apparatus and the second communication apparatus.

An embodiment of this application further provides a computer-readable storage medium. The computer-readable storage medium stores instructions; and when the instructions are run on a computer, the computer is enabled to perform the steps performed by the first communication apparatus in the foregoing embodiments.

An embodiment of this application further provides a computer-readable storage medium. The computer-readable storage medium stores instructions; and when the instructions are run on a computer, the computer is enabled to perform the steps performed by the second communication apparatus in the foregoing embodiments.

An embodiment of this application further provides a communication system, including any one of the first communication apparatuses and any one of the second communication apparatuses in the foregoing embodiments.

An embodiment of this application further provides a communication device, including any one of the first communication apparatuses and any one of the second communication apparatuses in the foregoing embodiments. In an example, the communication device may be a T-BOX.

An embodiment of this application further provides a communication method. The communication method is performed by a communication device, and the communication device may include the first communication apparatus and the second communication apparatus in the foregoing embodiments. In other words, in an example, the communication device may perform the steps performed by the first communication apparatus and the steps performed by the second communication apparatus in the foregoing embodiments. In another example, the communication device may perform the steps performed by the communication apparatus 1 and the steps performed by the communication apparatus 2 in the foregoing embodiments.

In an example, the communication device may be a T-BOX, the first communication apparatus may be a communication entity in the T-BOX, and the second communication apparatus is also a communication entity in the T-BOX.

In an example, the communication device may be a T-BOX, the communication apparatus 1 may be a communication entity in the T-BOX, and the communication apparatus 2 is also a communication entity in the T-BOX.

In the specification, claims, and accompanying drawings of this application, the terms "first", "second", "third", "fourth", and the like (if existent) are intended to distinguish between similar objects but do not necessarily indicate a specific order or sequence. It should be understood that data termed in such a way is interchangeable in proper circumstances, so that embodiments described herein can be implemented in other orders than the order illustrated or described herein. In addition, the terms "include", "have", and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, in other words, may be located in one position, or may be distributed on a plurality of network units. Some or all of the units may be selected based on an actual requirement to achieve the objectives of the solutions of embodiments.

In addition, service units in embodiments of this application may be integrated into one processing unit, each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, services described in the present disclosure may be implemented by hardware, software, firmware, or any combination thereof. When being implemented by software, the foregoing services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose computer or a special-purpose computer.

The objectives, technical solutions, and beneficial effects of the present disclosure have been further described in detail in the foregoing specific implementations. It should be understood that the foregoing descriptions are merely specific implementations of the present disclosure.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A first communication apparatus, comprising: a communication interface; at least one processor; and a non-transitory computer-readable storage medium storing a program to be executed by the at least one processor, the program including instructions for: receiving, through the communication interface, within an aging periodicity of a first pre-shared key (PSK), a first protocol packet sent by a second communication apparatus, wherein the first protocol packet comprises a first PSK key material for generating a second PSK, wherein the first PSK is used for processing, within the aging periodicity of the first PSK, a packet exchanged between the first communication apparatus and the second communication apparatus and the second PSK is used for processing, within an aging periodicity of the second PSK, a packet exchanged between the first communication apparatus and the second communication apparatus obtaining the second PSK based on the first PSK key material, wherein obtaining the second PSK based on the first PSK key material comprises: obtaining the second PSK based on the first PSK key material and a first key derivation algorithm, and obtaining the second PSK based on the first PSK key material and the first key derivation algorithm comprises: performing a first algorithm calculation on the first PSK key material to obtain an intermediate value; and generating the second PSK based on the intermediate value and the first key derivation algorithm.

2. The first communication apparatus according to claim 1, further comprising:
storing the second PSK in a non-volatile memory area of the first communication apparatus.

3. The first communication apparatus according to claim 1, wherein obtaining the second PSK based on the first PSK key material comprises:
obtaining the second PSK based on the first PSK key material and a second PSK key material of the first communication apparatus.

4. The first communication apparatus according to claim 1, further comprising:
sending a third PSK key material to the second communication apparatus, to enable the second communication apparatus to generate the second PSK based on the third PSK key material.

5. The first communication apparatus according to claim 1, wherein the first PSK key material comprises a nonce.

6. The first communication apparatus according to claim 1, wherein the first protocol packet is a PSK-based extensible authentication protocol (EAP)-PSK packet.

7. The first communication apparatus according to claim 1, wherein the first communication apparatus stores a first data key, the first protocol packet further comprises a data key material, the data key material is associated with generating a second data key, the first data key is associated with processing, within an aging periodicity of the first data key, a data packet exchanged between the first communication apparatus and the second communication apparatus, and the second data key is associated with processing, within an aging periodicity of the second data key, a data packet exchanged between the first communication apparatus and the second communication apparatus, and wherein the instructions further comprise instructions for:
obtaining the second data key based on the data key material.

8. The first communication apparatus according to claim 1, wherein the first communication apparatus stores a first authentication key, the first protocol packet further comprises an authentication key material, the authentication key material is associated with generating a second authentication key, the first authentication key is associated with processing, within an aging periodicity of the first authentication key, an identity authentication packet exchanged between the first communication apparatus and the second communication apparatus, and the second authentication key is associated with processing, within an aging periodicity of the second authentication key, an identity authentication packet exchanged between the first communication apparatus and the second communication apparatus, and wherein the instructions further comprise instructions for:
obtaining the second authentication key based on the authentication key material.

9. The first communication apparatus according to claim 1, further comprising:
deriving a media access control security (MACsec) key based on the second PSK.

10. The first communication apparatus according to claim 1, wherein the first communication apparatus is an in-vehicle apparatus, and the second communication apparatus is an in-vehicle apparatus.

11. A second communication apparatus, comprising:
a communication interface;
at least one processor; and
a non-transitory computer-readable storage medium storing a program to be executed by the at least one processor, the program including instructions for:
obtaining a first pre-shared key (PSK) key material, wherein the first PSK key material indicates to a first communication apparatus to generate a second PSK, a packet exchanged between the first communication apparatus and the second communication apparatus is processed, within an aging periodicity of a first PSK, based on the first PSK, and a packet exchanged between the first communication apparatus and the second communication apparatus is processed, within an aging periodicity of the second PSK, based on the second PSK;
sending, using the communication interface, a first protocol packet to the first communication apparatus within the aging periodicity of the first PSK, wherein the first protocol packet comprises the first PSK key material; and
obtaining the second PSK based on the first PSK key material,
wherein obtaining the second PSK based on the first PSK key material comprises:
obtaining the second PSK based on the first PSK key material and a first key derivation algorithm, and obtaining the second PSK based on the first PSK key material and the first key derivation algorithm comprises:
performing a first algorithm calculation on the first PSK key material to obtain an intermediate value; and
generating the second PSK based on the intermediate value and the first key derivation algorithm.

12. The second communication apparatus according to claim 11, further comprising:
storing the first PSK key material.

13. The second communication apparatus according to claim 11, further comprising:
receiving a third PSK key material sent by the first communication apparatus; and
obtaining the second PSK based on the third PSK key material.

14. The second communication apparatus according to claim 11, wherein the first PSK key material comprises a nonce.

15. The second communication apparatus according to claim 11, wherein the first protocol packet is a PSK-based extensible authentication protocol (EAP)-PSK packet.

16. The second communication apparatus according to claim 11, wherein the first protocol packet further comprises a data key material, the data key material is associated with generating a second data key, a first data key is associated with processing, within an aging periodicity of the first data key, a data packet exchanged between the first communication apparatus and the second communication apparatus, and the second data key is associated with processing, within an aging periodicity of the second data key, a data packet exchanged between the first communication apparatus and the second communication apparatus.

17. The second communication apparatus according to claim 11, wherein the first protocol packet further comprises an authentication key material, the authentication key material is associated with generating a second authentication key, a first authentication key is associated with processing, within an aging periodicity of the first authentication key, an identity authentication packet exchanged between the first communication apparatus and the second communication apparatus, and the second authentication key is associated with processing, within an aging periodicity of the second authentication key, an identity authentication packet exchanged between the first communication apparatus and the second communication apparatus.

18. The second communication apparatus according to claim 11, further comprising:
  deriving a media access control security (MACsec) key based on the second PSK.

19. The second communication apparatus according to claim 11, wherein the first communication apparatus is an in-vehicle apparatus, and the second communication apparatus is an in-vehicle apparatus.

20. A communication system, comprising:
  a second communication apparatus; and
  a first communication apparatus configured to:
    receive, within an aging periodicity of a first pre-shared key (PSK), a first protocol packet sent by the second communication apparatus, wherein the first protocol packet comprises a first PSK key material for generating a second PSK, a packet exchanged between the first communication apparatus and the second communication apparatus is processed, within the aging periodicity of the first PSK, based on the first PSK, and a packet exchanged between the first communication apparatus and the second communication apparatus is processed, within an aging periodicity of the second PSK, based on the second PSK; and
    obtain the second PSK based on the first PSK key material,
    wherein to obtain the second PSK based on the first PSK key material, the first communication apparatus is further configured to:
    obtain the second PSK based on the first PSK key material and a first key derivation algorithm, and to obtain the second PSK based on the first PSK key material and the first key derivation algorithm, the first communication apparatus is further configured to:
      perform a first algorithm calculation on the first PSK key material to obtain an intermediate value; and
      generate the second PSK based on the intermediate value and the first key derivation algorithm.

21. The communication system according to claim 20, wherein the communication system is an Internet of Things (IoT) device.

22. The communication system according to claim 21, wherein the first communication apparatus is an in-vehicle telematics box (T-BOX).

* * * * *

UNITED STATES PATENT AND TRADEMARK OFFICE
CERTIFICATE OF CORRECTION

| | | |
|---|---|---|
| PATENT NO. | : 12,500,745 B2 | Page 1 of 1 |
| APPLICATION NO. | : 18/158890 | |
| DATED | : December 16, 2025 | |
| INVENTOR(S) | : Sheng et al. | |

It is certified that error appears in the above-identified patent and that said Letters Patent is hereby corrected as shown below:

In the Claims

In Column 173, in Claim 1, Line 2, delete "apparatus" and insert -- apparatus, --.

In Column 173, in Claim 1, Line 5, delete "second communication apparatus" and insert -- second communication apparatus; and --.

Signed and Sealed this
Third Day of February, 2026

John A. Squires
*Director of the United States Patent and Trademark Office*